US012712417B2

(12) United States Patent
Niwa et al.

(10) Patent No.: US 12,712,417 B2
(45) Date of Patent: Aug. 18, 2026

(54) ROTARY ELECTRIC MACHINE

(71) Applicant: DENSO CORPORATION, Kariya-city (JP)

(72) Inventors: Wataru Niwa, Kariya-city (JP); Tsuyoshi Goda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 208 days.

(21) Appl. No.: 18/615,966

(22) Filed: Mar. 25, 2024

(65) Prior Publication Data

US 2024/0258885 A1 Aug. 1, 2024

Related U.S. Application Data

(63) Continuation of application No. PCT/JP2022/035356, filed on Sep. 22, 2022.

(30) Foreign Application Priority Data

Sep. 27, 2021 (JP) ................................ 2021-156823
Jul. 27, 2022 (JP) ................................ 2022-119824

(51) Int. Cl.
*H02K 11/25* (2016.01)
*H02K 1/2798* (2022.01)
(Continued)

(52) U.S. Cl.
CPC ........... *H02K 11/25* (2016.01); *H02K 1/2798* (2022.01); *H02K 3/522* (2013.01); *H02K 21/24* (2013.01);
(Continued)

(58) Field of Classification Search
CPC ...... H02K 11/25; H02K 1/2798; H02K 3/522; H02K 21/24; H02K 2203/09; H02K 2203/12
(Continued)

(56) References Cited

U.S. PATENT DOCUMENTS 6,589,029 B1 7/2003 Heller
6,891,291 B1 5/2005 Weihsmann
(Continued)

FOREIGN PATENT DOCUMENTS

CN 205693522 U 11/2016
CN 107359741 A * 11/2017 ............ H02K 7/085
(Continued)

OTHER PUBLICATIONS

U.S. Appl. No. 18/615,946 and its entire file history.
(Continued)

*Primary Examiner* — Jose A Gonzalez Quinones
(74) *Attorney, Agent, or Firm* — Precision Patents, P.C.

(57) ABSTRACT

A motor device includes a motor housing, a stator coil, and a temperature sensor. The motor housing accommodates the stator coil and the temperature sensor. In the motor housing, motor fins are provided on a motor outer peripheral surface. The motor fins are provided on a radially outer side of the stator coil. The temperature sensor is provided on a radially inner side of the stator coil. In the motor device, heat radiation of the stator coil toward the radially outer side is accelerated by the motor fins such that heat radiated from the stator coil toward the radially outer side is more than heat radiated from the stator coil toward the radially inner side.

10 Claims, 93 Drawing Sheets

(51) Int. Cl.
*H02K 3/52* (2006.01)
*H02K 21/24* (2006.01)

(52) U.S. Cl.
CPC ..... *H02K 2203/09* (2013.01); *H02K 2203/12* (2013.01)

(58) Field of Classification Search
USPC ........................................................ 310/68 C
See application file for complete search history.

(56) References Cited

U.S. PATENT DOCUMENTS

| | | | |
|---|---|---|---|
| 7,291,950 B2 | 11/2007 | Isoda et al. | |
| 2006/0279156 A1 | 12/2006 | Shibukawa et al. | |
| 2007/0284954 A1 | 12/2007 | Lin et al. | |
| 2009/0230694 A1 | 9/2009 | Yoshida et al. | |
| 2009/0295246 A1 | 12/2009 | Abe | |
| 2010/0052452 A1 | 3/2010 | Yoshino et al. | |
| 2011/0285220 A1 | 11/2011 | Sonohara et al. | |
| 2012/0262019 A1 | 10/2012 | Smith et al. | |
| 2012/0262020 A1 | 10/2012 | Smith et al. | |
| 2013/0214631 A1 | 8/2013 | Smith et al. | |
| 2015/0061428 A1 | 3/2015 | Jimbo et al. | |
| 2015/0381014 A1 | 12/2015 | Lee | |
| 2016/0006315 A1 | 1/2016 | Winterer | |
| 2016/0149450 A1 | 5/2016 | Horii et al. | |
| 2016/0247616 A1 | 8/2016 | Smith et al. | |
| 2016/0344249 A1 | 11/2016 | Enjoji | |
| 2016/0344265 A1 | 11/2016 | Enjoji | |
| 2017/0170695 A1 | 6/2017 | Yamamoto et al. | |
| 2017/0331341 A1 | 11/2017 | Makino et al. | |
| 2018/0198335 A1 | 7/2018 | Inoue et al. | |
| 2018/0358860 A1 | 12/2018 | Major et al. | |
| 2019/0058375 A1 | 2/2019 | Tokoi et al. | |
| 2019/0140508 A1 | 5/2019 | Masuda | |
| 2019/0248021 A1 | 8/2019 | Jackowski et al. | |
| 2019/0288584 A1 | 9/2019 | Vansompel et al. | |
| 2019/0334402 A1 | 10/2019 | Makino et al. | |
| 2020/0014272 A1* | 1/2020 | Asahi | H02K 3/50 |
| 2020/0309118 A1 | 10/2020 | Sakamoto et al. | |
| 2020/0395808 A1 | 12/2020 | Tokoi et al. | |
| 2021/0044180 A1 | 2/2021 | Seo et al. | |
| 2021/0075289 A1 | 3/2021 | Yada et al. | |
| 2021/0083537 A1 | 3/2021 | Milheim et al. | |
| 2021/0218322 A1 | 7/2021 | Mihaila et al. | |
| 2021/0351658 A1 | 11/2021 | Jore | |
| 2022/0094230 A1 | 3/2022 | Lines | |
| 2023/0038386 A1 | 2/2023 | Goykhman et al. | |

FOREIGN PATENT DOCUMENTS

| | | | | |
|---|---|---|---|---|
| CN | 109586440 A | | 4/2019 | |
| CN | 112821699 A | | 5/2021 | |
| DE | 10313274 A1 | | 2/2004 | |
| DE | 202011001542 U1 | | 4/2011 | |
| JP | H07-245915 A | | 9/1995 | |
| JP | 2003-83258 A | | 3/2003 | |
| JP | 2003083258 A | * | 3/2003 | |
| JP | 2003-134750 A | | 5/2003 | |
| JP | 2006-304532 A | | 11/2006 | |
| JP | 2008-125307 A | | 5/2008 | |
| JP | 2008-278654 A | | 11/2008 | |
| JP | 4715361 B2 | | 7/2011 | |
| JP | 2011188587 A | | 9/2011 | |
| JP | 2014-75909 A | | 4/2014 | |
| JP | 2014075909 A | * | 4/2014 | |
| JP | 5626758 B2 | | 11/2014 | |
| JP | 2016-119764 A | | 6/2016 | |
| JP | 2017051059 A | | 3/2017 | |
| JP | 2018174604 A | * | 11/2018 | |
| JP | 2019-047645 A | | 3/2019 | |
| JP | 2020-137183 A | | 8/2020 | |
| JP | 2021-078218 A | | 5/2021 | |
| JP | 6943317 B1 | | 9/2021 | |
| JP | 2021-175338 A | | 11/2021 | |
| JP | 2021-182801 A | | 11/2021 | |
| JP | 2023-047729 A | | 4/2023 | |
| JP | 2023-047730 A | | 4/2023 | |
| JP | 2023-047731 A | | 4/2023 | |
| WO | WO-2010067680 A1 | * | 6/2010 | H02K 5/225 |
| WO | 2017146031 A1 | | 8/2017 | |
| WO | 2021/139079 A1 | | 7/2021 | |
| WO | 2021181728 A1 | | 9/2021 | |

OTHER PUBLICATIONS

U.S. Appl. No. 18/615,717 and its entire file history.
U.S. Appl. No. 18/615,956 and its entire file history.
U.S. Appl. No. 18/615,779 and its entire file history.
U.S. Appl. No. 18/615,962 and its entire file history.
U.S. Appl. No. 18/615,814 and its entire file history.
U.S. Appl. No. 18/615,861 and its entire file history.
U.S. Appl. No. 18/615,970 and its entire file history.
U.S. Appl. No. 18/615,879 and its entire file history.
U.S. Appl. No. 18/615,974 and its entire file history.
U.S. Appl. No. 18/615,893 and its entire file history.

* cited by examiner

ROTARY ELECTRIC MACHINE

CROSS REFERENCE TO RELATED APPLICATION

The present application is a continuation application of International Patent Application No. PCT/JP2022/035356 filed on Sep. 22, 2022, which designated the U.S. and claims the benefit of priority from Japanese Patent Applications No. 2021-156823 filed on Sep. 27, 2021 and No. 2022-119824 filed on Jul. 27, 2022. The entire disclosures of all of the above applications are incorporated herein by reference.

TECHNICAL FIELD

The present disclosure relates to a rotary electric machine.

BACKGROUND

An axial gap-type motor includes a rotor and a stator that are aligned in an axial direction.

SUMMARY

According to an aspect of the present disclosure, a rotary electric machine comprises a stator and a rotor configured to rotate about a rotation axis and aligned with the stator in an axial direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
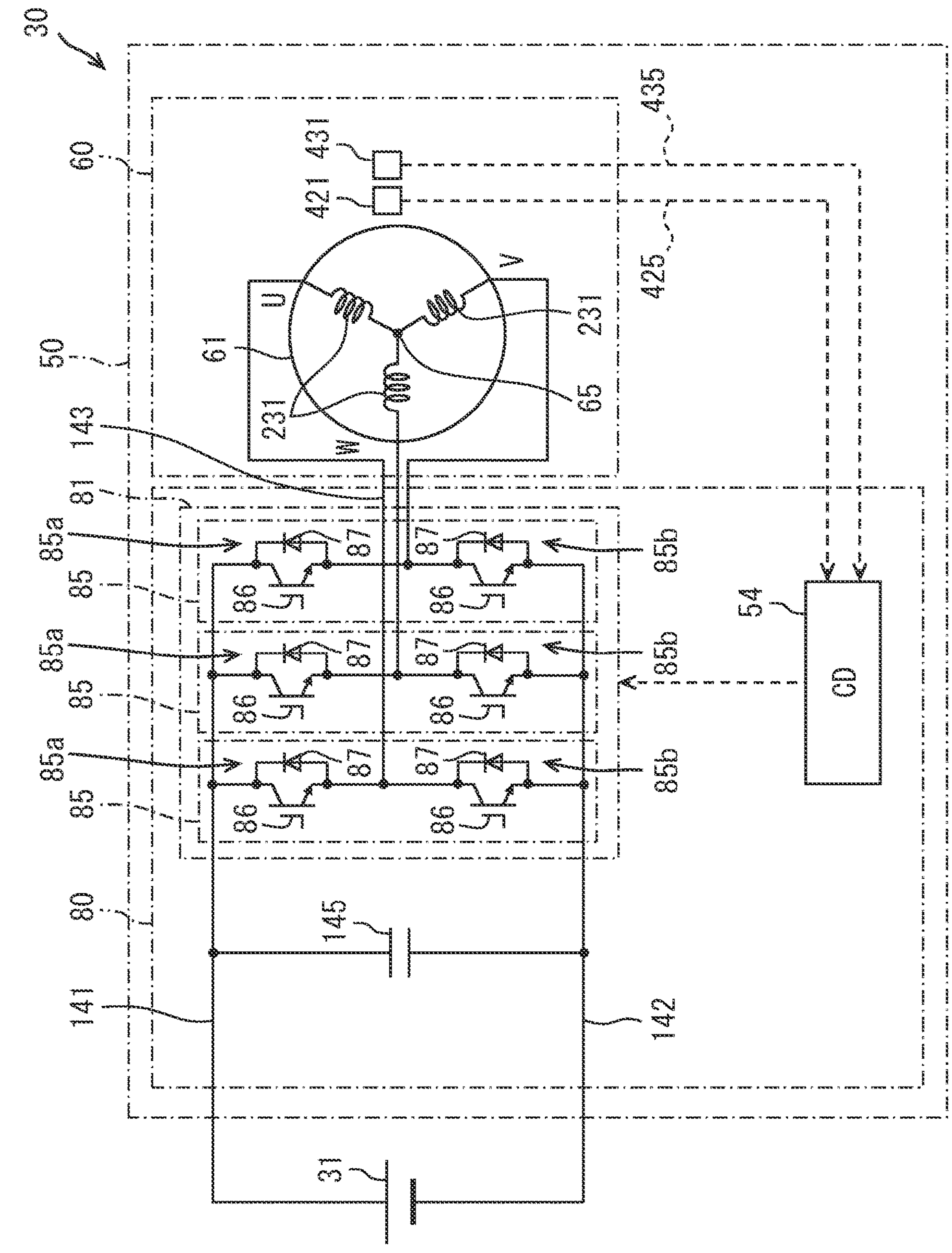
FIG. 1 is a diagram showing a configuration of a driving system according to a first embodiment.

Hereinafter, examples of the present disclosure will be described.

According to an example of the present disclosure, a motor includes a temperature sensor. In the motor, a stator and a rotor are accommodated in a housing. A temperature sensor is also accommodated in the housing. The temperature sensor is provided on an outer peripheral side of a coil of the stator.

In this example, it is considered that the housing functions as a heat radiation portion that releases heat of the coil to the outside. When the housing functions as the heat radiation portion, a temperature of the housing is likely to be lower than a temperature of the coil. In this example, the temperature sensor detects a temperature between the coil and the housing that functions as the heat radiation portion, and thus a detected temperature of the temperature sensor is likely to be lower than an actual temperature of the coil. From a viewpoint that the temperature sensor detects the temperature of the coil, there is a concern that the detection accuracy of the temperature sensor is decreased.

According to an example of the present disclosure, a rotary electric machine is to be driven by supply of electric power. The rotary electric machine comprises:

- a stator including a coil;
- a rotor configured to rotate about a rotation axis and aligned with the stator in an axial direction in which the rotation axis extends;
- an electric machine housing accommodating the stator and the rotor;
- a heat radiation accelerating portion provided on one of an inner side and an outer side of the coil in a radial direction of the rotation axis and configured to accelerate heat radiation of the coil toward one side, such that heat radiated from the coil toward the one side is more than heat radiated toward the other side; and
- a temperature detection unit accommodated in the electric machine housing, provided on an opposite side of the coil from the heat radiation accelerating portion in the radial direction, and configured to detect an internal temperature of the electric machine housing.

In the rotary electric machine, the heat radiation accelerating portion is provided on one of the inner side and the outer side of the coil in the radial direction. Therefore, an effect of cooling the rotary electric machine from one side in the radial direction can be applied by the heat radiation accelerating portion. Moreover, the temperature detection unit is provided on the side opposite to the heat radiation accelerating portion with the coil interposed therebetween. In the configuration, due to the cooling effect of the heat radiation accelerating portion, a detected temperature of the temperature detection unit is less likely to be lower than an actual coil temperature. That is, a difference between the detected temperature of the temperature detection unit and the actual coil temperature is less likely to be generated. Therefore, in the rotary electric machine, the detection accuracy for the coil temperature can be improved while enhancing the cooling effect.

Hereinafter, multiple embodiments for carrying out the present disclosure will be described with reference to the drawings. In each embodiment, the same reference numerals are assigned to portions corresponding to the items described in the preceding embodiments, and a repetitive description thereof may be omitted. In each embodiment, when only a part of the configuration is described, another embodiment previously described can be employed for the other part of the configuration. Not only combinations between portions that are specifically clarified as being able to be used in combination in each embodiment are possible, but also partial combinations between the embodiments whose combination is not specifically clarified are possible as long as no adverse effect is particularly generated on the combination.

First Embodiment

A driving system 30 shown in FIG. 1 is mounted on a moving object such as a vehicle or a flight vehicle. Examples of the vehicle on which the driving system 30 is mounted include an electric vehicle (EV), a hybrid vehicle (HV), and a fuel cell vehicle. An example of the flight vehicle includes an aircraft such as a vertical take-off and landing aircraft, a rotorcraft, and a fixed-wing aircraft. The vertical take-off and landing aircraft includes an eVTOL. The eVTOL is an abbreviation of an electric vertical take-off and landing aircraft.

The driving system 30 is a system that drives the moving object to move. If the moving object is a vehicle, the driving system 30 drives the vehicle to travel, and if the moving object is a flight vehicle, the driving system 30 drives the flight vehicle to fly.

The driving system 30 includes a battery 31 and a motor device unit 50. The battery 31 is electrically connected to the motor device unit 50. The battery 31 is an electric power supply unit that supplies electric power to the motor device unit 50, and corresponds to a power supply unit. The battery 31 is a DC voltage source that applies a DC voltage to the motor device unit 50. The battery 31 includes a rechargeable secondary battery. Examples of the secondary battery include a lithium ion battery and a nickel-hydrogen battery. In addition to or instead of the battery 31, a fuel cell, a generator, or the like may be used as the power supply unit.

The motor device unit 50 is a device that drives the moving object to move, and corresponds to a drive device. The motor device unit 50 includes a motor device 60 and an inverter device 80. The motor device 60 includes a motor 61. The inverter device 80 includes an inverter 81. The battery 31 is electrically connected to the motor 61 via the inverter 81. Electric power is supplied to the motor 61 from the battery 31 via the inverter 81. The motor 61 is driven in response to a voltage and a current supplied from the inverter 81.

The motor 61 is a multi-phase AC motor. The motor 61 is, for example, a three-phase AC motor, and has a U-phase, a V-phase, and a W-phase. The motor 61 is a moving driving source for moving the moving object, and functions as an electric motor. As the motor 61, for example, a brushless motor is used. The motor 61 functions as a generator during regeneration. The motor 61 corresponds to a rotary electric machine, and the motor device unit 50 corresponds to a rotary electric machine unit.

The motor 61 includes coils 211 of multiple phases. The coils 211 are windings and form an armature. The coil 211 is provided for each of the U-phase, the V-phase, and the W-phase. In the motor 61, the coils 211 of multiple phases are star-connected. The star-connection may be referred to as a Y-connection. The motor 61 includes a neutral point 65. The coils 211 of multiple phases are connected to one another by the neutral point 65.

The inverter 81 drives the motor 61 by converting the electric power supplied to the motor 61. The inverter 81 converts the electric power supplied to the motor 61 from a direct current to an alternating current. The inverter 81 is an electric power conversion unit that converts the electric power. The inverter 81 is a multi-phase electric power conversion unit, and performs electric power conversion for each of the multiple phases. The inverter 81 is, for example, a three-phase inverter, and performs the electric power conversion for each of the U-phase, the V-phase, and the W-phase.

The inverter device 80 includes a P-line 141 and an N-line 142. The P-line 141 and the N-line 142 electrically connect the battery 31 and the inverter 81. The P-line 141 is electrically connected to a positive electrode of the battery 31. The N-line 142 is electrically connected to a negative electrode of the battery 31. In the battery 31, the positive electrode is an electrode on a high potential side, and the negative electrode is an electrode on a low potential side. The P-line 141 and the N-line 142 are electric power lines for supplying the electric power. The P-line 141 is the electric power line on the high potential side and may be referred to as a high potential line. The N-line 142 is the electric power line on the low potential side and may be referred to as a low potential line.

The motor device unit 50 includes an output line 143. The output line 143 is an electric power line for supplying the electric power. The output line 143 electrically connects the motor 61 and the inverter 81. The output line 143 is in a state of spanning the motor device 60 and the inverter device 80.

The inverter device 80 includes a smoothing capacitor 145. The smoothing capacitor 145 is a capacitor that smooths the DC voltage supplied from the battery 31. The smoothing capacitor 145 is connected to the P-line 141 and the N-line 142 between the battery 31 and the inverter 81. The smoothing capacitor 145 is connected in parallel to the inverter 81.

The inverter 81 is an electric power conversion circuit, for example, a DC-AC conversion circuit. The inverter 81 includes multi-phase arm circuits 85. For example, the inverter 81 includes the arm circuits 85 respectively for the U-phase, the V-phase, and the W-phase. The arm circuit 85 may be referred to as a leg and an upper and lower arm circuit. Each of the arm circuits 85 includes an upper arm 85*a* and a lower arm 85*b*. The upper arm 85*a* and the lower arm 85*b* are connected in series to the battery 31. The upper arm 85*a* is connected to the P-line 141, and the lower arm 85*b* is connected to the N-line 142.

The output line 143 is connected to the arm circuit 85 for each of the multiple phases. The output line 143 is connected between the upper arm 85*a* and the lower arm 85*b*. The output line 143 connects the arm circuit 85 and the coil 211 in each of the multiple phases. The output line 143 is connected to a side of the coil 211 opposite to the neutral point 65.

The arms 85*a* and 85*b* each include an arm switch 86 and a diode 87. The arm switch 86 is formed by a switching element such as a semiconductor device. The switching element is, for example, a power element such as an IGBT and a MOSFET. The IGBT is an abbreviation of an insulated gate bipolar transistor. The MOSFET is an abbreviation of a metal-oxide-semiconductor field-effect transistor.

The arms 85*a* and 85*b* each include one arm switch 86 and one diode 87. In each of the arms 85*a* and 85*b*, the diode 87 is connected in antiparallel to the arm switch 86 for reflux. In the upper arm 85*a*, a collector of the arm switch 86 is connected to the P-line 141. In the lower arm 85*b*, an emitter of the arm switch 86 is connected to the N-line 142. The emitter of the arm switch 86 in the upper arm 85*a* and the collector of the arm switch 86 in the lower arm 85*b* are connected to each other. An anode of the diode 87 is connected to the emitter of the corresponding arm switch 86, and a cathode of the diode 87 is connected to the collector of the corresponding arm switch 86. The arm switch 86 may also be referred to as a semiconductor switch.

The motor device unit 50 includes a control device 54. The control device 54 is provided in the inverter device 80. The control device 54 is, for example, an ECU, and controls driving of the inverter 81. The ECU is an abbreviation of an electronic control unit. The control device 54 is mainly implemented by a microcomputer including, for example, a processor, a memory, an I/O, and a bus connecting these components. The memory is a non-transitory tangible storage medium that non-temporarily stores computer readable programs and data. The non-transitory tangible storage medium is implemented by a semiconductor memory, a magnetic disk, or the like. In FIG. 1, the control device 54 is illustrated as a CD.

The control device 54 executes various types of processing related to the driving of the inverter 81 by executing a control program stored in the memory. The control device 54 is electrically connected to an external device, the inverter 81, and various sensors. The external device is, for example, a host ECU such as an integrated ECU mounted on the moving object. The various sensors are provided, for example, in the motor device unit 50. The control device 54 controls the inverter 81 by outputting a command signal to the inverter 81. The control device 54 generates a command signal in response to a control signal received from the external device, detection signals received from the various sensors, and the like. In the inverter device 80, the inverter 81 is driven in response to the command signal received from the control device 54, and the electric power conversion is performed by the inverter 81.

The motor device 60 includes a resolver 421 and a temperature sensor 431 as the various sensors. The resolver 421 is a rotation sensor that detects a rotation angle of the motor 61, and corresponds to a rotation detection unit. The resolver 421 outputs a detection signal corresponding to the rotation angle of the motor 61. The detection signal of the resolver 421 includes information on a rotation number of the motor 61, such as a rotation angle. The motor device 60 may include a rotation detection unit different from the resolver 421.

The temperature sensor 431 can detect a temperature of the motor 61, and corresponds to a temperature detection unit. The temperature sensor 431 outputs a detection signal corresponding to the temperature of the motor 61. The temperature sensor 431 detects, for example, a temperature of a stator 200 to be described later, as the temperature of the motor 61. The temperature sensor 431 may detect a temperature of any portion of the motor 61.

The resolver 421 and the temperature sensor 431 are electrically connected to the control device 54. The resolver 421 is connected to the control device 54 via a signal line 425. The detection signal output by the resolver 421 is input to the control device 54 via the signal line 425. The temperature sensor 431 is connected to the control device 54 via a signal line 435. The detection signal output by the temperature sensor 431 is input to the control device 54 via the signal line 435. The signal lines 425 and 435 are provided in the motor device unit 50, and are in a state of spanning the motor device 60 and the inverter device 80.

Figure 2:
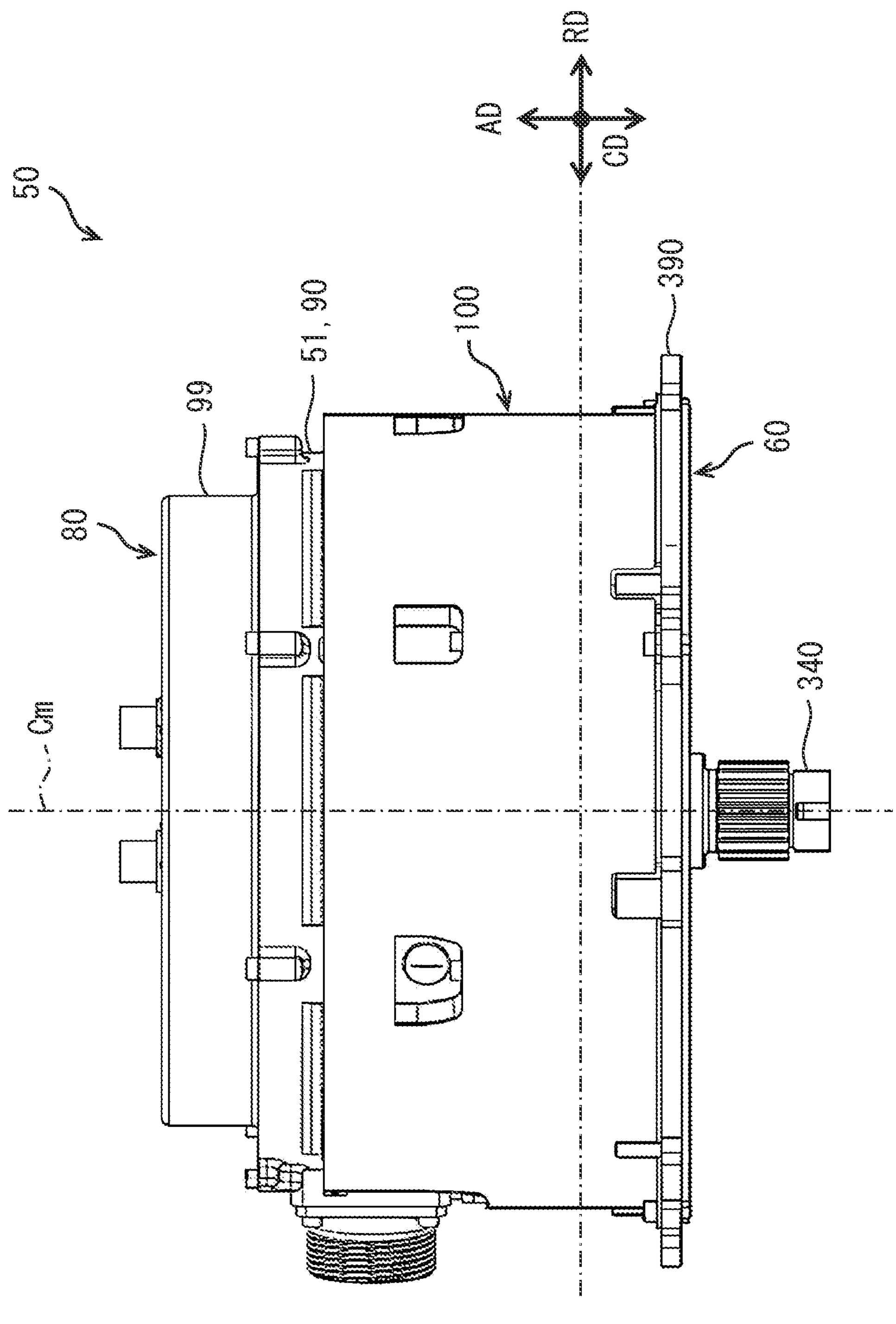
FIG. 2 is a front view of a motor device unit.
Figure 3:
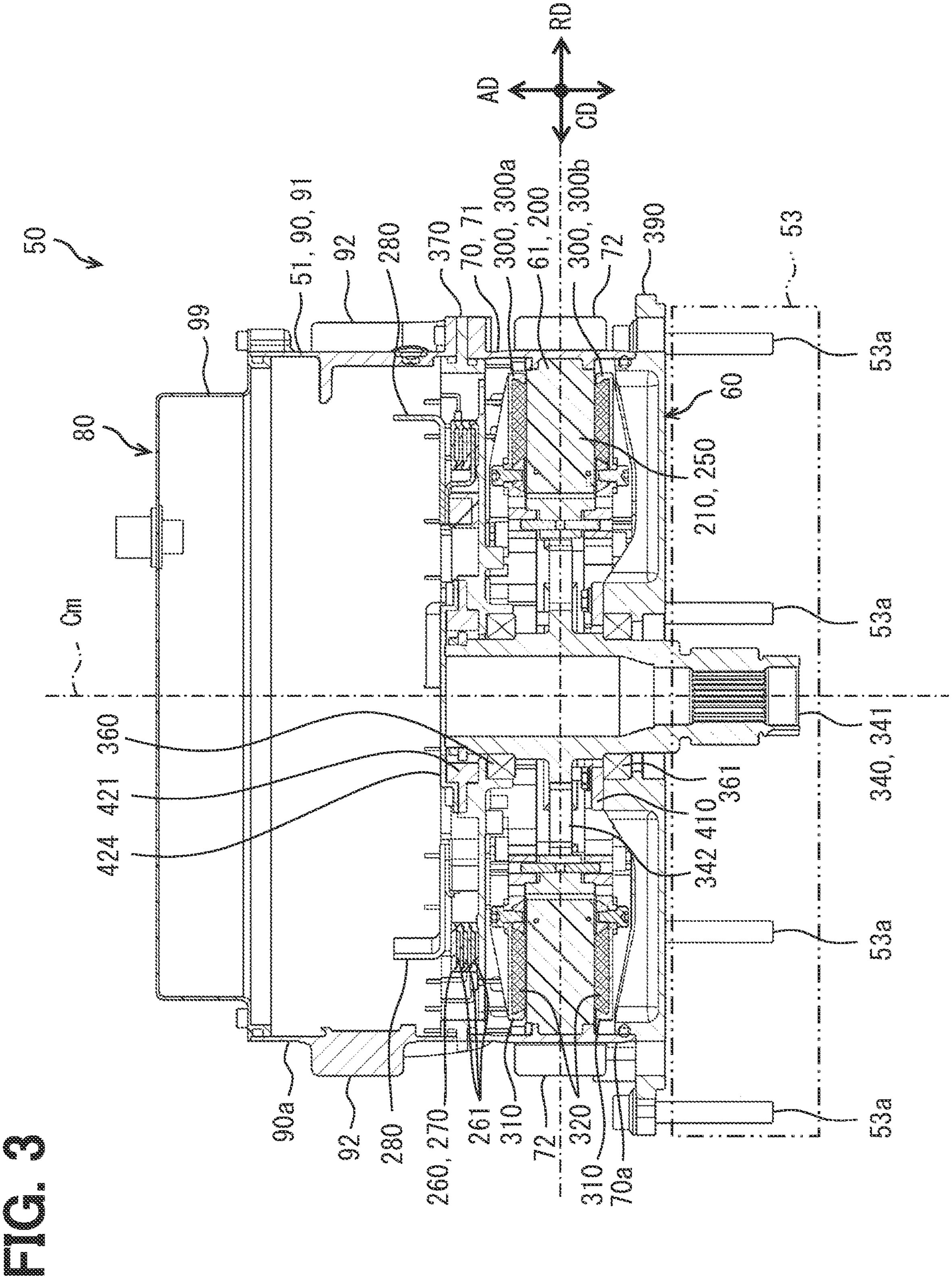
FIG. 3 is a vertical cross-sectional view of the motor device unit.

As shown in FIGS. 2 and 3, in the motor device unit 50, the motor device 60 and the inverter device 80 are arranged along a motor axis Cm. The motor device 60 and the inverter device 80 are fixed to each other by fixing tools such as bolts. The motor axis Cm is a virtual line extending linearly. When a direction in which the motor axis Cm extends is referred to as an axial direction AD, the axial direction AD, a radial direction RD, and a circumferential direction CD of the motor axis Cm are orthogonal to one another. An outer side in the radial direction RD may be referred to as a radially outer side, and an inner side in the radial direction RD may be referred to as a radially inner side. FIG. 3 illustrates a vertical cross-section of the motor device unit 50 extending along the motor axis Cm.

The motor device 60 includes a motor housing 70. The motor housing 70 accommodates the motor 61. The motor housing 70 is formed in a tubular shape as a whole and extends along the motor axis Cm. The motor housing 70 is made of a metal material or the like, and has a thermal conduction property. The motor housing 70 has an outer peripheral surface 70*a*. The outer peripheral surface 70*a* is included in an outer surface of the motor housing 70 and extends in an annular shape in the circumferential direction CD as a whole.

The motor housing 70 includes a housing main body 71 and motor fins 72. On the housing main body 71, the outer peripheral surface 70*a* is formed. Each of the motor fin 72 is a radiation fin provided on the outer peripheral surface 70*a*. The motor fins 72 increase a surface area of the motor housing 70 and enhance a heat radiation effect of the motor housing 70. The motor fin 72 protrudes from the outer peripheral surface 70*a* toward the radially outer side. The motor fin 72 extends in the axial direction AD along the outer peripheral surface 70*a*. Multiple motor fins 72 are arranged in the circumferential direction CD.

The inverter device 80 includes an inverter housing 90. The inverter housing 90 accommodates the inverter 81. The inverter housing 90 is formed in a tubular shape as a whole and extends along the motor axis Cm. The inverter housing 90 is made of a metal material or the like and has a thermal conduction property. The inverter housing 90 has an outer peripheral surface 90*a*. The outer peripheral surface 90*a* is included in an outer surface of the inverter housing 90 and extends in an annular shape in the circumferential direction CD.

The motor device 60 and the inverter device 80 are air-cooled type devices. The inverter housing 90 includes a housing main body 91 and inverter fins 92. On the housing main body 91, the outer peripheral surface 90*a* is formed. Each of the inverter fins 92 is a radiation fin provided on the outer peripheral surface 90*a*. The inverter fins 92 increase a surface area of the inverter housing 90 and enhance a heat radiation effect of the inverter housing 90. The inverter fin 92 protrudes from the outer peripheral surface 90*a* toward the radially outer side. The inverter fin 92 extends in the axial direction AD along the outer peripheral surface 90*a*. Multiple inverter fins 92 are arranged in the circumferential direction CD.

As shown in FIG. 2, the motor device unit 50 includes a unit duct 100. The unit duct 100 is made of a resin material or the like. The unit duct 100 accommodates the motor housing 70 and the inverter housing 90. The unit duct 100 is formed in a tubular shape as a whole and extends along the motor axis Cm. The unit duct 100 is in a state of spanning the motor housing 70 and the inverter housing 90 in the axial direction AD. The unit duct 100 is in a state of covering the motor housing 70 and the inverter housing 90 from an outer peripheral side. The unit duct 100 is fixed to at least one of the motor housing 70 and the inverter housing 90. In the unit duct 100, opening portions are formed at both ends in the axial direction AD.

An inner peripheral surface of the unit duct 100 faces the outer peripheral surfaces 70*a* and 90*a* with the motor fins 72 and the inverter fins 92 interposed therebetween. The inner peripheral surface of the unit duct 100 is separated from the outer peripheral surfaces 70*a* and 90*a* toward the radially outer side. In the motor device unit 50, a duct flow channel is formed between the outer peripheral surfaces 70*a* and 90*a* and the inner peripheral surface of the unit duct 100. The duct flow channel is opened in the axial direction AD through the opening portions of the unit duct 100. In the motor device unit 50, heat is likely to be released from the motor fins 72 and the inverter fins 92 by a gas such as air passing through the duct flow channel.

The inner peripheral surface of the unit duct 100 approaches or contacts tip end surfaces of the motor fin 72 and the inverter fin 92. In the configuration, the gas passing through the duct flow channel in the axial direction AD is likely to pass through a position overlapping the motor fin 72 and the inverter fin 92 in the radial direction RD. Therefore, a heat radiation effect based on the motor fin 72 and inverter fin 92 can be enhanced easily.

As shown in FIG. 3, the inverter device 80 includes an inverter cover portion 99 in addition to the inverter housing 90. The inverter cover portion 99 is made of a metal material or the like and has a thermal conduction property. The inverter cover portion 99 extends in a direction orthogonal to the motor axis Cm. In the inverter housing 90, an opening portion formed on one end side in the axial direction AD is covered by the inverter cover portion 99.

The motor device 60 includes a drive frame 390 in addition to the motor housing 70. The drive frame 390 is made of a metal material or the like and has a thermal conduction property. The drive frame 390 extends in a direction orthogonal to the motor axis Cm. In the motor housing 70, an opening portion formed on one end side in the axial direction AD is covered by the drive frame 390. The drive frame 390 is fixed to the motor housing 70 by frame fixing tools 405. Each of the frame fixing tools 405 is a fixing tool such as a bolt. The frame fixing tool 405 is screwed to the drive frame 390 and the motor housing 70 via a washer 406.

The motor device 60 includes an O-ring 401. The O-ring 401 is an elastically deformable seal member and is made of a resin material or the like. The O-ring 401 is in a state of being sandwiched between the motor housing 70 and the drive frame 390. The O-ring 401 extends along an outer peripheral edge of the motor housing 70. The O-ring 401 seals between the motor housing 70 and the drive frame 390.

In the motor device unit 50, one end portion in the axial direction AD is formed by the inverter cover portion 99. The other end portion in the axial direction AD is formed by the drive frame 390.

The motor device unit 50 includes a unit housing 51. The unit housing 51 includes the inverter housing 90, the inverter cover portion 99, the motor housing 70, and the drive frame 390. In the unit housing 51, an outer peripheral surface thereof is formed by the inverter housing 90 and the motor housing 70. In the unit housing 51, one of a pair of end surfaces thereof is formed by the inverter cover portion 99, and the other is formed by the drive frame 390. The unit duct 100 is in a state of covering the outer peripheral surface of the unit housing 51.

Figure 4:
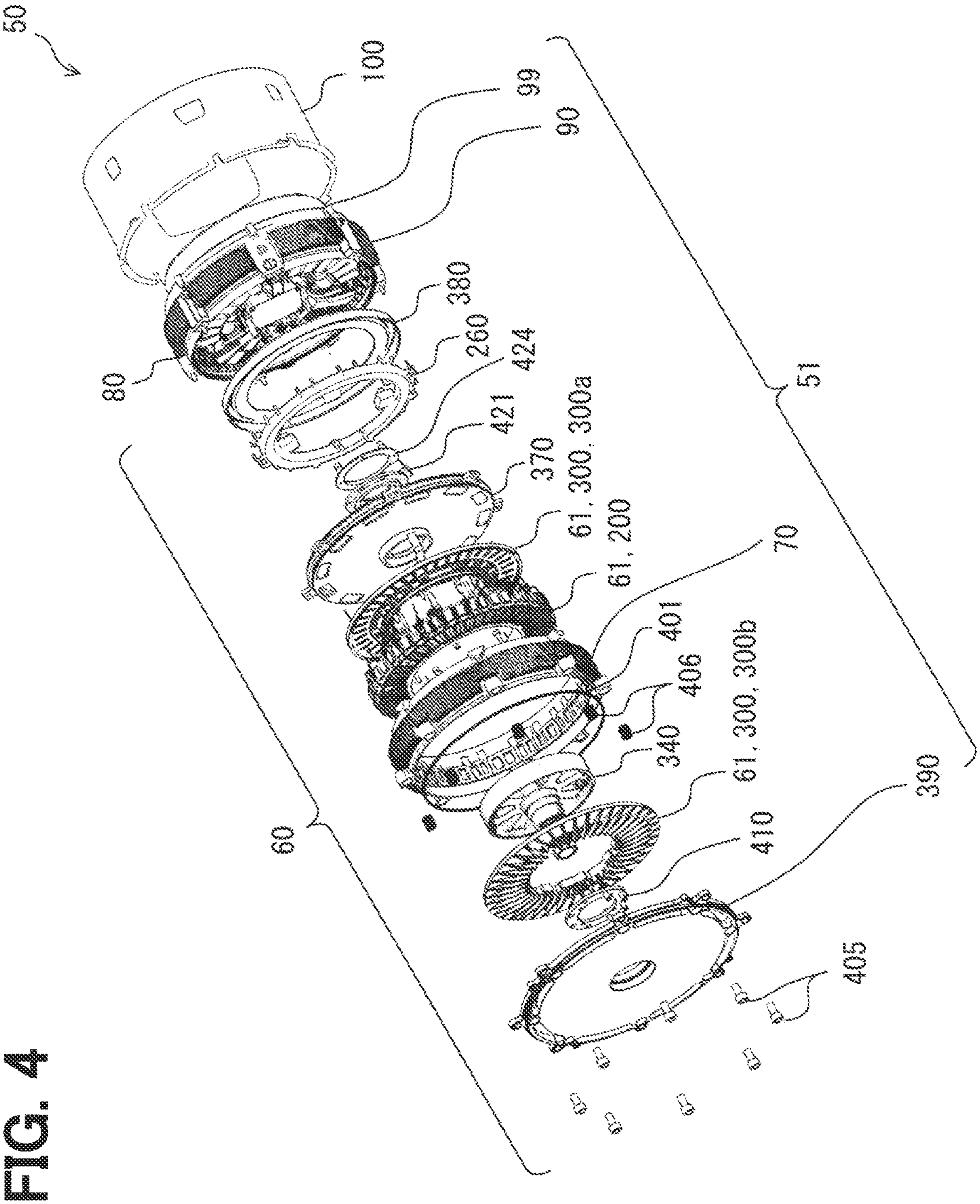
FIG. 4 is an exploded perspective view of the motor device unit.

As shown in FIGS. 3 and 4, the motor 61 includes the stator 200, rotors 300, and a shaft 340. Each of the rotors 300 rotates relative to the stator 200 about the motor axis Cm. The rotor 300 is a rotor and may be referred to as a rotor sub-assembly. The motor axis Cm is a center line of the rotor 300 and corresponds to a rotation axis. The shaft 340 is fixed to the rotor 300 and rotates together with the rotor 300. The shaft 340 is a rotation shaft of the motor 61. A center line of the shaft 340 coincides with the motor axis Cm. A center line of the stator 200 coincides with the motor axis Cm. The stator 200 is a stationary element and may be referred to as a stator sub-assembly.

The motor device 60 is an axial gap-type rotary electric machine. In the motor 61, the stator 200 and the rotor 300 are aligned in the axial direction AD along the motor axis Cm. The rotor 300 is in a state of being overlapped with the stator 200 in the axial direction AD, and rotates relative to the stator 200 in this state.

The motor device 60 is a double rotor-type rotary electric machine, and includes two rotors 300. The two rotors 300 are arranged in the axial direction AD. In the axial direction AD, the stator 200 is provided between the two rotors 300. The shaft 340 is fixed to both of the two rotors 300. The two rotors 300 rotate together with the shaft 340. When the two rotors 300 are referred to as a first rotor 300*a* and a second rotor 300*b*, the first rotor 300*a* is provided on a side of a rear frame 370 facing the stator 200. The second rotor 300*b* is provided on a side of the stator 200 opposite to the inverter device 80. An axial gap-type and double rotor-type rotary electric machine may be referred to as a double axial motor.

Figure 6:
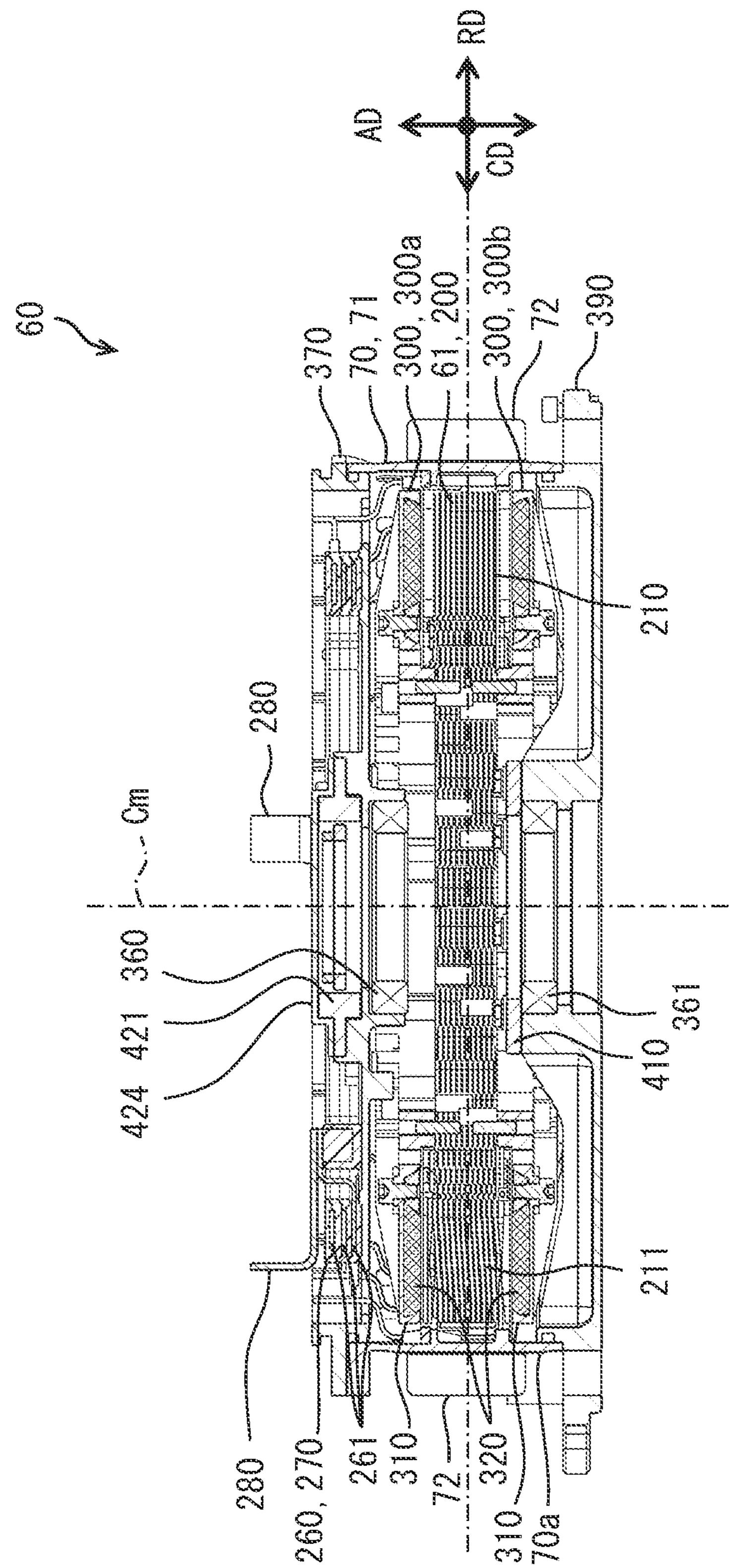
FIG. 6 is a vertical cross-sectional view of the motor device.

As shown in FIGS. 3 and 6, the stator 200 extends in the circumferential direction CD around the motor axis Cm, and is formed in an annular shape as a whole. The stator 200 includes a coil unit 210 and a coil protection portion 250. The coil unit 210 includes coil portions 215. Multiple coil portions 215 are arranged in the circumferential direction CD. In the coil unit 210, the coil 211 is formed by at least one coil portion 215. The coils 211 of multiple phases are arranged in the circumferential direction CD in the coil unit 210. In FIG. 6, an illustration of the coil protection portion 250 is omitted.

The coil protection portion 250 is made of a resin material or the like. The coil protection portion 250 is made of, for example, an epoxy-based thermosetting resin. The coil protection portion 250 is, for example, a mold resin formed by molding. The coil protection portion 250 has an electrical insulation property. The coil protection portion 250 has a thermal conduction property, and heat from the coil portion 215 is easily transferred thereto. The coil protection portion 250 has thermal conductivity higher than that of air, for example.

The coil protection portion 250 is in a state of covering the coil unit 210 and protects the coil unit 210. The coil protection portion 250 extends in the circumferential direction CD around the motor axis Cm. The coil protection portion 250 is formed in an annular shape as a whole. The coil protection portion 250 seals the coils 211 and the coil portions 215. The coil protection portion 250 is in contact with both the coil portions 215 and the motor housing 70. The coil protection portion 250 facilitates transferring the heat from the coil portions 215 to the motor housing 70.

The rotor 300 extends in the circumferential direction CD around the motor axis Cm, and is formed in an annular shape as a whole. The rotor 300 is formed in a plate shape as a whole. The rotor 300 includes magnets 310 and a magnet holder 320. Multiple magnets 310 are arranged in the circumferential direction CD. Each of the magnets 310 is a permanent magnet and generates a magnetic field. The magnet holder 320 supports the multiple magnets 310. The magnet holder 320 extends in the circumferential direction CD around the motor axis Cm. The magnet holder 320 is formed in an annular shape as a whole.

The shaft 340 includes a shaft main body 341 and a shaft flange 342. The shaft main body 341 is formed in a columnar shape and extends along the motor axis Cm. The shaft flange 342 extends from the shaft main body 341 toward the radially outer side. The shaft flange 342 extends in the circumferential direction CD around the motor axis Cm. The shaft flange 342 is formed in an annular shape as a whole. The shaft flange 342 is fixed to the rotor 300.

The motor device 60 includes a first bearing 360 and a second bearing 361. The bearings 360 and 361 rotatably support the shaft 340. The rotor 300 is rotatably supported by the bearings 360 and 361 via the shaft 340. The first bearing 360 and the second bearing 361 are aligned in the axial direction AD. In the axial direction AD, the shaft flange 342 is provided between the first bearing 360 and the second bearing 361. The first bearing 360 is attached to a rear frame 370 to be described later, and is fixed to the motor housing 70 via the rear frame 370. The second bearing 361 is attached to the drive frame 390, and is fixed to the motor housing 70 via the drive frame 390.

As shown in FIGS. 3, 4, and 6, the motor device 60 includes a busbar unit 260, the rear frame 370, a dustproof cover 380, a retainer plate 410, the resolver 421, and a resolver cover 424. In FIG. 3, an illustration of the dustproof cover 380 is omitted.

The rear frame 370 is formed in a plate shape as a whole and extends in a direction orthogonal to the motor axis Cm. The rear frame 370 is made of a metal material or the like. The rear frame 370 is in a state of covering the stator 200 and the rotor 300 from an inverter device 80 side. The rear frame 370 defines an internal space of the motor housing 70 from the inverter device 80 side. The rear frame 370 partitions the internal space of the motor housing 70 and an internal space of the inverter housing 90. The rear frame 370 is provided between the motor housing 70 and the inverter housing 90 in the axial direction AD. The rear frame 370 is in a state of being sandwiched between the motor housing 70 and the inverter housing 90.

The dustproof cover 380 extends in the circumferential direction CD around the motor axis Cm. The dustproof cover 380 is formed in an annular shape as a whole. The dustproof cover 380 is in a state of being overlapped with the rear frame 370 from the inverter device 80 side. The dustproof cover 380 is made of a resin material or the like, and has a structure through which a foreign matter such as dust does not pass. The dustproof cover 380 prevents the foreign matter from entering from one of the internal space of the motor housing 70 and the internal space of the inverter housing 90 to the other.

Figure 5:
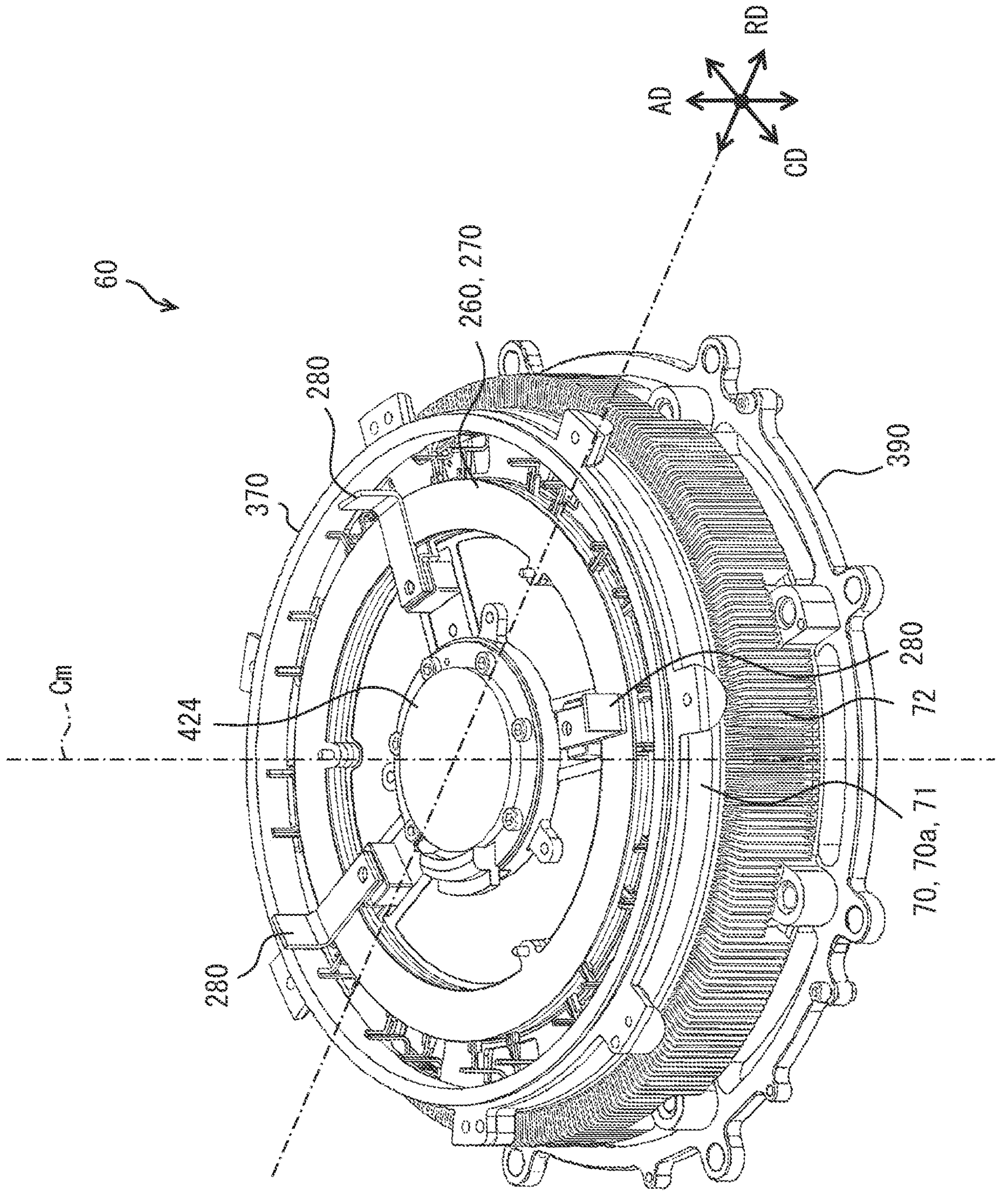
FIG. 5 is a perspective view of a motor device.

As shown in FIGS. 4 and 5, the busbar unit 260 extends in the circumferential direction CD around the motor axis Cm. The busbar unit 260 is formed in an annular shape as a whole. The busbar unit 260 is located at a position separated from the stator 200 toward the rear frame 370 in the axial direction AD. The busbar unit 260 is provided closer to the inverter device 80 than the rear frame 370 is. The busbar unit 260 extends along a plate surface of the rear frame 370.

As shown in FIGS. 3 and 6, the busbar unit 260 includes electric power busbars 261 and a busbar protection portion 270. Each of the electric power busbars 261 is a conductive member such as a busbar member for a current to pass therethrough. The electric power busbar 261 is provided for each of the multiple phases, and forms at least a part of the output line 143 in each of the multiple phases. The electric power busbar 261 is provided between the coil 211 and the inverter 81 in the output line 143, and electrically connects the coil 211 and the inverter 81. The electric power busbar 261 extends in the circumferential direction CD around the motor axis Cm. The electric power busbar 261 is formed in an annular shape as a whole. The busbar member is a member having a plate-shaped body covered with an insulator.

The busbar protection portion 270 is made of a resin material or the like and has an electrical insulation property. The busbar protection portion 270 is in a state of covering the multiple electric power busbars 261 and protects the multiple electric power busbars 261. The busbar protection portion 270 extends in the circumferential direction CD around the motor axis Cm. The busbar protection portion 270 is formed in an annular shape as a whole.

As shown in FIGS. 3, 5, and 6, the motor device 60 includes relay terminals 280. Each of the relay terminals 280 is a conductive member such as a busbar member for a current to pass therethrough. The relay terminal 280 is provided for each of the multiple phases, and forms at least a part of the output line 143 in each of the multiple phases. The relay terminal 280 is provided between the electric power busbar 261 and the inverter 81 in the output line 143. The relay terminal 280 electrically connects the electric power busbar 261 and the inverter 81. The relay terminal 280 is electrically connected to the electric power busbar 261. Multiple relay terminals 280 are arranged in the circumferential direction CD. The relay terminal 280 is connected to a member constituting the inverter 81 in the inverter device 80, for example.

As shown in FIGS. 3, 4, and 6, the retainer plate 410 extends in the circumferential direction CD around the motor axis Cm. The retainer plate 410 is formed in an annular shape as a whole. The retainer plate 410 fixes the second bearing 361 to the drive frame 390. The retainer plate 410 is fixed to the drive frame 390 in a state in which the second bearing 361 is sandwiched between the retainer plate 410 and the drive frame 390.

The resolver 421 extends in the circumferential direction CD around the motor axis Cm. The resolver 421 is formed in an annular shape as a whole. The resolver 421 includes a resolver rotor and a resolver stator. The resolver rotor rotates relative to the resolver stator. The resolver rotor is provided on a rotor 300 side, and the resolver stator is provided on a motor housing 70 side. For example, the resolver rotor is attached to the shaft 340, and the resolver stator is attached to the rear frame 370. The resolver 421 is provided on a side of the inverter device 80 facing the rear frame 370. The resolver cover 424 is formed in a plate shape as a whole and extends in a direction orthogonal to the motor axis Cm. The resolver cover 424 is in a state of covering the resolver 421 from the inverter device 80 side. The resolver cover 424 is attached to the rear frame 370. The resolver cover 424 is in a state of covering the shaft main body 341 from the inverter device 80 side.

A speed reducer 53 is attached to the motor device unit 50. The speed reducer 53 mechanically connects the motor 61 and an external device. For example, the external device is mechanically connected to the rotation shaft of the motor 61 via the speed reducer 53. The speed reducer 53 decelerates rotation of the motor 61 and transfers the rotation to the external device. Examples of the external device include a wheel and a propeller. The speed reducer 53 includes multiple gears, and may be referred to as a transmission gear and a gear box. The speed reducer 53 has a structure matching a motor characteristic of the motor 61. The speed reducer 53 is fixed to the drive frame 390 by speed reducer fixing tools 53*a*. Each of the speed reducer fixing tools 53*a* is a fixing tool such as a bolt.

<Configuration Group Aa>

Figure 7:
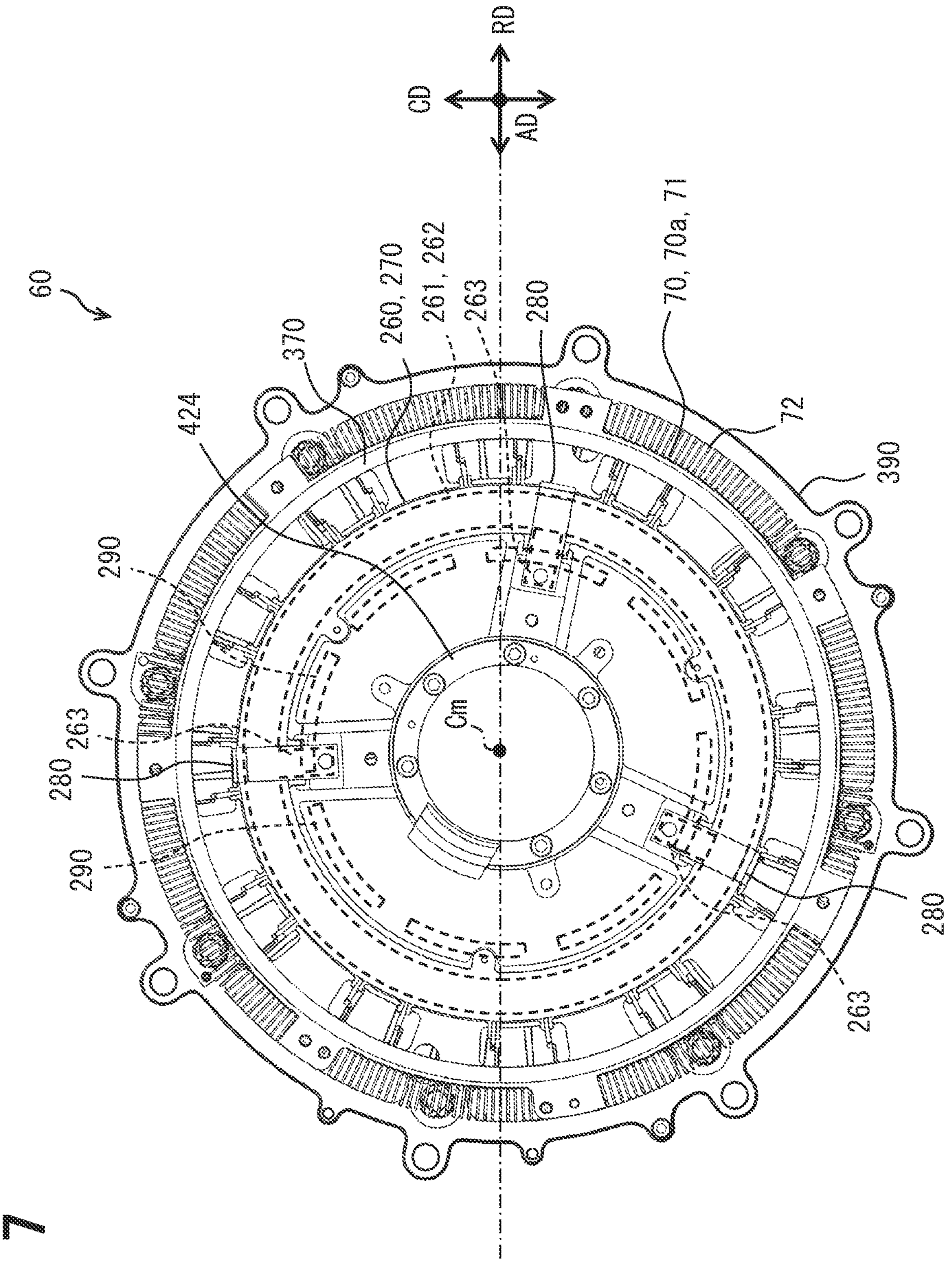
FIG. 7 is a top view of the motor device in a configuration group Aa.
Figure 8:
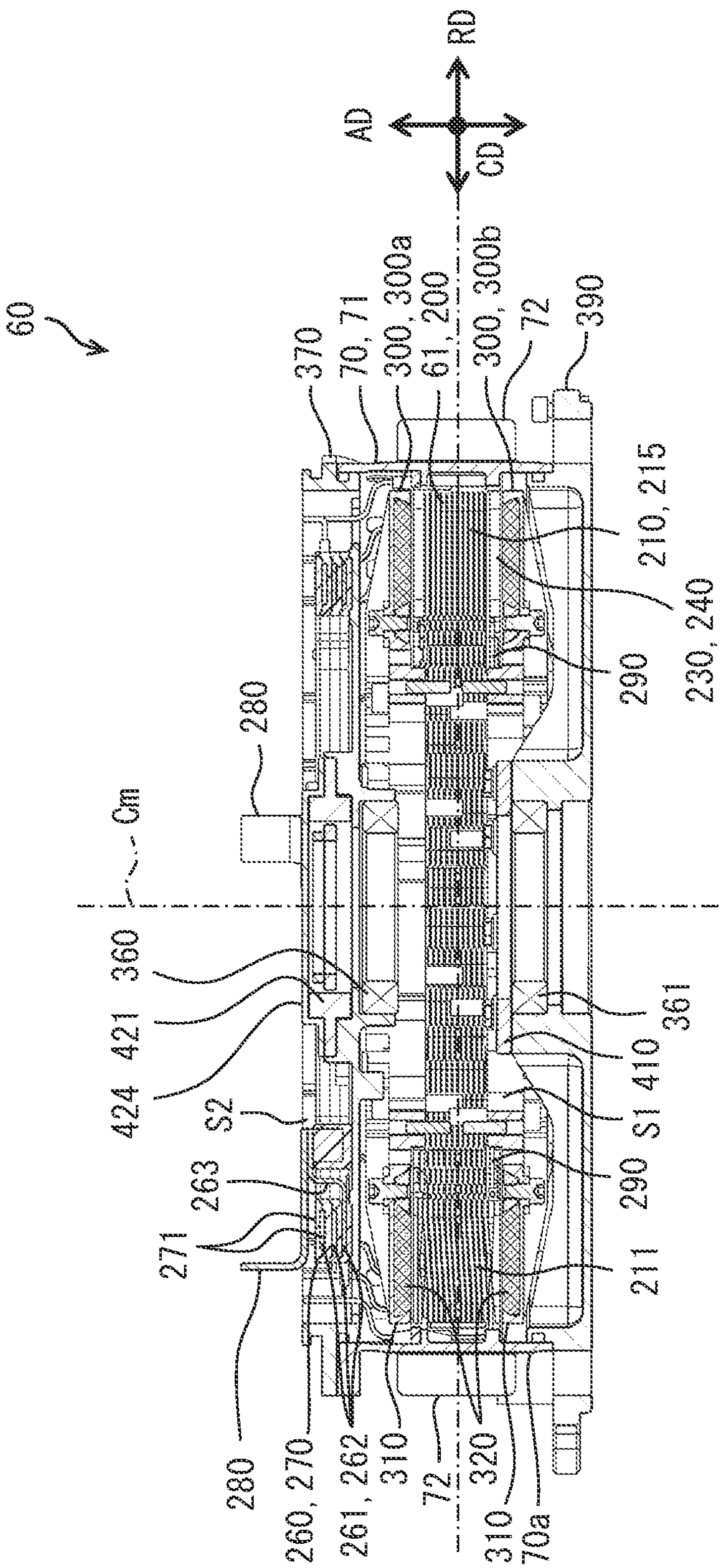
FIG. 8 is a vertical cross-sectional view of the motor device.
Figure 9:
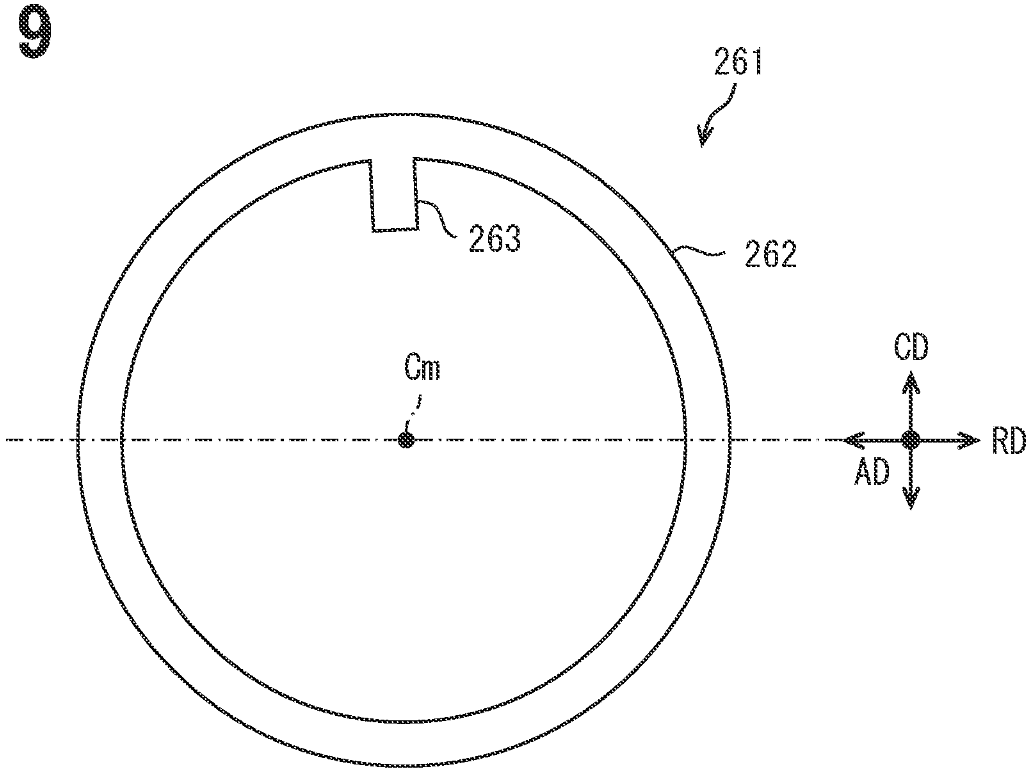
FIG. 9 is a top view of an electric power busbar.

As shown in FIGS. 7, 8, and 9, the electric power busbar 261 includes a busbar main body 262 and a busbar terminal 263. The busbar main body 262 extends in the circumferential direction CD around the motor axis Cm. The busbar main body 262 is formed in an annular shape as a whole. The busbar main body 262 is formed in a plate shape as a whole and extends in a direction orthogonal to the motor axis Cm. The busbar terminal 263 extends from the busbar main body 262 in a direction intersecting the circumferential direction CD. The busbar terminal 263 extends from the busbar main body 262 toward the radially inner side. The busbar terminal 263 is formed in a plate shape as a whole. In FIG. 7, an illustration of the dustproof cover 380 is omitted.

The multiple electric power busbars 261 are arranged in the axial direction AD. For example, the multiple electric power busbars 261 include a U-phase electric power busbar 261, a V-phase electric power busbar 261, and a W-phase electric power busbar 261. In the multiple electric power busbars 261, the busbar main bodies 262 are overlapped in the axial direction AD. The multiple busbar main bodies 262 are provided at a position aligned with the stator 200 in the axial direction AD. In the multiple electric power busbars 261, the busbar terminals 263 are located at positions separated from each other in the circumferential direction CD.

The motor device 60 has a stator-side space S1 and an inverter-side space S2. The stator-side space S1 and the inverter-side space S2 are included in the internal space of the motor device 60 and are spaces partitioned by the rear frame 370. The stator-side space S1 and the inverter-side space S2 are arranged in the axial direction AD with the rear frame 370 interposed therebetween. The stator-side space S1 is a space closer to the stator 200 than to the rear frame 370. The stator-side space S1 is a space between the rear frame 370 and the drive frame 390 in the axial direction AD. The inverter-side space S2 is a space closer to the inverter device 80 than to the rear frame 370. The inverter-side space S2 is a space between the rear frame 370 and the inverter housing 90 in the axial direction AD. The inverter-side space S2 may include an internal space of the inverter device 80. The stator-side space S1 corresponds to the first space, the inverter-side space S2 corresponds to the second space, and the rear frame 370 corresponds to the space partition portion.

The electric power busbar 261 is provided in the inverter-side space S2. The busbar unit 260 is in a state of being overlapped with the rear frame 370 from the inverter device 80 side. The busbar protection portion 270 is fixed to the rear frame 370 by fixing tools such as screws.

As shown in FIG. 8, the busbar protection portion 270 includes multiple protection plates 271. Each of the protection plates 271 is made of a resin material or the like, and has an electrical insulation property. The protection plate 271 is formed in a plate shape and extends in a direction orthogonal to the axial direction AD. The protection plate 271 extends in the circumferential direction CD around the motor axis Cm. The protection plate 271 is formed in an annular shape as a whole. The multiple protection plates 271 are overlapped in the axial direction AD with the busbar main bodies 262 interposed therebetween. Two of the busbar main bodies 262 which are adjacent to each other with the protection plate 271 interposed therebetween in the axial direction AD, are electrically insulated by the protection plate 271.

Figure 10:
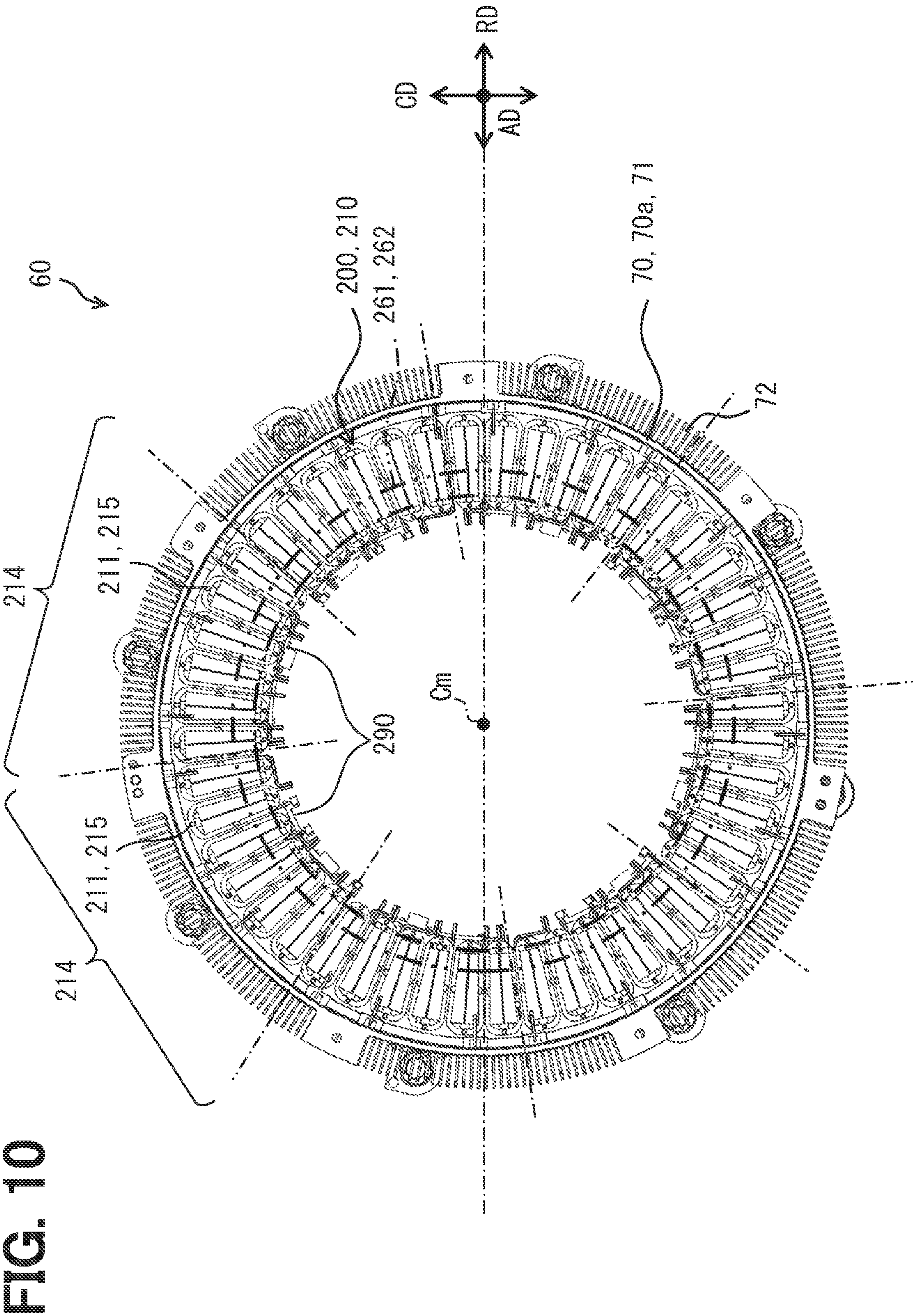
FIG. 10 is a top view of a stator showing a configuration of a coil unit.

As shown in FIG. 10, the motor device 60 includes neutral point busbars 290. Each of the neutral point busbars 290 is provided on the stator 200. The neutral point busbar 290 is a conductive member such as a busbar member for a current to pass therethrough. The neutral point busbar 290 forms the neutral point 65 at least, and electrically connects the coils 211 of multiple phases. The neutral point busbar 290 extends in the circumferential direction CD around the motor axis Cm. Multiple neutral point busbars 290 are arranged in the circumferential direction CD.

As shown in FIG. 8, the neutral point busbar 290 is provided at a position separated from the electric power busbar 261 in the axial direction AD. The neutral point busbar 290 is located closer to the drive frame 390 than the rear frame 370 is in the axial direction AD. The neutral point busbar 290 is located on an opposite side of the rear frame 370 from the electric power busbar 261, and the rear frame 370 is interposed therebetween in the axial direction AD. The neutral point busbar 290 is provided in the stator-side space S1. On the other hand, as described above, the electric power busbar 261 is provided in the inverter-side space S2.

As shown in FIGS. 7 and 10, the neutral point busbar 290 is provided at a position separated from the busbar main body 262 in the radial direction RD. The neutral point busbar 290 is located at a position separated from the busbar main body 262 toward the radially inner side.

As shown in FIG. 10, the coil unit 210 includes neutral point units 214. Multiple neutral point units 214 are arranged in the circumferential direction CD. Each of the neutral point units 214 includes multiple coil portions 215 and one neutral point busbar 290. In the neutral point unit 214, the coils 211 of multiple phases are star-connected by the neutral point 65. In the coil unit 210, since the multiple neutral point units 214 are arranged in the circumferential direction CD, the star-connected coils 211 of multiple phases are arranged in the circumferential direction CD.

Figure 11:
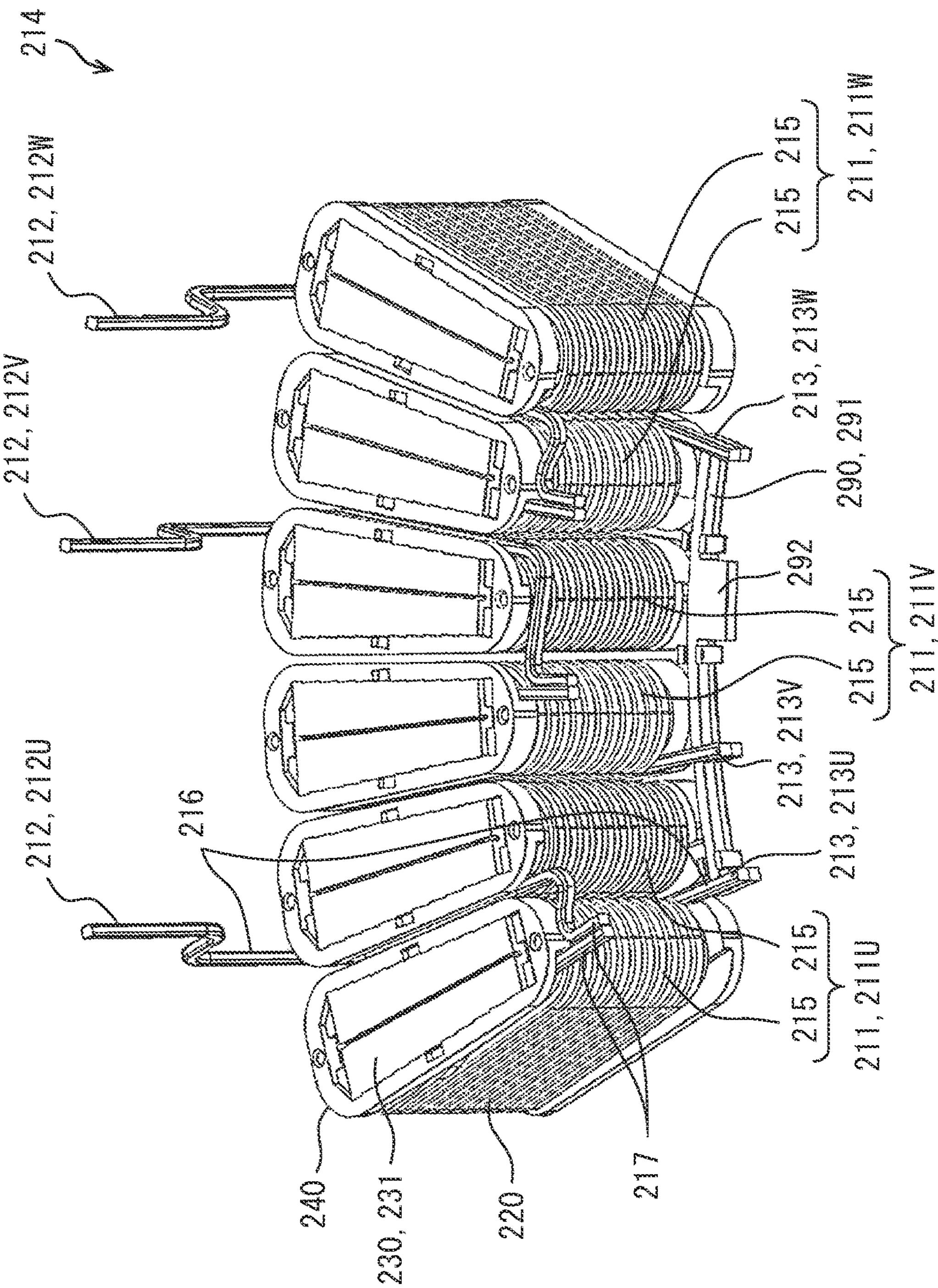
FIG. 11 is a perspective view of a neutral point unit.

As shown in FIG. 11, in the neutral point unit 214, since the coil portions 215 are arranged in the circumferential direction CD, the coils 211 of multiple phases are arranged in the circumferential direction CD. In the neutral point unit 214, an electric power lead-out wire 212 and a neutral lead-out wire 213 extend from the coil 211 in each of the multiple phases. The electric power lead-out wire 212 is led out from the coil 211 toward the radially outer side and extends in the axial direction AD toward the electric power busbar 261. The electric power lead-out wire 212 is electrically connected to the electric power busbar 261. The neutral lead-out wire 213 is led out from the coil 211 toward the radially inner side. The neutral lead-out wire 213 is electrically connected to the neutral point busbar 290.

The coil portion 215 is formed by a wound coil wire 220. The coil wire 220 is a conductive member such as an electric wire for a current to pass therethrough. The coil wire 220 is wound around a core unit 230. In the core unit 230, the coil wire 220 is wound around a core 231 via a bobbin 240. In the coil wire 220, a wound portion forms the coil portion 215, and a portion extending from the coil portion 215 forms a first extending wire 216 and a second extending wire 217. In the coil portion 215, the first extending wire 216 extends from one of both ends arranged in the axial direction AD, and the second extending wire 217 extends from the other end.

The coil wire 220 forms the coil 211 by forming the coil portion 215. In the coil wire 220, a wound portion forms the coil 211, and a portion extending from the coil 211 forms the electric power lead-out wire 212 and the neutral lead-out wire 213.

In each of the multiple phases, one coil 211 is formed by two coil portions 215. In each of the multiple phases, the first extending wire 216 of one of the two coil portions 215 forms the electric power lead-out wire 212, and the first extending wire 216 of the other coil portions 215 forms the neutral lead-out wire 213. The second extending wires 217 of the two coil portions 215 are connected to each other.

In the neutral point unit 214, the coil 211, the electric power lead-out wire 212, and the neutral lead-out wire 213 are denoted with a U-phase, a V-phase, and a W-phase, respectively. Then, in the neutral point unit 214, a U-phase coil 211U, a V-phase coil 211V, and a W-phase coil 211W are arranged one by one in the circumferential direction CD. Similarly, a U-phase electric power lead-out wire 212U, a V-phase electric power lead-out wire 212V, and a W-phase electric power lead-out wire 212W are arranged in the circumferential direction CD. A U-phase neutral lead-out wire 213U, a V-phase neutral lead-out wire 213V, and a W-phase neutral lead-out wire 213W are arranged one by one in the circumferential direction CD.

<Configuration Group Ab>

Figure 12:
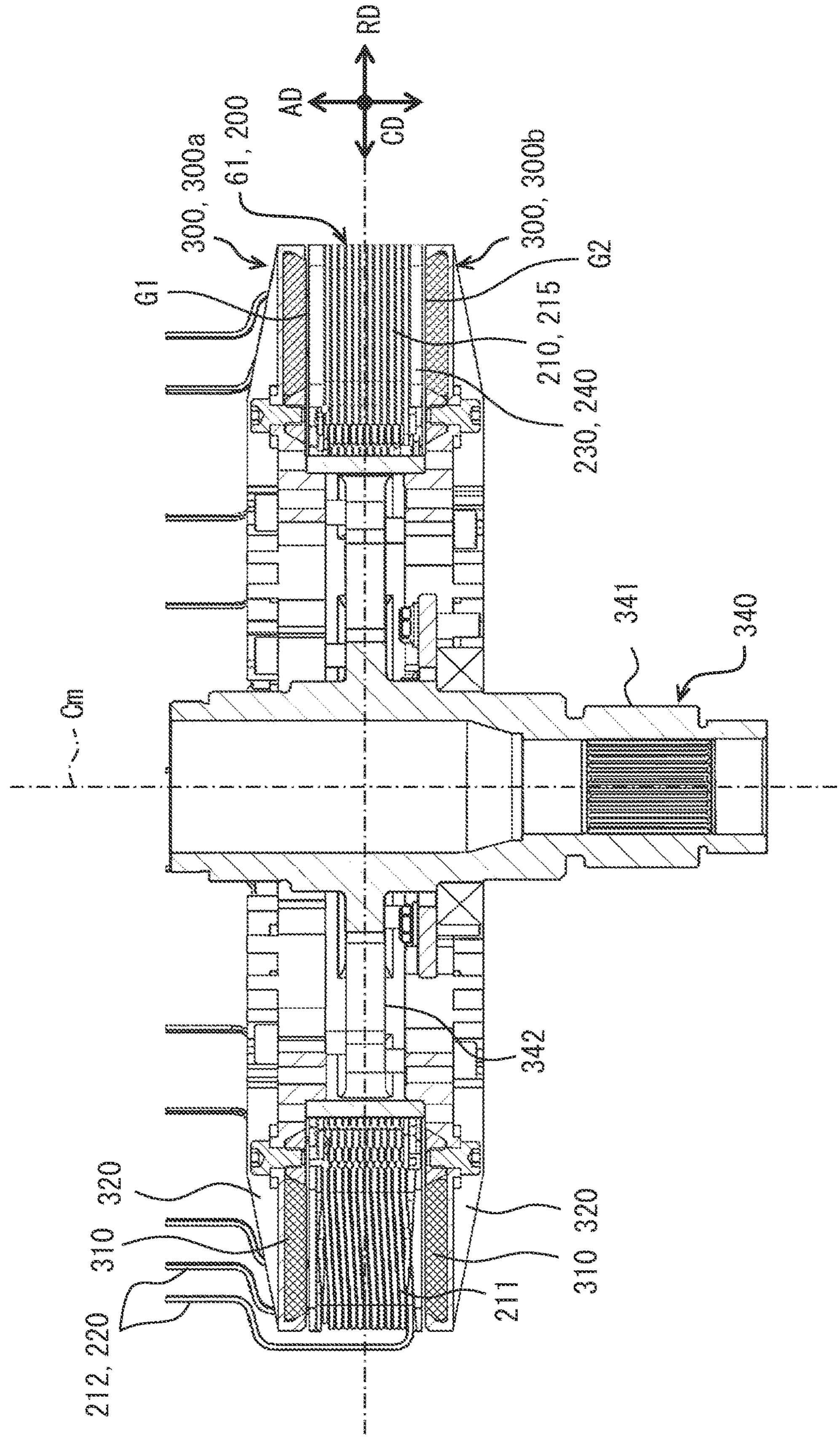
FIG. 12 is a vertical cross-sectional view of a rotor and a shaft in a configuration group Ab.

As shown in FIG. 12, the motor 61 includes the first rotor 300*a* and the second rotor 300*b*. The motor 61 includes a first gap G1 and a second gap G2. The first gap G1 is a gap between the stator 200 and the first rotor 300*a*. The second gap G2 is a gap between the stator 200 and the second rotor 300*b*. The first gap G1 and the second gap G2 are arranged in the axial direction AD with the stator 200 interposed therebetween. The motor 61 may be referred to as a double gap-type rotary electric machine.

Figure 13:
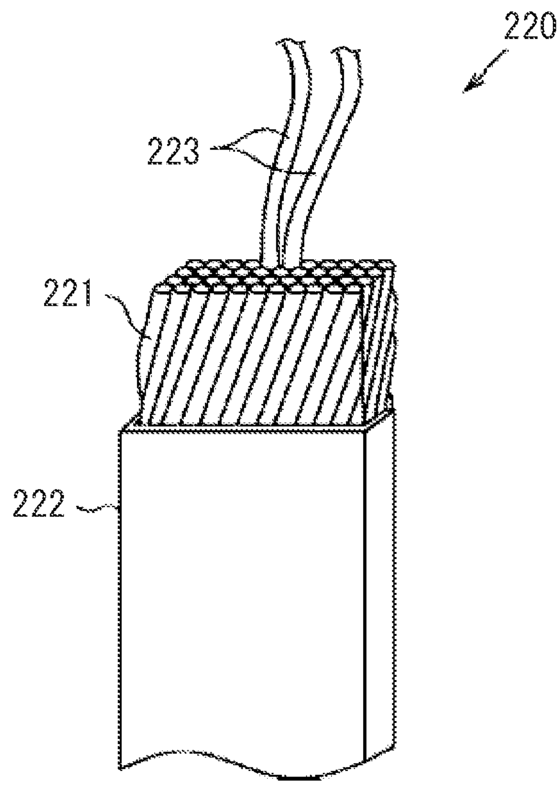
FIG. 13 is a perspective view of a coil wire.

As shown in FIG. 13, the coil wire 220 includes a conductor portion 221 and a covering portion 222. The conductor portion 221 is conductive and is a portion through which a current flows in the coil wire 220. The covering portion 222 is made of a resin material or the like, and has an electrical insulation property. The covering portion 222 covers the conductor portion 221. The conductor portion 221 includes multiple wires 223. Each of the wires 223 is made of a conductive material such as copper, and is a portion through which a current flows in the conductor portion 221. The coil wire 220 may be referred to as a strand or a dividing copper wire.

<Configuration Group Ac>

Figure 14:
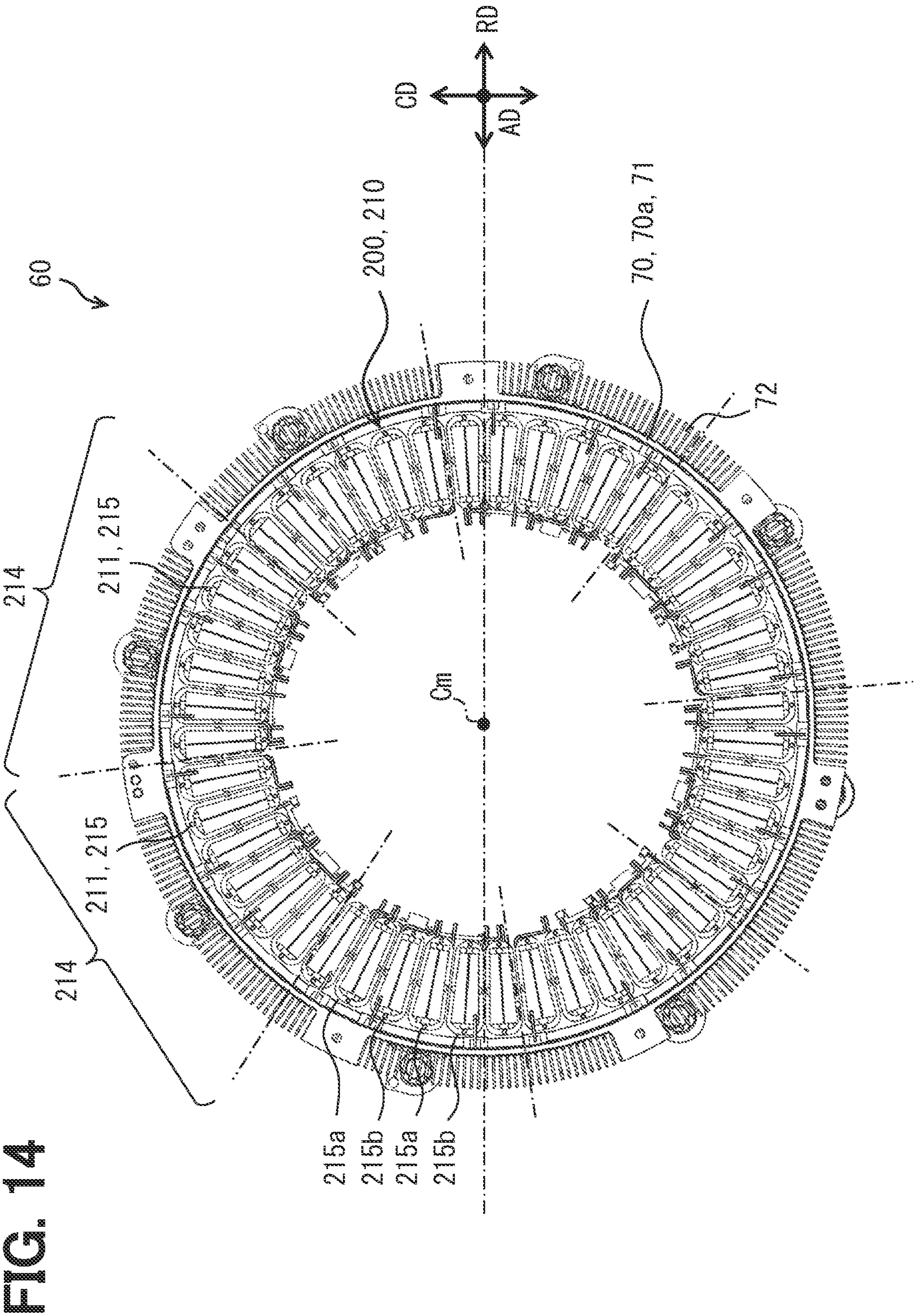
FIG. 14 is a top view of a stator and a motor housing in a configuration group Ac.
Figure 15:
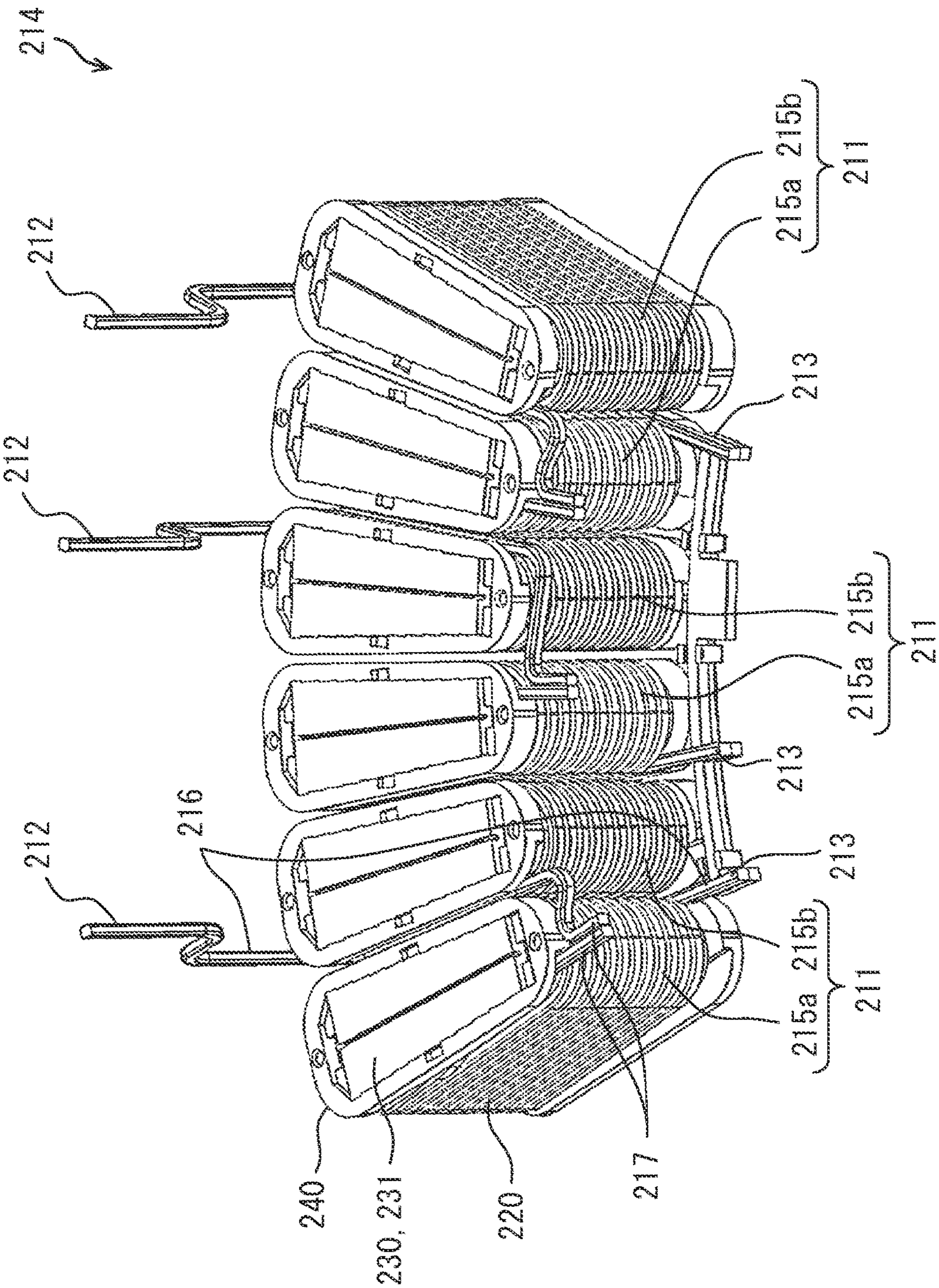
FIG. 15 is a perspective view of a neutral point unit.

As shown in FIGS. 14 and 15, in the coil unit 210, the multiple coil portions 215 include first coil portions 215*a* and second coil portions 215*b*. The first coil portions 215*a* and the second coil portions 215*b* are alternately arranged in the circumferential direction CD. In the coil unit 210, one of two coil portions 215 adjacent to each other in the circumferential direction CD is the first coil portion 215*a*, and the other is the second coil portion 215*b*.

In the coil unit 210, two coil portions 215 adjacent to each other in the circumferential direction CD are different in the number of turns. The number of turns of the coil portion 215 is the number of turns of the coil wire 220 in the coil portion 215. The number of turns of the first coil portion 215*a* is different from that of the second coil portion 215*b*. For example, the number of turns of the first coil portion 215*a* is larger than the number of turns of the second coil portion 215*b*.

As shown in FIG. 15, in the first coil portion 215*a*, both the first extending wire 216 and the second extending wire 217 are led out to one side in the radial direction RD. For example, in the first coil portion 215*a*, both the first extending wire 216 and the second extending wire 217 are led out to the radially inner side. On the other hand, in the second coil portion 215*b*, the first extending wire 216 and the second extending wire 217 are led out in opposite directions in the radial direction RD. For example, in the second coil portion 215*b*, the first extending wire 216 is led out to the radially outer side, and the second extending wire 217 is led out to the radially inner side. Therefore, when the number of turns of the first coil portion 215*a* is an integer, the number of turns of the second coil portion 215*b* is substantially 0.5 less than the number of turns of the first coil portion 215*a*.

<Configuration Group Ad>

Figure 16:
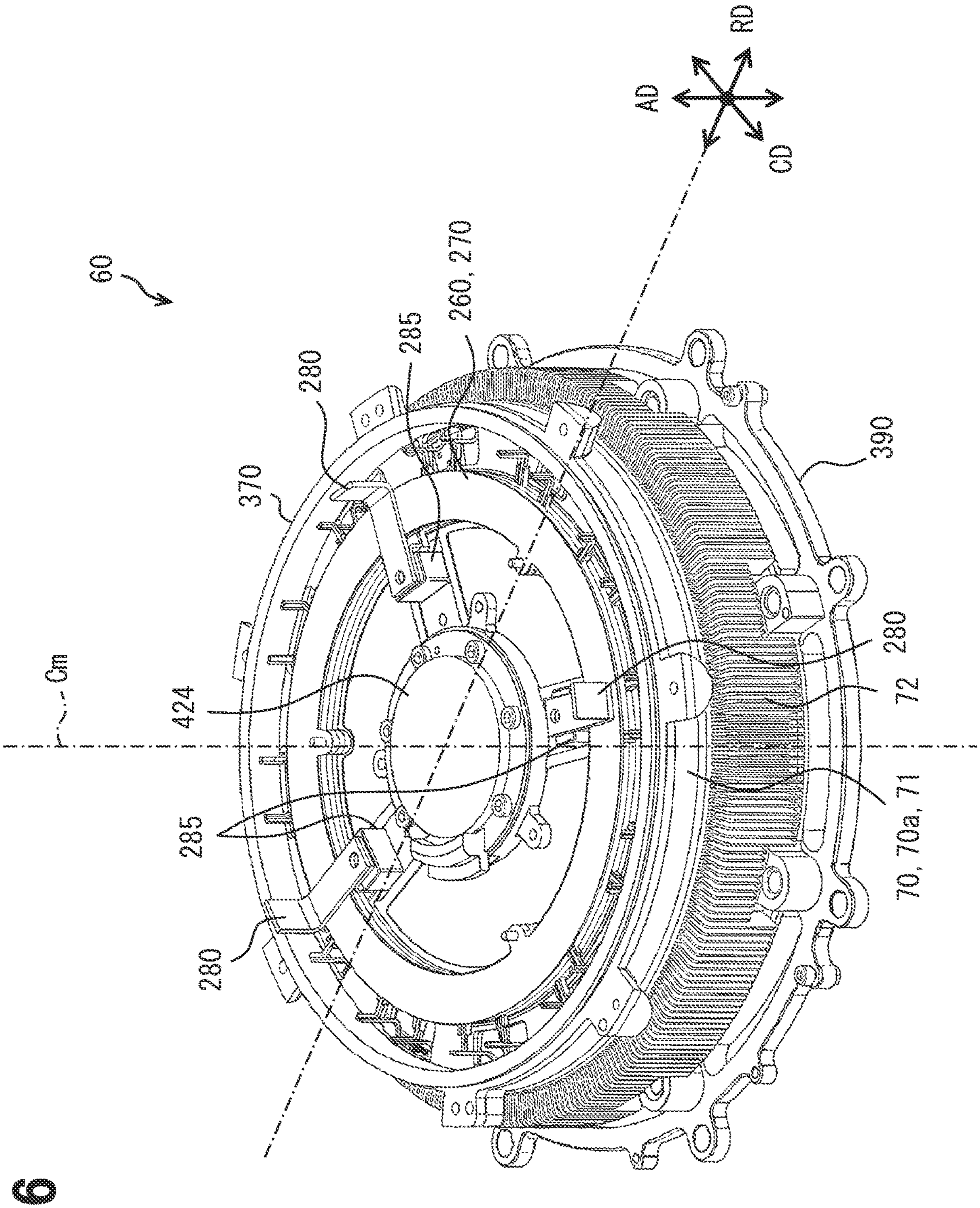
FIG. 16 is a perspective view of a motor device in a configuration group Ad.
Figure 17:
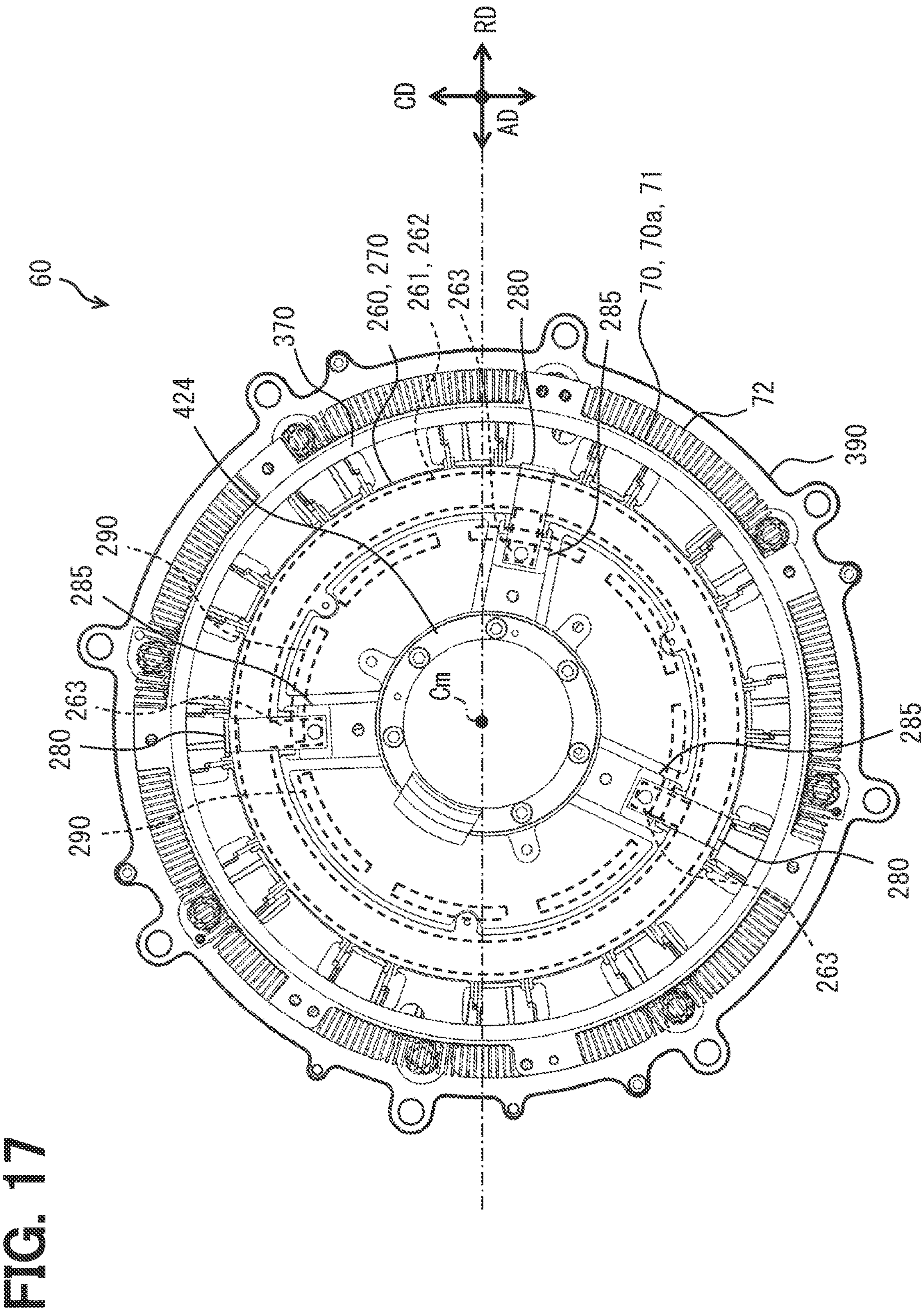
FIG. 17 is a top view of the motor device.
Figure 18:
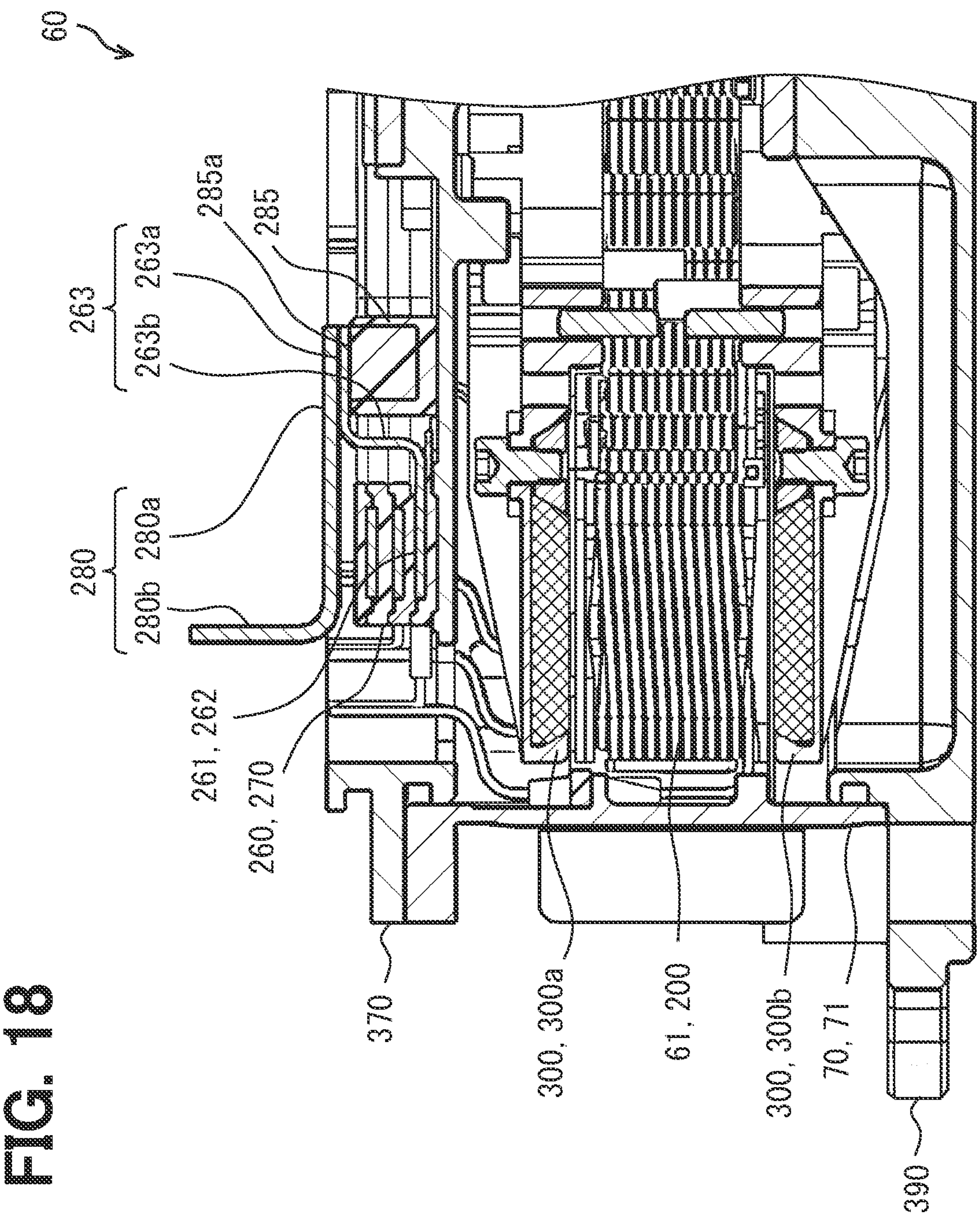
FIG. 18 is a vertical cross-sectional view of a periphery of a relay terminal in the motor device.

In FIGS. 16, 17, and 18, the relay terminal 280 and the electric power busbar 261 are electrically connected. In the electric power busbar 261, the busbar terminal 263 is connected to the relay terminal 280 by a connector such as a screw. The connector is a conductive member for a current to pass therethrough.

The motor device 60 includes terminal bases 285. Each of the terminal bases 285 is made of a resin material or the like, and has an electrical insulation property. The terminal base 285 supports a connection portion between the relay terminal 280 and the busbar terminal 263. For example, by screwing the connector to the terminal base 285, the connection portion between the relay terminal 280 and the busbar terminal 263 is fixed to the terminal base 285. In other words, the relay terminal 280 and the busbar terminal 263 are connected by the terminal base 285. The terminal base 285 corresponds to a terminal block. The relay terminal 280 is electrically connected to the inverter 81. The relay terminal 280 is formed by, for example, a busbar member, and corresponds to a relay busbar.

As shown in FIG. 18, the terminal base 285 has a base surface 285*a*. The base surface 285*a* extends in a direction orthogonal to the motor axis Cm. The relay terminal 280 includes a relay connection portion 280*a*, and the busbar terminal 263 includes a busbar connection portion 263*a*. The relay connection portion 280*a* and the busbar connection portion 263*a* are connected to each other by the connector in a state of being overlapped with the base surface 285*a*. One of the relay connection portion 280*a* and the busbar connection portion 263*a* is sandwiched between the other and the base surface 285*a*.

The relay terminal 280 includes a relay extending portion 280*b*. The relay extending portion 280*b* extends toward the inverter device 80 in the relay terminal 280. For example, the relay extending portion 280*b* extends from the relay connection portion 280*a* in the axial direction AD. The busbar terminal 263 includes a busbar extending portion 263*b*. The busbar extending portion 263*b* extends toward the busbar main body 262 in the busbar terminal 263. For example, the busbar extending portion 263*b* includes a portion extending in the radial direction RD and a portion extending in the axial direction AD.

The terminal base 285 is provided for each of the multiple phases. Multiple terminal bases 285 are arranged in the circumferential direction CD along the busbar unit 260. For example, the multiple terminal bases 285 include a U-phase terminal base 285, a V-phase terminal base 285, and a W-phase terminal base 285. The terminal base 285 is provided at a position aligned with the busbar unit 260 in the radial direction RD. The terminal base 285 is located at a position separated from the busbar unit 260 toward the radially inner side.

<Configuration Group Ae>

Figure 19:
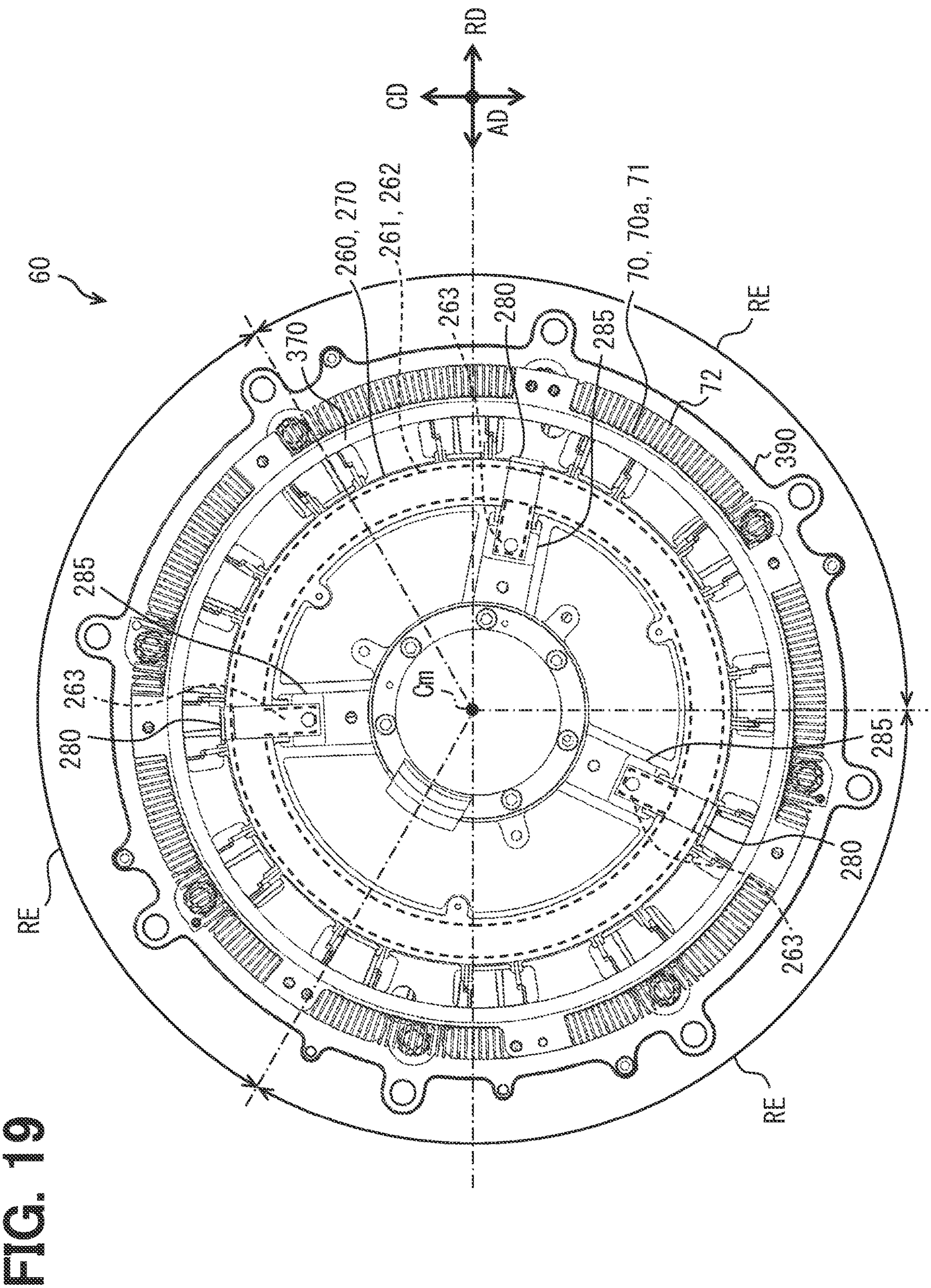
FIG. 19 is a top view of a motor device in a configuration group Ae.

As shown in FIG. 19, the multiple relay terminals 280 are arranged by being sufficiently spaced apart from one another. A separation distance between two adjacent relay terminals 280 in the circumferential direction CD is sufficiently large. For example, in a configuration in which three relay terminals 280 are arranged in the circumferential direction CD, a separation angle between two adjacent relay terminals 280 is approximately 120 degrees.

In the motor device 60, multiple virtual divided regions RE are arranged in the circumferential direction CD. The multiple divided regions RE are regions obtained by dividing a periphery of the motor axis Cm at equal intervals in the circumferential direction CD. The number of the divided regions RE is the same with the number of the relay terminals 280. For example, when the number of the relay terminals 280 is three, the number of the divided regions RE is also three. In this case, the three divided regions RE are obtained by dividing the periphery of the motor axis Cm by 120 degrees in the circumferential direction CD.

One relay terminal 280 is disposed in each of the multiple divided regions RE. For example, one relay terminal 280 is disposed in each of the three divided regions RE. When the three relay terminals 280 are arranged at intervals of 120 degrees, one relay terminal 280 is necessarily arranged in each of the three divided regions RE. Even if the separation angle of the three relay terminals 280 is too large or too small with respect to 120 degrees, a sufficient separation distance is secured between at least two relay terminals 280.

Similarly to the multiple relay terminals 280, the multiple busbar terminals 263 and the multiple terminal bases 285 are also arranged by being sufficiently spaced apart from one another in the circumferential direction CD. For example, when there are three busbar terminals 263 and three terminal bases 285, one busbar terminal 263 and one terminal base 285 are disposed in each of the three divided regions RE.

<Configuration Group Af>

Figure 20:
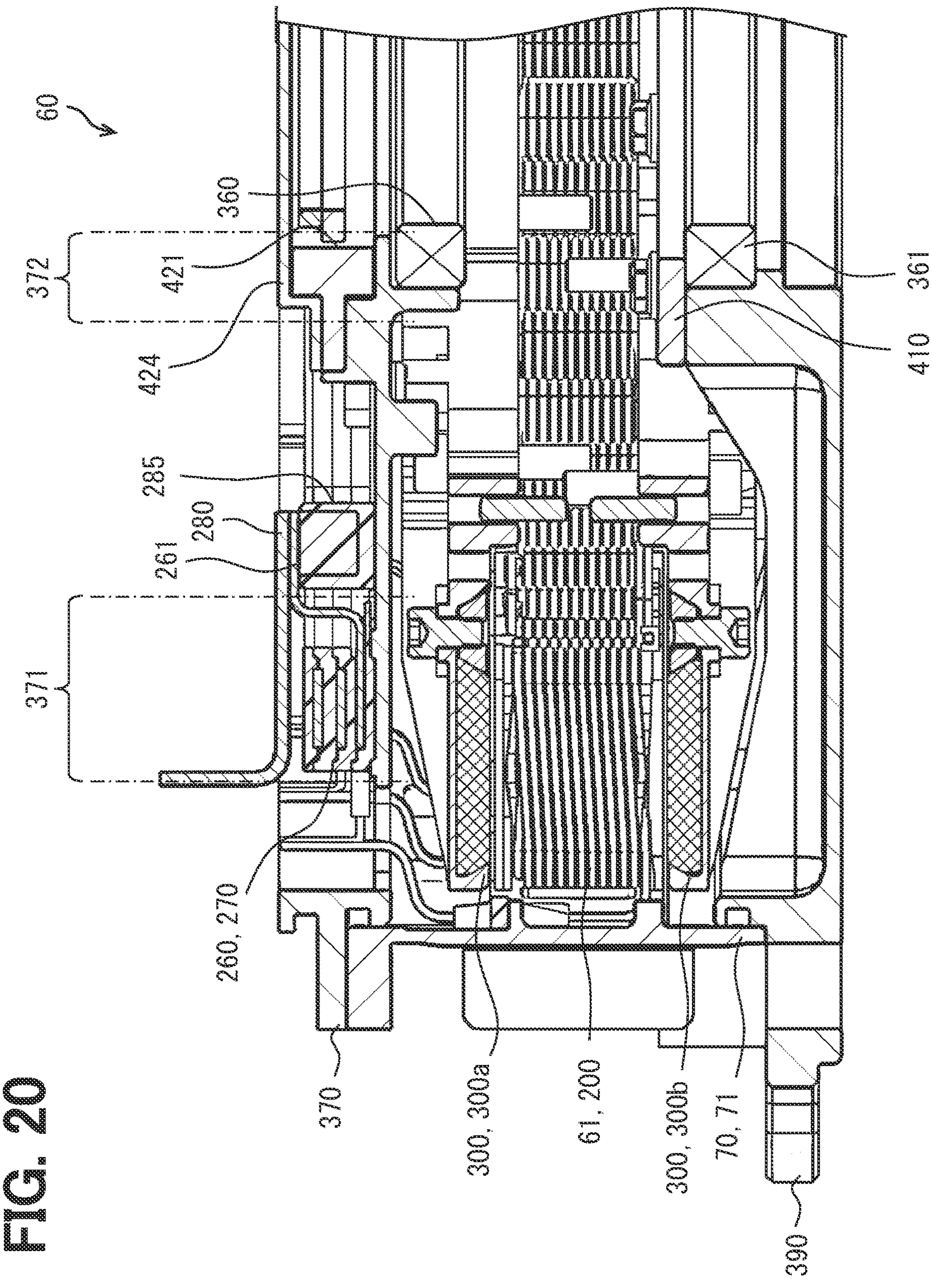
FIG. 20 is a vertical cross-sectional view of a periphery of a relay terminal in a motor device in a configuration group Af.
Figure 21:
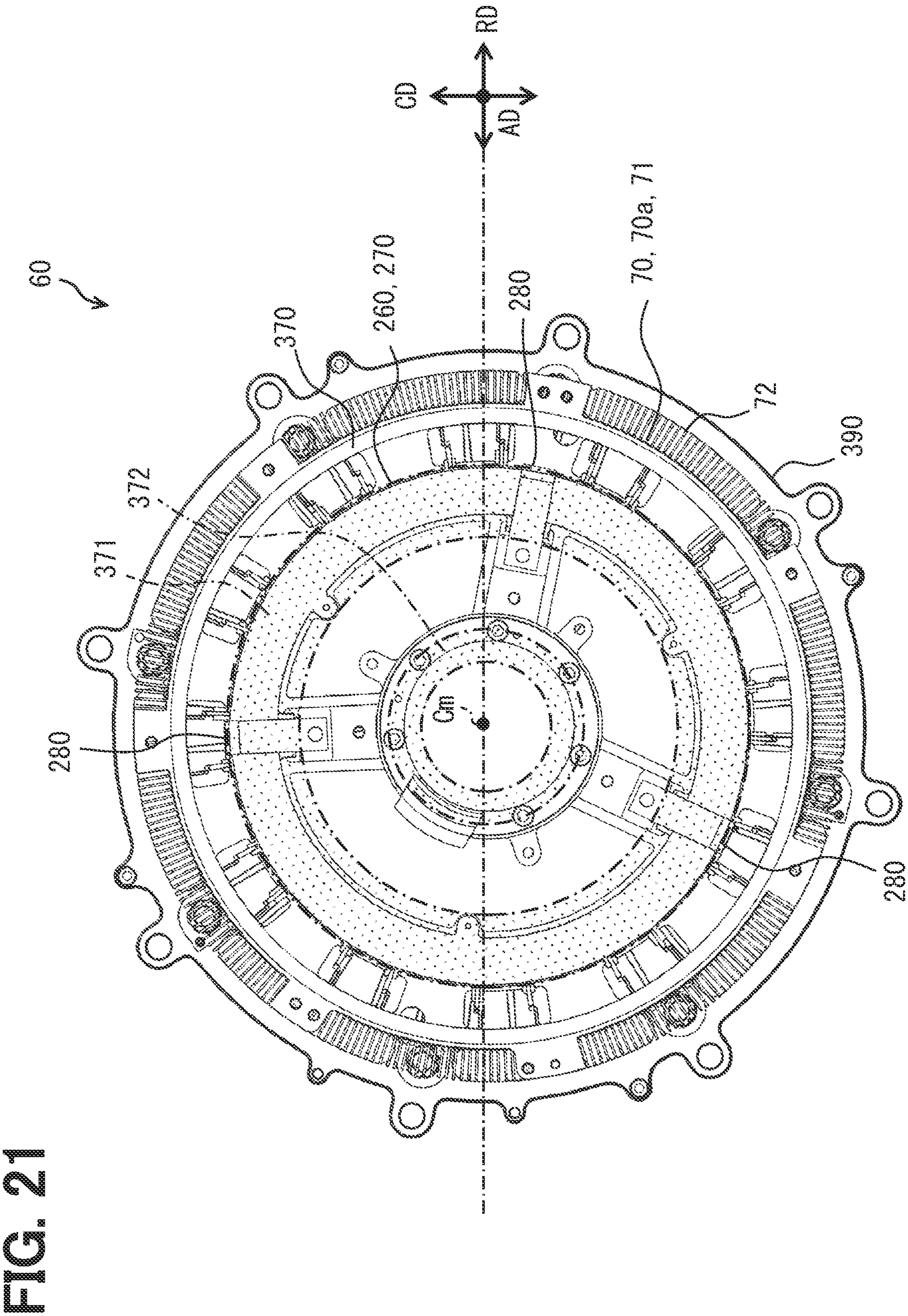
FIG. 21 is a top view of the motor device.

As shown in FIGS. 20 and 21, the rear frame 370 supports both the busbar unit 260 and the first bearing 360. The rear frame 370 includes a busbar support portion 371 and a bearing support portion 372. The rear frame 370 corresponds to a support frame, and the first bearing 360 corresponds to a bearing.

The busbar support portion 371 is a portion of the rear frame 370 which supports the busbar unit 260. The busbar support portion 371 supports the electric power busbar 261 by supporting the busbar protection portion 270. The busbar support portion 371 includes at least a portion of the rear frame 370 which is overlapped with the busbar unit 260 in the axial direction AD. The busbar unit 260 is fixed to the busbar support portion 371 by fixing tools such as bolts. The busbar support portion 371 extends in the circumferential direction CD around the motor axis Cm. The busbar support portion 371 is formed in an annular shape as a whole. The busbar support portion 371 is located at a position separated from an outer peripheral edge of the rear frame 370 toward the radially inner side. The busbar support portion 371 is located at a position separated from an inner peripheral edge of the rear frame 370 toward the radially outer side. The busbar support portion 371 and the bearing support portion 372 are located at positions separated from each other in the radial direction RD.

The bearing support portion 372 is a portion of the rear frame 370 which supports the first bearing 360. The bearing support portion 372 includes at least a portion of the rear frame 370 which is overlapped with the first bearing 360 in the axial direction AD. The bearing support portion 372 extends in the circumferential direction CD around the motor axis Cm. The bearing support portion 372 is formed in an annular shape as a whole. The bearing support portion 372 forms the inner peripheral edge of the rear frame 370.

The bearing support portion 372 includes a support projection portion 372*a*. The support projection portion 372*a* in the rear frame 370 protrudes toward the drive frame 390 in the axial direction AD. The support projection portion 372*a* extends in the circumferential direction CD and is formed in an annular shape as a whole. The support projection portion 372*a* is provided at a position separated from the inner peripheral edge of the rear frame 370 toward the radially outer side. The first bearing 360 is fixed to the bearing support portion 372 in a state of entering inside the support projection portion 372*a*. The first bearing 360 is fitted inside the support projection portion 372*a*, for example. In FIG. 21, the busbar support portion 371 and the bearing support portion 372 are indicated by dot hatching.

<Configuration Group Ag>

Figure 22:
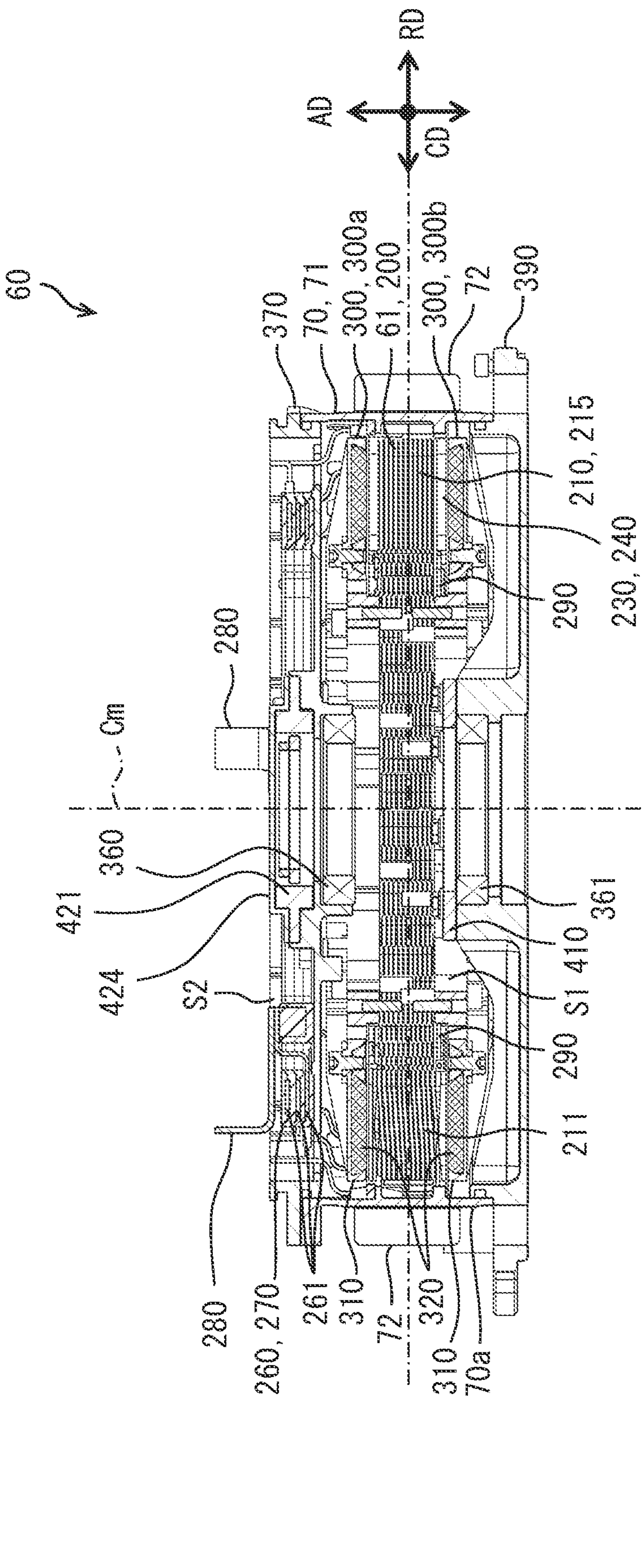
FIG. 22 is a vertical cross-sectional view of a motor device in a configuration group Ag.

As shown in FIG. 22, the resolver 421 is provided in the inverter-side space S2. The resolver 421 is in a state of being overlapped with the rear frame 370 from the inverter device 80 side.

Figure 23:
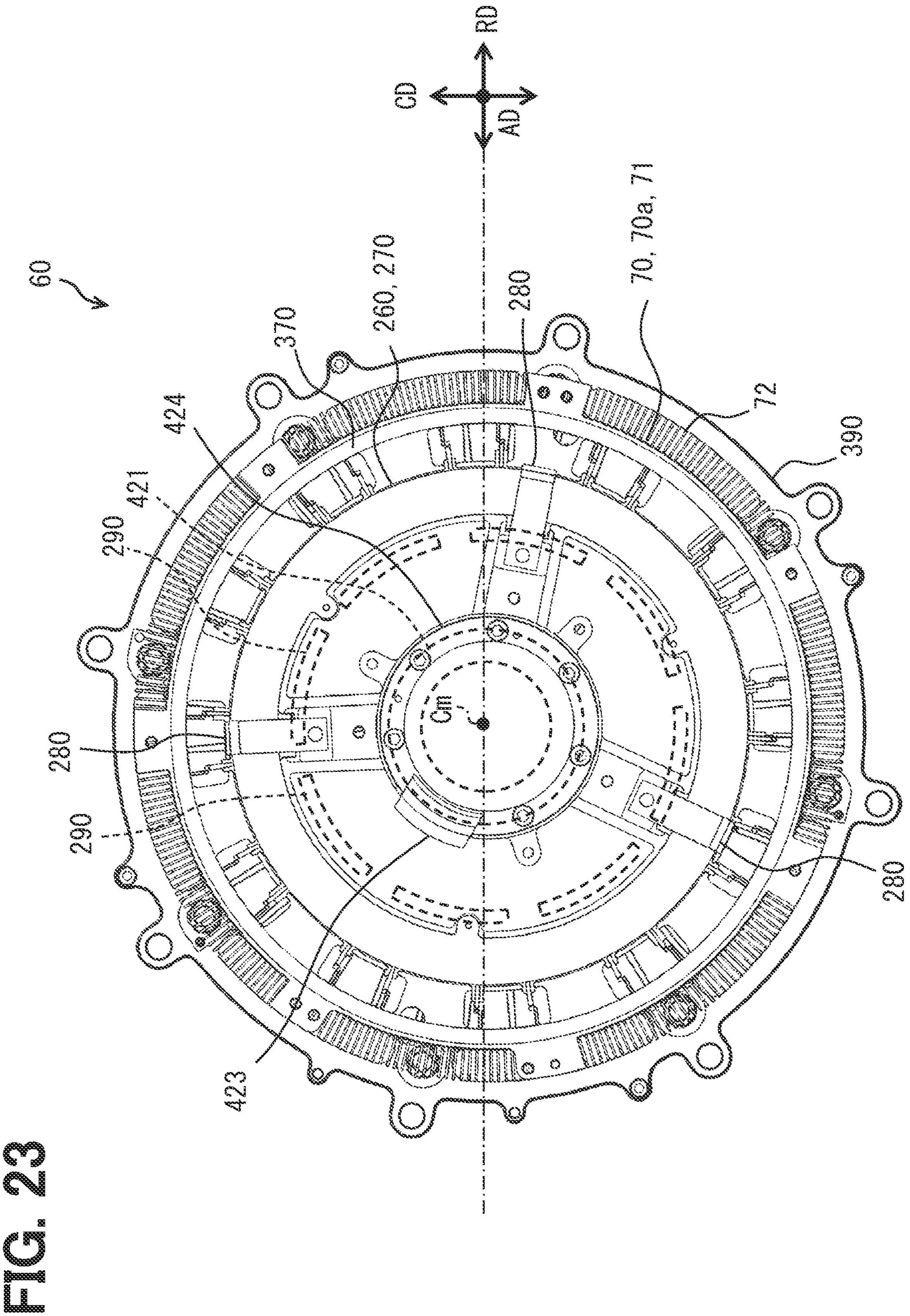
FIG. 23 is a top view of the motor device.

As shown in FIGS. 22 and 23, the resolver 421 is provided with a resolver connector 423. The resolver connector 423 is a connector for electrically connecting the resolver 421 to the external device such as the control device 54. In the resolver connector 423, for example, an electric wire forming the signal line 425 is electrically connected to the resolver 421. The resolver connector 423 is in a state of protruding from the resolver 421 in the axial direction AD.

At least a part of the resolver connector 423 is in a state of being exposed to the inverter device 80 without being covered by the resolver cover 424. The resolver cover 424 may be provided in the resolver 421.

As shown in FIG. 22, the neutral point busbar 290 is located at a position separated from the resolver 421 in the axial direction AD. The neutral point busbar 290 is located on an opposite side of the rear frame 370 from the resolver 421, and the rear frame 370 is interposed therebetween in the axial direction AD. The neutral point busbar 290 is provided in the stator-side space S1, and the resolver 421 is provided in the inverter-side space S2. As shown in FIG. 23, the neutral point busbar 290 is provided at a position separated from the resolver 421 in the radial direction RD. The neutral point busbar 290 is located at a position separated from the resolver 421 toward the radially outer side. The rear frame 370 corresponds to an orthogonal frame.

<Configuration Group Ba>

Figure 24:
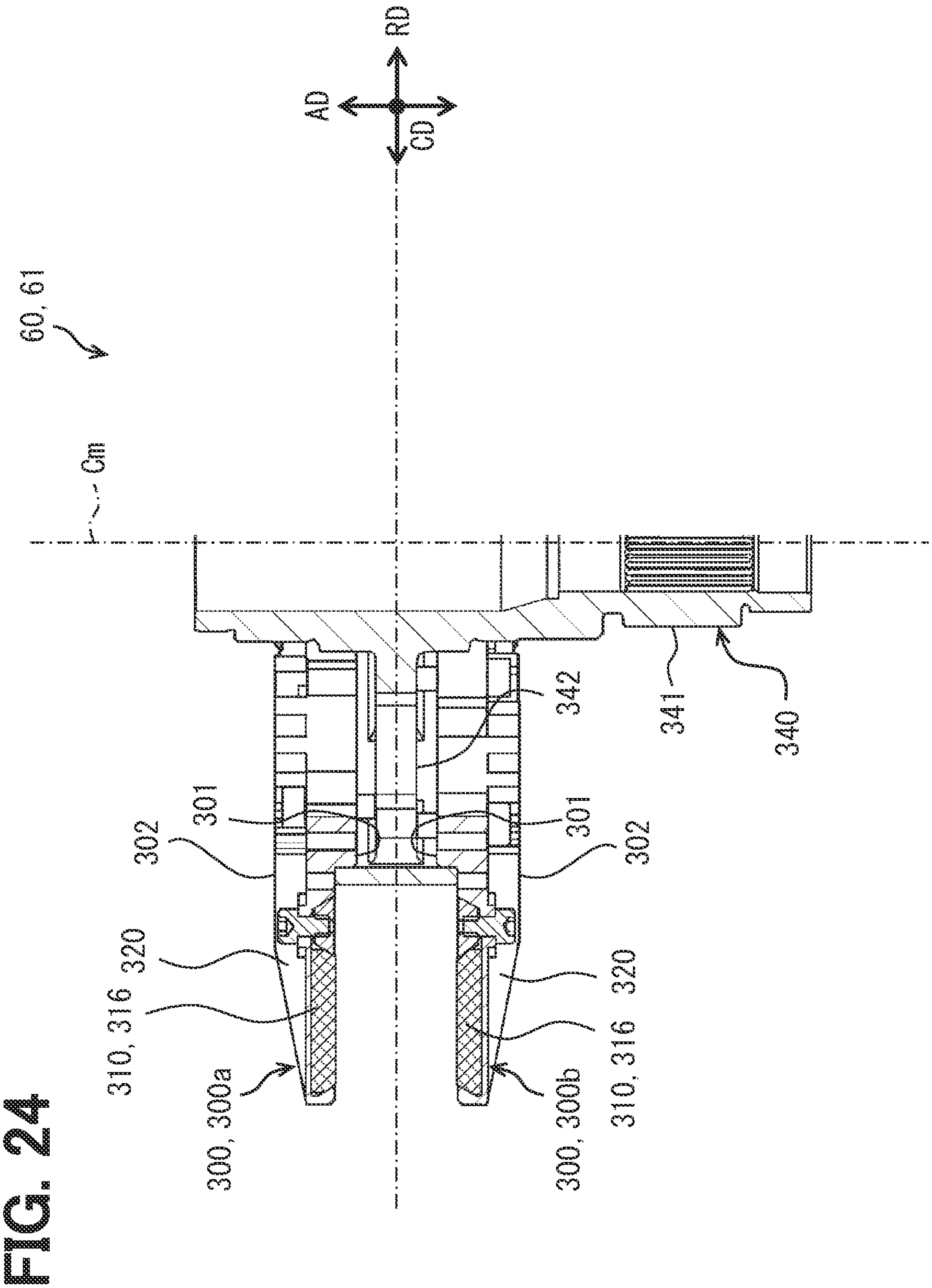
FIG. 24 is a vertical cross-sectional view of a rotor and a shaft in a configuration group Ba.
Figure 25:
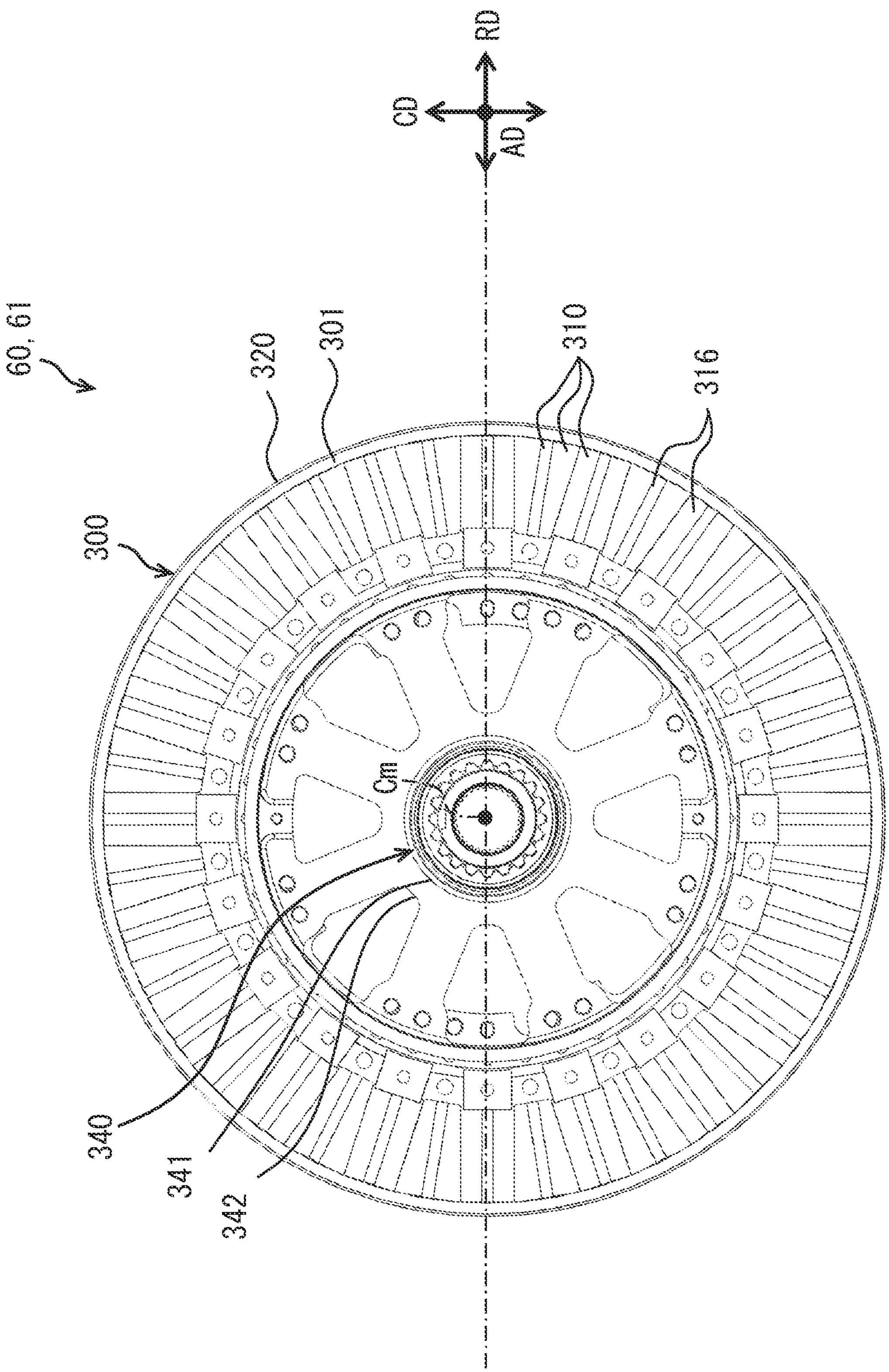
FIG. 25 is a top view of the rotor viewed from a first rotor surface side.
Figure 26:
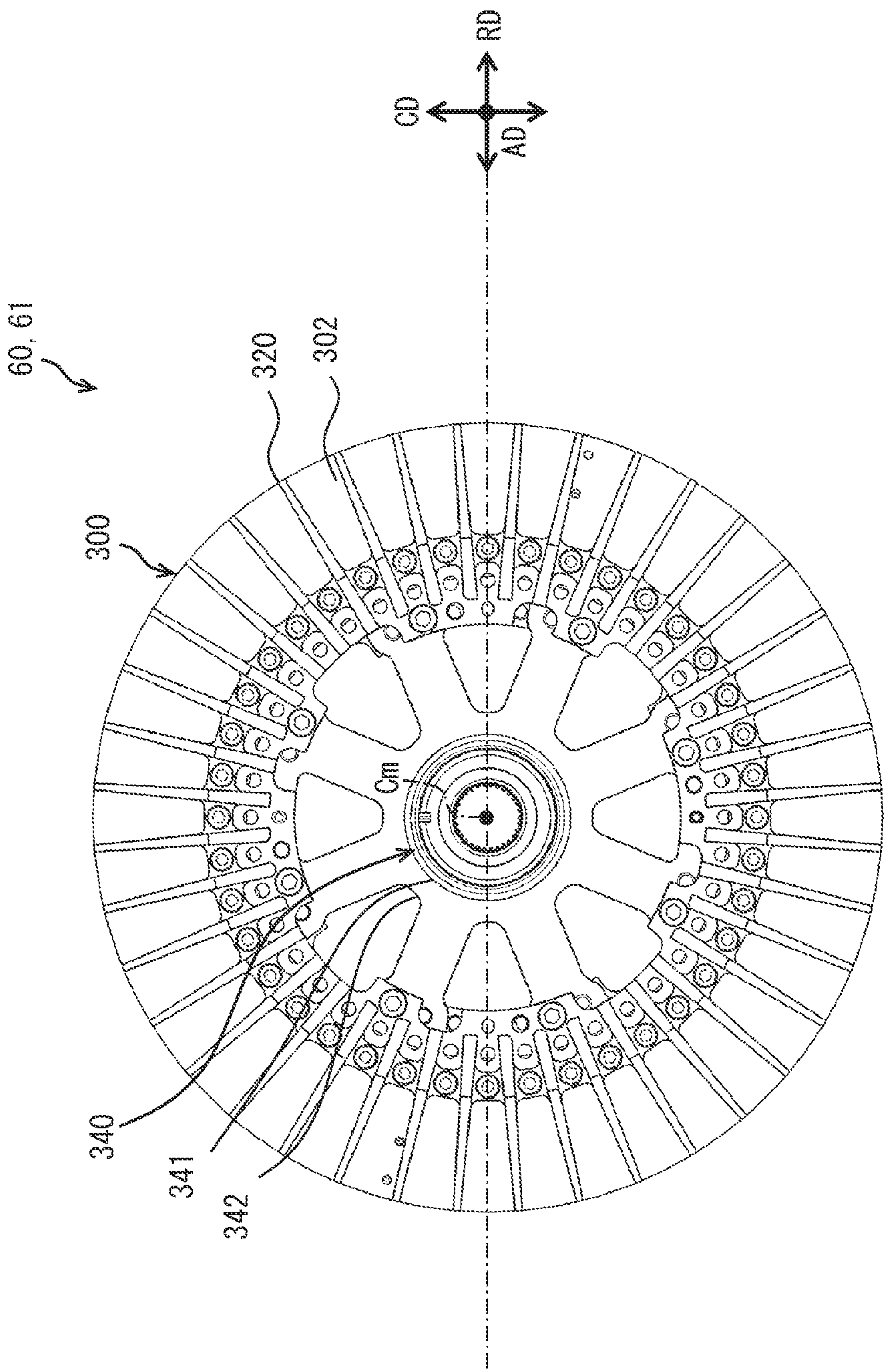
FIG. 26 is a top view of the rotor viewed from a second rotor surface side.

As shown in FIGS. 24, 25, and 26, the rotor 300 has a first rotor surface 301 and a second rotor surface 302. The first rotor surface 301 and the second rotor surface 302 each extend in a direction orthogonal to the motor axis Cm. The first rotor surface 301 and the second rotor surface 302 each extend in the circumferential direction CD around the motor axis Cm, and are formed in an annular shape as a whole. In the rotor 300, one of a pair of plate surfaces is the first rotor surface 301, and the other is the second rotor surface 302.

In the motor device 60, the first rotor 300*a* and the second rotor 300*b* are disposed such that the first rotor surfaces 301 thereof face each other. In the first rotor 300*a* and the second rotor 300*b*, the second rotor surfaces 302 thereof face opposite sides. In the first rotor 300*a*, the second rotor surfaces 302 faces the rear frame 370.

As shown in FIGS. 24 and 25, in the rotor 300, the multiple magnets 310 are arranged along the first rotor surface 301. Each of the magnets 310 is exposed on the first rotor surface 301, and is not exposed on the second rotor surface 302. The magnet 310 is in a state of being covered by the magnet holder 320 from the second rotor surface 302.

Figure 27:
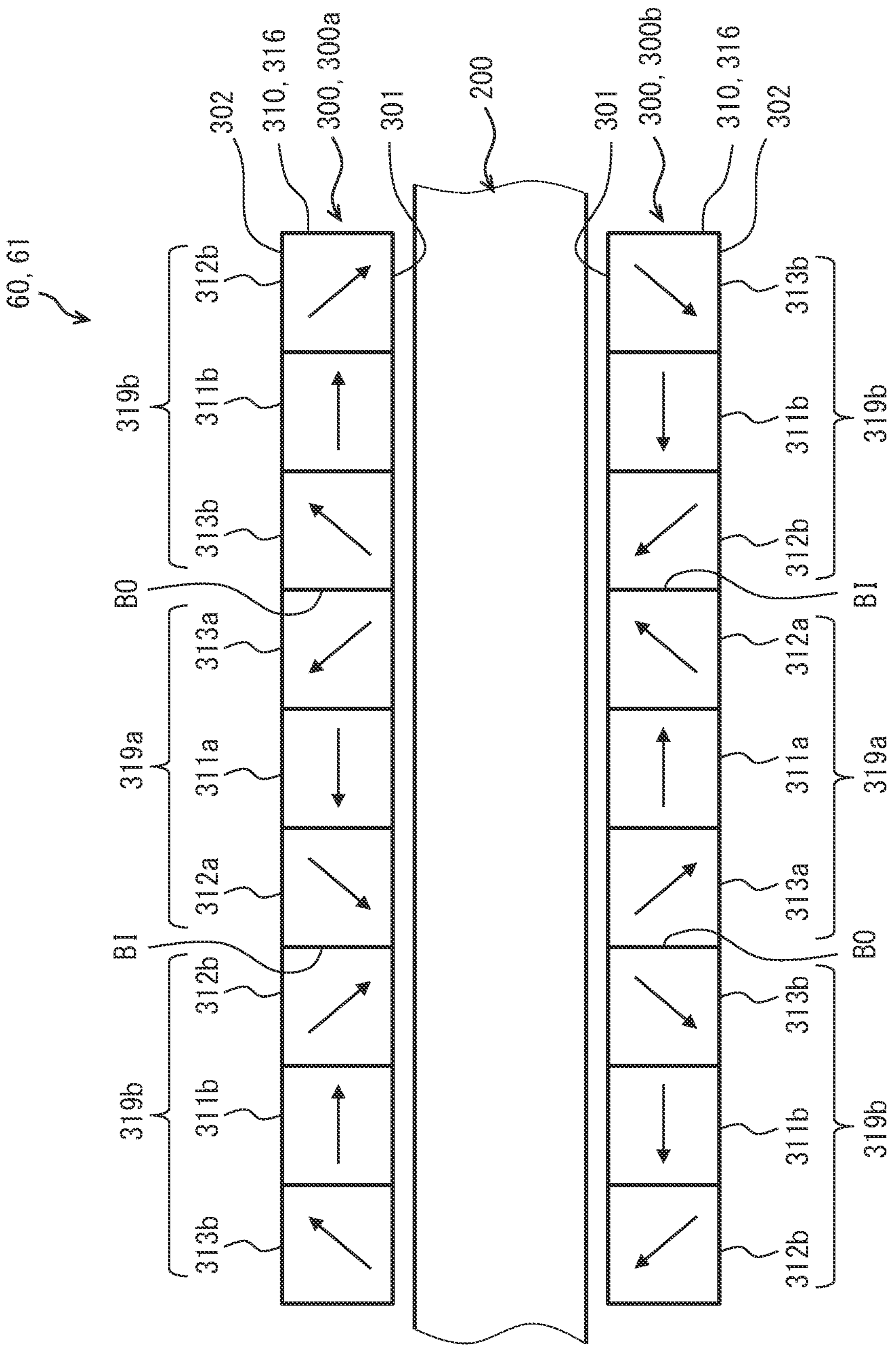
FIG. 27 is a diagram showing an array of magnets in the motor.

As shown in FIGS. 25 and 27, the rotor 300 includes magnet units 316. The magnet unit 316 includes at least one magnet 310. In the present embodiment, the magnet unit 316 includes multiple magnets 310. In the magnet unit 316, the multiple magnets 310 are arranged in the circumferential direction CD. The magnet unit 316 includes, for example, three magnets 310. Multiple magnet units 316 are arranged in the circumferential direction CD in the rotor 300.

As shown in FIG. 27, the multiple magnets 310 of the rotor 300 include first peripheral magnets 311*a*, second peripheral magnets 311*b*, first axially inward magnets 312*a*, second axially inward magnets 312*b*, first axially outward magnets 313*a*, and second axially outward magnets 313*b*. These peripheral magnets 311*a* and 311*b*, the axially inward magnets 312*a* and 312*b*, and the axially outward magnets 313*a* and 313*b* are disposed to strengthen a magnetic force on the stator 200. Such an array of the magnets 310 may be referred to as a Halbach array. FIG. 27 is a view of the array of the magnets 310 developed on a plane as the rotor 300 is viewed from the radially outer side.

Multiple first peripheral magnets 311*a* and multiple second peripheral magnets 311*b* are arranged in the circumferential direction CD. The first peripheral magnets 311*a* and the second peripheral magnets 311*b* are alternately arranged one by one in the circumferential direction CD. The first peripheral magnet 311*a* and the second peripheral magnet 311*b* are magnets oriented opposite to each other in the circumferential direction CD. The first peripheral magnet 311*a* is oriented toward one side in the circumferential direction CD, and the second peripheral magnet 311*b* is oriented toward the other side in the circumferential direction CD. For example, when a person views the rotor 300 from a side opposite to the stator 200, the first peripheral magnet 311*a* is oriented clockwise in the circumferential direction CD. The second peripheral magnet 311*b* is oriented counterclockwise in the circumferential direction CD. In the present embodiment, a magnetization direction in the magnet 310 is an orientation direction thereof. The first peripheral magnet 311*a* and the second peripheral magnet 311*b* correspond to the peripheral magnets.

The first axially inward magnets 312*a* and the second axially inward magnets 312*b* are alternately arranged in the circumferential direction CD. For example, the first axially inward magnets 312*a* and the second axially inward magnets 312*b* are alternately arranged one by one in the circumferential direction CD. The first axially inward magnet 312*a* and the second axially inward magnet 312*b* each are a magnet oriented to be inclined with respect to the motor axis Cm in a manner of facing the stator 200 in the axial direction AD. In the circumferential direction CD, the first axially inward magnet 312*a* and the second axially inward magnet 312*b* are oriented opposite to each other. In the circumferential direction CD, the first axially inward magnet 312*a* is oriented toward the same side as the first peripheral magnet 311*a*. In the circumferential direction CD, the second axially inward magnet 312*b* is oriented toward the same side as the second peripheral magnet 311*b*. The first axially inward magnet 312*a* and the second axially inward magnet 312*b* correspond to axially inward magnets.

The multiple magnets 310 include a pair of axially inward magnets 312*a* and 312*b*. The pair of axially inward magnets 312*a* and 312*b* are adjacent to each other in the circumferential direction CD. When a boundary between the pair of axially inward magnets 312*a* and 312*b* is referred to as an inner boundary BI, the first axially inward magnet 312*a* and the second axially inward magnet 312*b* which form the inner boundary BI are the pair of axially inward magnets 312*a* and 312*b*. The pair of axially inward magnets 312*a* and 312*b* are oriented to be inclined with respect to the motor axis Cm in a manner of facing the stator 200 in the axial direction AD and facing each other in the circumferential direction CD.

The first axially outward magnets 313*a* and the second axially outward magnets 313*b* are alternately arranged in the circumferential direction CD. The first axially outward magnets 313*a* and the second axially outward magnets 313*b* are alternately arranged one by one in the circumferential direction CD. The first axially outward magnet 313*a* and the second axially outward magnet 313*b* are each a magnet oriented to be inclined with respect to the motor axis Cm in a manner of facing a side opposite to the stator 200 in the axial direction AD. In the circumferential direction CD, the first axially outward magnet 313*a* and the second axially outward magnet 313*b* are oriented opposite to each other. In the circumferential direction CD, the first axially outward magnet 313*a* is oriented toward the same side as the first peripheral magnet 311*a*. In the circumferential direction CD, the second axially outward magnet 313*b* is oriented toward the same side as the second peripheral magnet 311*b*. The first axially outward magnet 313*a* and the second axially outward magnet 313*b* correspond to axially outward magnets.

The multiple magnets 310 include a pair of axially outward magnets 313*a* and 313*b*. The pair of axially outward magnets 313*a* and 313*b* are adjacent to each other in the circumferential direction CD. When a boundary between the pair of axially outward magnets 313*a* and 313*b* is referred to as an outer boundary BO, the first axially outward magnet 313*a* and the second axially outward magnet 313*b* which form the outer boundary BO are the pair of axially outward magnets 313*a* and 313*b*. The pair of axially outward magnets 313*a* and 313*b* are oriented to be inclined with respect to the motor axis Cm in a manner of facing a side opposite to the stator 200 in the axial direction AD and facing opposite sides in the circumferential direction CD.

In the circumferential direction CD, multiple pairs of axially inward magnets 312*a* and 312*b* and multiple pairs of axially outward magnets 313*a* and 313*b* are arranged. The pairs of axially inward magnets 312*a* and 312*b* and the pairs of axially outward magnets 313*a* and 313*b* are alternately arranged one pair by one pair in the circumferential direction CD. The pair of axially inward magnets 312*a* and 312*b* and the pair of axially outward magnets 313*a* and 313*b* are disposed such that the first axially inward magnet 312*a* and the first axially outward magnet 313*a* are adjacent to each other with the first peripheral magnet 311*a* interposed therebetween in the circumferential direction CD. In other words, the first peripheral magnet 311*a* is provided between the first axially inward magnet 312*a* and the first axially outward magnet 313*a* in the circumferential direction CD. The pair of axially inward magnets 312*a* and 312*b* and the pair of axially outward magnets 313*a* and 313*b* are disposed such that the second axially inward magnet 312*b* and the second axially outward magnet 313*b* are adjacent to each other with the second peripheral magnet 311*b* interposed therebetween in the circumferential direction CD. In other words, the second peripheral magnet 311*b* is provided between the second axially inward magnet 312*b* and the second axially outward magnet 313*b* in the circumferential direction CD.

The multiple magnets 310 include a pair of peripheral magnets 311*a* and 311*b*. The pair of peripheral magnets 311*a* and 311*b* are adjacent to each other with the pair of axially inward magnets 312*a* and 312*b* interposed therebetween. The pair of peripheral magnets 311*a* and 311*b* are oriented to face each other in the circumferential direction CD.

The multiple magnet units 316 include first orientation units 319*a* and second orientation units 319*b*. Multiple first orientation units 319*a* and multiple second orientation units 319*b* are arranged in the circumferential direction CD. The first orientation units 319*a* and the second orientation units 319*b* are alternately arranged one by one in the circumferential direction CD. The first orientation units 319*a* and the second orientation units 319*b* are oriented in opposite directions as a whole.

Each of the first orientation units 319*a* includes one first peripheral magnet 311*a*, one first axially inward magnet 312*a*, and one first axially outward magnet 313*a*. In the first orientation unit 319*a*, the first peripheral magnet 311*a* is disposed between the first axially inward magnet 312*a* and the first axially outward magnet 313*a*. In the first orientation unit 319*a*, the first peripheral magnet 311*a*, the first axially inward magnet 312*a*, and the first axially outward magnet 313*a* are fixed to each other to form a unit.

Each of the second orientation units 319*b* includes one second peripheral magnet 311*b*, one second axially inward magnet 312*b*, and one second axially outward magnet 313*b*. In the second orientation unit 319*b*, the second peripheral magnet 311*b* is disposed between the second axially inward magnet 312*b* and the second axially outward magnet 313*b*. In the second orientation unit 319*b*, the second peripheral magnet 311*b*, the second axially inward magnet 312*b*, and the second axially outward magnet 313*b* are fixed to each other to form a unit.

The first rotor 300*a* and the second rotor 300*b* are provided point-symmetrically to each other. The first rotor 300*a* is disposed in a direction rotated by 180 degrees with respect to the second rotor 300*b*. The first rotor surfaces 301 of the first rotor 300*a* and the second rotor 300*b* face each other with the stator 200 interposed therebetween. When respectively viewed from sides opposite to the stator 200, the first rotor 300*a* and the second rotor 300*b* have the same arrangement order of the peripheral magnets 311*a* and 311*b*, the axially inward magnets 312*a* and 312*b*, and the axially outward magnets 313*a* and 313*b* in the circumferential direction CD.

In the first rotor 300*a* and the second rotor 300*b*, the respective first peripheral magnets 311*a* are arranged in the axial direction AD. In the first rotor 300*a* and the second rotor 300*b*, a pair of axially inward magnets 312*a* and 312*b* in one rotor and a pair of axially outward magnets 313*a* and 313*b* in the other rotor are arranged in the axial direction AD. In the configuration, the first axially inward magnet 312*a* in the one rotor and the first axially outward magnet 313*a* in the other rotor are arranged in the axial direction AD. The second axially inward magnet 312*b* in the one rotor and the second axially outward magnet 313*b* in the other rotor are arranged in the axial direction AD. Further, the inner boundary BI in the one rotor and the outer boundary BO in the other rotor are arranged in the axial direction AD.

<Configuration Group Bb>

Figure 28:
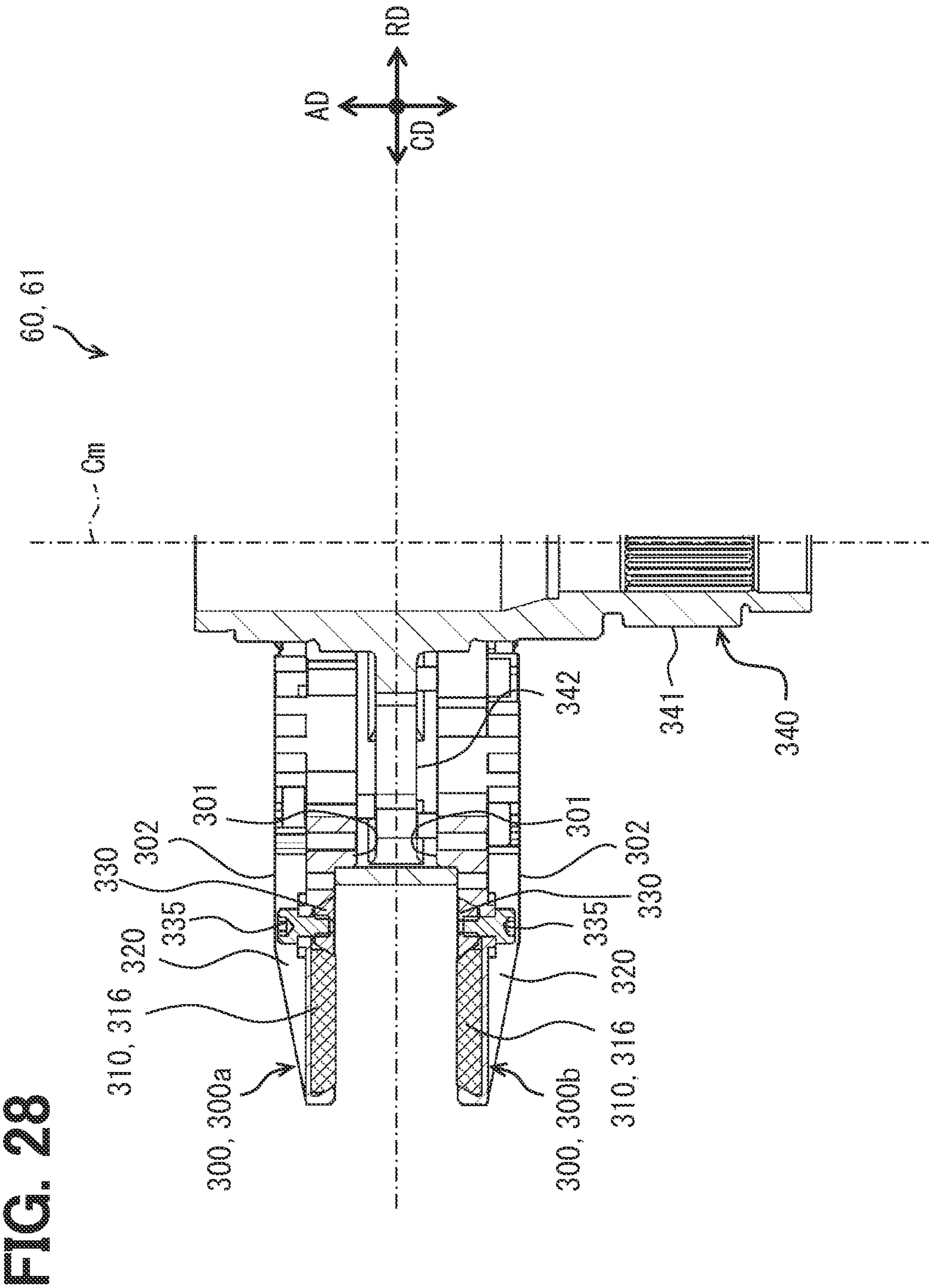
FIG. 28 is a vertical cross-sectional view of a rotor and a shaft in a configuration group Bb.
Figure 29:
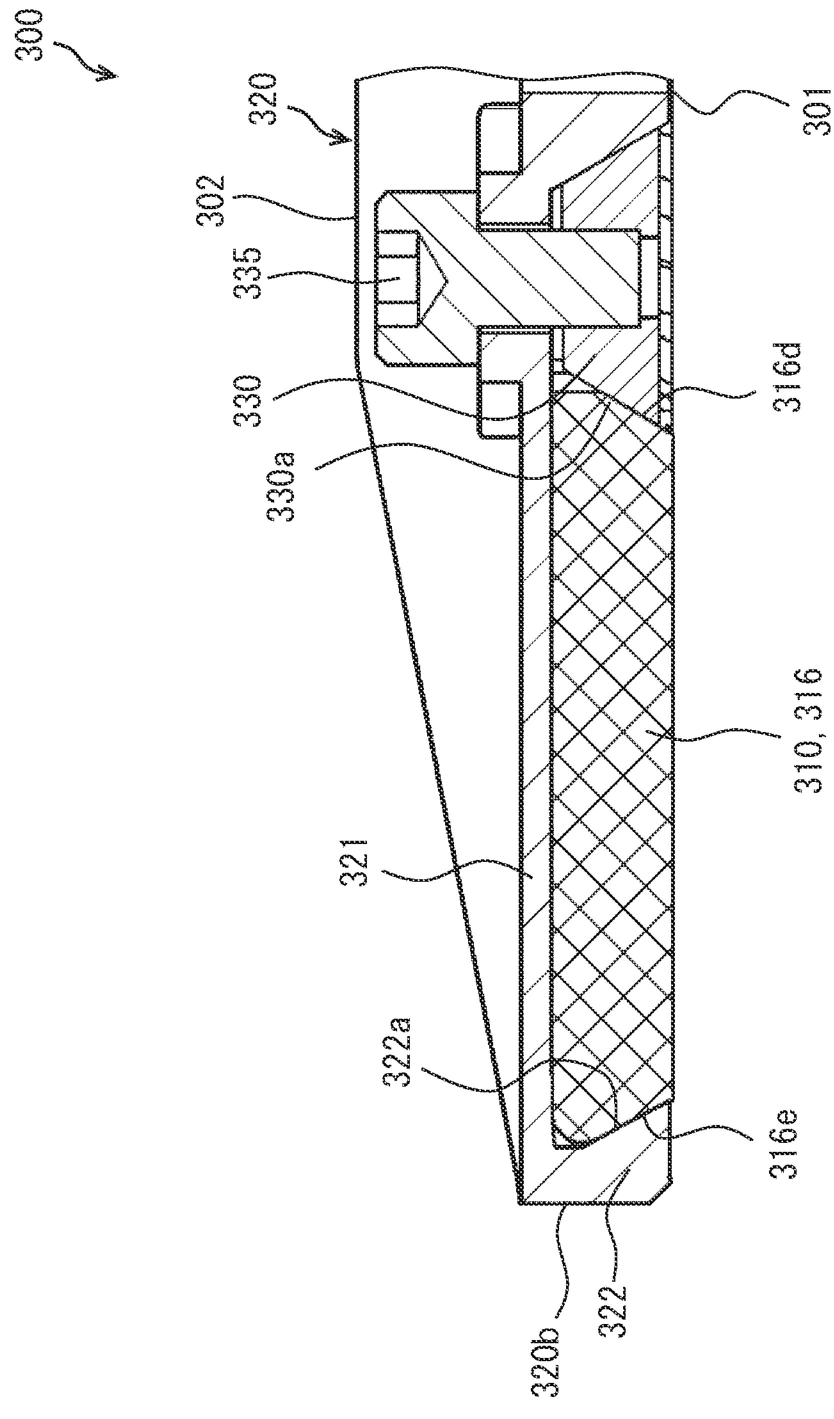
FIG. 29 is a vertical cross-sectional view of a periphery of the magnet in the rotor.
Figure 30:
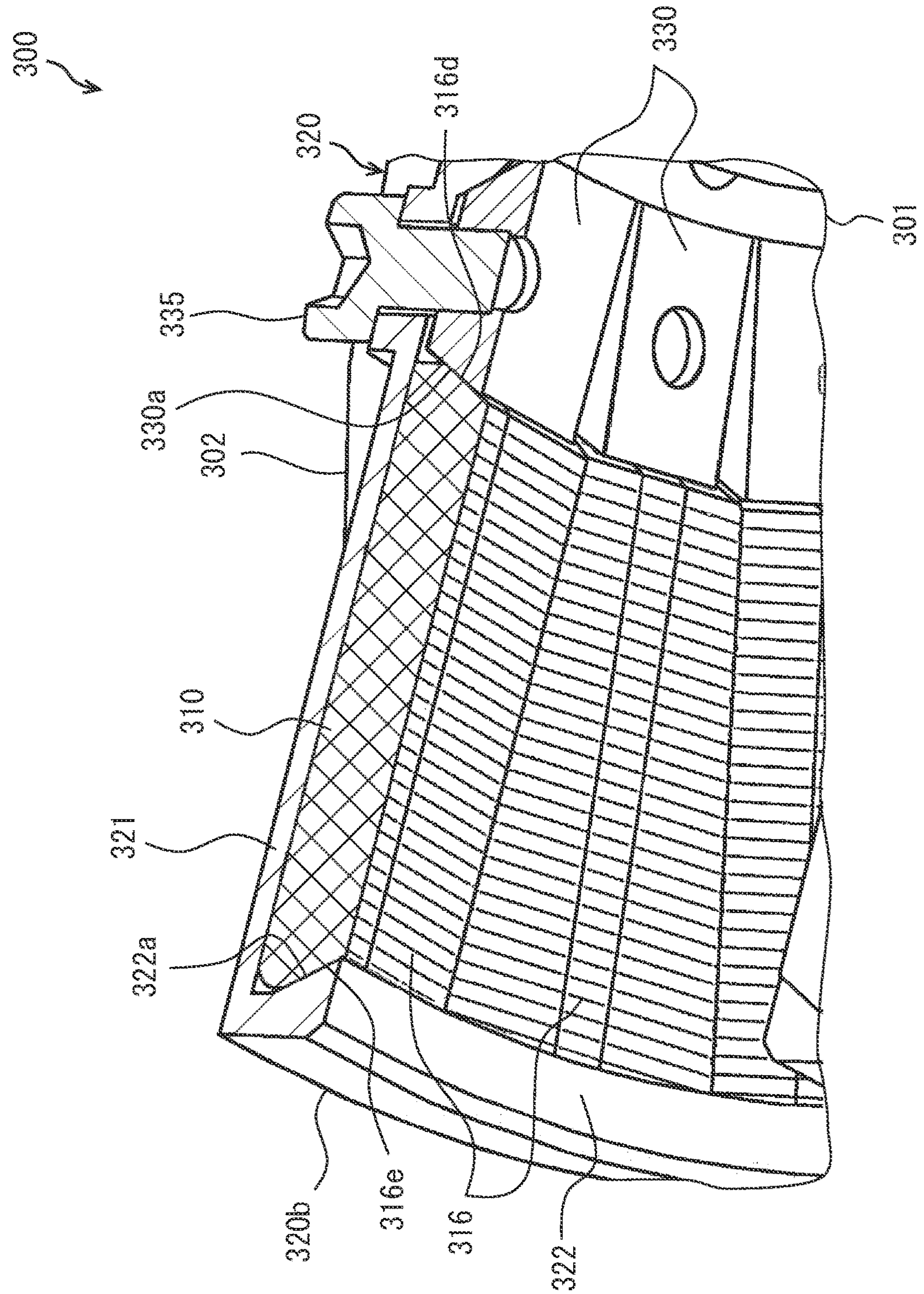
FIG. 30 is a vertical cross-sectional perspective view of the periphery of the magnet in the rotor.

As shown in FIGS. 28, 29, and 30, the rotor 300 includes fixing blocks 330 and magnet fixing tools 335 in addition to the magnet holder 320 and the magnets 310. Each of the magnet fixing tools 335 is a fixing tool such as a bolt, and is made of a metal material or the like. The magnet fixing tool 335 fixes the magnet 310 to the magnet holder 320 via the fixing block 330. In the rotor 300, the magnet 310 and the fixing block 330 are provided on a side of the first rotor surface 301 facing the magnet holder 320. The magnet 310 is overlapped with the magnet holder 320 from the first rotor surface 301 side in the axial direction AD. The magnet 310 is in a state of being sandwiched between the fixing block 330 and the magnet holder 320 in the axial direction AD. The magnet fixing tool 335 penetrates the magnet holder 320 from the second rotor surface 302 and is screwed to the fixing block 330.

The magnet holder 320 includes a holder main body 321 and an outer peripheral engagement portion 322. The holder main body 321 extends in a direction orthogonal to the motor axis Cm, and is formed in a plate shape as a whole. The holder main body 321 forms a main portion of the magnet holder 320. The holder main body 321 extends in the circumferential direction CD around the motor axis Cm and is formed in an annular shape as a whole. The magnet holder 320 includes a holder inner peripheral end 320*a* (see FIG. 31) and a holder outer peripheral end 320*b*. The holder inner peripheral end 320*a* is an inner peripheral end of the magnet holder 320, and the holder outer peripheral end 320*b* is an outer peripheral end of the magnet holder 320. The holder main body 321 forms the holder inner peripheral end 320*a* and the holder outer peripheral end 320*b*.

The outer peripheral engagement portion 322 is a protruding portion provided in the holder main body 321, and protrudes from the holder main body 321 toward the first rotor surface 301 in the axial direction AD. The outer peripheral engagement portion 322 is provided on the holder outer peripheral end 320*b*. The outer peripheral engagement portion 322 includes a portion extending toward the radially inner side, and is in a state of sandwiching the magnet 310 between the portion and the holder main body 321. The outer peripheral engagement portion 322 has an engagement tapered surface 322*a*. The engagement tapered surface 322*a* is an inclined surface inclined with respect to the motor axis Cm. The engagement tapered surface 322*a* faces the radially inner side and is inclined with respect to the motor axis Cm to face the holder main body 321. The magnet 310 is in a state of entering between the engagement tapered surface 322*a* and the holder main body 321 from the radially inner side.

The fixing block 330 is made of a metal material or the like. The fixing block 330 is provided on a side opposite to the outer peripheral engagement portion 322 with the magnet 310 interposed therebetween in the radial direction RD. The fixing block 330 includes a portion extending toward the radially outer side, and is in a state of sandwiching the magnet 310 between the portion and the holder main body 321. The fixing block 330 includes a block tapered surface 330*a*. The block tapered surface 330*a* is provided on an outer surface of the fixing block 330. The block tapered surface 330*a* is an inclined surface inclined with respect to the motor axis Cm. The block tapered surface 330*a* faces the radially outer side and is inclined with respect to the motor axis Cm to face the holder main body 321. The magnet 310 is in a state of entering between the block tapered surface 330*a* and the holder main body 321 from the radially outer side.

The magnet 310 is provided between the outer peripheral engagement portion 322 and the fixing block 330 in the radial direction RD. The magnet 310 is fixed to the holder main body 321 in a state of being sandwiched between the outer peripheral engagement portion 322 and the fixing block 330 in the radial direction RD.

Figure 31:
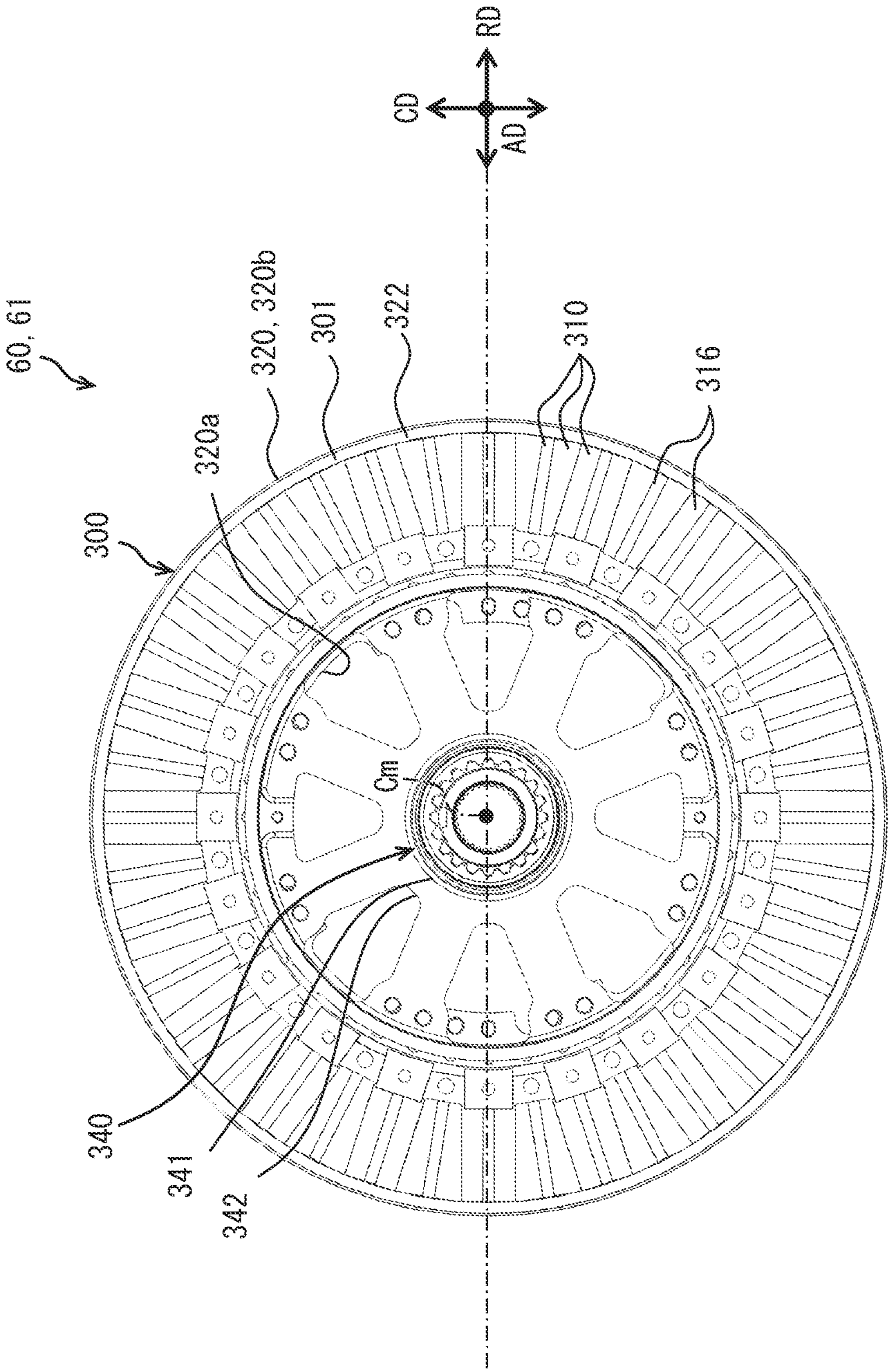
FIG. 31 is a top view of the rotor viewed from a first rotor surface side.

As shown in FIG. 31, multiple fixing blocks 330 and multiple magnet fixing tools 335 are arranged in the circumferential direction CD together with the magnets 310. The fixing blocks 330 are in a state of spanning the multiple magnets 310 in the circumferential direction CD. The outer peripheral engagement portion 322 extends along the holder outer peripheral end 320*b*. The outer peripheral engagement portion 322 extends in the circumferential direction CD around the motor axis Cm and is formed in an annular shape as a whole.

The fixing block 330 and the magnet fixing tool 335 fix the magnet 310 by fixing the magnet unit 316 to the magnet holder 320. The multiple magnet units 316 are arranged in the circumferential direction CD together with the fixing blocks 330 and the magnet fixing tools 335.

Figure 32:
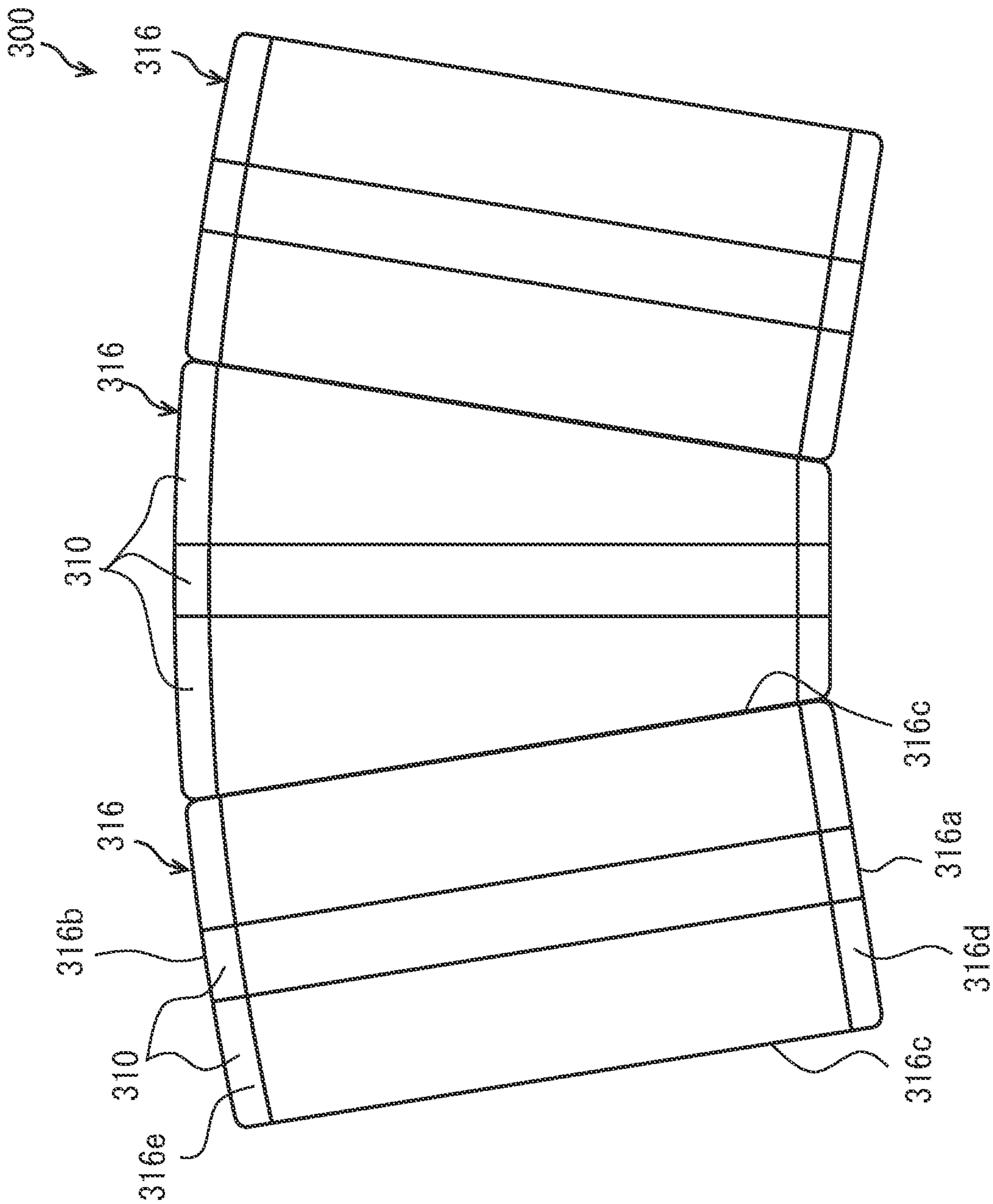
FIG. 32 is a top view of a magnet unit.

As shown in FIG. 32, the magnet unit 316 includes a unit inner peripheral end 316*a*, a unit outer peripheral end 316*b*, and a unit side surface 316*c*. The unit inner peripheral end 316*a* is an end portion of the magnet unit 316 on the radially inner side and extends in the circumferential direction CD. The unit inner peripheral end 316*a* extends, for example, linearly along a tangent line orthogonal to the radial direction RD. The unit outer peripheral end 316*b* is an end portion of the magnet unit 316 on the radially outer side and extends in the circumferential direction CD. The unit outer peripheral end 316*b* extends, for example, in a curved shape along an arc to bulge toward the radially outer side.

A pair of unit side surfaces 316*c* are arranged in the circumferential direction CD in the magnet unit 316. The pair of unit side surfaces 316*c* extend in the radial direction RD. The unit side surface 316*c* is in a state of spanning the unit inner peripheral end 316*a* and the unit outer peripheral end 316*b* in the radial direction RD.

The magnet unit 316 includes an inner peripheral tapered surface 316*d* and an outer peripheral tapered surface 316*e*. The inner peripheral tapered surface 316*d* is inclined with respect to the motor axis Cm toward the radial direction RD and extends from the unit inner peripheral end 316*a* toward the radially outer side. The outer peripheral tapered surface 316*e* is inclined with respect to the motor axis Cm toward the radial direction RD and extends from the unit outer peripheral end 316*b* toward the radially inner side.

In the magnet unit 316, the unit inner peripheral end 316*a*, the unit outer peripheral end 316*b*, the unit side surfaces 316*c*, the inner peripheral tapered surface 316*d*, and the outer peripheral tapered surface 316*e* are formed by at least one magnet 310.

As shown in FIGS. 29 and 30, the magnet unit 316 is sandwiched between the fixing block 330 and the magnet holder 320 in a state in which the inner peripheral tapered surface 316*d* is overlapped with the block tapered surface 330*a*. The fixing block 330 fixes the magnet unit 316 to the magnet holder 320 by the block tapered surface 330*a* pressing the inner peripheral tapered surface 316*d* toward the magnet holder 320 in the radial direction RD. The magnet unit 316 is sandwiched between the outer peripheral engagement portion 322 and the holder main body 321 in a state in which the outer peripheral tapered surface 316*e* is overlapped with the engagement tapered surface 322*a*. The outer peripheral engagement portion 322 and the fixing block 330 fix the magnet unit 316 to the magnet holder 320 in both the axial direction AD and the radial direction RD.

The fixing block 330 corresponds to a fixing support portion, the block tapered surface 330*a* corresponds to a support inclined surface, and the inner peripheral tapered surface 316*d* corresponds to a magnet inclined surface.

Next, a method of manufacturing the motor device 60 will be described. A process of manufacturing the motor device 60 includes a process of manufacturing the rotor 300. An operator prepares the magnet unit 316, the magnet holder 320, the fixing block 330, and the magnet fixing tool 335 as a preparation process. Then, the operator inserts the magnet unit 316 between the holder main body 321 and the outer peripheral engagement portion 322 in the magnet holder 320 from the radially inner side. Thereafter, the operator fixes the fixing block 330 to the holder main body 321 by the magnet fixing tool 335 by sandwiching the magnet unit 316 between the fixing block 330 and the holder main body 321 in a state of overlapping the magnet unit 316 with the holder main body 321. When the operator screws the magnet fixing tool 335 into the holder main body 321, the outer peripheral tapered surface 316*e* is pressed against the engagement tapered surface 322*a*, and the block tapered surface 330*a* is pressed against the inner peripheral tapered surface 316*d*.

<Configuration Group Bc>

Figure 33:
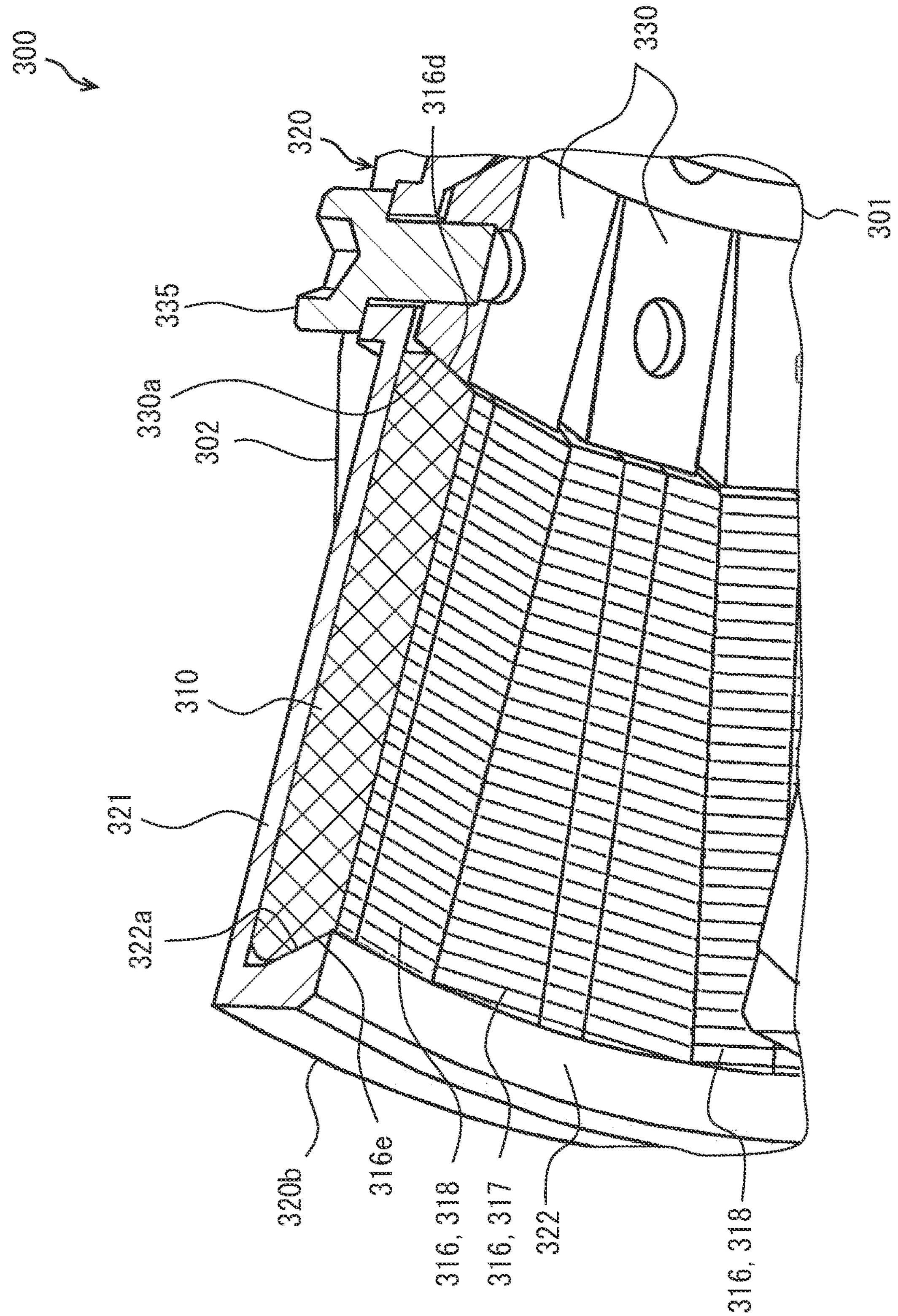
FIG. 33 is a vertical cross-sectional perspective view of a periphery of a magnet of a rotor in a configuration group Bc.
Figure 34:
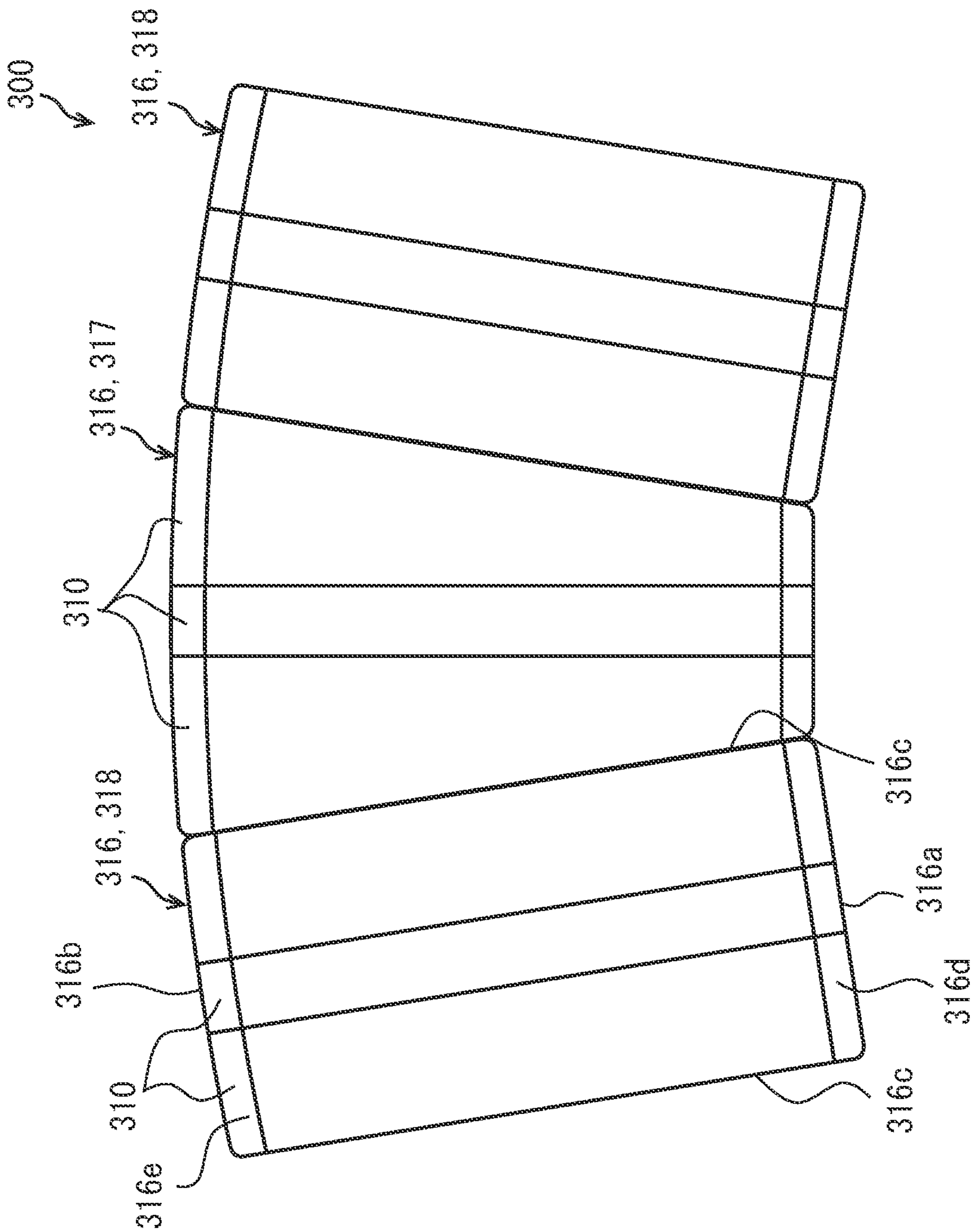
FIG. 34 is a top view of inclined magnet units and parallel magnet units.
Figure 35:
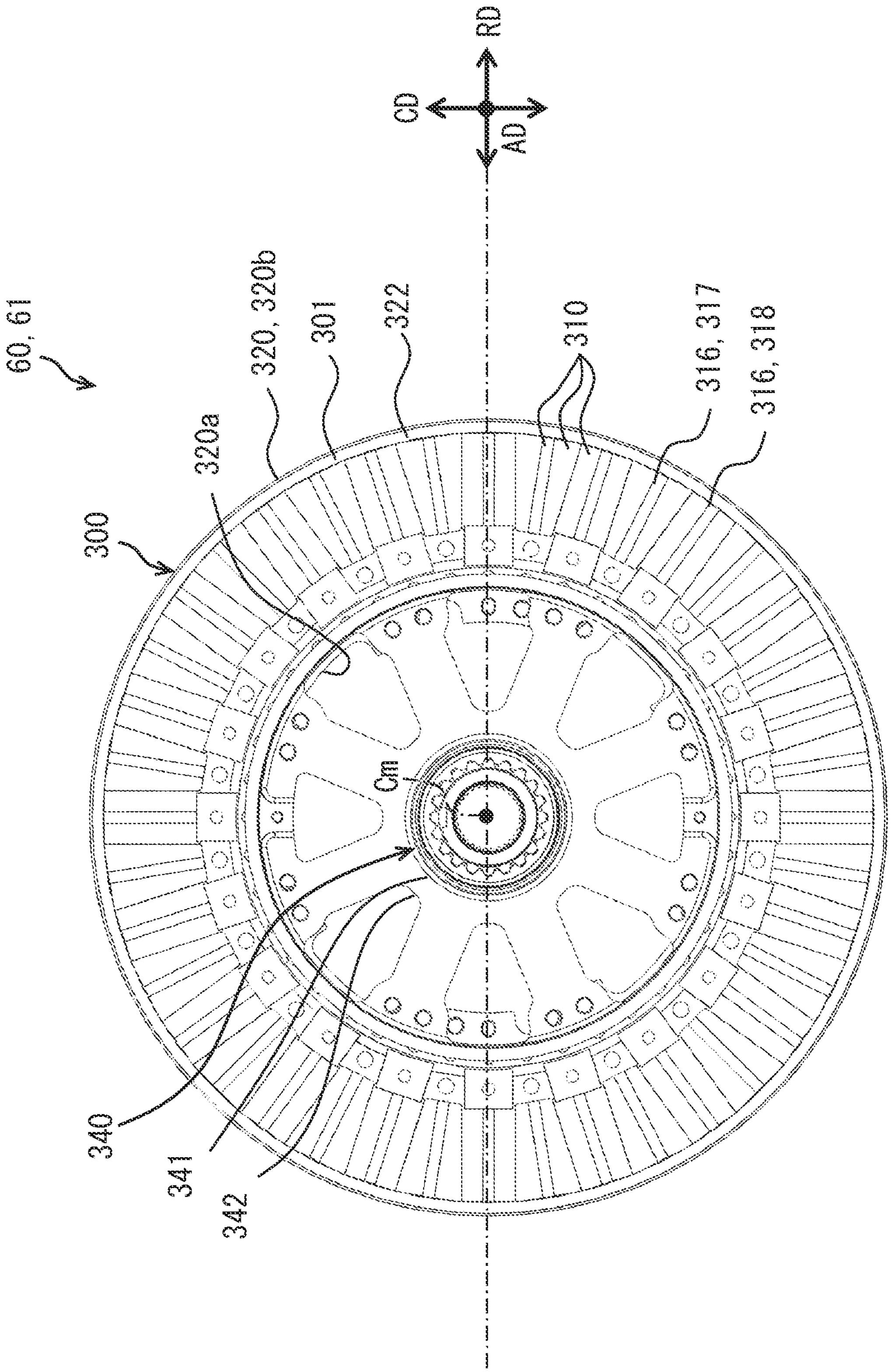
FIG. 35 is a top view of the rotor viewed from a first rotor surface side.

As shown in FIGS. 33, 34, and 35, the multiple magnet units 316 include inclined magnet units 317 and parallel magnet units 318. Multiple inclined magnet units 317 and multiple parallel magnet units 318 are arranged on the rotor 300 in the circumferential direction CD. The inclined magnet units 317 and the parallel magnet units 318 are alternately arranged one by one in the circumferential direction CD.

As shown in FIG. 34, in each of the inclined magnet units 317, the pair of unit side surfaces 316*c* are inclined away from each other toward the radially outer side. In the inclined magnet unit 317, a separation distance between the pair of unit side surfaces 316*c* gradually increases toward the radially outer side. In the inclined magnet unit 317, the unit outer peripheral end 316*b* becomes longer than the unit inner peripheral end 316*a* along the radial direction RD. The inclined magnet unit 317 is formed in a trapezoidal shape or a fan shape as a whole.

In each of the parallel magnet units 318, the pair of unit side surfaces 316*c* extend in parallel. The pair of unit side surfaces 316*c* extend in a direction orthogonal to the circumferential direction CD. In the parallel magnet unit 318, the separation distance between the pair of unit side surfaces 316*c* is uniform along the radial direction RD. In the parallel magnet unit 318, the unit outer peripheral end 316*b* and the unit inner peripheral end 316*a* have substantially the same length along the radial direction RD. The parallel magnet unit 318 is formed in a rectangular shape as a whole.

Next, a method of manufacturing the rotor 300 in the method of manufacturing the motor device 60 will be described. In the process of manufacturing the rotor 300, as described above, the operator fixes the magnet unit 316 to the magnet holder 320 by the fixing block 330 and the magnet fixing tool 335. The operator arranges the multiple magnet units 316 on the magnet holder 320 such that the inclined magnet units 317 and the parallel magnet units 318 are alternately arranged one by one in the circumferential direction CD. The operator inserts the unit outer peripheral ends 316*b* of both the inclined magnet unit 317 and the parallel magnet unit 318 between the outer peripheral engagement portion 322 and the holder main body 321. The operator sets one magnet unit 316 arranged last on the magnet holder 320 to be the parallel magnet unit 318. The operator inserts the last one parallel magnet unit 318 between two inclined magnet units 317 adjacent to each other in the circumferential direction CD and inserts the unit outer peripheral end 316*b* between the outer peripheral engagement portion 322 and the holder main body 321.

The operator may fix the magnet unit 316 to the magnet holder 320 by the fixing block 330 and the magnet fixing tool 335 every time disposing the magnet unit 316 on the magnet holder 320. The operator may fix all the magnet units 316 to the magnet holder 320 by the fixing blocks 330 and the magnet fixing tools 335 after disposing all the magnet units 316 on the magnet holder 320.

For example, a configuration different from that of the present embodiment is assumed in which all of the multiple magnet units 316 are the inclined magnet units 317. In the configuration, in a process of manufacturing the rotor 300, the operator cannot insert the last one inclined magnet unit 317 between two inclined magnet units 317 adjacent to each other in the circumferential direction CD. The reason is that a separation distance between the two inclined magnet units 317 adjacent to each other in the circumferential direction CD is smaller than a width dimension of the unit outer peripheral end 316*b* of the last inclined magnet unit 317 on a side radially inward with respect to the outer peripheral engagement portion 322.

Meanwhile, in the present embodiment, the operator can insert the parallel magnet unit 318 between the two inclined magnet units 317 adjacent to each other in the circumferential direction CD by setting the last one magnet unit 316 as the parallel magnet unit 318. The reason is that the separation distance between the two inclined magnet units 317 adjacent to each other in the circumferential direction CD is the same between a region on the radially inward with respect to the outer peripheral engagement portion 322 and a region on the inner side of the outer peripheral engagement portion 322.

<Configuration Group Bd>

Figure 36:
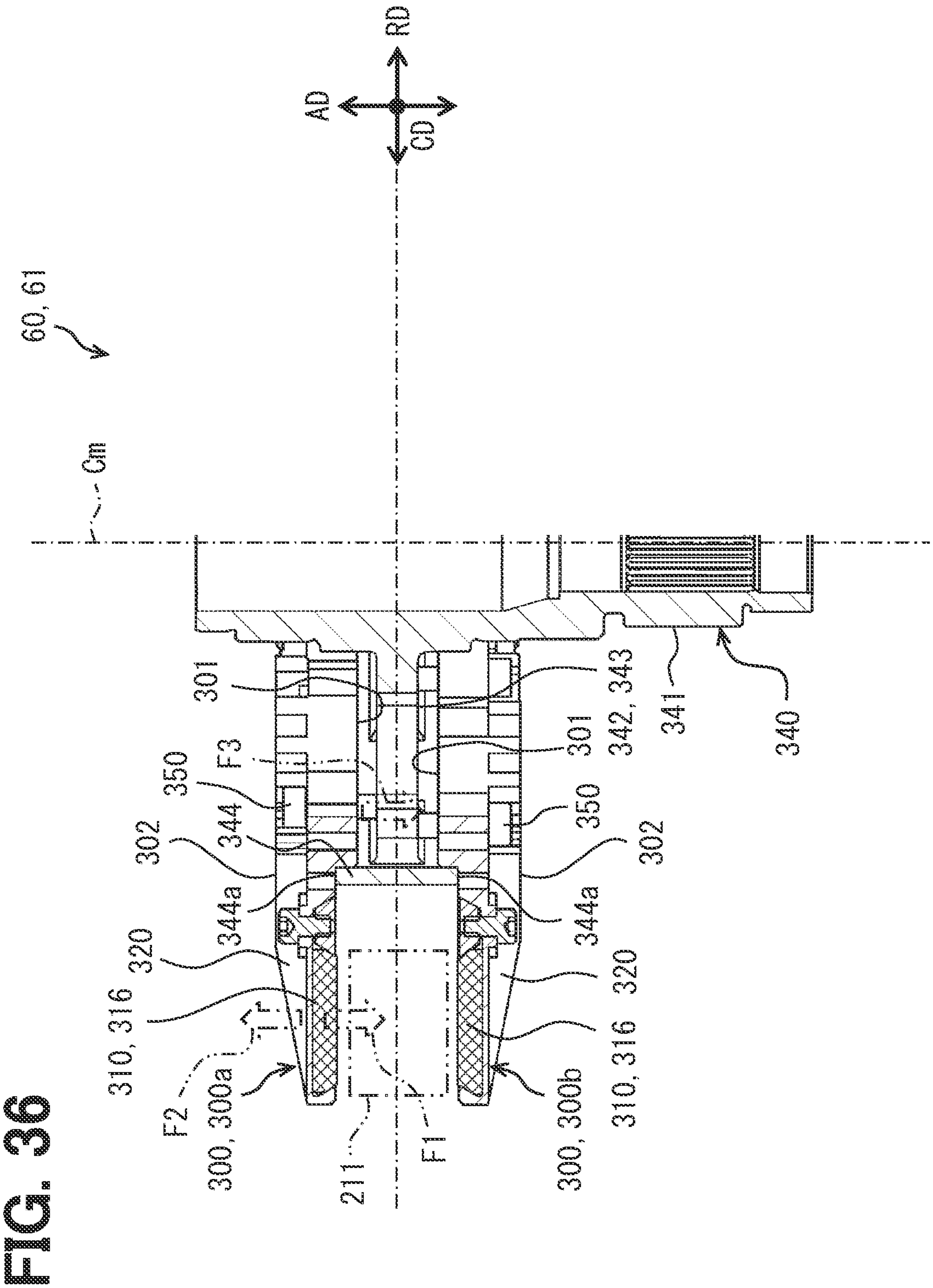
FIG. 36 is a vertical cross-sectional view of a rotor and a shaft in a configuration group Bd.
Figure 37:
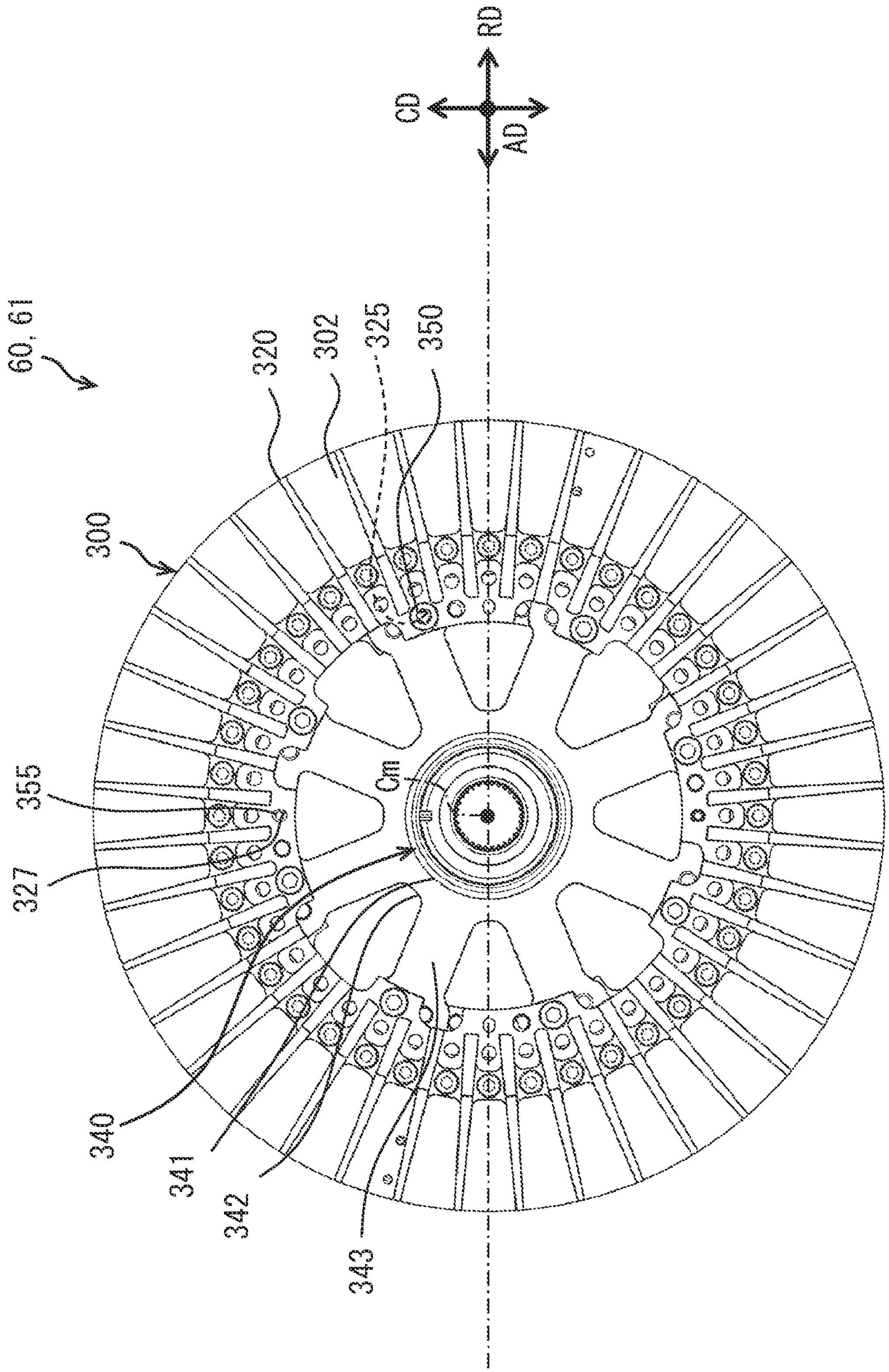
FIG. 37 is a top view of the rotor viewed from a second rotor surface side.
Figure 38:
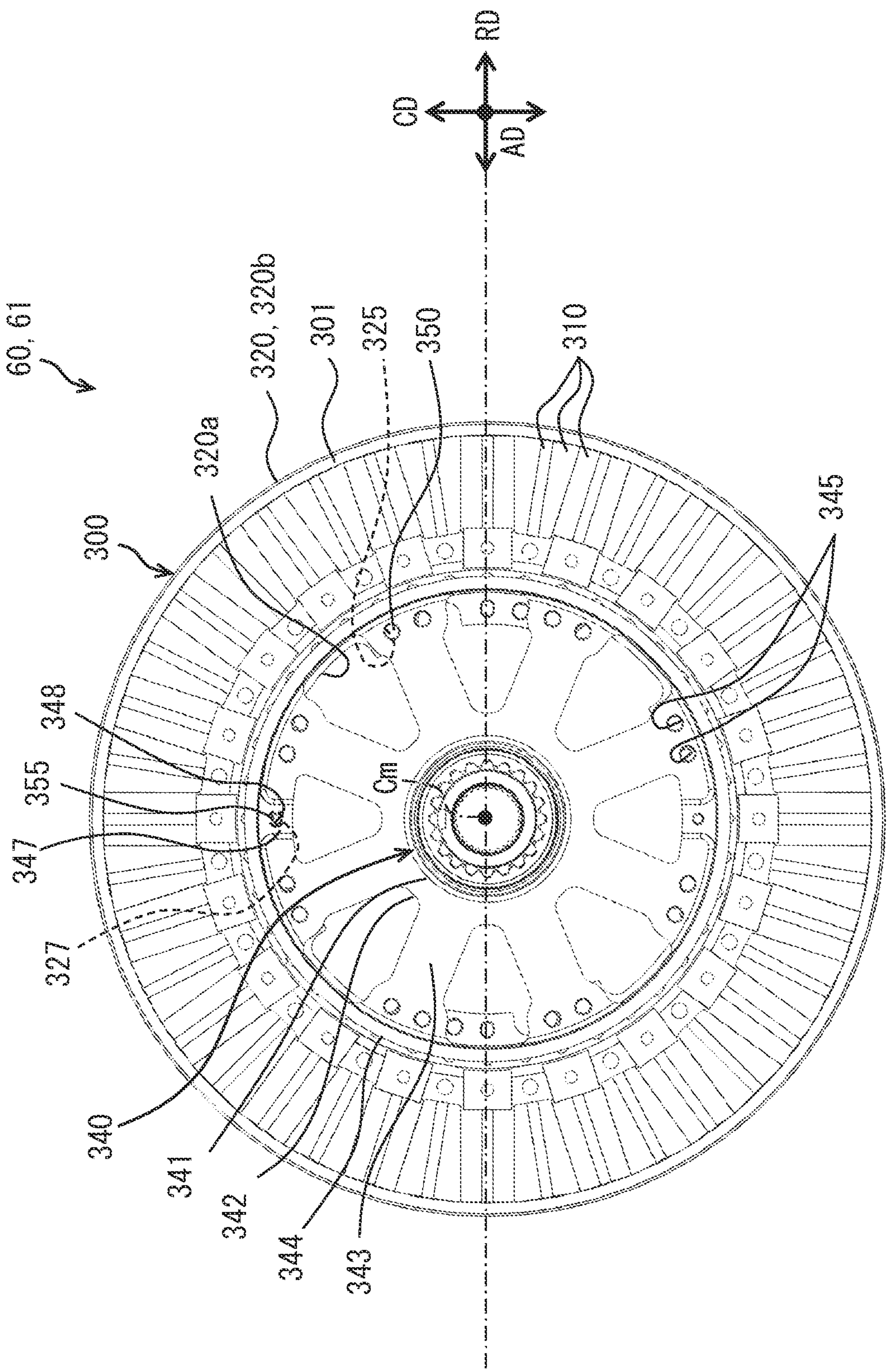
FIG. 38 is a top view of the rotor viewed from a first rotor surface side.

As shown in FIGS. 36, 37, and 38, the rotor 300 includes holder fixing tools 350. Each of the holder fixing tools 350 is a fixing tool such as a bolt, and is made of a metal material or the like. The holder fixing tool 350 fixes the magnet holder 320 to the shaft flange 342. Multiple holder fixing tools 350 are arranged in the circumferential direction CD. The holder fixing tool 350 is screwed to the shaft flange 342 in a state of penetrating the magnet holder 320 from the second rotor surface 302, for example.

Figure 39:
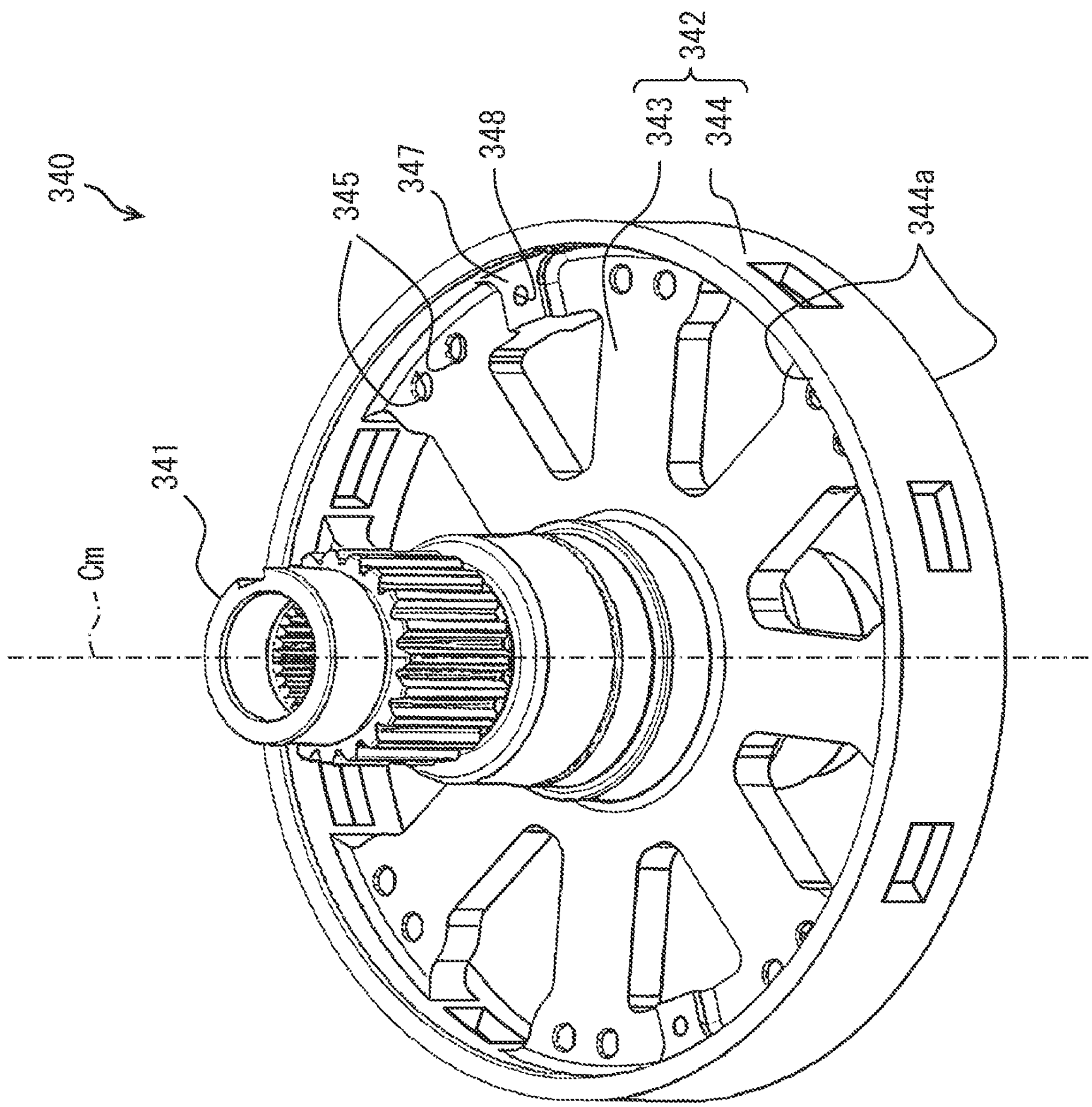
FIG. 39 is a perspective view of the shaft.

As shown in FIGS. 36, 38, and 39, the shaft flange 342 includes spokes 343 and a rim 344. Each of the spokes 343 extends from the shaft main body 341 toward the radially outer side. Multiple spokes 343 are arranged in the circumferential direction CD. The rim 344 extends in the circumferential direction CD around the motor axis Cm and is formed in an annular shape as a whole. The rim 344 is provided at a position separated from the shaft main body 341 toward the radially outer side. The rim 344 connects two spokes 343 adjacent to each other in the circumferential direction CD. The spoke 343 connects the shaft main body 341 and the rim 344 in the radial direction RD.

The rim 344 includes a pair of rim tip portions 344*a*. The rim 344 extends from the spoke 343 toward both sides in the axial direction AD. In the rim 344, the pair of rim tip portions 344*a* are arranged in the axial direction AD. The rim tip portion 344*a* is located at a position separated from the spoke 343 in the axial direction AD. In the axial direction AD, a height dimension of the rim 344 is larger than a height dimension of the spoke 343.

As shown in FIGS. 36, 37, and 38, the rotor 300 is in a state of being overlapped with the shaft flange 342 from one side in the axial direction AD. In the shaft flange 342, at least the rim tip portion 344*a* is in contact with the rotor 300. In the shaft 340, a portion on a radially outermost side among portions that are in contact with the rotor 300 is the rim tip portion 344*a*. The rim tip portion 344*a* is located at a position of the rotor 300 separated from the magnet 310 toward the radially inner side. The holder fixing tool 350 is at a position separated from the rim tip portion 344*a* toward the radially inner side. The holder fixing tool 350 is located on a side opposite to the magnet 310 with the rim tip portion 344*a* interposed therebetween in the radial direction RD.

The holder fixing tool 350 fixes the magnet holder 320 and the shaft flange 342 in a state of being inserted into a holder fixing hole 325 and a flange fixing hole 345. The holder fixing hole 325 is formed in the magnet holder 320. The holder fixing hole 325 penetrates the magnet holder 320 in the axial direction AD. Multiple holder fixing holes 325 are arranged in the circumferential direction CD. The holder fixing hole 325 is located at a position separated from the rim 344 toward the radially inner side. The flange fixing hole 345 is formed in the shaft flange 342. The flange fixing hole 345 is formed in, for example, the spoke 343. The flange fixing hole 345 penetrates the shaft flange 342 in the axial direction AD. Multiple flange fixing holes 345 are arranged in the circumferential direction CD. Each of flange fixing holes 345 is located at a position separated from the rim 344 toward the radially inner side. For example, the holder fixing tool 350 is screwed into the flange fixing hole 345 through the holder fixing hole 325.

As shown in FIG. 36, in the motor device 60, an attraction force F1 is generated to the rotor 300. The attraction force F1 is a force for attracting the magnet 310 toward the coil 211 in the axial direction AD, and is generated by a magnetic force of the magnet 310. The attraction force F1 is a force for bending a peripheral portion of the magnet 310 in the rotor 300 toward the stator 200.

In the motor device 60, a bending stress F2 against the attraction force F1 is generated in the rotor 300. The bending stress F2 is a force for bending the peripheral portion of the magnet 310 in the rotor 300 to the side opposite to the stator 200. The bending stress F2 is generated by the holder fixing tool 350 pressing the rotor 300 toward the stator 200. The holder fixing tool 350 applies a pressing force F3 to the rotor 300. The pressing force F3 is a force for pressing the rotor 300 toward the stator 200 in the axial direction AD. In the rotor 300, the bending stress F2 is generated by the rim tip portion 344*a* serving as a fulcrum for the pressing force F3. The holder fixing tool 350 corresponds to a pressing member, and the rim tip portion 344*a* corresponds to a fulcrum.

For example, a configuration different from that of the present embodiment is assumed in which the pressing force F3 is not generated by the holder fixing tool 350. In the configuration, there is a concern that the peripheral portion of the magnet 310 in the rotor 300 approaches the stator 200 in the axial direction AD, and the rotor 300 is deformed to warp toward the stator 200 with the rim tip portion 344*a* as a fulcrum. Meanwhile, in the present embodiment, deformation of the rotor 300 to warp toward the stator 200 with the rim tip portion 344*a* as the fulcrum is reduced by the pressing force F3 generated by the holder fixing tool 350.

<Configuration Group Be>

Figure 40:
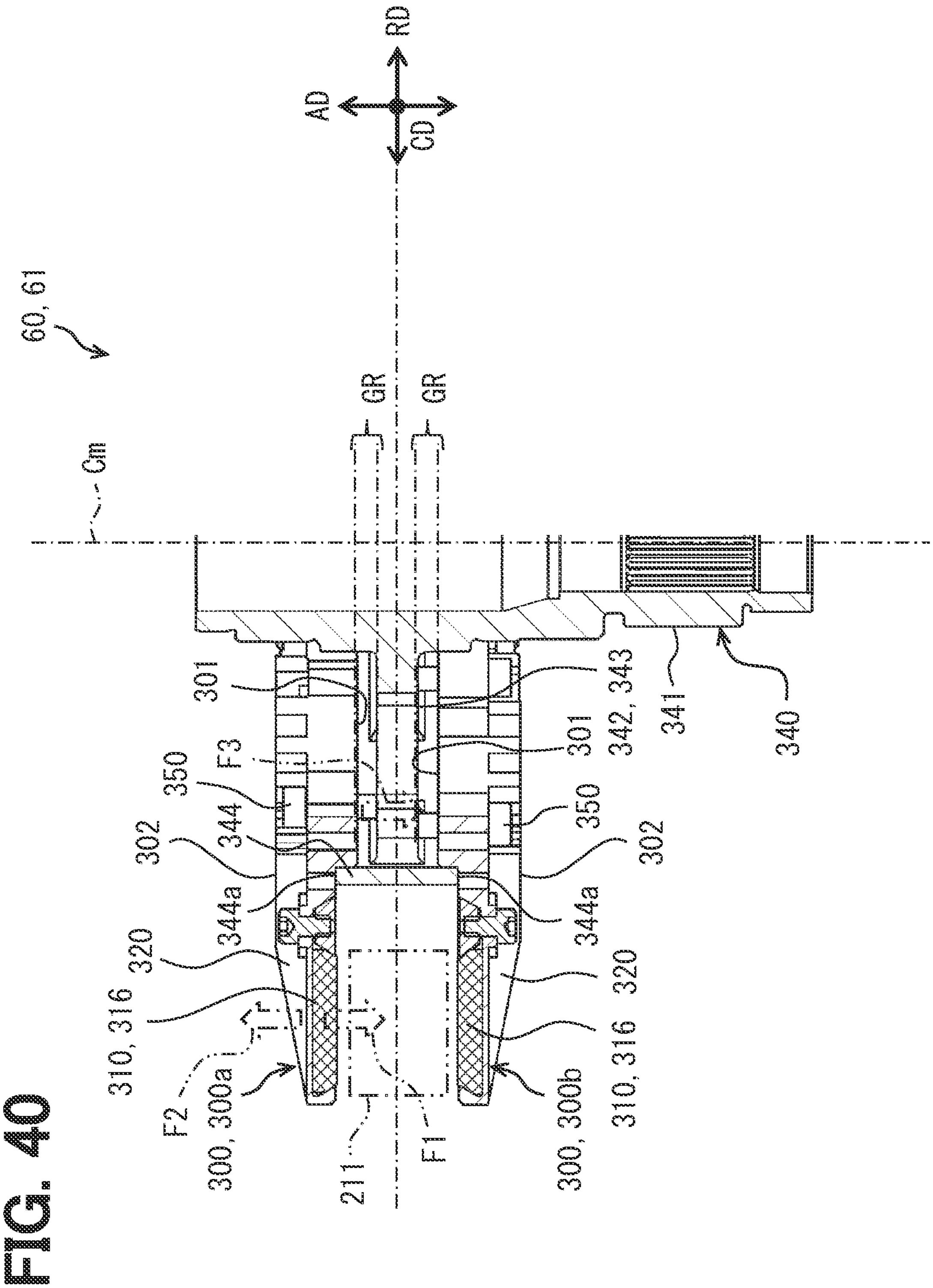
FIG. 40 is a vertical cross-sectional view of a rotor and a shaft in a configuration group Be.
Figure 41:
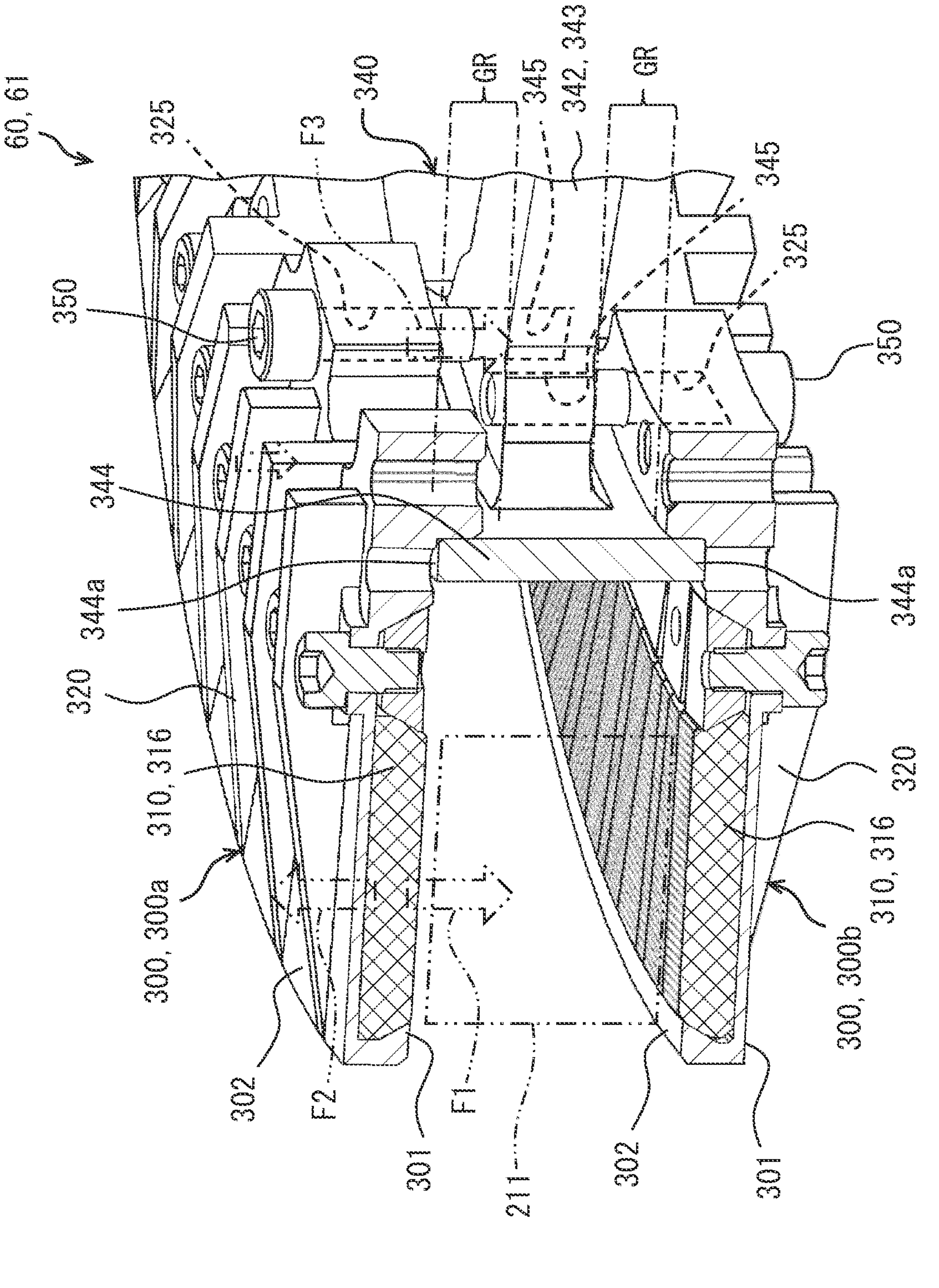
FIG. 41 is a vertical cross-sectional perspective view of a first rotor and a second rotor.

As shown in FIGS. 40 and 41, the holder fixing tool 350 is fixed to a portion of the shaft flange 342 which is radially inward with respect to the rim 344. The holder fixing tool 350 penetrates the magnet holder 320 and is screwed into the spoke 343 at a position separated from the rim 344 toward the radially inner side. A rotor gap GR is provided between the portion of the magnet holder 320 to which the holder fixing tool 350 is fixed and the portion of the spoke 343 to which the holder fixing tool 350 is fixed.

The portion of the magnet holder 320 to which the holder fixing tool 350 is fixed is the holder fixing hole 325 of the magnet holder 320 into which the holder fixing tool 350 is inserted. The portion of the spoke 343 to which the holder fixing tool 350 is fixed is the flange fixing hole 345 of the spoke 343 into which the holder fixing tool 350 is inserted. The rotor gap GR is a separation space formed between the rotor 300 and the shaft flange 342 in the axial direction AD. The rotor gap GR is formed between the magnet holder 320 and the spoke 343 in the axial direction AD. On a side radially inward with respect to the rim 344, the magnet holder 320 and the spoke 343 are separated in the axial direction AD.

The holder fixing tool 350 can increase or decrease a width dimension of the rotor gap GR in the axial direction AD. As a screwing amount of the holder fixing tool 350 into the spoke 343 increases, the portion of the magnet holder 320 to which the holder fixing tool 350 is fixed and the portion of the spoke 343 to which the magnet fixing tool 335 is fixed approach each other, and the rotor gap GR decreases. As the screwing amount of the holder fixing tool 350 increases, the pressing force F3 increases and the bending stress F2 increases. Therefore, the rotor gap GR between the shaft flange 342 and the rotor 300 is secured, and thus the bending stress F2 for resisting the attraction force F1 can be adjusted.

For example, a configuration different from that of the present embodiment is assumed in which the portion of the magnet holder 320 to which the holder fixing tool 350 is fixed and the portion of the spoke 343 to which the holder fixing tool 350 is fixed are in contact with each other. In the configuration, it is difficult to further deform the magnet holder 320 by the holder fixing tool 350, and it is difficult to further increase the pressing force F3. Therefore, for example, there is a concern that when the pressing force F3 is insufficient with respect to the attraction force F1, the shortage cannot be resolved. Meanwhile, in the present embodiment, since the portion of the magnet holder 320 to which the holder fixing tool 350 is fixed and the portion of the spoke 343 to which the holder fixing tool 350 is fixed are separated in the axial direction AD, the pressing force F3 can be further increased.

Next, a method of assembling the rotor 300 and the shaft 340 in the method of manufacturing the motor device 60 will be described. In a process of attaching the rotor 300 to the shaft 340, the operator inserts the holder fixing tool 350 into the holder fixing hole 325 and the flange fixing hole 345. When screwing the holder fixing tool 350 inserted through the holder fixing hole 325 into the flange fixing hole 345, the operator adjusts the screwing amount of the holder fixing tool 350 to such an extent that the peripheral portion of the magnet 310 in the magnet holder 320 is warped toward the second rotor surfaces 302. That is, the operator adjusts the pressing force F3 by the holder fixing tool 350.

Thereafter, in a process of attaching the stator 200 to the rotor 300 and the shaft 340, the operator confirms that the peripheral portion of the magnet 310 in the rotor 300 is not warped in the axial direction AD. When the peripheral portion of the magnet 310 in the rotor 300 is warped in the axial direction AD, the operator adjusts the screwing amount of the holder fixing tool 350 to eliminate warpage of the rotor 300. That is, the operator adjusts the pressing force F3 by the holder fixing tool 350 such that the bending stress F2 is equal to the attraction force F1.

<Configuration Group Bf>

Figure 43:
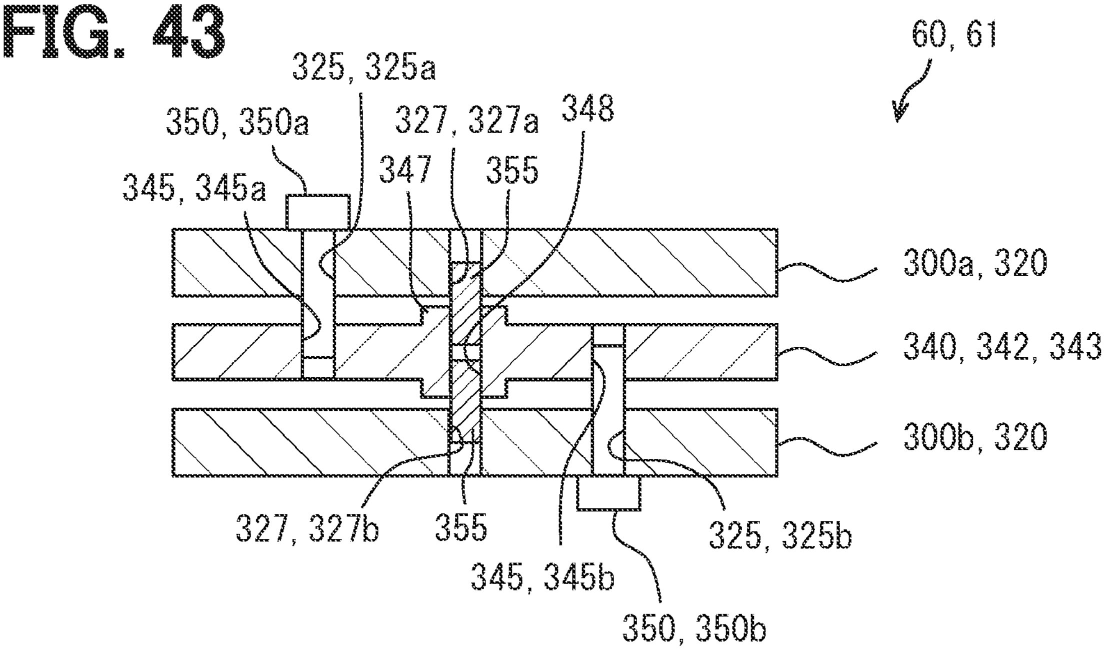
FIG. 43 is a diagram showing a positional relationship between a first holder fixing tool and a second holder fixing tool.
Figure 44:
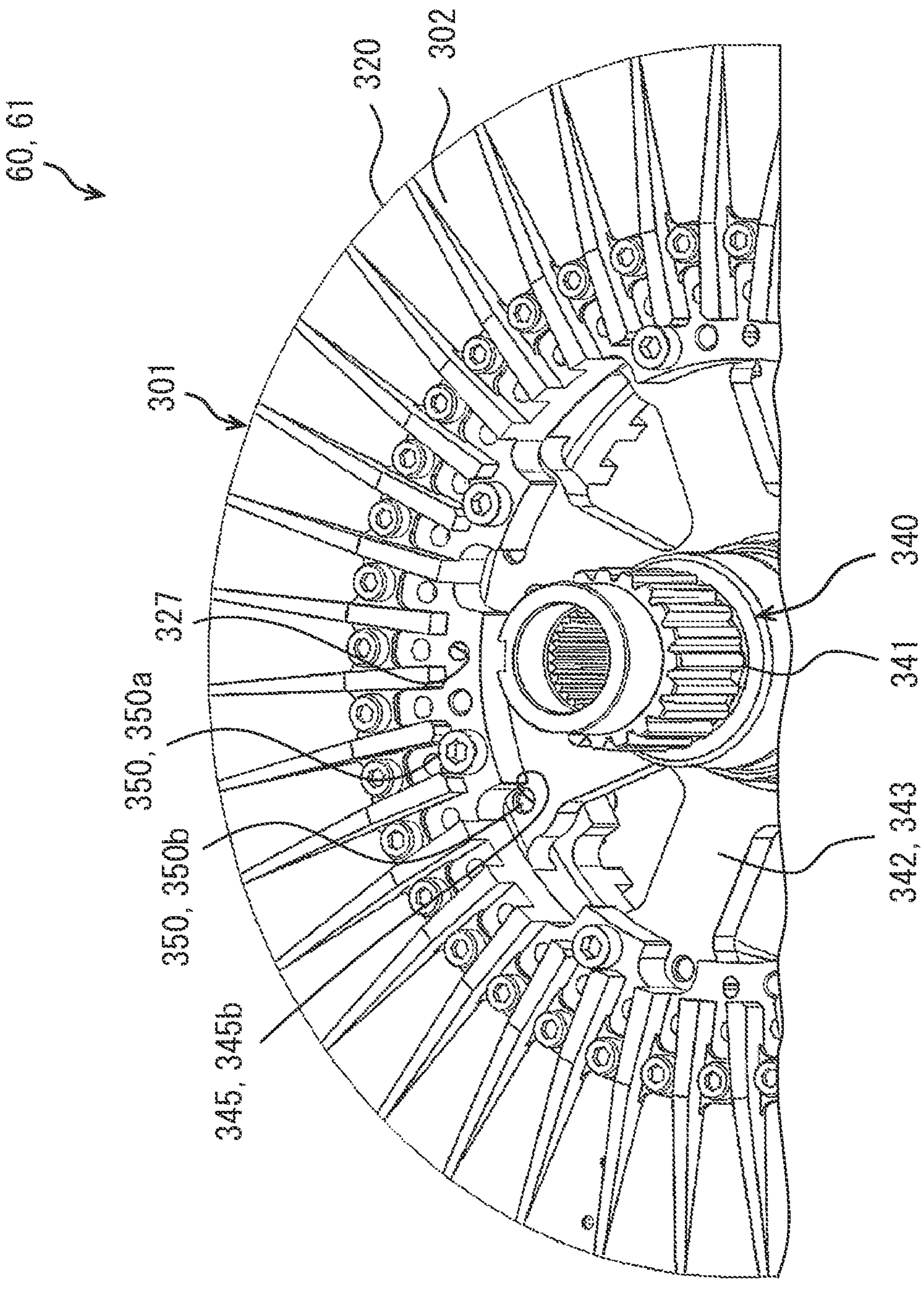
FIG. 44 is a perspective view of a motor viewed from a first rotor side.
Figure 45:
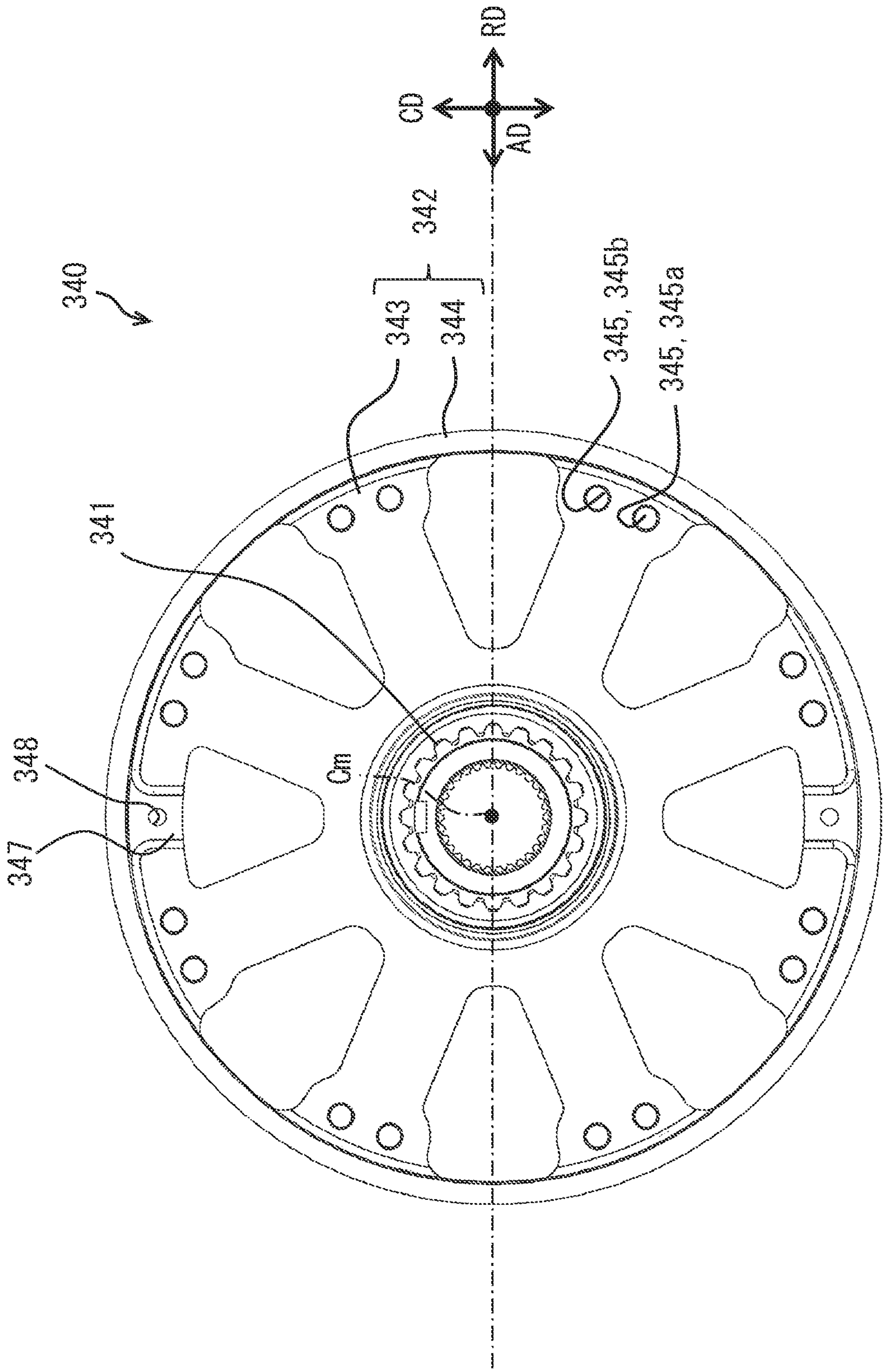
FIG. 45 is a top view of the shaft.

As shown in FIGS. 43, 44, and 45, in the shaft flange 342, the multiple flange fixing holes 345 formed in the spokes 343 include first flange fixing holes **345*a* and second flange fixing holes 345*b*. When the holder fixing hole 325 formed in the first rotor 300*a* is referred to as a first holder fixing hole 325*a*, the first holder fixing hole 325*a* and the first flange fixing hole 345*a* are aligned in the axial direction AD. When the holder fixing hole 325 formed in the second rotor 300*b* is referred to as a second holder fixing hole 325*b*, the second holder fixing hole 325*b* and the second flange fixing hole 345*b* are aligned in the axial direction AD. The first flange fixing holes 345*a* and the second flange fixing holes 345*b*** are alternately arranged in the circumferential direction CD, for example.

FIG. 43 is a schematic diagram of a longitudinal cross-section of the motor 61 in which an arrangement of the holder fixing tools 350 is developed on a plane as the first rotor **300*a*, the second rotor 300*b*, and the shaft flange 342** are viewed from the radially inner side.

Figure 42:
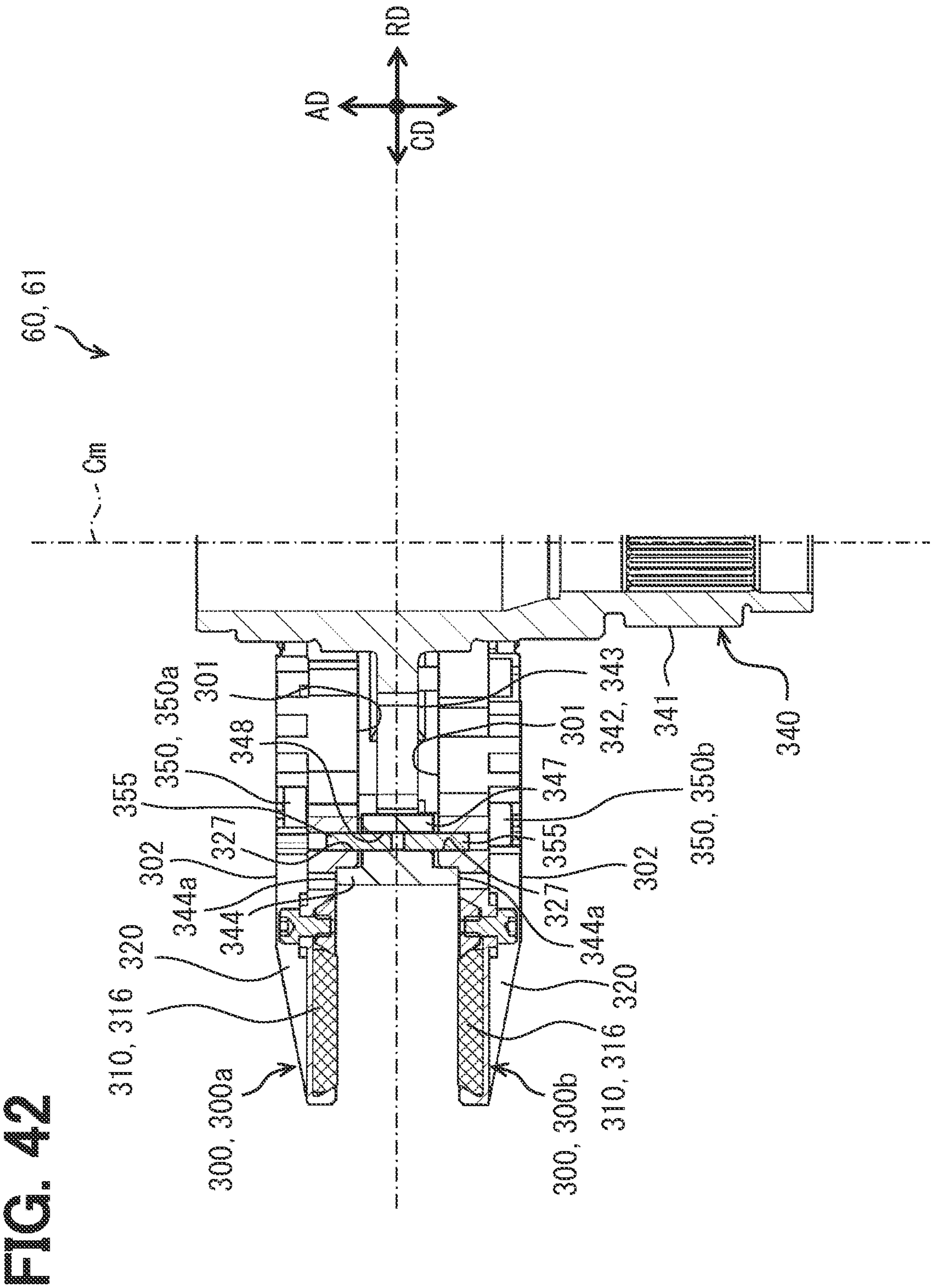
FIG. 42 is a vertical cross-sectional view of a rotor and a shaft in a configuration group Bf.

As shown in FIGS. 42, 43, and 44, the motor device 60 includes a first holder fixing tool **350*a* and a second holder fixing tool 350*b* as the holder fixing tool 350. The first holder fixing tool 350*a* fixes the first rotor 300*a* to the shaft flange 342. The first holder fixing tool 350*a* is inserted into the first holder fixing hole 325*a* and the first flange fixing hole 345*a*. The first holder fixing tool 350*a* is screwed into the first flange fixing hole 345*a* through the first holder fixing hole 325*a*, for example. The first holder fixing tool 350*a* corresponds to a first fixing tool. The first holder fixing hole 325*a* corresponds to a first rotor hole, and the first flange fixing hole 345*a*** corresponds to a first shaft hole.

The second holder fixing tool **350*b* fixes the second rotor 300*b* to the shaft flange 342. The second holder fixing tool 350*b* is inserted into the second holder fixing hole 325*b* and the second flange fixing hole 345*b*. The second holder fixing tool 350*b* is screwed into the second flange fixing hole 345*b* through the second holder fixing hole 325*b*, for example. The second holder fixing tool 350*b* corresponds to a second fixing tool. The second holder fixing hole 325*b* corresponds to a second rotor hole, and the second flange fixing hole 345*b*** corresponds to a second shaft hole.

The first holder fixing hole **325*a* and the second holder fixing hole 325*b* are provided at positions separated in the circumferential direction CD. The first flange fixing hole 345*a* and the second flange fixing hole 345*b* are located at positions separated from each other in the circumferential direction CD matching a positional relationship between the first holder fixing hole 325*a* and the second holder fixing hole 325*b***.

As shown in FIGS. 42 and 43, the motor device 60 includes positioning pins 355. The positioning pins 355 determine a relative position of the rotor 300 with respect to the shaft 340 in a direction orthogonal to the axial direction AD. The positioning pins 355 restrict positional deviation of the rotor 300 with respect to the shaft 340 in the direction orthogonal to the axial direction AD. For example, the positioning pins 355 restrict the positional deviation of the rotor 300 with respect to the shaft 340 in the circumferential direction CD.

As shown in FIGS. 42, 43, and 44, the motor device 60 has holder pin holes 327. Each of the holder pin holes 327 is formed in the rotor 300. The holder pin hole 327 is formed in the magnet holder 320. The holder pin hole 327 penetrates the magnet holder 320 in the axial direction AD. Multiple holder pin holes 327 are arranged in the circumferential direction CD. The holder pin hole 327 is located at a position separated from the rim 344 toward the radially inner side. In the magnet holder 320, the holder fixing holes 325 and the holder pin holes 327 are arranged in the circumferential direction CD.

The motor device 60 has flange pin holes 348. Each of the flange pin holes 348 is formed in the shaft 340. The flange pin hole 348 is formed in the shaft flange 342. The flange pin hole 348 is formed in, for example, the spoke 343. The flange pin hole 348 penetrates the shaft flange 342 in the axial direction AD. Multiple flange pin holes 348 are arranged in the circumferential direction CD. The flange pin hole 348 is located at a position separated from the rim 344 toward the radially inner side. In the shaft 340, the flange fixing holes 345 and the flange pin holes 348 are arranged in the circumferential direction CD.

The holder pin hole 327 and the flange pin hole 348 are aligned in the axial direction AD. The positioning pin 355 is inserted into the holder pin hole 327 and the flange pin hole 348 in a state of spanning the holder pin hole 327 and the flange pin hole 348 in the axial direction AD. The positioning pin 355 is fitted into the holder pin hole 327 and the flange pin hole 348. For example, the positioning pin 355 is press-fitted into the flange pin hole 348 and is clearance-fitted to the holder pin hole 327. The positioning pin 355 is configured such that no rattling is generated in the holder pin hole 327 and the flange pin hole 348. The positioning pin 355 does not move relative to the holder pin hole 327 and the flange pin hole 348 in the direction orthogonal to the axial direction AD. For example, the positioning pin 355 does not move in the circumferential direction CD relative to the holder pin hole 327 and the flange pin hole 348.

The holder fixing tool 350 is likely to generate rattling with respect to the holder fixing hole 325 and the flange fixing hole 345. For example, it is conceivable that the holder fixing hole 325 moves in the circumferential direction CD relative to the holder fixing hole 325 and the flange fixing hole 345. In this case, there is a concern that the rotor 300 and the shaft 340 are relatively deviated in the circumferential direction CD. Meanwhile, since no rattling is generated between the positioning pin 355 and the holder pin hole 327 and the flange pin hole 348, the positional deviation between the rotor 300 and the shaft 340 is prevented by the positioning pin 355. The positioning pin 355, the holder pin hole 327, and the flange pin hole 348 are also shown in FIGS. 37, 38, and 39.

The holder pin hole 327 formed in the first rotor 300*a* is referred to as a first holder pin hole 327*a*, and the holder pin hole 327 formed in the second rotor 300*b* is referred to as a second holder pin hole 327*b*. Multiple positioning pins 355 are provided in the motor device 60. The multiple positioning pins 355 include a positioning pin 355 that positions the first rotor 300*a* and the shaft 340. The positioning pin 355 is fitted into the first holder pin hole 327*a*. The multiple positioning pins 355 include a positioning pin 355 that positions the second rotor 300*b* and the shaft 340. The positioning pin 355 is fitted into the second holder pin hole 327*b*.

The first holder pin hole 327*a* and the second holder pin hole 327*b* are arranged in the axial direction AD with the flange pin hole 348 interposed therebetween. That is, the first holder pin hole 327*a* and the second holder pin hole 327*b* are not separated from each other in the circumferential direction CD. The positioning pin 355 fitted into the first holder pin hole 327*a* and the positioning pin 355 fitted into the second holder pin hole 327*b* are arranged in the axial direction AD. Therefore, in the first rotor 300*a* and the second rotor 300*b*, a difference in balance such as rotational balance is less likely to occur due to the positioning pin 355.

For example, a configuration different from that of the present embodiment is assumed in which the first holder pin hole 327*a* and the second holder pin hole 327*b* are deviated in position in the circumferential direction CD. In the configuration, there is a concern that a difference in balance occurs between the first rotor 300*a* and the second rotor 300*b* due to the positional deviation of the positioning pin 355 in the circumferential direction CD.

The shaft flange 342 includes a flange thick portion 347. The flange thick portion 347 is a portion of the shaft flange 342 that is thicker than other portions of the shaft flange 342. The flange thick portion 347 is in a state of protruding from the spoke 343 on each of one side and the other side in the axial direction AD.

The flange pin hole 348 is formed in the flange thick portion 347 of the shaft flange 342. The flange pin hole 348 penetrates the flange thick portion 347 in the axial direction AD. In the motor device 60, the flange pin hole 348 is located in the flange thick portion 347, and thus the flange pin hole 348 and the holder pin hole 327 are disposed as close as possible in the axial direction AD. A portion of the positioning pin 355 between the flange pin hole 348 and the holder pin hole 327 in the axial direction AD is as short as possible. Therefore, the portion of the positioning pin 355 between the flange pin hole 348 and the holder pin hole 327 is less likely to be deformed, and the rotor 300 is less likely to be deviated relative to the shaft 340 in the circumferential direction CD.

Since the flange pin hole 348 is formed in the flange thick portion 347, a portion of the positioning pin 355 fitted in the flange pin hole 348 is as long as possible in the axial direction AD. Therefore, the positioning pin 355 stands up easily with respect to the flange pin hole 348 with high positional accuracy. Since the shaft flange 342 includes the flange thick portion 347, a thickness of the shaft flange 342 is locally increased. Therefore, for example, unlike a configuration in which the thickness of the entire shaft flange 342 is large, rattling between the positioning pin 355 and the flange pin hole 348 is less likely to occur while reducing the weight of the shaft flange 342.

In the motor device 60, the first rotor 300*a* and the second rotor 300*b* have a point-symmetrical relation. Therefore, one of two members used as the rotor 300 can be defined as the first rotor 300*a*, and the other can be defined as the second rotor 300*b* when being disposed to be point-symmetrical with respect to the first rotor 300*a*. In this way, by making the member used as the first rotor 300*a* and the member used as the second rotor 300*b* common, it is possible to reduce a cost for manufacturing the first rotor 300*a* and the second rotor 300*b*.

<Configuration Group Ca>

Figure 46:
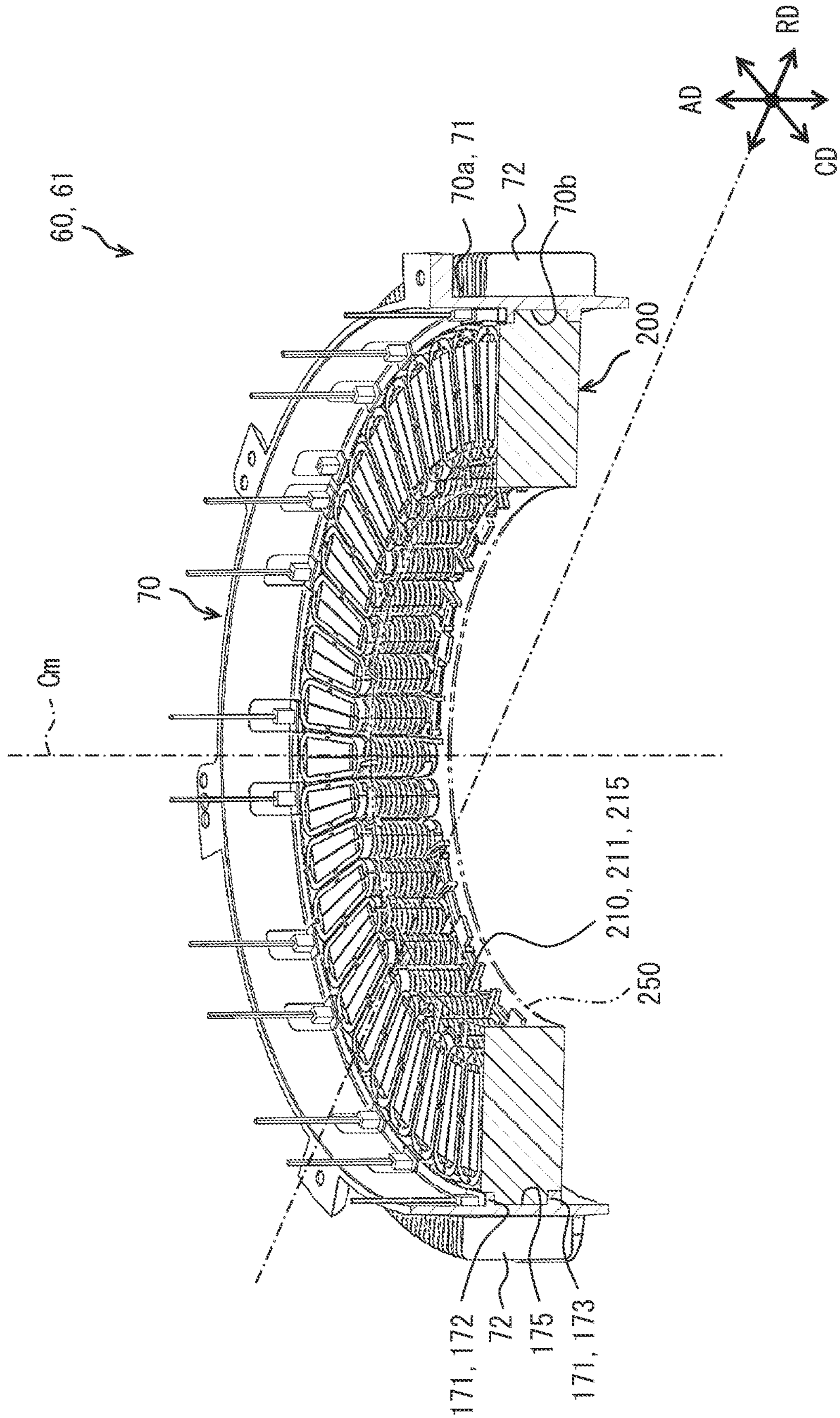
FIG. 46 is a vertical cross-sectional perspective view of a motor housing and a coil protection portion in a configuration group Ca.
Figure 47:
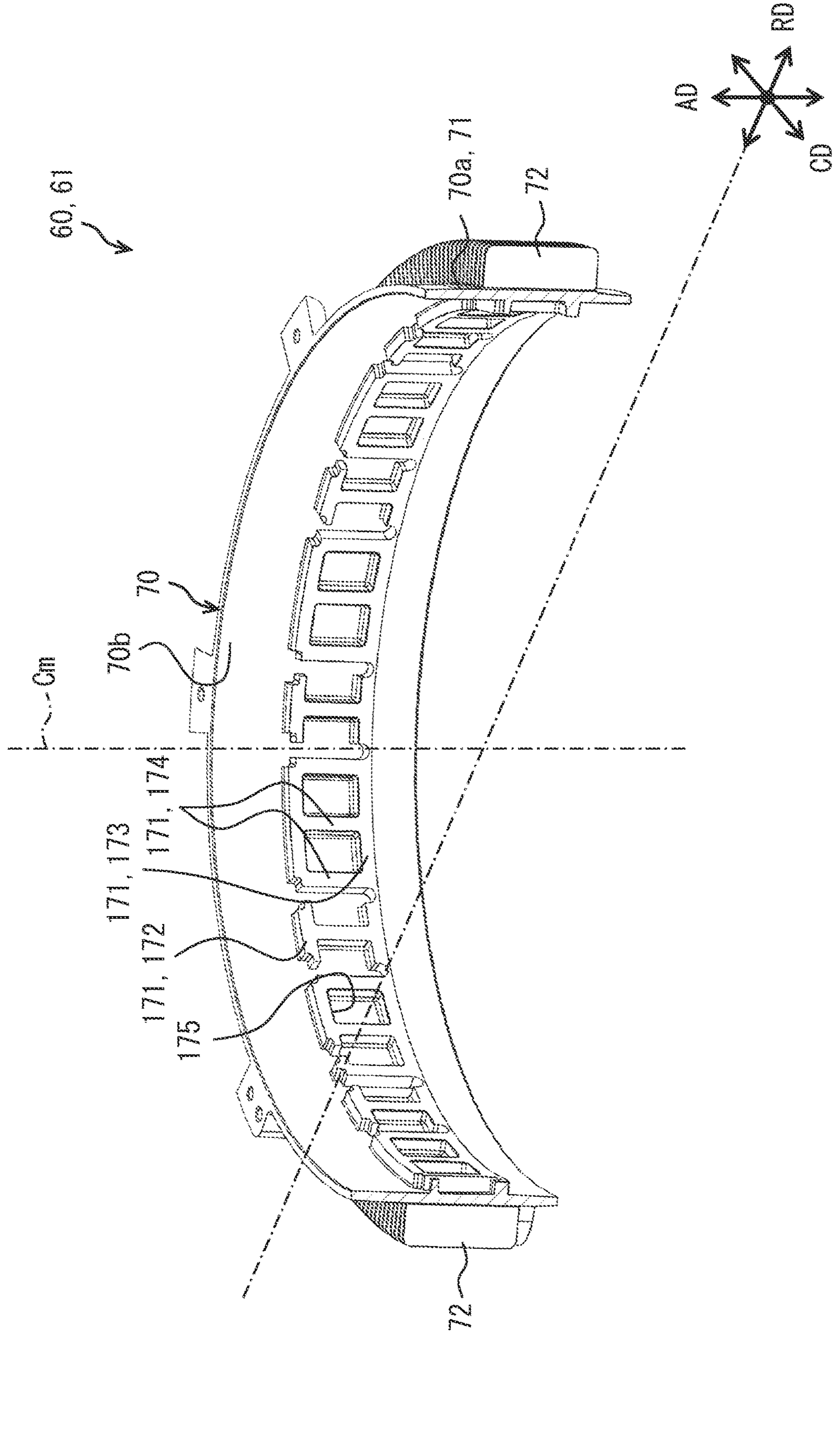
FIG. 47 is a vertical cross-sectional perspective view of the motor housing.

As shown in FIGS. 46 and 47, the motor housing 70 has an inner peripheral surface 70*b*. The inner peripheral surface 70*b* is included in an inner surface of the motor housing 70, and extends in an annular shape in the circumferential direction CD as a whole.

The motor housing 70 includes stator holding portions 171. Each of the stator holding portions 171 is a projection portion provided on the inner peripheral surface 70*b*. The stator holding portion 171 protrudes from the housing main body 71 toward the radially inner side. Multiple stator holding portions 171 are arranged in at least one of the circumferential direction CD and the axial direction AD. The stator holding portion 171 forms the inner peripheral surface 70*b* together with the housing main body 71.

The multiple stator holding portions 171 include first peripheral holding portions 172, second peripheral holding portions 173, and axial holding portions 174. Each of the first peripheral holding portions 172 and each of the second peripheral holding portions 173 extend along the housing main body 71 in the circumferential direction CD. The first peripheral holding portion 172 and the second peripheral holding portion 173 are arranged in the axial direction AD and are provided parallel to each other. The first peripheral holding portion 172 is provided closer to the rear frame 370 than the second peripheral holding portion 173 is in the axial direction AD. The first peripheral holding portion 172 is located at a position separated from an end portion of the motor housing 70, which is on a rear frame 370 side, toward the second peripheral holding portion 173. The second peripheral holding portion 173 is located at a position separated from an end portion of the motor housing 70, which is on a side opposite to the inverter device 80, toward the first peripheral holding portion 172.

The axial holding portion 174 extends along the housing main body 71 in the axial direction AD. Multiple axial holding portions 174 are arranged in the circumferential direction CD. The axial holding portion 174 is in a state of spanning the first peripheral holding portion 172 and the second peripheral holding portion 173 in the axial direction AD. The axial holding portion 174 connects the first peripheral holding portion 172 and the second peripheral holding portion 173.

The motor housing 70 includes holding recess portions 175. Each of the holding recess portions 175 is formed by the first peripheral holding portion 172, the second peripheral holding portion 173, and the axial holding portion 174. The holding recess portion 175 is formed between the first peripheral holding portion 172 and the second peripheral holding portion 173 in the axial direction AD and between two adjacent axial holding portions 174 in the circumferential direction CD. The holding recess portion 175 is a recess portion recessed toward the radially outer side with respect to the first peripheral holding portion 172, the second peripheral holding portion 173, and the axial holding portion 174. Multiple holding recess portions 175 are arranged in the circumferential direction CD together with the axial holding portions 174.

Figure 48:
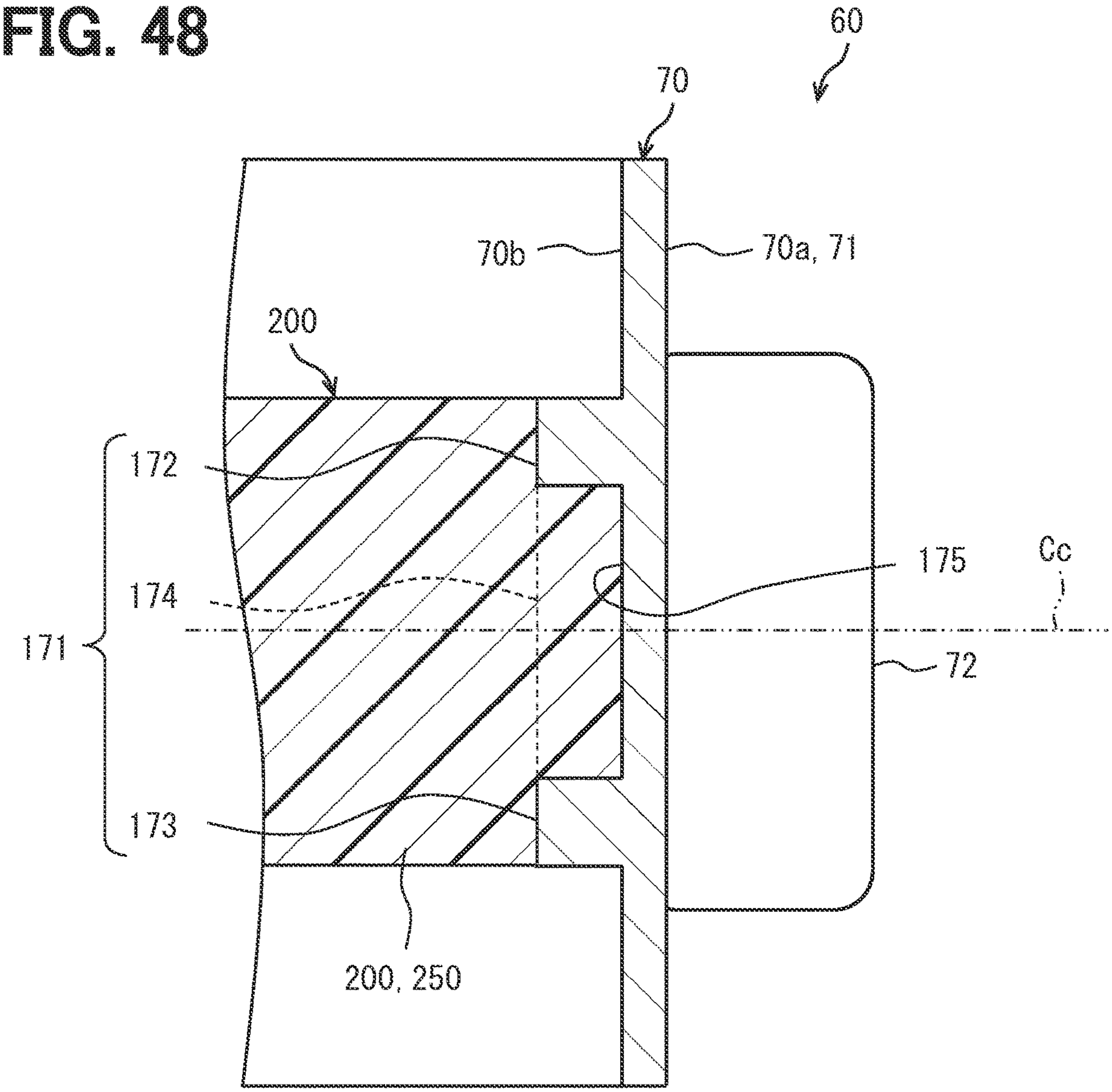
FIG. 48 is a schematic vertical cross-sectional view of the motor housing and the coil protection portion.
Figure 49:
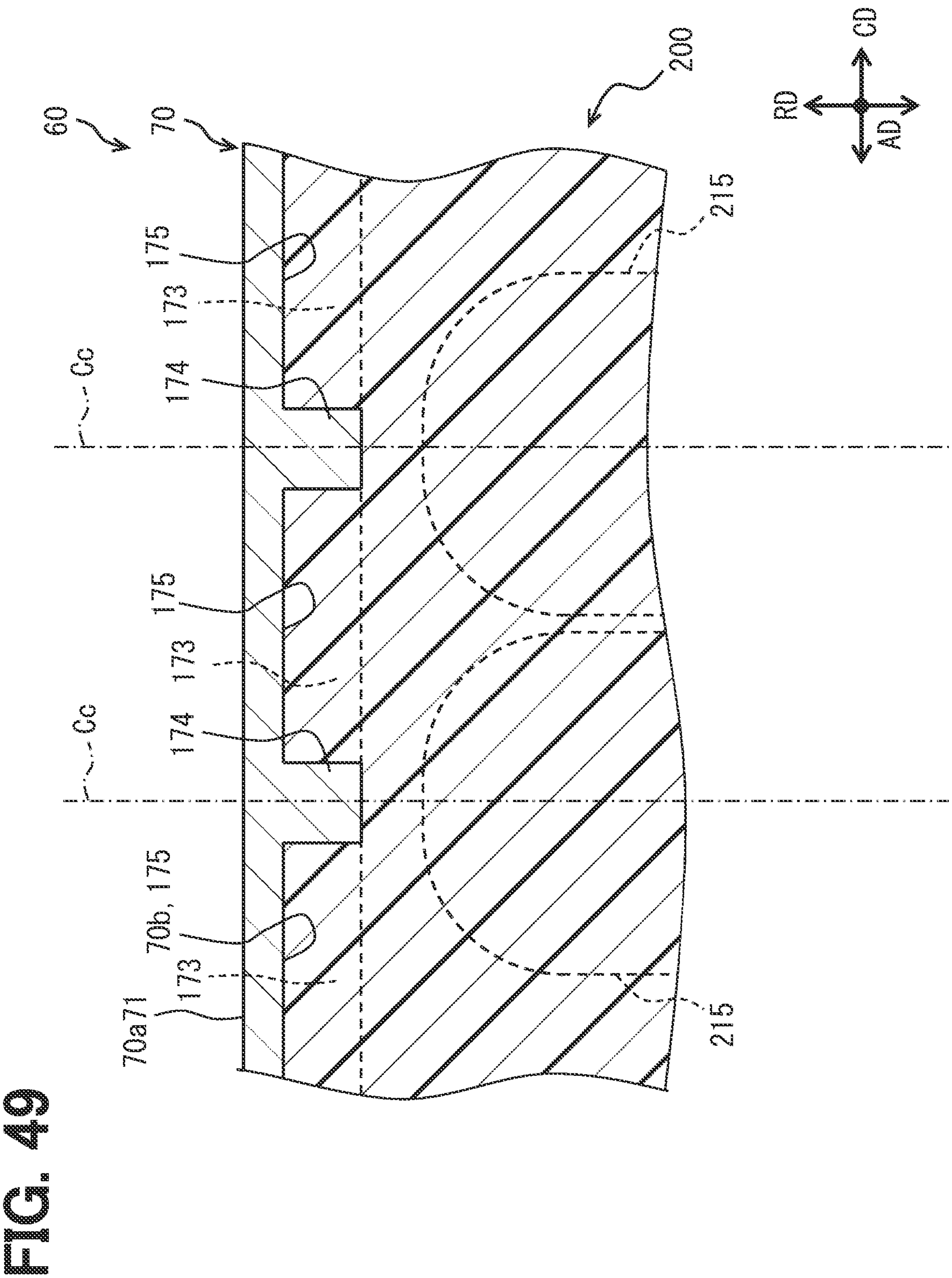
FIG. 49 is a schematic horizontal cross-sectional view of the motor housing and the coil protection portion.

As shown in FIGS. 48 and 49, inside the motor housing 70, the coil protection portion 250 is overlapped with the inner peripheral surface 70*b*. The coil protection portion 250 is in close contact with the inner peripheral surface 70*b*. The coil protection portion 250 is in a state of entering between the first peripheral holding portion 172 and the second peripheral holding portion 173 in the axial direction AD. The coil protection portion 250 is in a state of entering between two adjacent axial holding portions 174 in the circumferential direction CD. The coil protection portion 250 is in a state of entering the inside of the holding recess portion 175, and is overlapped with an inner surface of the holding recess portion 175.

The coil protection portion 250 is in a state of spanning the first peripheral holding portion 172 and the second peripheral holding portion 173 in the axial direction AD. For example, the coil protection portion 250 is overlapped with tip end surfaces of the first peripheral holding portion 172 and the second peripheral holding portion 173. The coil protection portion 250 may protrude outward from the first peripheral holding portion 172 and the second peripheral holding portion 173 in the axial direction AD.

As shown in FIG. 49, the multiple axial holding portions 174 are arranged matching the positions of the coil portions 215 in the circumferential direction CD. The number of the axial holding portions 174 arranged in the circumferential direction CD is the same as the number of the coil portions 215 arranged in the circumferential direction CD. The axial holding portion 174 and the coil portion 215 are aligned in the axial direction AD and face each other in the axial direction AD. The coil portion 215 is provided at a position in which a coil axis Cc passes through the axial holding portion 174. The coil axis Cc is a linear virtual line extending in the radial direction RD through a center of the coil portion 215. For example, the coil portion 215 is disposed at a position in which the coil axis Cc passes through a center of the axial holding portion 174 in the circumferential direction CD. The coil portion 215 is disposed at a position in which the coil axis Cc passes through a center of the axial holding portion 174 in the axial direction AD.

FIG. 49 is a horizontal cross-sectional view of the motor housing 70 and the stator 200 which are developed such that the outer peripheral surface 70*a* extends linearly. The motor housing 70 corresponds to an electric machine housing, and the axial holding portion 174 corresponds to an axial projection portion.

The coil protection portion 250 preferably has a high thermal conduction property and a high electrical insulation property. However, if it is difficult to increase both the thermal conduction property and the electrical insulation property in the coil protection portion 250, it is preferable to increase the thermal conduction property in preference to the electrical insulation property. For example, the thermal conduction property of the coil protection portion 250 is higher than the thermal conduction property of the bobbin 240. Specifically, the thermal conductivity of the coil protection portion 250 is higher than the thermal conductivity of the bobbin 240. On the other hand, the electrical insulation property of the coil protection portion 250 is lower than the electrical insulation property of the bobbin 240. Specifically, a dielectric constant of the coil protection portion 250 is higher than a dielectric constant of the bobbin 240.

Next, a method of manufacturing the stator 200 in the method of manufacturing the motor device 60 will be described. In a process of manufacturing the stator 200, the operator prepares the coil unit 210 and the motor housing 70 as a preparation process. Then, the operator installs the coil unit 210 inside the motor housing 70, and attaches the motor housing 70 together with the coil units 210 to a mold for molding. The operator molds the coil protection portion 250 inside the motor housing 70 by injection molding. In this way, in the motor device 60 in which the coil unit 210 and the motor housing 70 are integrated with the coil protection portion 250 by insert molding, the coil protection portion 250 is in close contact with both the coil portion 215 and the inner peripheral surface 70*b*.

<Configuration Group Cb>

Figure 50:
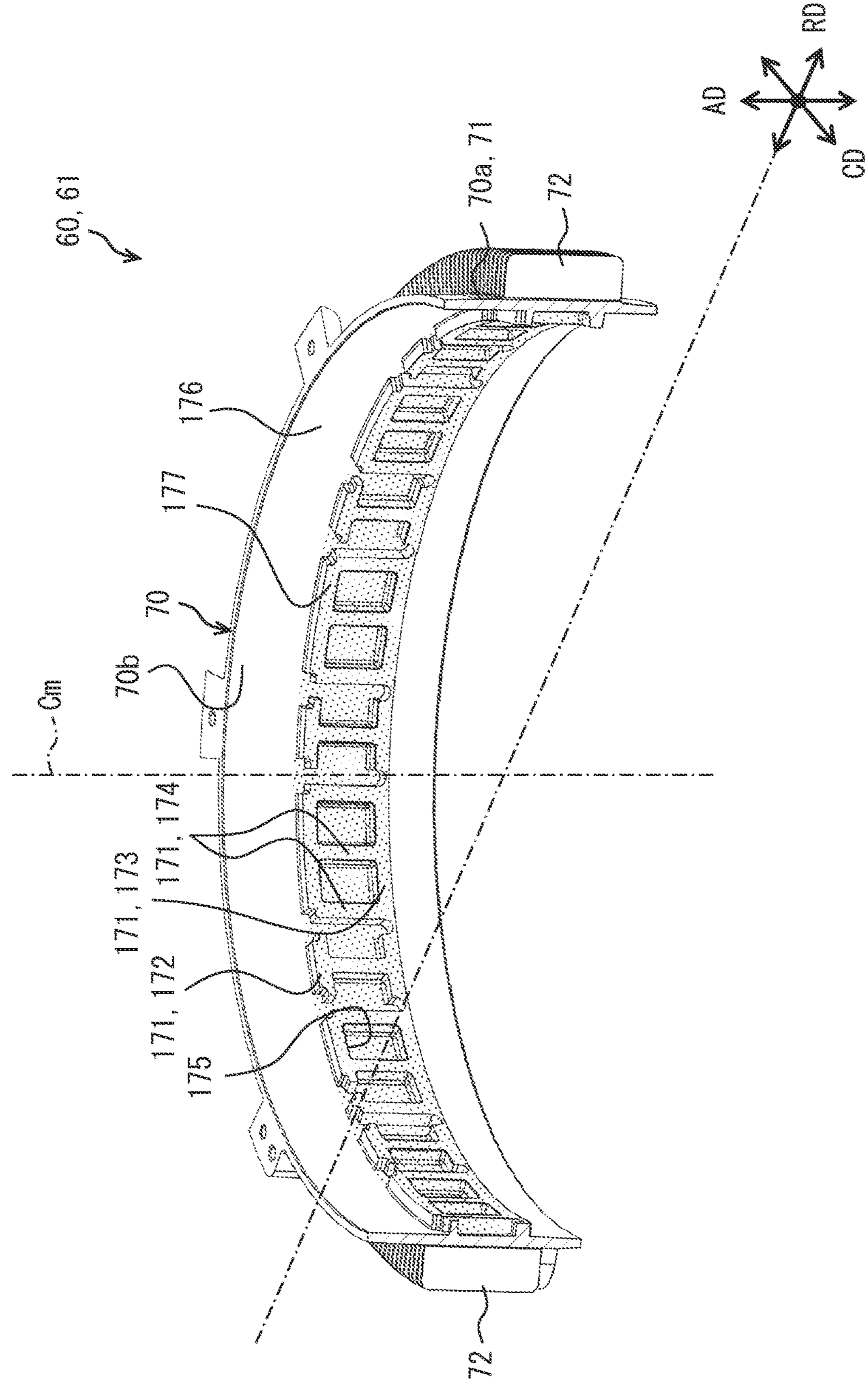
FIG. 50 is a vertical cross-sectional perspective view of a motor housing in a configuration group Cb.

As shown in FIG. 50, in the motor housing 70, the inner peripheral surface 70*b* includes a housing base surface 176 and a housing rough surface 177. The housing rough surface 177 is a surface rougher than the housing base surface 176. The housing rough surface 177 is provided with, for example, many minute irregularities, thus being a rough surface. The housing rough surface 177 is formed by performing surface roughening, which is used for forming a rough surface, on the motor housing 70. Examples of the surface roughening for forming the housing rough surface 177 include mechanical processing and scientific processing.

The housing base surface 176 is provided outward with respect to the stator holding portion 171 in the axial direction AD. For example, the housing base surface 176 is provided outward with respect to the first peripheral holding portion 172 and the second peripheral holding portion 173 in the axial direction AD. The housing base surface 176 is formed along the inner peripheral surface 70*b* in an annular shape.

The housing rough surface 177 includes an outer surface of the stator holding portion 171 and is provided on an inner side of the housing base surface 176 in the axial direction AD. The housing rough surface 177 is provided at least on the inner surface of the holding recess portion 175. The housing rough surface 177 is provided on the outer surface of the stator holding portion 171. For example, the housing rough surface 177 is provided on outer surfaces of the first peripheral holding portion 172, the second peripheral holding portion 173, and the axial holding portion 174. In FIG. 50, the housing rough surface 177 is indicated by dot hatching.

On the inner peripheral surface 70*b*, at least a portion with which the coil protection portion 250 is overlapped is the housing rough surface 177. The housing rough surface 177 is a surface with which the coil protection portion 250 is more easily to be in close contact than the housing base surface 176. The housing rough surface 177 tends to have a larger surface area than the housing base surface 176. Therefore, a contact area between the housing rough surface 177 and the coil protection portion 250 tends to be large.

<Configuration Group Cc>

Figure 51:
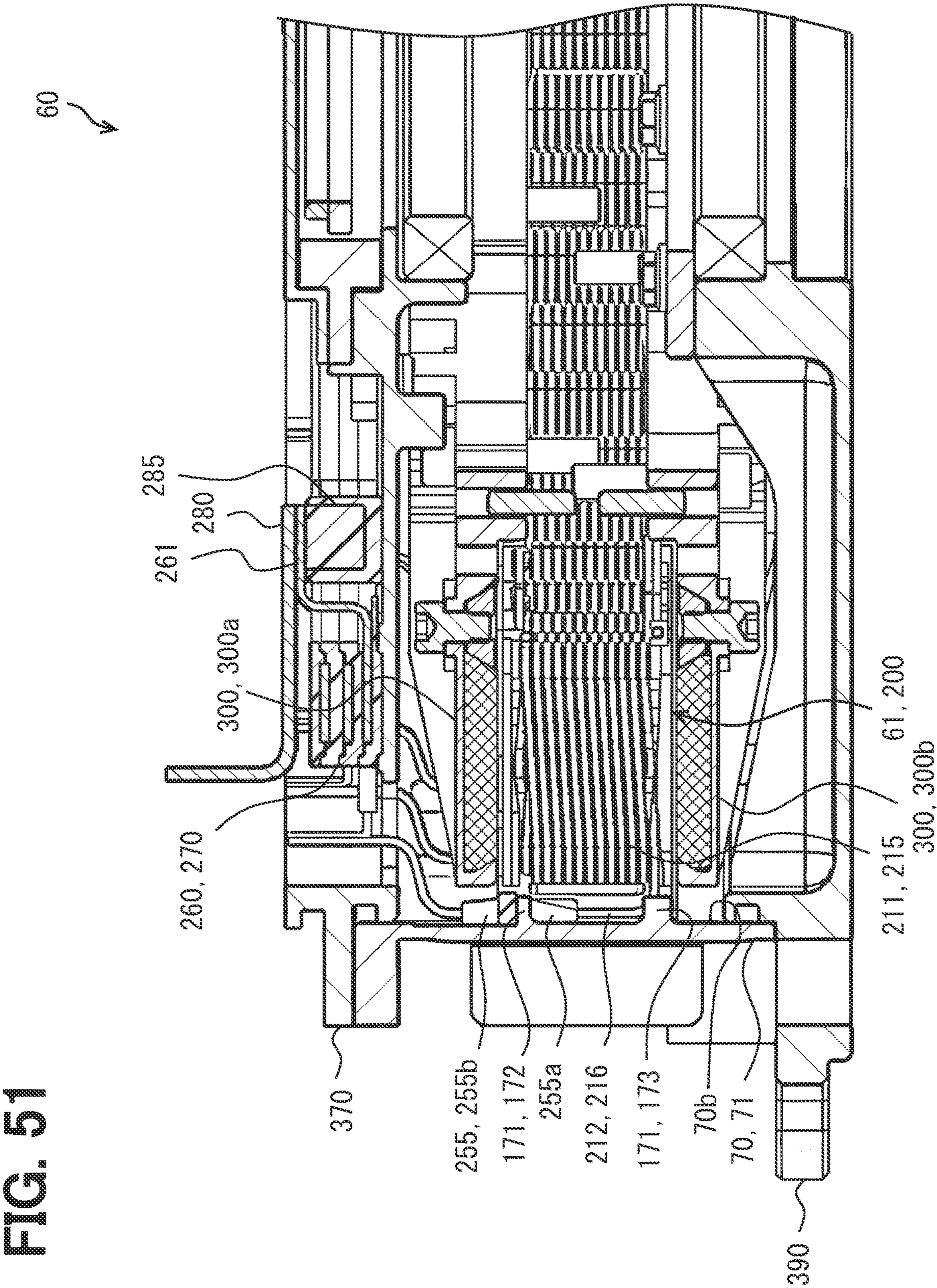
FIG. 51 is a vertical cross-sectional view of a periphery of a grommet in a motor device in a configuration group Cc.
Figure 52:
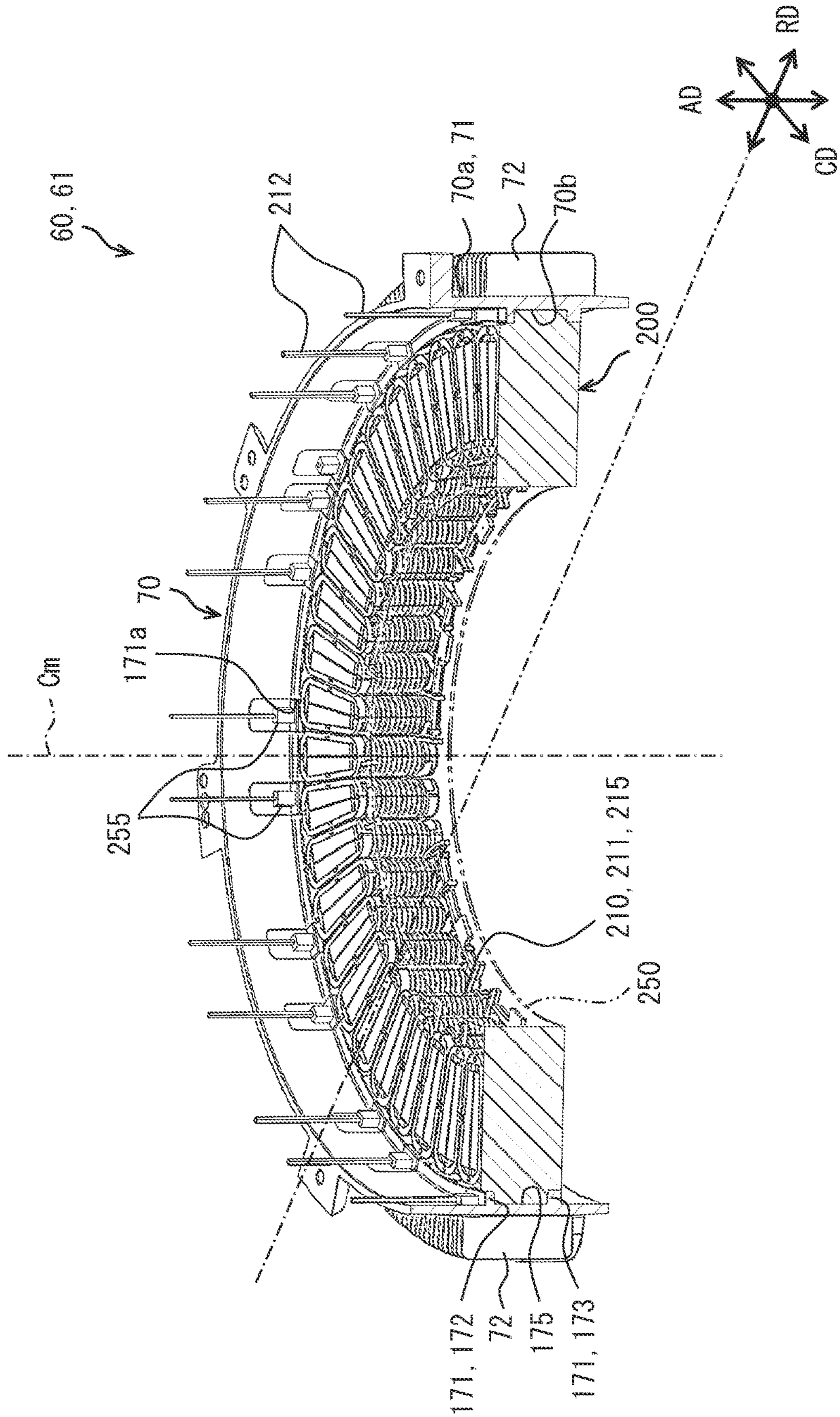
FIG. 52 is a vertical cross-sectional perspective view of a motor housing and a coil protection portion.

As shown in FIGS. 51 and 52, in the stator 200, the electric power lead-out wire 212 is led out from the coil protection portion 250. A grommet 255 is made of a resin material or the like, and has an electrical insulation property. A portion of the electric power lead-out wire 212 that is led out from the coil protection portion 250 is protected by the grommet 255. The grommet 255 is provided in the motor device 60. The grommet 255 covers the electric power lead-out wire 212 in a state of straddling a boundary between a portion of the electric power lead-out wire 212 embedded in the coil protection portion 250 and a portion exposed from the coil protection portion 250. In FIG. 51, an illustration of the coil protection portion 250 is omitted.

The grommet 255 includes an embedded portion 255*a* and an exposed portion 255*b*. The embedded portion 255*a* is a portion of the grommet 255 embedded in the coil protection portion 250. The exposed portion 255*b* is a portion of the grommet 255 exposed from the coil protection portion 250. The exposed portion 255*b* extends from the embedded portion 255*a* toward outside of the coil protection portion 250. The exposed portion 255*b* extends, for example, from the embedded portion 255*a* toward the rear frame 370 in the axial direction AD.

Figure 53:
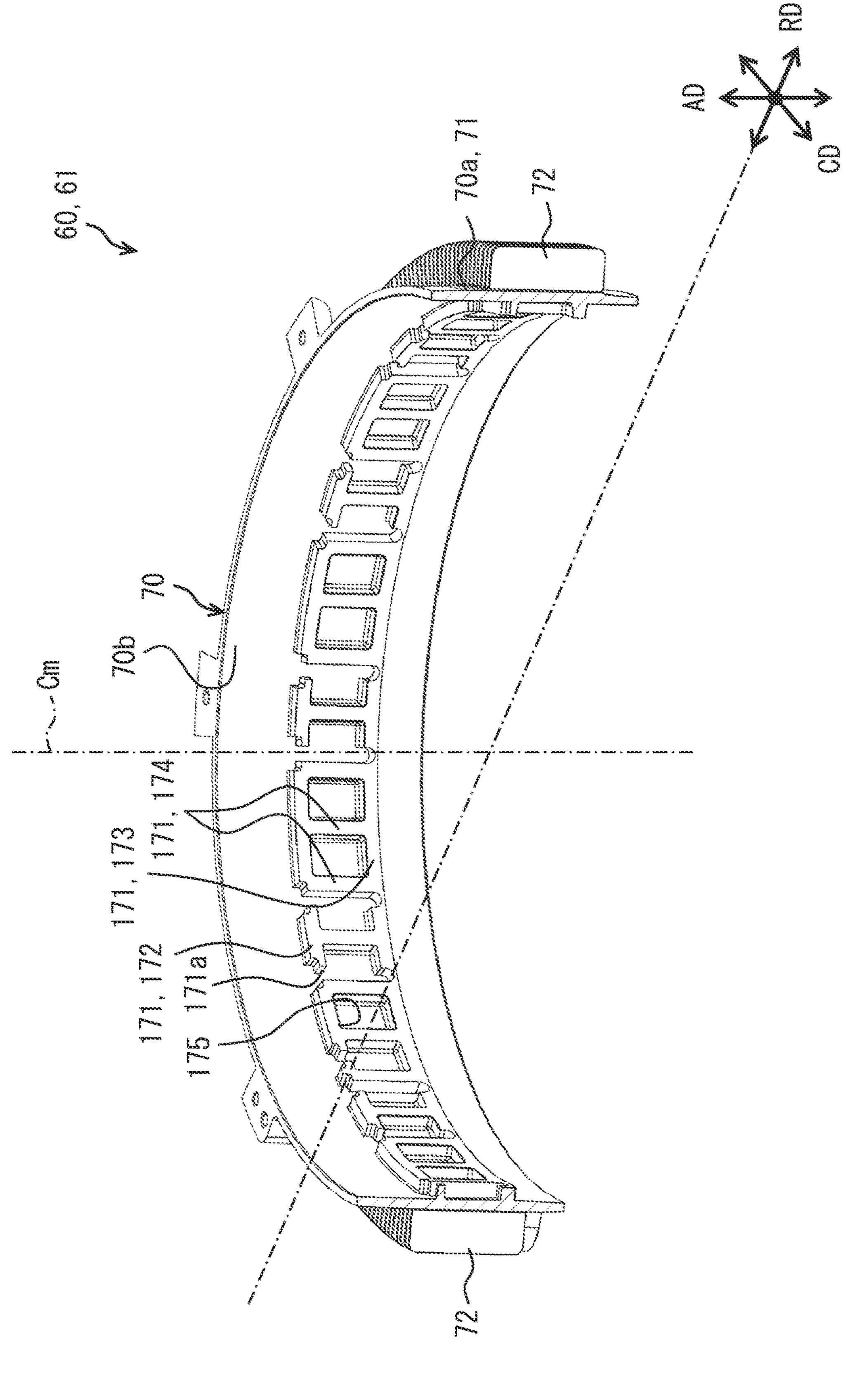
FIG. 53 is a vertical cross-sectional perspective view of the motor housing.

The electric power lead-out wire 212 is led out from the coil protection portion 250 to extend in the axial direction AD along the inner peripheral surface 70*b* in the motor housing 70. As shown in FIGS. 52 and 53, the motor housing 70 is provided with a lead-out groove portion 171*a*. The electric power lead-out wire 212 is led out from the coil protection portion 250 through the lead-out groove portion 171*a*. The lead-out groove portion 171*a* is provided in the stator holding portion 171. The lead-out groove portion 171*a* is provided in the first peripheral holding portion 172, and penetrates the first peripheral holding portion 172 in the axial direction AD in a state of being opened to the radially inner side.

As shown in FIGS. 51 and 52, the grommet 255 covers at least a portion of the electric power lead-out wire 212 which passes through the lead-out groove portion 171*a*. The grommet 255 is in a state of entering the lead-out groove portion 171*a* together with the electric power lead-out wire 212 from the radially inner side. The grommet 255 is in close contact with an inner surface of the lead-out groove portion 171*a*. The grommet 255 fills a gap between the inner surface of the lead-out groove portion 171*a* and the electric power lead-out wire 212. The grommet 255 is elastically deformable, for example, and is fitted into the lead-out groove portion 171*a* by being elastically deformed. The electric power lead-out wire 212 corresponds to a coil lead-out wire, and the grommet 255 corresponds to a lead-out wire protection portion.

Next, a method of manufacturing the coil protection portion 250 in the method of manufacturing the stator 200 will be described. In a process of manufacturing the coil protection portion 250, the operator prepares the coil unit 210, the motor housing 70, and the grommet 255 as a preparation process. Then, the operator attaches the grommet 255 to the electric power lead-out wire 212 of the coil unit 210. The operator performs an operation of installing the coil unit 210 inside the motor housing 70 and an operation of fitting the grommet 255 together with the electric power lead-out wire 212 into the lead-out groove portion 171*a*.

The operator attaches the coil unit 210 and the motor housing 70, which is attached with the grommet 255, to the mold, and molds the coil protection portion 250. In this case, the grommet 255 is fitted into the lead-out groove portion 171*a*, and thus the grommet 255 prevents a molten resin from flowing out from the lead-out groove portion 171*a*.

<Configuration Group Cd>

Figure 54:
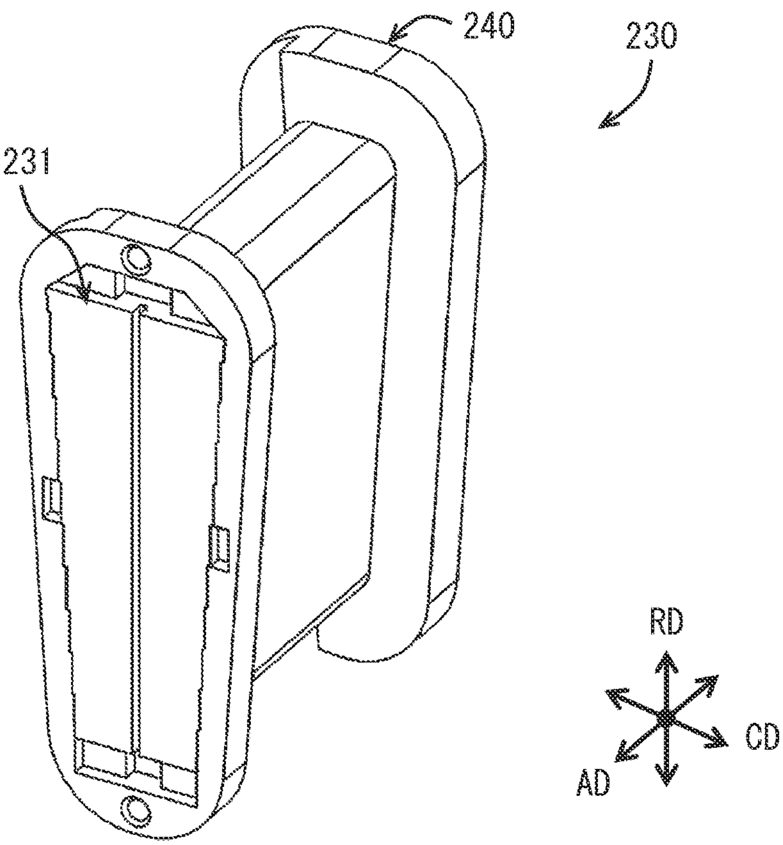
FIG. 54 is a perspective view of a core unit in a configuration group Cd.

As shown in FIG. 54, the core unit 230 includes the core 231 and the bobbin 240. The core unit 230 is permanently covered with the coil protection portion 250 together with the coil 211, and is protected by the coil protection portion 250. The coil protection portion 250 is in close contact with at least a part of the bobbin 240.

The bobbin 240 is made of a resin material or the like. The bobbin 240 is made of, for example, an epoxy-based thermosetting resin. The bobbin 240 is, for example, a molded resin formed by molding. The bobbin 240 has an electrical insulation property. The bobbin 240 has a thermal conduction property, and heat from the core 231 is easily transferred. The bobbin 240 has thermal conductivity higher than that of air, for example.

The bobbin 240 is in a state of covering at least a part of the core 231 and protects the core 231. The bobbin 240 covers the core 231 to extend in the direction orthogonal to the axial direction AD. The bobbin 240 is formed in an annular shape as a whole. The bobbin 240 is in close contact with an outer surface of the core 231. The bobbin 240 easily conducts heat from the coil 211 to the coil protection portion 250.

The bobbin 240 preferably has a high thermal conduction property and a high electrical insulation property. However, when it is difficult to increase both the thermal conduction property and the electrical insulation property in the bobbin 240, it is preferable to increase the electrical insulation property in preference to the thermal conduction property. For example, the electrical insulation property of the bobbin 240 is higher than the electrical insulation property of the coil protection portion 250. Specifically, the dielectric constant of the bobbin 240 is smaller than the dielectric constant of the coil protection portion 250. On the other hand, the thermal conduction property of the bobbin 240 is lower than the thermal conduction property of the coil protection portion 250. Specifically, the thermal conductivity of the bobbin 240 is smaller than the thermal conductivity of the coil protection portion 250.

<Configuration Group Ce>

Figure 55:
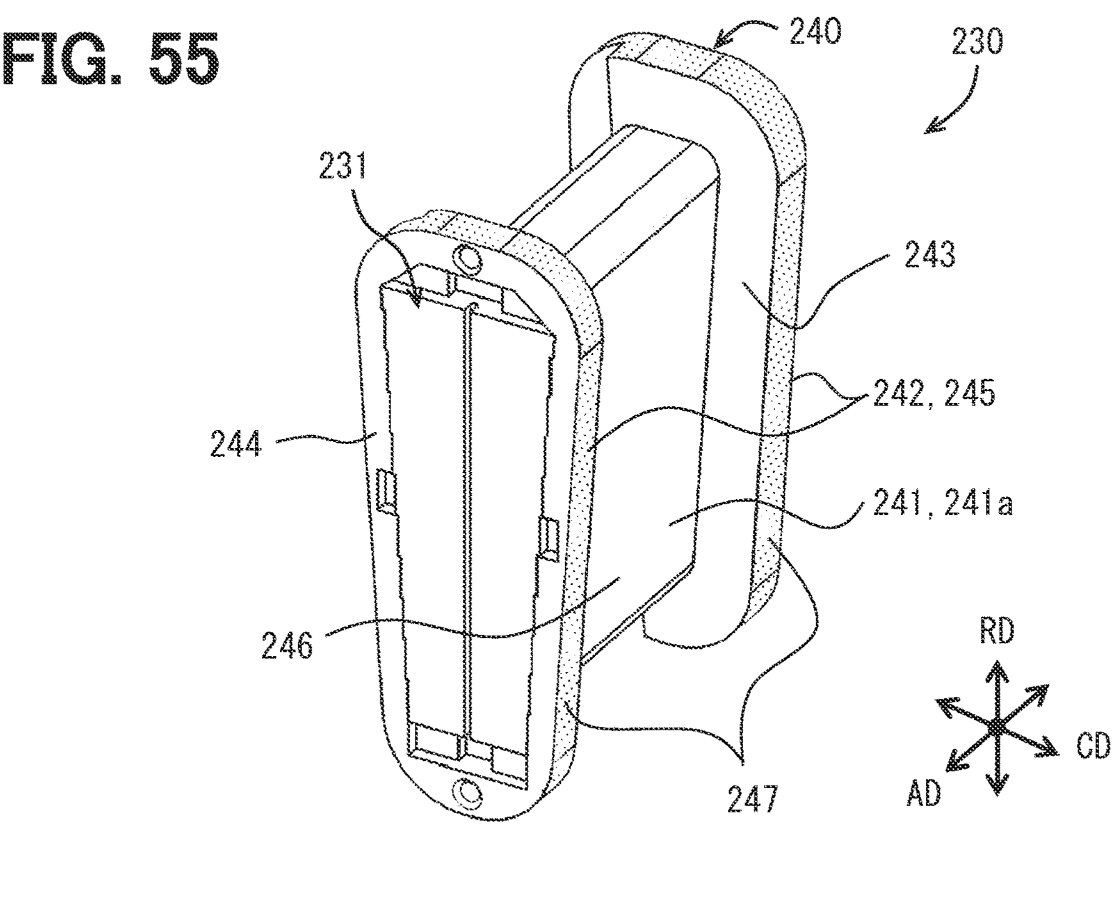
FIG. 55 is a perspective view of a core unit in a configuration group Ce.

As shown in FIG. 55, the bobbin 240 includes a bobbin trunk portion 241 and bobbin flanges 242. The bobbin trunk portion 241 is formed in a columnar shape as a whole and extends in the axial direction AD. An outer peripheral surface 241*a* of the bobbin trunk portion 241 is formed in an annular shape to extend in the direction orthogonal to the axial direction AD.

Each of the bobbin flanges 242 extends outward from the outer peripheral surface 241*a*. The bobbin flange 242 extends from the outer peripheral surface 241*a* in the direction orthogonal to the axial direction AD, and is formed in a plate shape as a whole. A pair of bobbin flanges 242 are provided side by side in the axial direction AD. In the bobbin 240, the coil 211 is wound around the bobbin trunk portion 241 between the pair of bobbin flanges 242.

The bobbin flange 242 has a flange inner plate surface 243, a flange outer plate surface 244, and a flange end surface 245. In the bobbin flange 242, a plate surface in the pair of plate surfaces which is on a bobbin trunk portion 241 side is the flange inner plate surface 243, and a plate surface opposite to the bobbin trunk portion 241 is the flange outer plate surface 244. The flange inner plate surfaces 243 of the pair of bobbin flanges 242 face each other. The flange end surface 245 is a tip end surface of the bobbin flange 242 and extends in the direction orthogonal to the axial direction AD. The flange end surface 245 is located at a position separated from the bobbin trunk portion 241 toward an outer side.

An outer surface of the bobbin 240 includes a bobbin base surface 246 and a bobbin rough surface 247. The bobbin rough surface 247 is a surface rougher than the bobbin base surface 246. The bobbin rough surface 247 is provided with, for example, many minute irregularities, thus being a rough surface. The bobbin rough surface 247 is formed by performing surface roughening, which is used for forming a rough surface, on the bobbin 240. Examples of the surface roughening for forming the bobbin rough surface 247 include mechanical processing and scientific processing. In FIG. 55, the bobbin rough surface 247 is indicated by dot hatching.

The bobbin base surface 246 includes, for example, the outer peripheral surface 241*a*, the flange inner plate surface 243, and the flange outer plate surface 244. The bobbin rough surface 247 includes, for example, the flange end surface 245. The flange outer plate surface 244 may be included in the rough surface.

Figure 56:
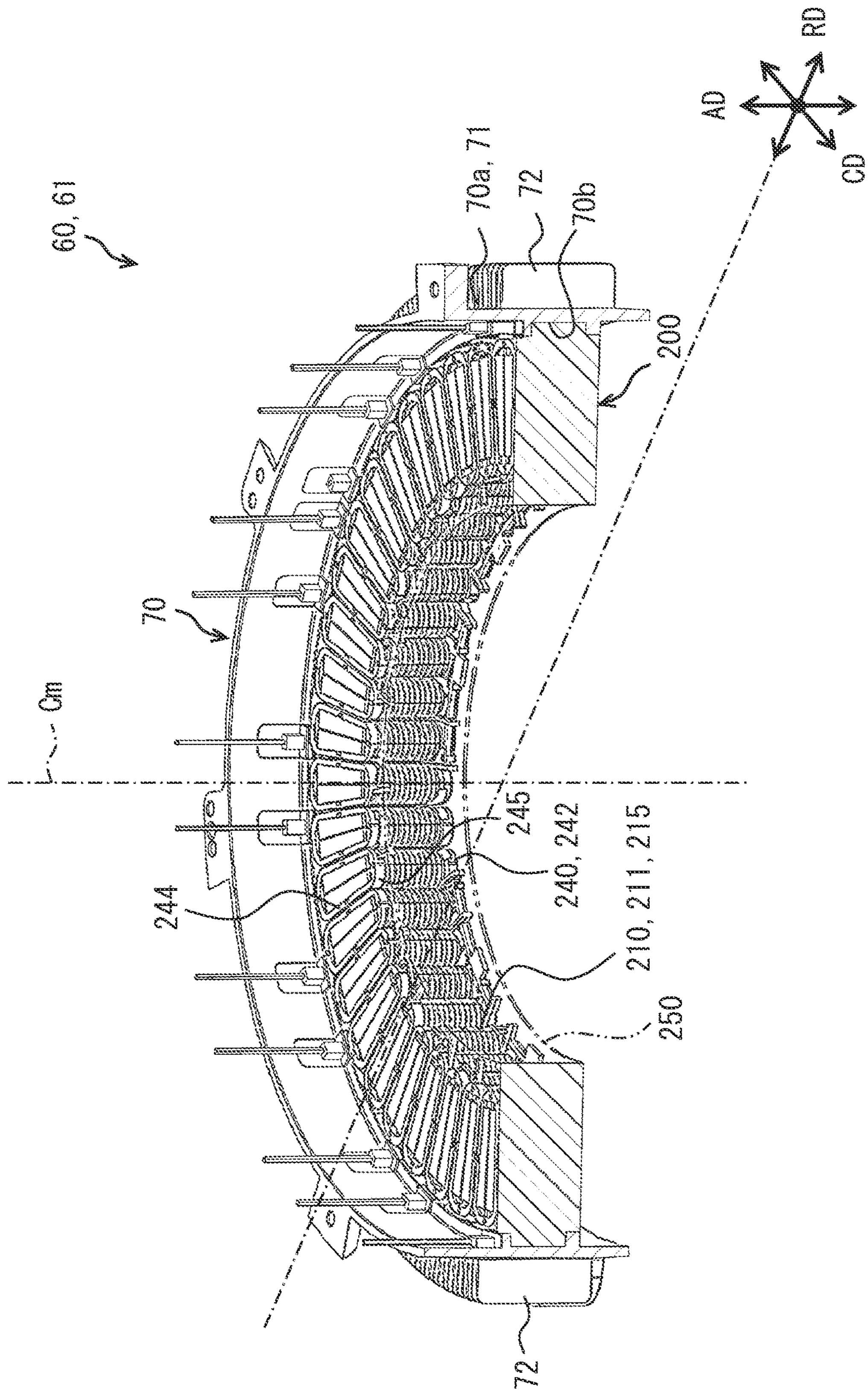
FIG. 56 is a vertical cross-sectional perspective view of a motor housing and a coil protection portion.

In the bobbin 240, at least a portion with which the coil protection portion 250 is overlapped is the bobbin rough surface 247. As shown in FIG. 56, in the coil unit 210, in a state in which the coil 211 is wound around the bobbin 240, at least the flange outer plate surface 244 and the flange end surface 245 are exposed to the outer side. In the motor device 60, in a state in which the coil unit 210 is covered by the coil protection portion 250, the coil protection portion 250 covers at least the flange end surface 245. That is, the coil protection portion 250 is overlapped with the flange end surface 245. The coil protection portion 250 basically does not cover the flange outer plate surface 244.

In the motor device 60, since the flange end surface 245 is included in the bobbin rough surface 247, the coil protection portion 250 is easily brought into close contact with the flange end surface 245. The flange end surface 245, which is the bobbin rough surface 247, tends to have a larger surface area than the bobbin base surface 246. Therefore, a contact area between the flange end surface 245 and the coil protection portion 250 tends to be large.

<Configuration Group Cf>

Figure 57:
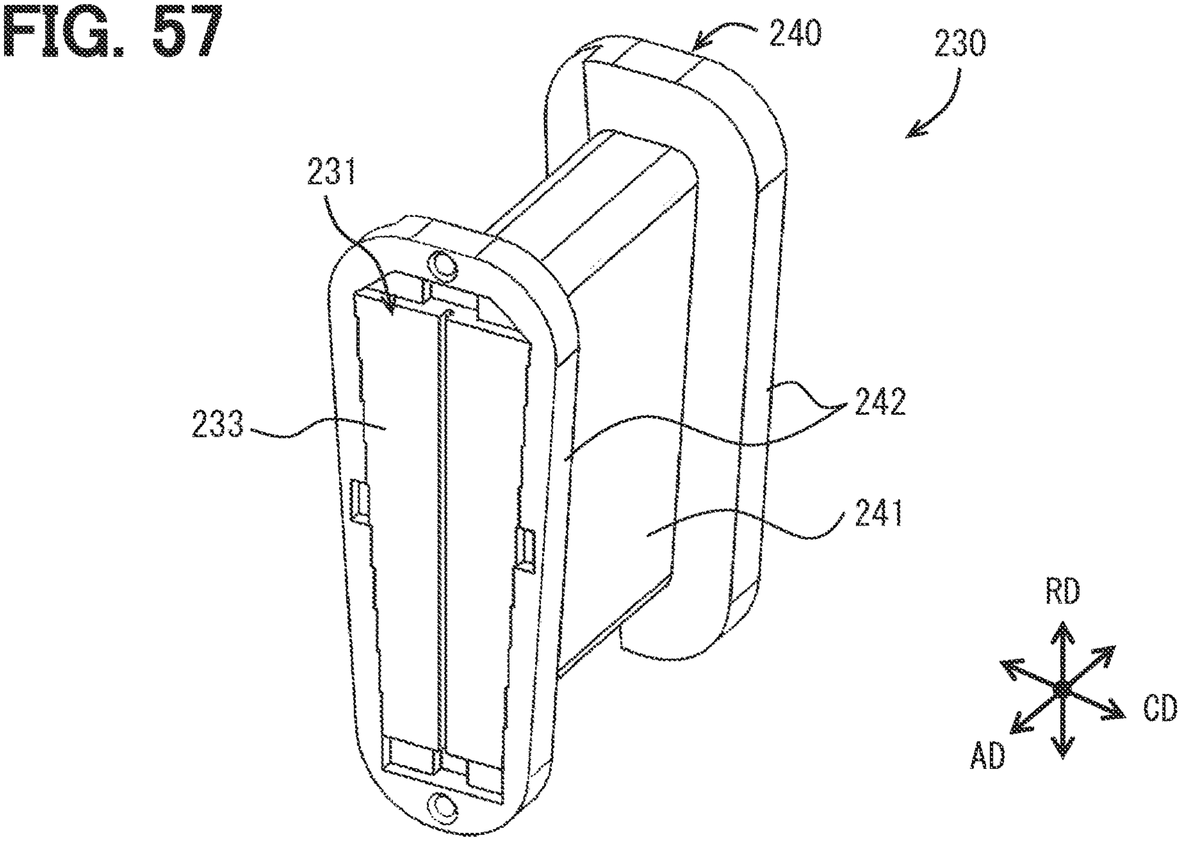
FIG. 57 is a perspective view of a core unit in a configuration group Cf.
Figure 58:
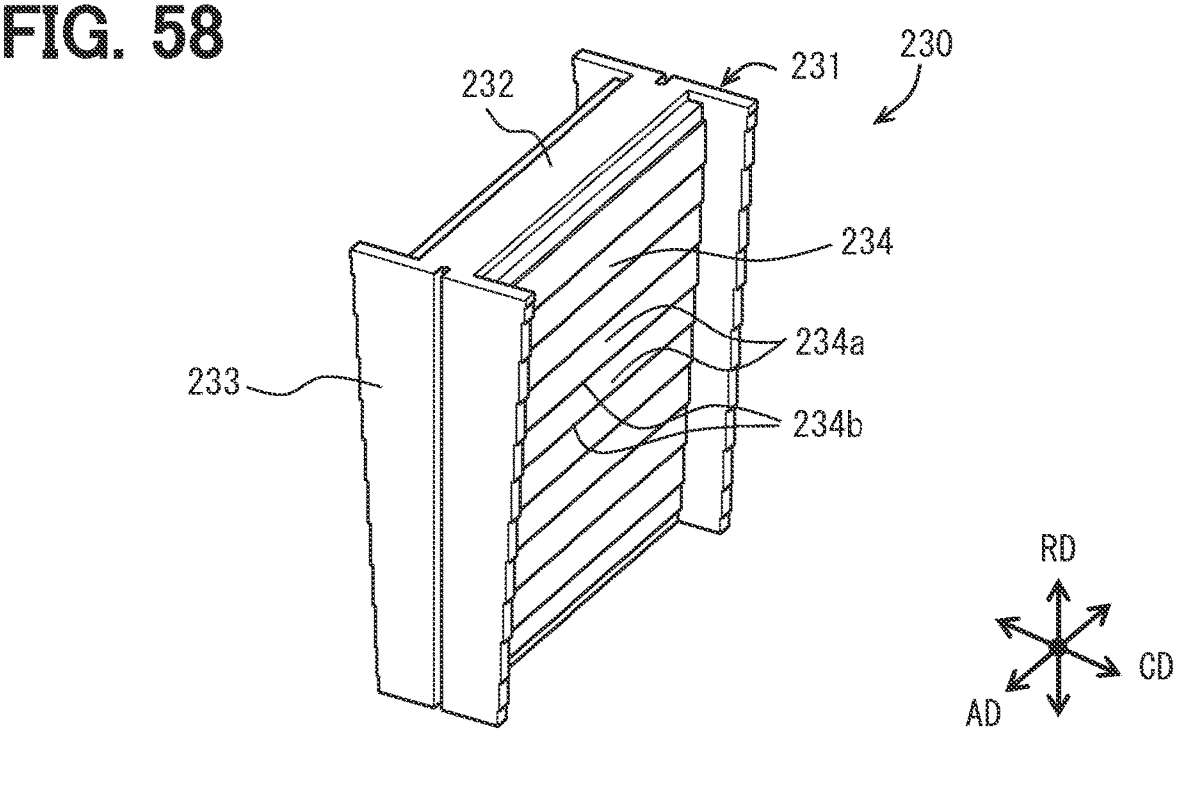
FIG. 58 is a perspective view of a core.

As shown in FIGS. 57 and 58, the core 231 includes a core trunk portion 232 and core flanges 233. The core trunk portion 232 is formed in a plate shape as a whole and extends in the axial direction AD. An outer peripheral surface 232*a* of the core trunk portion 232 is formed in an annular shape to extend in the direction orthogonal to the axial direction AD.

Each of the core flanges 233 extends outward from the outer peripheral surface 232*a*. The core flange 233 extends from the outer peripheral surface 232*a* in the direction orthogonal to the axial direction AD, and is formed in a plate shape as a whole. A pair of core flanges 233 are provided side by side in the axial direction AD. In the core 231, the coil 211 is wound around the core trunk portion 232 via the bobbin trunk portion 241 between the pair of core flanges 233.

Figure 59:
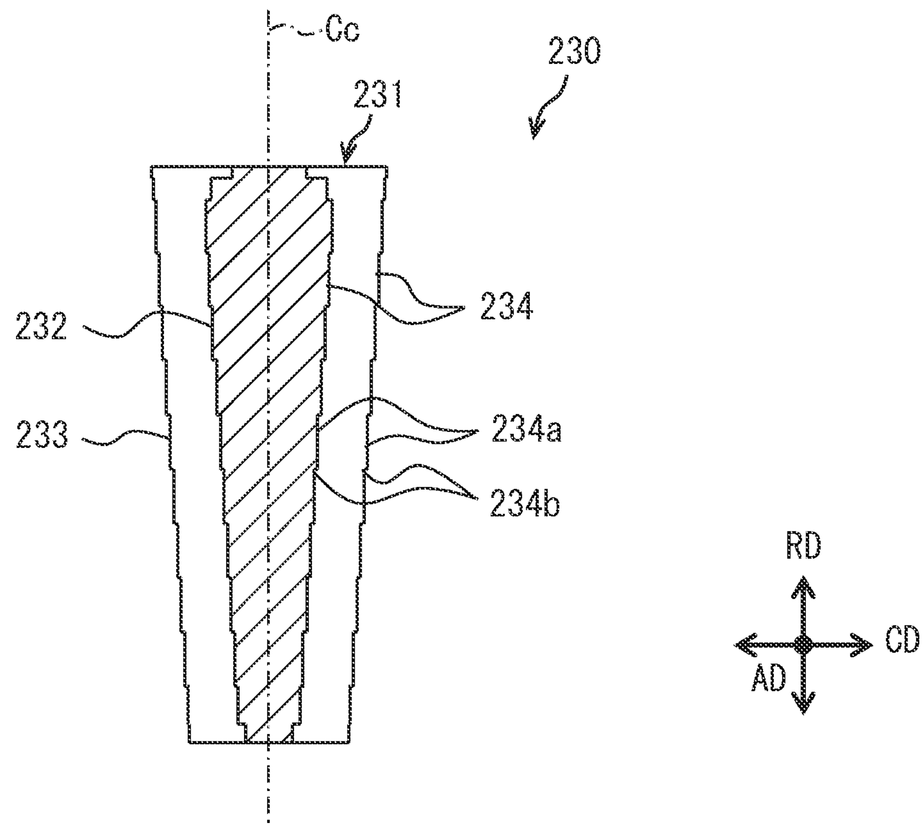
FIG. 59 is a horizontal cross-sectional view of the core.

As shown in FIGS. 58 and 59, the core 231 as a whole is gradually narrowed toward the radially inner side. A core width of the core 231 gradually decreases toward the radially inner side. The core width is a width dimension of the core 231 in the circumferential direction CD. The outer surface of the core 231 includes core step surfaces 234. Each of the core step surfaces 234 extends stepwise in the radial direction RD. The core step surface 234 is provided on the core trunk portion 232 and the core flanges 233. A pair of core step surfaces 234 are provided side by side in the circumferential direction CD in the core trunk portion 232 and the core flanges 233.

The core step surface 234 includes step base surfaces 234*a* and step connection surfaces 234*b*. Multiple step base surfaces 234*a* and multiple step connection surfaces 234*b* are arranged in the radial direction RD. The step base surface 234*a* extends in the direction orthogonal to the circumferential direction CD. Of two step base surfaces 234*a* adjacent to each other in the radial direction RD, the step base surface 234*a* on the radially inner side is disposed inward in the circumferential direction CD with respect to the step base surface 234*a* on the radially outer side. The step connection surface 234*b* extends in the direction orthogonal to the radial direction RD. The step connection surface 234*b* connects two step base surfaces 234*a* adjacent to each other in the radial direction RD.

Figure 60:
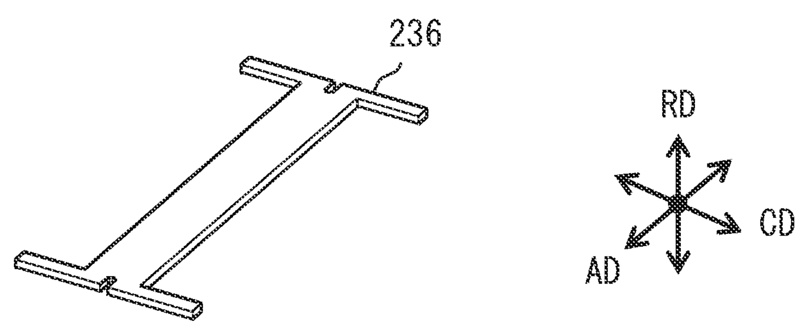
FIG. 60 is a perspective view of a core forming plate member.
Figure 61:
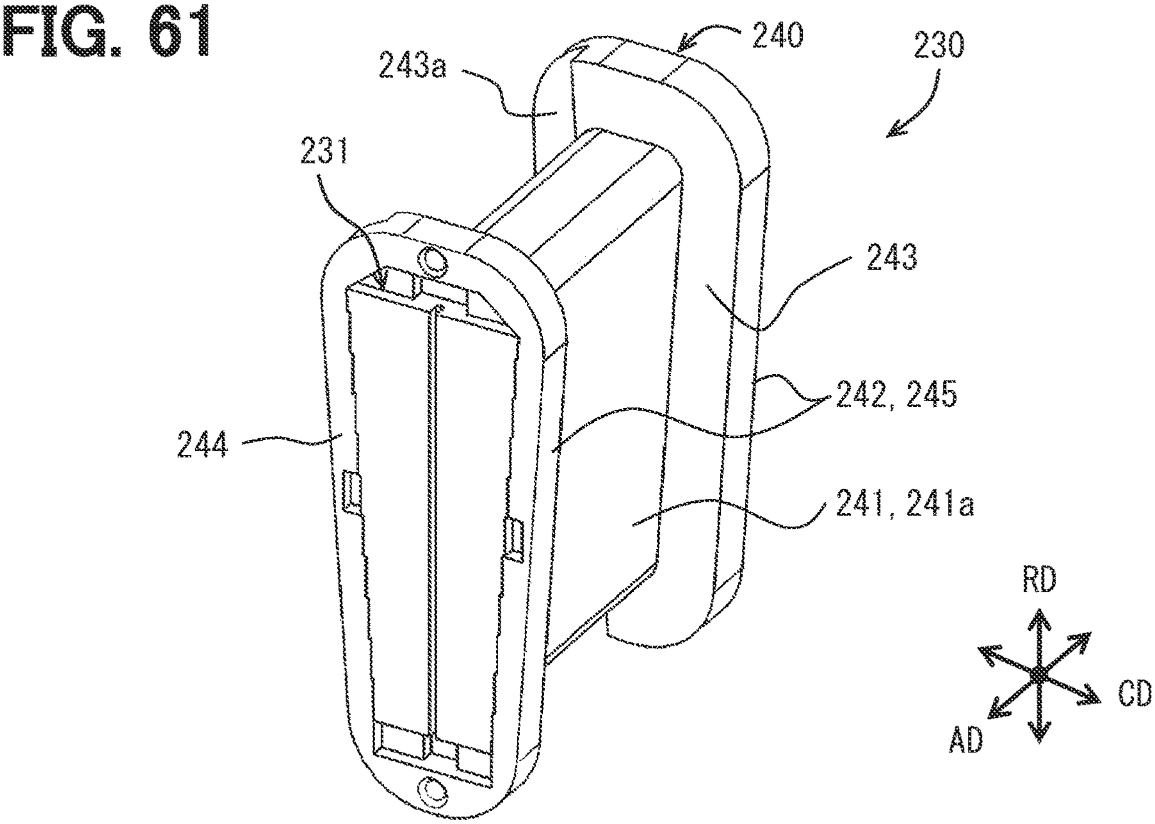
FIG. 61 is a perspective view of a core unit in a configuration group Cg.
Figure 62:
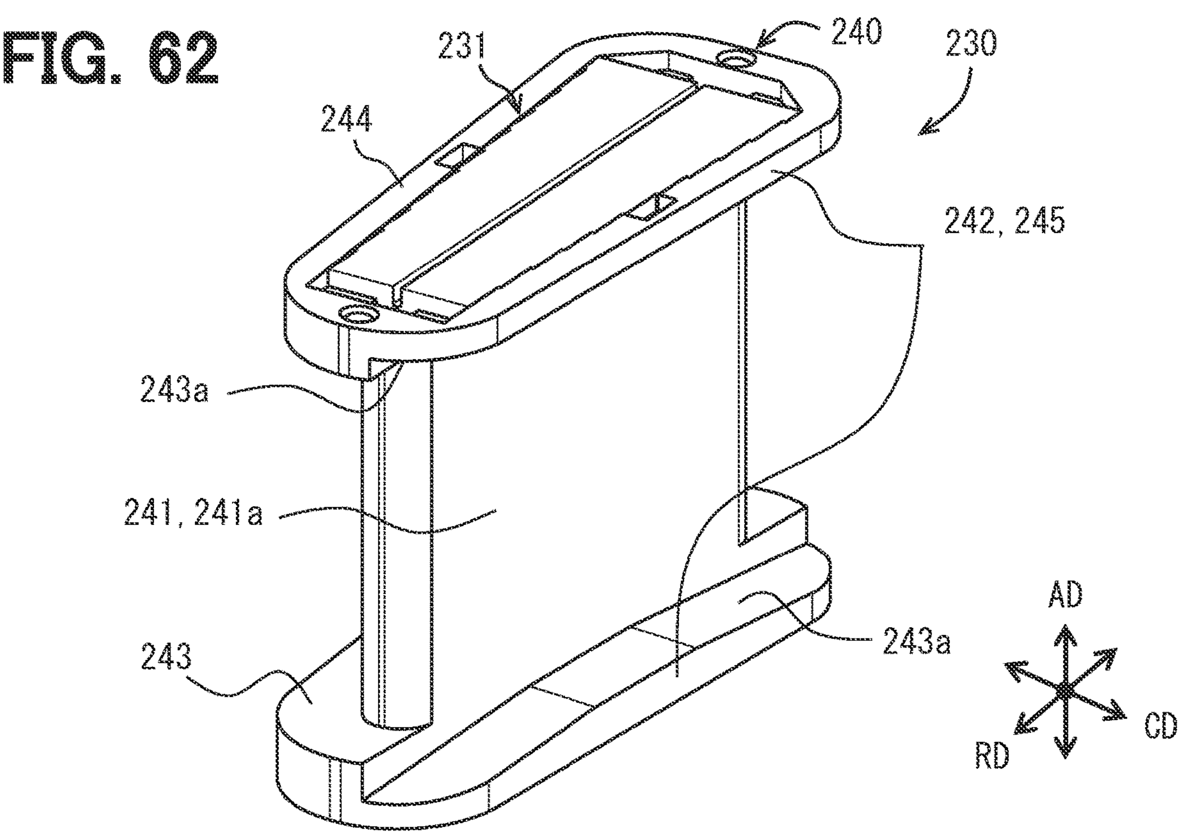
FIG. 62 is a perspective view of the core unit viewed from a flange recess portion side.
Figure 63:
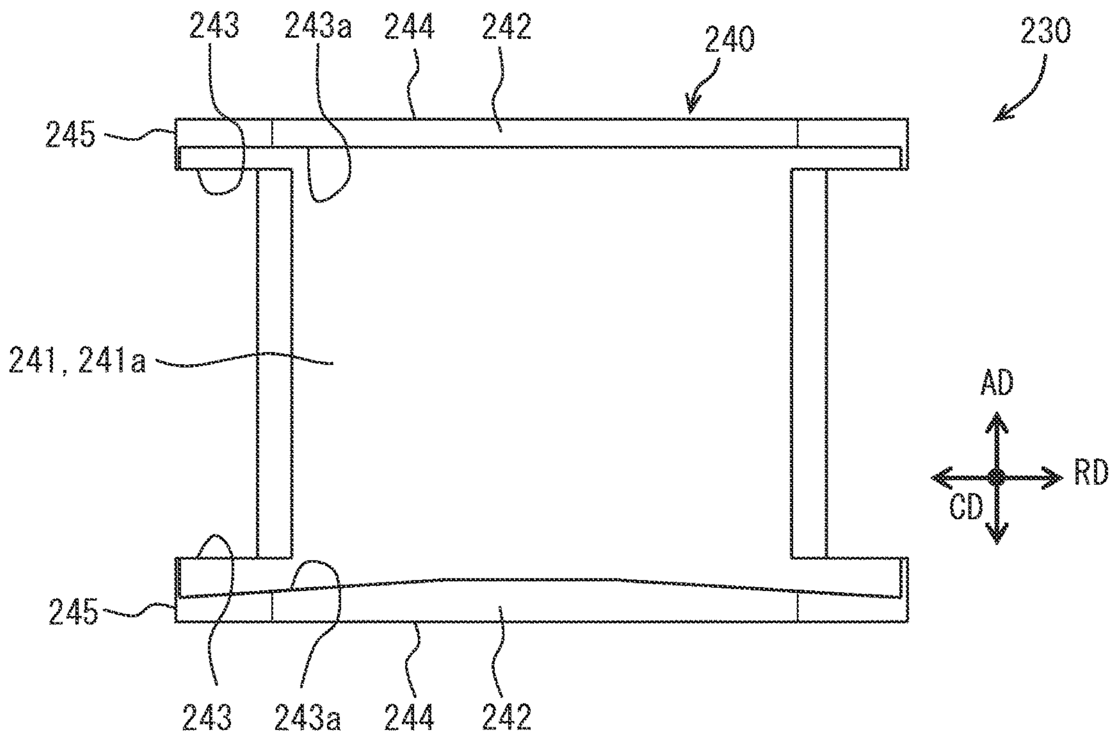
FIG. 63 is a side view of the core unit viewed from the flange recess portion side.
Figure 64:
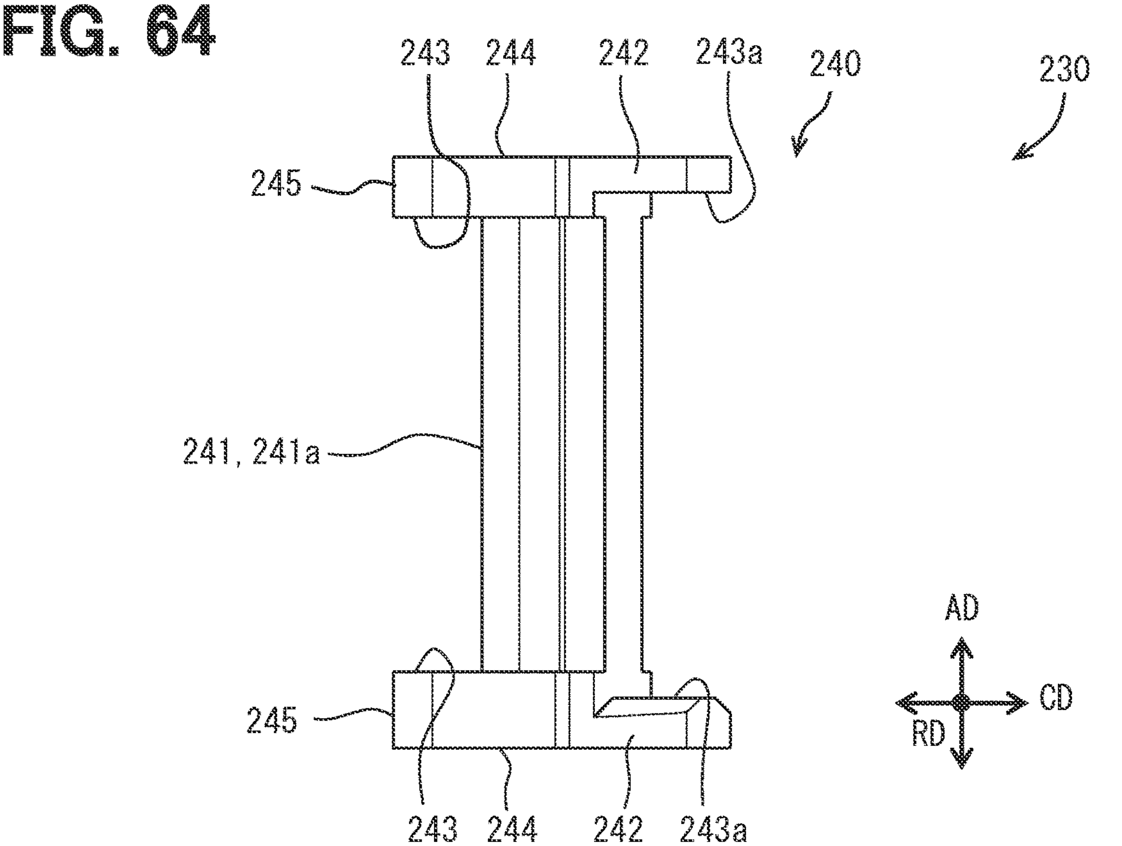
FIG. 64 is a front view of the core unit viewed from a radially inner side.

The core 231 is formed by multiple core forming plate members 236. As shown in FIG. 60, each of the core forming plate members 236 is a thin plate-shaped member. The core forming plate member 236 is made of, for example, a soft magnetic material. The core 231 is formed by overlapping the multiple core forming plate members 236. The core 231 includes multiple types of core forming plate members 236 having different sizes and shapes. In the core 231, the multiple types of core forming plate members 236 are used according to the core width. In the core 231, multiple core forming plate members 236 forming the step base surface 234*a* at one stage are of one type of core forming plate members 236 having the same size and shape. The core 231 includes at least the same number of types of core forming plate members 236 as the number of step base surfaces 234*a*.

In the core 231, since the multiple core forming plate members 236 are stacked, an eddy current is less likely to be generated. Therefore, eddy current loss generated in the core 231 can be reduced. In the core unit 230, at least the bobbin 240 is overlapped with the core step surface 234. Since the core step surface 234 is provided on the outer surface of the core 231, a surface area is likely to be increased. In the core unit 230, a contact area between the core 231 and the bobbin 240 is likely to be increased by the core step surface 234.

A method of manufacturing the core 231 and the core unit 230 in the method of manufacturing the motor device 60 will be described. In a process of manufacturing the core 231, the operator prepares multiple types of core forming plate members 236. Then, the operator forms the core 231 by performing, for each of the step base surfaces 234*a* at multiple stages, work of overlapping the multiple core forming plate members 236 of one type to form the step base surface 234*a* at one stage.

In a process of manufacturing the core unit 230, the operator prepares the core 231 as a preparation process. Then, the operator attaches the core 231 to a mold and the bobbin 240 is molded by molding. In this way, in the core unit 230 in which the core 231 is integrated with the bobbin 240 by insert molding, the bobbin 240 is in close contact with the core 231. In the core 231, the bobbin 240 is in close contact with the core step surface 234.

For example, a configuration different from that of the present embodiment is assumed in which the core width of the core 231 continuously decreases toward the radially inner side. In the configuration, the outer surface of the core 231 includes a tapered surface instead of the core step surface 234. Therefore, in order to form the tapered surface by laminating the multiple core forming plate members 236, the number of types of core forming plate members 236 is very large. In the manufacture of the core 231, there is a concern that a cost for manufacturing the core forming plate member 236 increases as the number of types of core forming plate member 236 increases. Meanwhile, in the present embodiment, since the core width of the core 231 gradually decreases toward the radially inner side, the types of the core forming plate member 236 can be reduced. Therefore, it is possible to reduce the cost for manufacturing the core forming plate member 236 in manufacturing the core 231.

<Configuration Group Cg>

As shown in FIGS. 61, 62, 63, and 64, the bobbin 240 includes flange recess portions 243*a*. The flange recess portions 243*a* are respectively provided in the pair of bobbin flanges 242. The flange recess portion 243*a* is a recess portion provided in the flange inner plate surface 243. The flange recess portion 243*a* is provided on one side of the bobbin trunk portion 241 in the circumferential direction CD. The flange recess portion 243*a* is not provided on the other side of the bobbin trunk portion 241 in the circumferential direction CD. The flange recess portion 243*a* extends along the bobbin trunk portion 241 in the radial direction RD. Both end portions of the flange recess portion 243*a* are opened in the radial direction RD. The flange recess portion 243*a* is opened toward a side opposite to the bobbin trunk portion 241 in the circumferential direction CD. The flange recess portions 243*a* respectively provided in the pair of bobbin flanges 242 face each other in the axial direction AD. The flange inner plate surface 243 corresponds to a flange surface.

Figure 65:
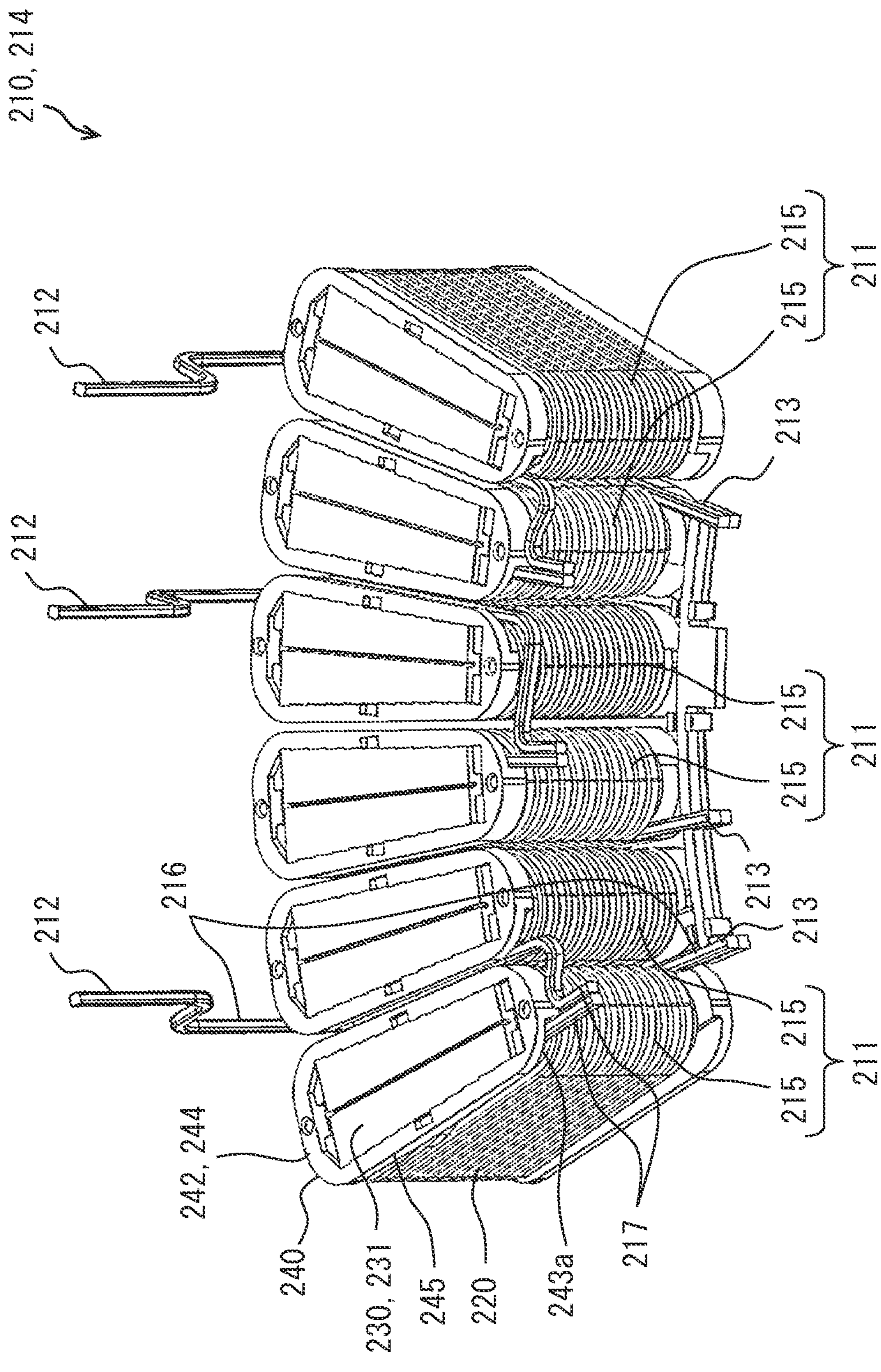
FIG. 65 is a perspective view of a neutral point unit.

As shown in FIG. 65, in the coil unit 210, the flange recess portion 243*a* is used to lead out the electric power lead-out wire 212 from the coil 211. In the coil portion 215, the flange recess portion 243*a* is used to lead out the first extending wire 216. In the coil portion 215, the coil wire 220 is led out through the flange recess portion 243*a* to form the first extending wire 216.

On a side opposite to the flange recess portion 243*a* with the bobbin trunk portion 241 interposed in the circumferential direction CD, a dead space is less likely to be formed between the coil portion 215 and the flange inner plate surface 243 due to absence of the flange recess portion 243*a*. In this way, since a dead space is less likely to be formed between the pair of bobbin flanges 242, a space factor of the coil 211 can be increased in the bobbin 240. In the bobbin 240, the space factor of the coil 211 increases as the dead space formed between the pair of bobbin flanges 242 decreases.

<Configuration Group Da>

Figure 66:
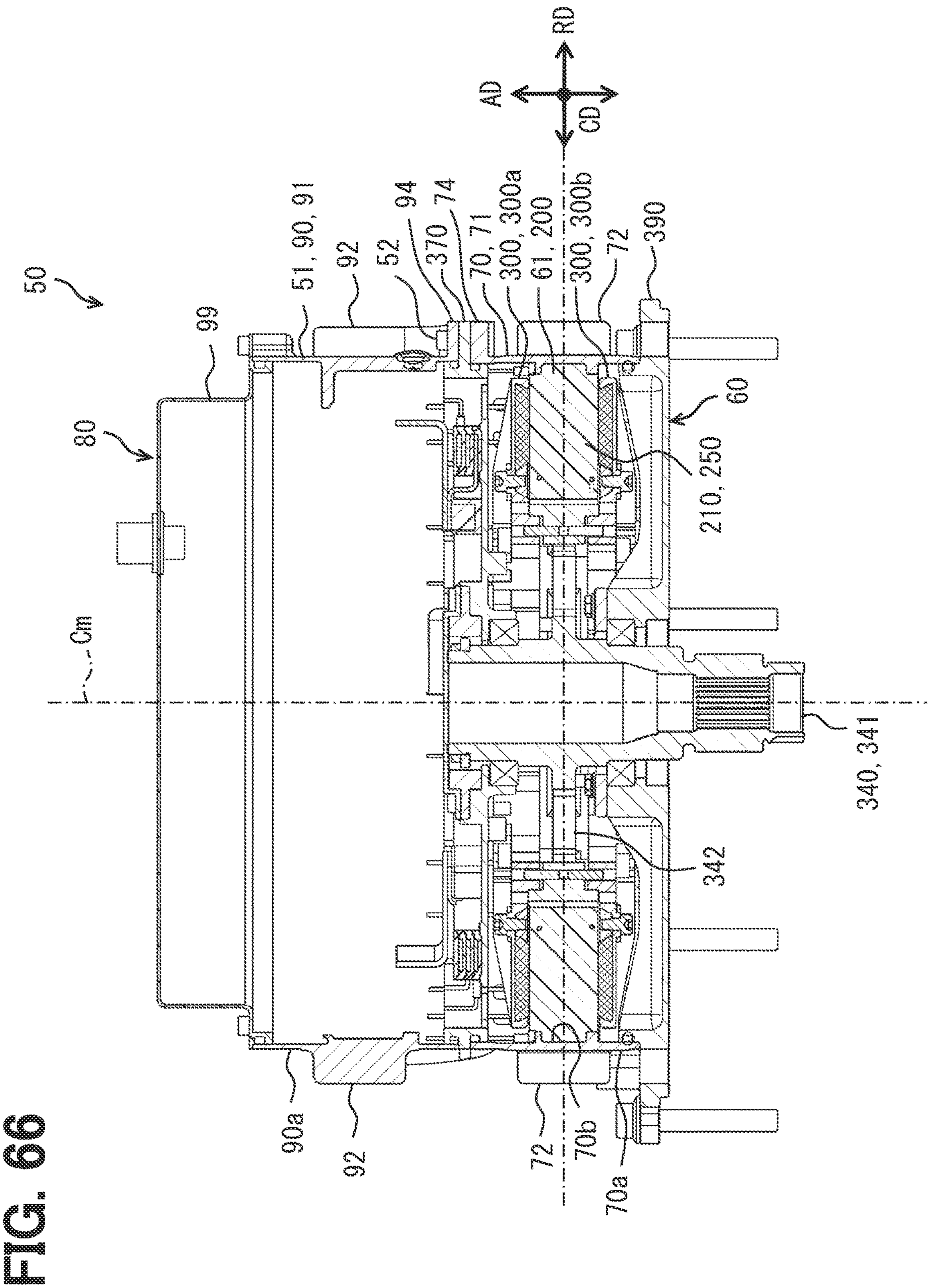
FIG. 66 is a vertical cross-sectional view of a motor device unit in a configuration group Da.

As shown in FIG. 66, in the motor device unit 50, the unit housing 51 includes the motor housing 70 and the inverter housing 90. The outer peripheral surface of the unit housing 51 includes the outer peripheral surface 70*a* of the motor housing 70 and the outer peripheral surface 90*a* of the inverter housing 90. The motor fins 72 and the inverter fins 92 are provided on the outer peripheral surface of the unit housing 51. The unit housing 51 accommodates the stator 200, the rotor 300, and the inverter 81. In the motor device unit 50, heat of the motor 61 and the inverter 81 is easily released to the outside by the motor fins 72 and the inverter fins 92.

In the unit housing 51, the motor housing 70 and the inverter housing 90 are integrated. The motor housing 70 and the inverter housing 90 are arranged along the motor axis Cm in the axial direction AD. The motor housing 70 corresponds to the electric machine housing, and the inverter housing 90 corresponds to a device housing.

The motor housing 70 and the inverter housing 90 are fixed by housing fixing tools 52. Each of the housing fixing tools 52 is a fixing tool such as a bolt. The housing fixing tool 52 connects a connection flange 74 of the motor housing 70 and a connection flange 94 of the inverter housing 90. The connection flange 74 is provided on the outer peripheral surface 70*a* of the motor housing 70 and protrudes from the housing main body 71 toward the radially outer side. The connection flange 94 is provided on the outer peripheral surface 90*a* of the inverter housing 90 and protrudes from the housing main body 91 toward the radially outer side.

Figure 67:
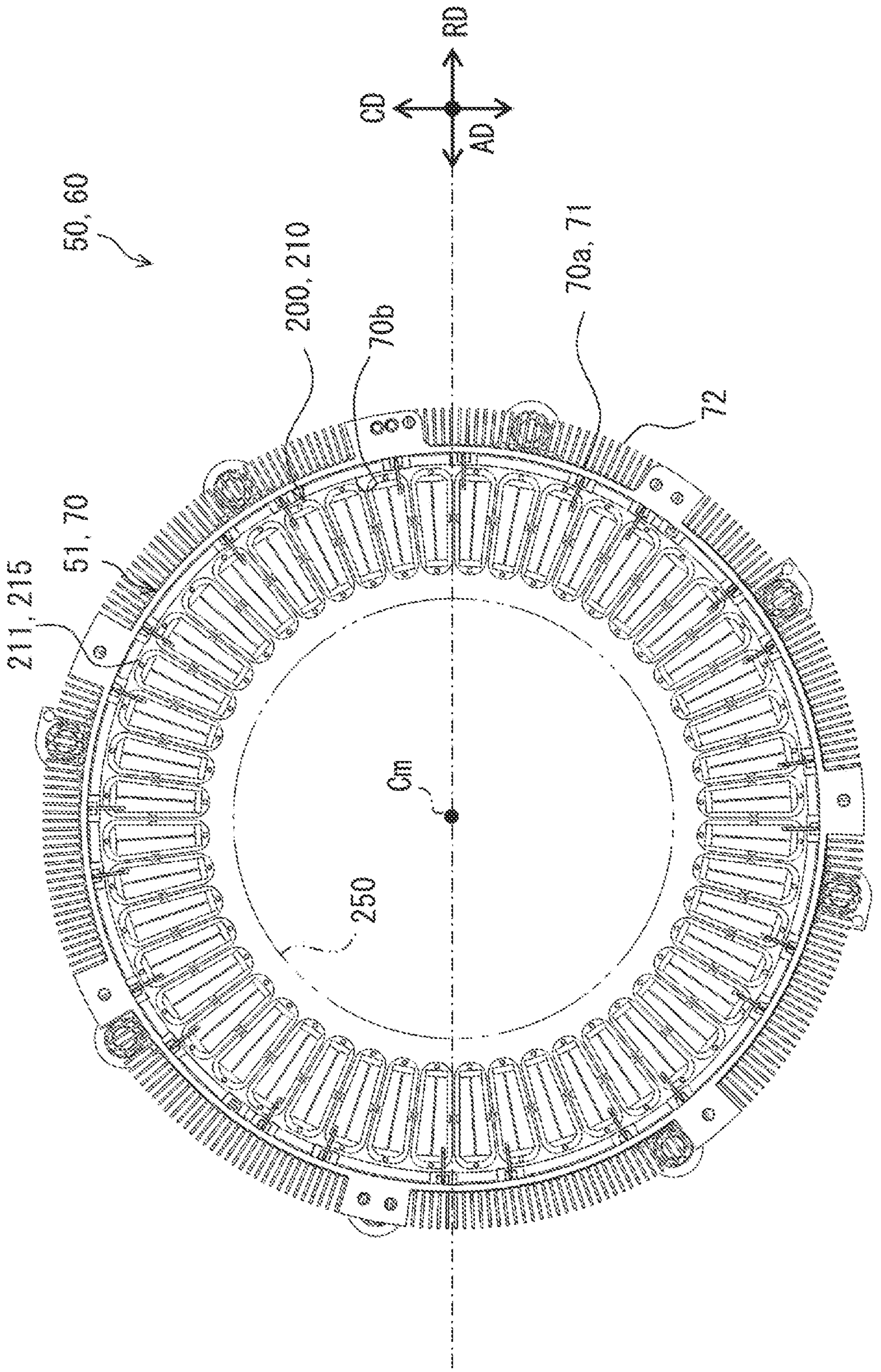
FIG. 67 is a top view of a stator and a motor housing.

As shown in FIGS. 66 and 67, in the motor housing 70, the coil protection portion 250 is overlapped with the inner peripheral surface 70*b*. The inner peripheral surface 70*b* of the motor housing 70 is included in the inner peripheral surface of the unit housing 51. The coil protection portion 250 is overlapped with the inner peripheral surface of the unit housing 51. The coil protection portion 250 is in close contact with the inner peripheral surface of the unit housing 51.

<Configuration Group Db>

Figure 68:
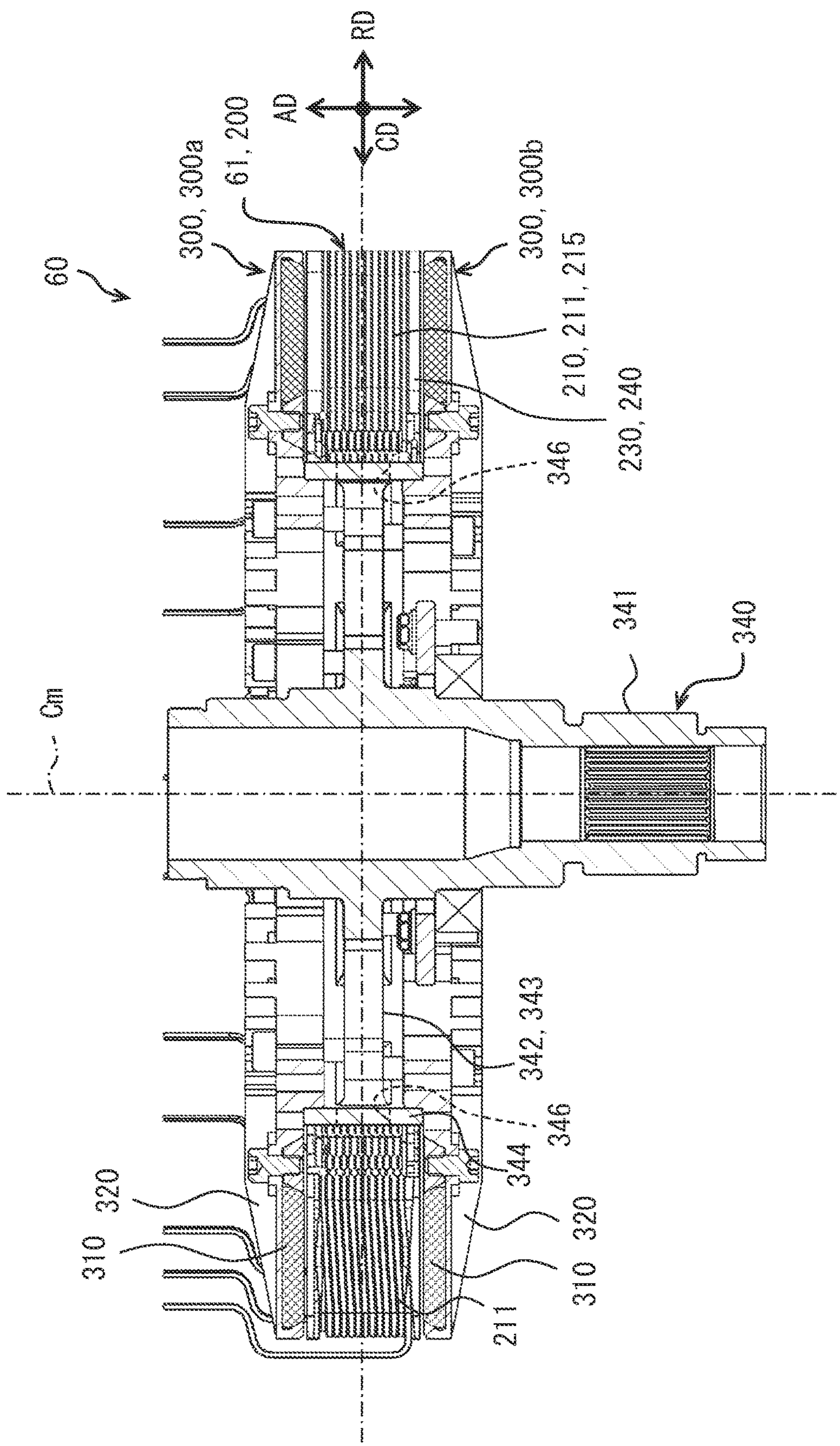
FIG. 68 is a vertical cross-sectional view of a rotor and a stator in a configuration group Db.
Figure 69:
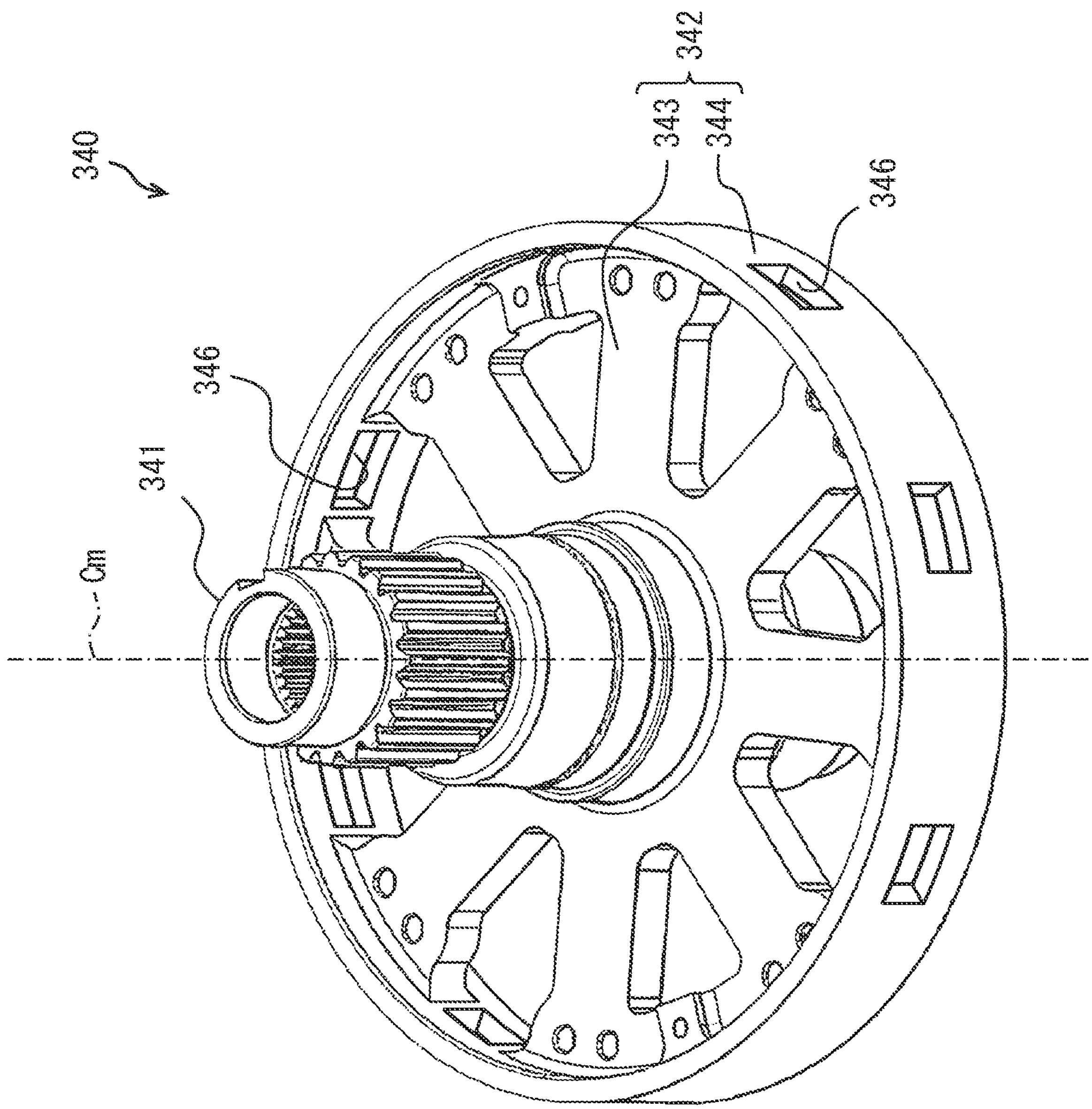
FIG. 69 is a perspective view of a shaft viewed from a lower side of FIG. 68.
Figure 70:
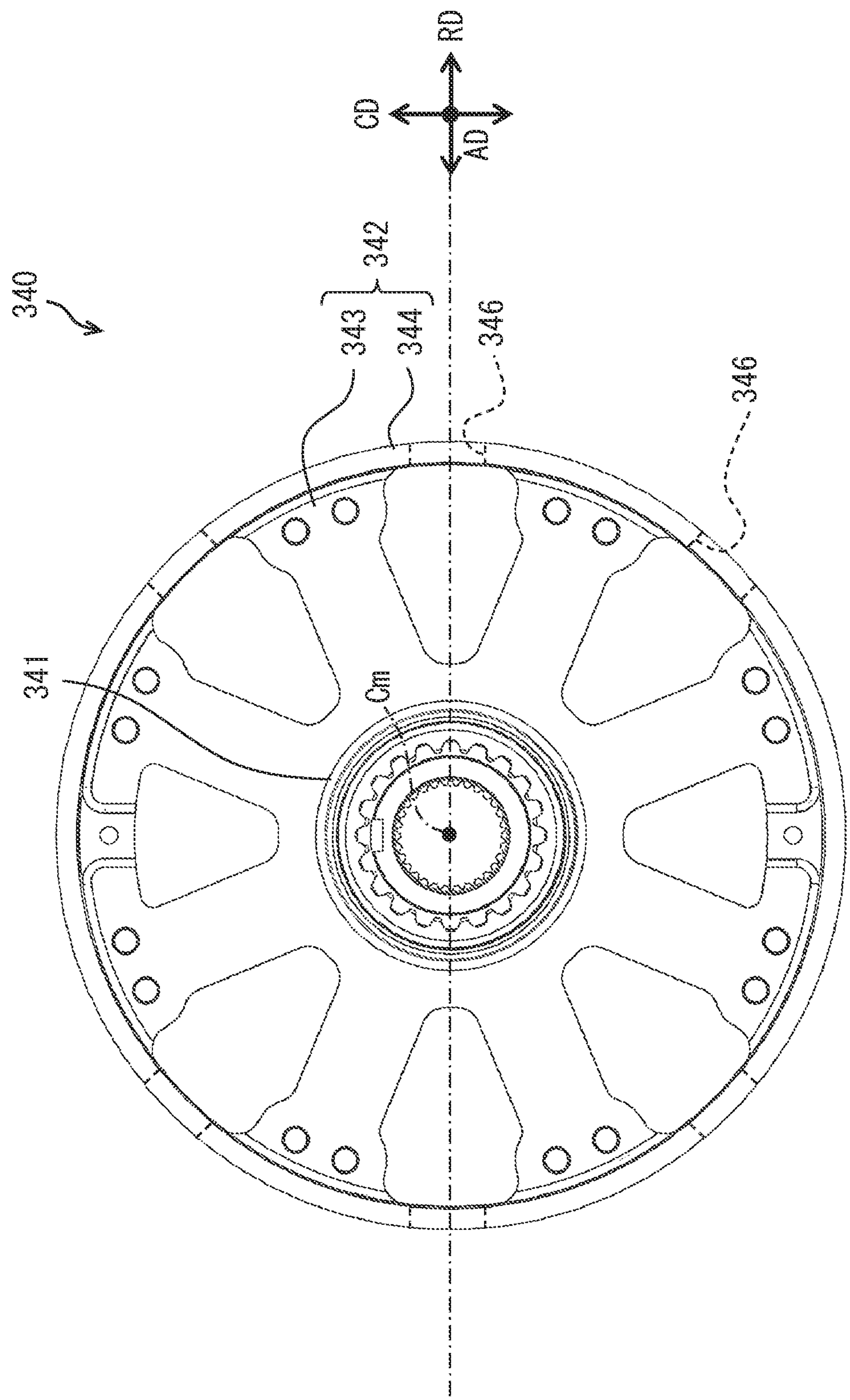
FIG. 70 is a top view of the shaft viewed from the lower side of FIG. 68.
Figure 71:
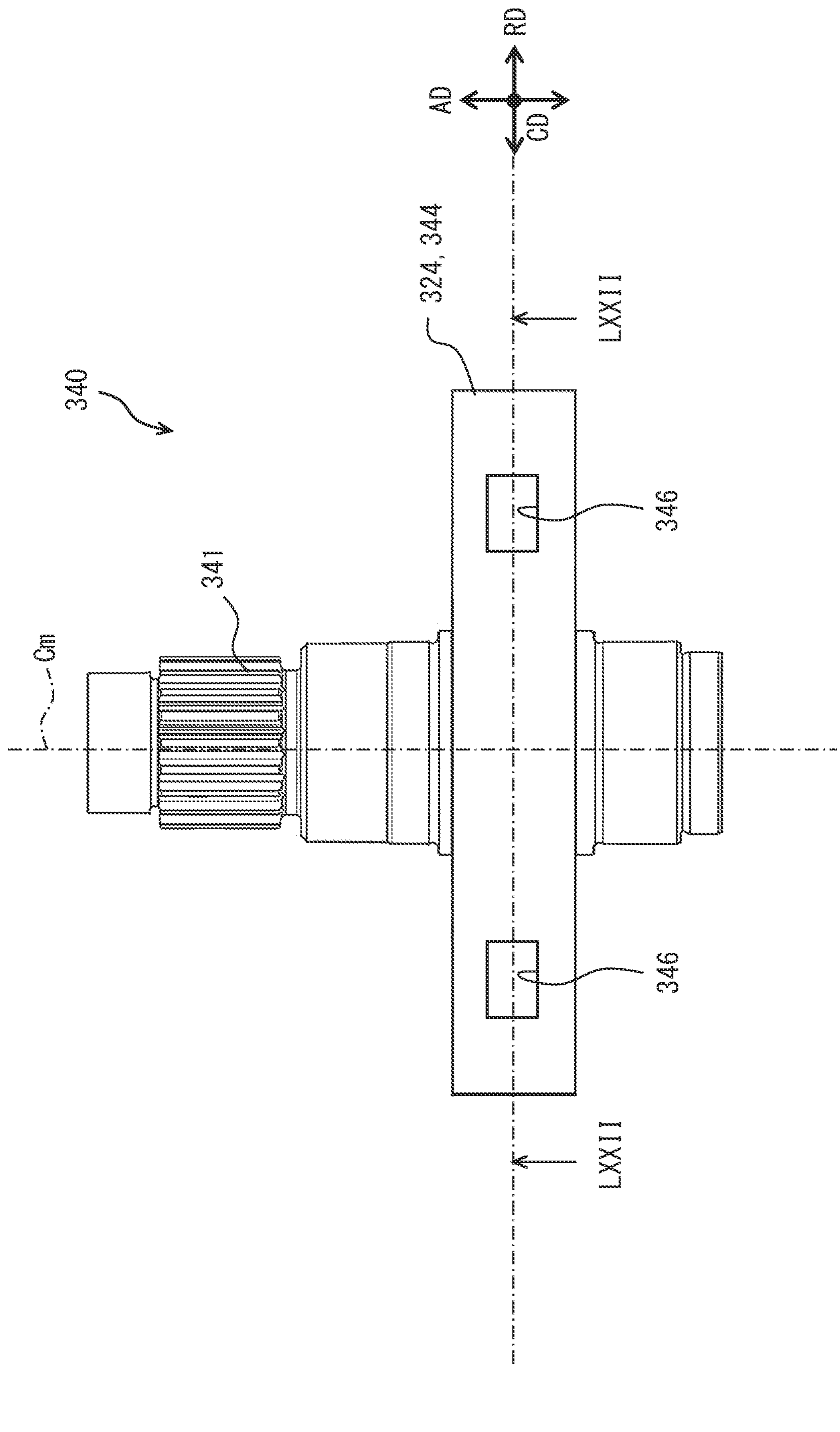
FIG. 71 is a front view of the shaft.
Figure 72:
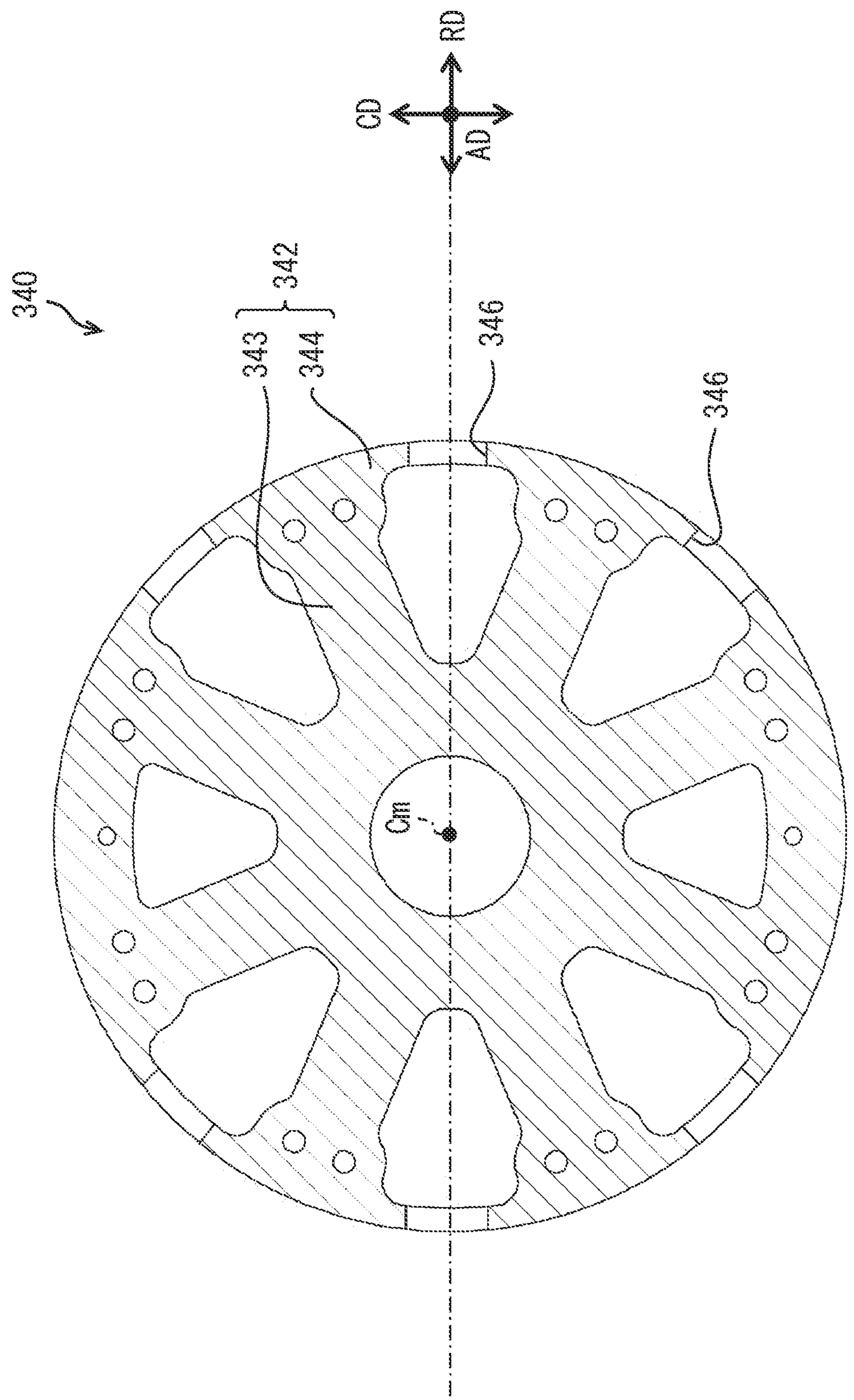
FIG. 72 is a cross-sectional view taken along a line LXXII-LXXII in FIG. 71.

As shown in FIGS. 68 and 69, in the shaft 340, the rim 344 of the shaft flange 342 is formed in a plate shape as a whole. A pair of plate surfaces of the rim 344 face the radial direction RD. A thickness direction of the rim 344 is the radial direction RD. The rim 344 extends in an annular shape in the circumferential direction CD and corresponds to an annular portion. The rim 344 forms an outer peripheral end of the shaft flange 342. The rim 344 is in a state of spanning the first rotor 300*a* and the second rotor 300*b* in the axial direction AD.

As shown in FIG. 68, the rim 344 is provided inside the stator 200. The rim 344 is located at a position separated from the stator 200 toward the radially inner side. The rim 344 is in a state of partitioning an inner space of the stator 200 in the radial direction RD. The inner space of the stator 200 is a space that exists on the radially inner side of the coil protection portion 250. The inner space may be referred to as an inner region. The rim 344 extends along the inner peripheral surface of the coil protection portion 250 in the axial direction AD. In the axial direction AD, a height dimension of the rim 344 and a height dimension of the coil protection portion 250 are substantially the same.

As shown in FIGS. 69, 70, 71, and 72, the shaft flange 342 has flange vent holes 346. Each of the flange vent holes 346 is formed in the rim 344 and penetrates the rim 344 in the radial direction RD. The flange vent hole 346 is located at a position separated from both of the pair of rim tip portions 344*a* in the axial direction AD. For example, the flange vent hole 346 is formed at an intermediate position of the rim 344 in the axial direction AD.

Multiple flange vent holes 346 are arranged in the circumferential direction CD. In the shaft flange 342, the flange vent hole 346 and the spoke 343 are arranged in the circumferential direction CD. The flange vent hole 346 is formed between two spokes 343 adjacent to each other in the circumferential direction CD. The two spokes 343 adjacent to each other with the flange vent hole 346 interposed therebetween in the circumferential direction CD are located at positions separated from the flange vent hole 346.

In FIG. 68, the flange vent hole 346 enables ventilation in the internal space of the motor device 60 in the radial direction RD. The flange vent hole 346 establishes communication between a space radially inward with respect to the rim 344 and a space radially outward with respect to the rim 344. In the inner space of the coil protection portion 250, the heat of the stator 200 is easily released to the inside of the rim 344 through the flange vent hole 346. The stator 200 is easily cooled by air as a gas flowing through the flange vent hole 346 in the radial direction RD. Inside the motor housing 70, air convection in the radial direction RD is likely to occur through the flange vent hole 346.

<Configuration Group Dc>

Figure 73:
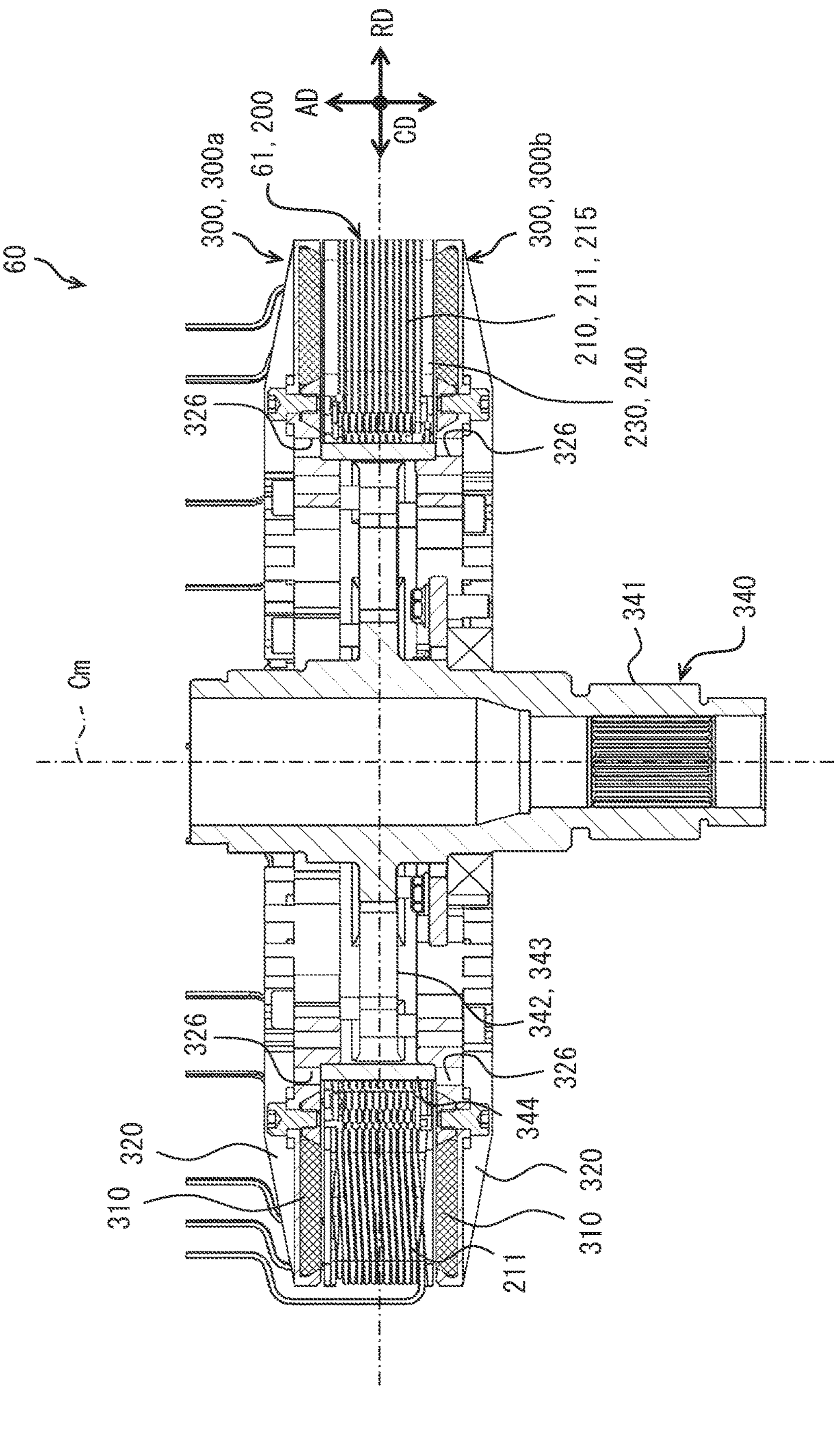
FIG. 73 is a vertical cross-sectional view of a rotor and a stator in a configuration group Dc.
Figure 74:
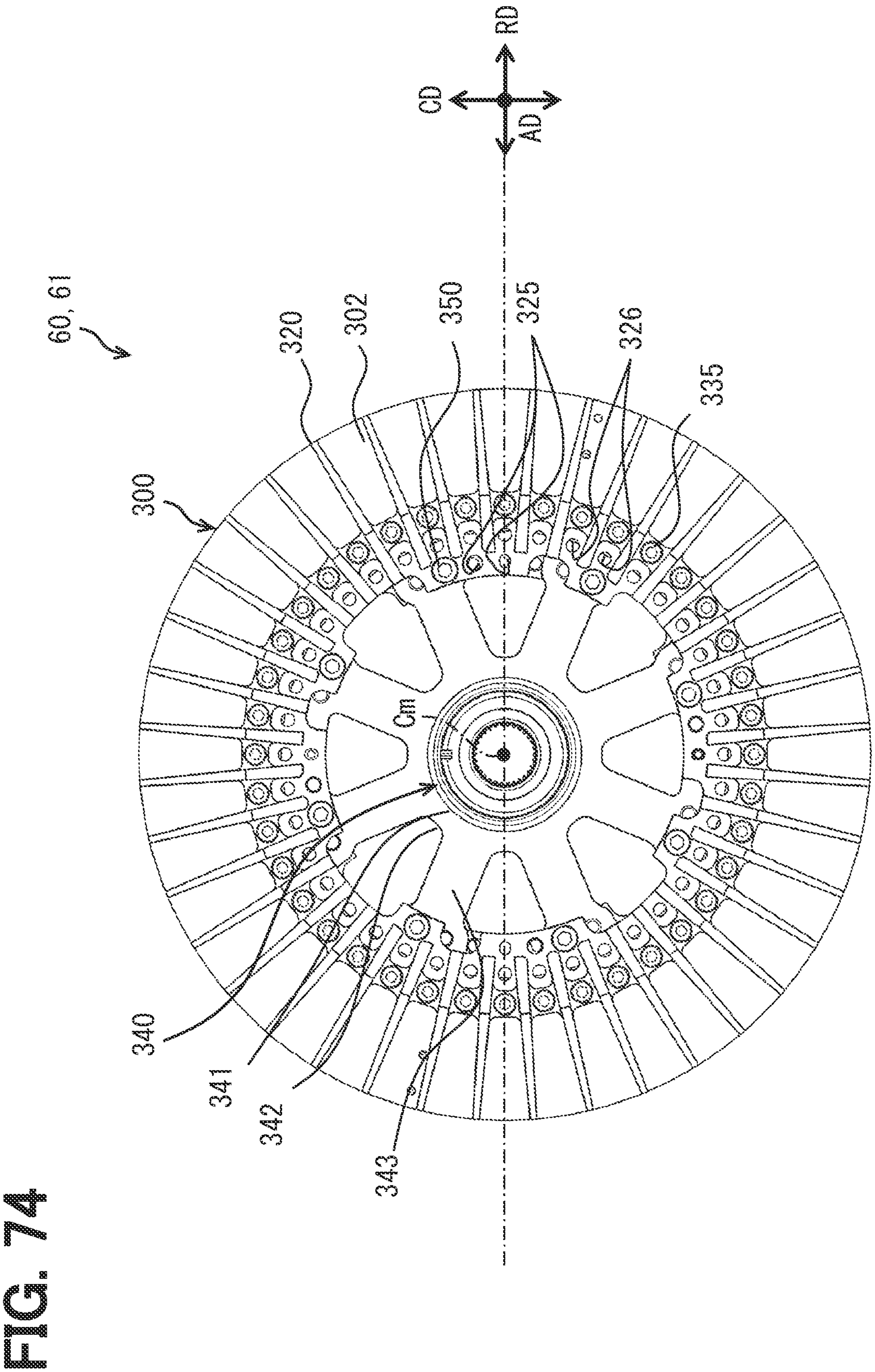
FIG. 74 is a top view of the rotor viewed from a second rotor surface side.

As shown in FIGS. 73 and 74, the rotor 300 has holder adjustment holes 326. Each of the holder adjustment holes 326 is formed in the magnet holder 320. The holder adjustment hole 326 penetrates the rotor 300 in the axial direction AD by penetrating the magnet holder 320 in the axial direction AD. The holder adjustment hole 326 is formed radially inward with respect to the magnet 310. For example, the holder adjustment hole 326 is formed between the holder fixing hole 325 and the magnet fixing tool 335 in the radial direction RD. Multiple holder adjustment holes 326 are arranged in the circumferential direction CD. The holder adjustment holes 326 are arranged, for example, in the same number as the magnet fixing tools 335.

In the rotor 300, the center of gravity may deviate from the motor axis Cm in the radial direction RD and the rotor 300 may be out of balance. In the rotor 300, a weight member is attached to the magnet holder 320 to maintain balance. The weight member attached to the rotor 300 is inserted into any of the multiple holder adjustment holes 326 according to a balance state of the rotor 300. The weight member is fixed to the holder adjustment hole 326 by being fitted into the holder adjustment hole 326. The balance of the rotor 300 includes static balance in a state in which the rotor 300 is not rotating and rotation balance in a state in which the rotor 300 is rotating. The holder adjustment hole 326 corresponds to a balance adjustment hole.

A part of the holder adjustment hole 326 is in a state of being closed by the rim 344 in the axial direction AD. The weight member is inserted into the holder adjustment hole 326 from the second rotor surface 302 in the axial direction AD. The rim 344 blocks a part of the holder adjustment hole 326 to restrict the weight member from falling out of the holder adjustment hole 326 to the first rotor surface 301.

In FIG. 73, the magnet holder 320 is in a state of partitioning the internal space of the motor housing 70 in the axial direction AD in both the first rotor 300*a* and the second rotor 300*b*. For example, the magnet holder 320 of the first rotor 300*a* is in a state of partitioning the internal space of the motor housing 70 into a space on the rear frame 370 side and a space on a stator 200 side. The magnet holder 320 of the second rotor 300*b* is in a state of partitioning the internal space of the motor housing 70 into a space on the stator 200 side and a space on a drive frame 390 side.

The holder adjustment hole 326 enables ventilation in the internal space of the motor device 60 in the axial direction AD. The holder adjustment hole 326 establishes communication between the two spaces that are partitioned in the axial direction AD by the magnet holder 320. Therefore, the heat of the stator 200 is easily released in the axial direction AD through the holder adjustment hole 326. The stator 200 is easily cooled by air flowing through the holder adjustment hole 326 in the axial direction AD. Inside the motor housing 70, air convection in the axial direction AD is likely to occur through the holder adjustment hole 326.

For example, the holder adjustment hole 326 of the first rotor 300*a* establishes communication between the space on the rear frame 370 side relative to the first rotor 300*a* and the space on the stator 200 side relative to the first rotor 300*a*. Therefore, the heat of the stator 200 is easily released toward the rear frame 370 through the holder adjustment hole 326 of the first rotor 300*a*. The holder adjustment hole 326 of the second rotor 300*b* establishes communication between a space on the stator 200 side relative to the second rotor 300*b* and a space on the drive frame 390 side relative to the second rotor 300*b*. Therefore, the heat of the stator 200 is easily released toward the drive frame 390 through the holder adjustment hole 326 of the second rotor 300*b*.

<Configuration Group Dd>

Figure 75:
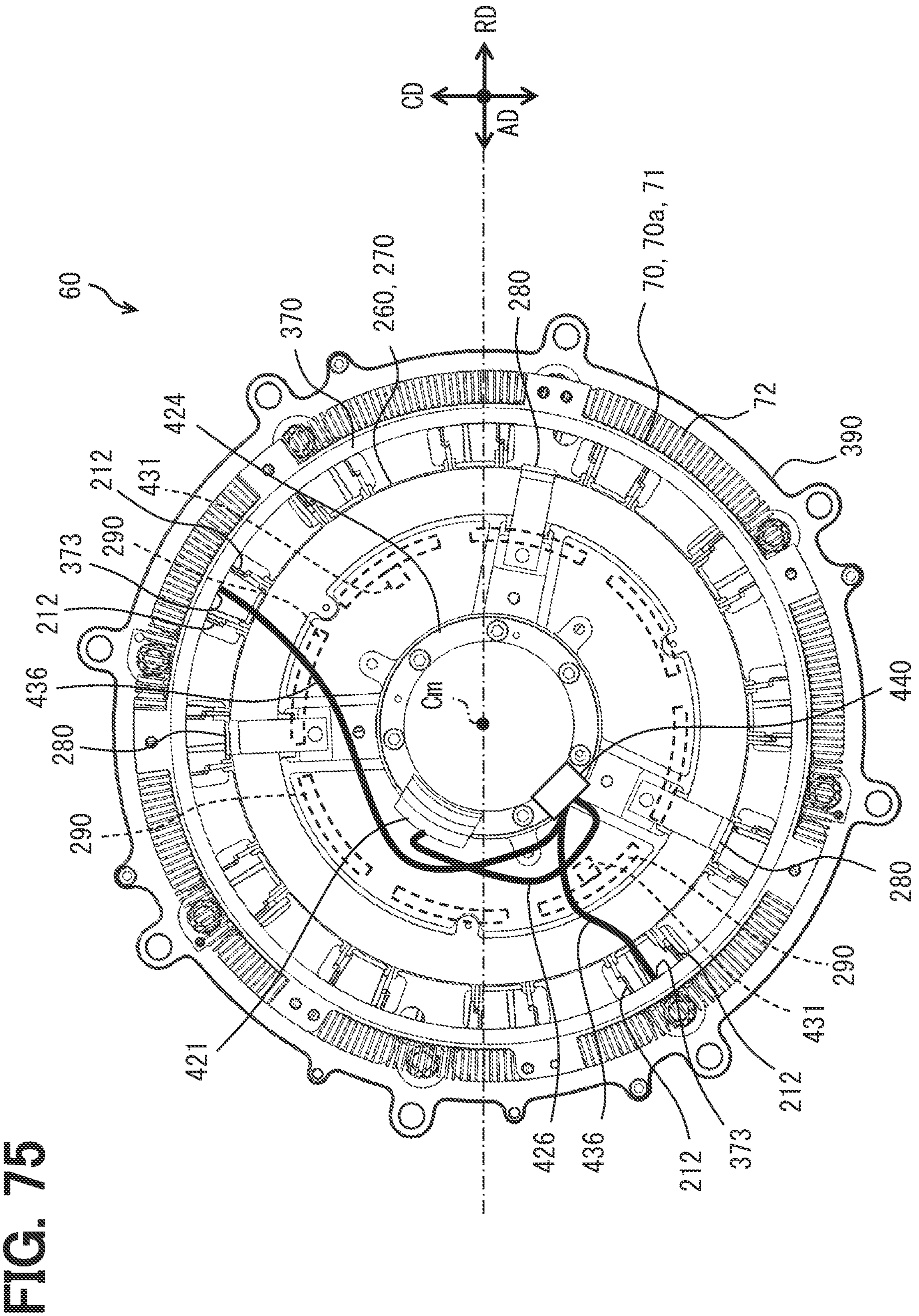
FIG. 75 is a top view of a motor device in a configuration group Dd.

As shown in FIG. 75, the rear frame 370 includes frame opening portions 373. The frame opening portion 373 penetrates the rear frame 370 in the axial direction AD. The frame opening portion 373 is an opening portion that opens the rear frame 370 in the axial direction AD. The frame opening portion 373 is provided radially outward with respect to the busbar unit 260 in the radial direction RD. Multiple frame opening portions 373 are arranged in the circumferential direction CD.

The electric power lead-out wire 212 is inserted through the frame opening portion 373 in the axial direction AD. The electric power lead-out wire 212 is led out toward the electric power busbar 261 through the frame opening portion 373. In the electric power lead-out wire 212, a portion led out from the frame opening portion 373 is electrically connected to the electric power busbar 261. At least one electric power lead-out wire 212 is inserted through the frame opening portion 373.

In the motor device unit 50, the rear frame 370 and the resolver cover 424 are in a state of partitioning the interior of the unit housing 51 into an inverter device 80 side and a motor device 60 side. The rear frame 370 and the resolver cover 424 extend in the direction orthogonal to the axial direction AD as a whole. The rear frame 370 and the resolver cover 424 correspond to housing partition portions.

Figure 76:
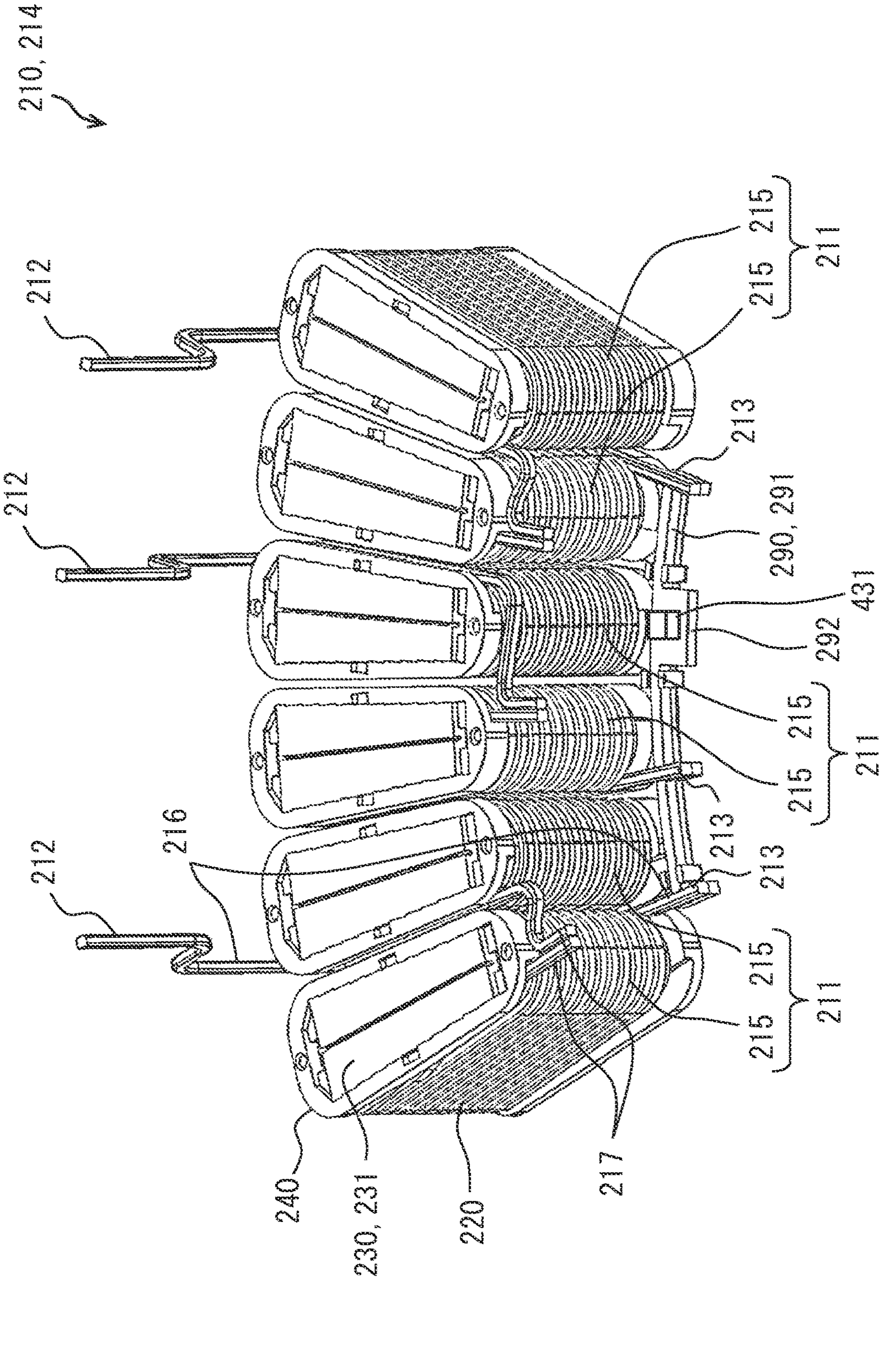
FIG. 76 is a perspective view of a neutral point unit.

As shown in FIGS. 75 and 76, the temperature sensor 431 is provided in, for example, the coil unit 210 of the motor 61. Multiple temperature sensors 431 are provided, for example. The temperature sensors 431 are attached to the neutral point busbar 290. The neutral point busbar 290 includes a busbar main body 291 and a sensor support portion 292. The busbar main body 291 forms a main portion of the neutral point busbar 290. The busbar main body 291 is in a state of spanning multiple coil portions 215 in the neutral point unit 214. The sensor support portion 292 supports the temperature sensor 431. The sensor support portion 292 is, for example, a protruding portion protruding from the busbar main body 291. The temperature sensor 431 is fixed to the sensor support portion 292.

As shown in FIG. 75, the motor device 60 includes a signal terminal block 440. The signal terminal block 440 is provided on a side of the rear frame 370 and the resolver cover 424 facing the inverter device 80 in the axial direction AD. The signal terminal block 440 is attached to at least one of the rear frame 370 and the resolver cover 424. The signal terminal block 440 is aligned with the resolver connector 423 in the direction orthogonal to the axial direction AD.

The motor device 60 includes a signal wiring 426. The signal wiring 426 extends from the resolver connector 423. The signal wiring 426 is a conductive member such as an electric wire, and forms the signal line 425. The signal wiring 426 is electrically connected to the resolver 421 via the resolver connector 423.

The motor device 60 includes a signal wiring 436. The signal wiring 436 extends from the temperature sensor 431. The signal wiring 436 is a conductive member such as an electric wire, and forms the signal line 435. The signal wiring 436 is electrically connected to the temperature sensor 431.

The signal terminal block 440 collects the signal wirings 426 and 436 and corresponds to a wiring collecting portion. The signal wirings 426 and 436 are drawn into the signal terminal block 440. The signal terminal block 440 includes multiple terminal portions and a case accommodating the terminal portions. The signal wirings 426 and 436 drawn into the signal terminal block 440 are electrically connected to the terminal portions, respectively.

Regarding the resolver 421, the signal wiring 426 is in a state of spanning the resolver connector 423 and the signal terminal block 440. The signal wiring 426 extends along the rear frame 370 and the resolver cover 424 on a side of the rear frame 370 and the resolver cover 424 facing the inverter device 80. The resolver 421 can detect a state of the motor device 60 by detecting the rotation angle of the motor 61. The resolver 421 corresponds to a state detection unit, and the signal wiring 426 corresponds to a detection wiring.

Regarding the temperature sensor 431, the signal wiring 436 is in a state of spanning the temperature sensor 431 and the signal terminal block 440. The signal wiring 436 is inserted through the frame opening portion 373, thereby penetrating the rear frame 370 and the resolver cover 424 in the axial direction AD. The temperature sensor 431 can detect the state of the motor device 60 by detecting the temperature of the motor 61. The temperature sensor 431 corresponds to a state detection unit, and the signal wiring 436 corresponds to a detection wiring.

Multiple inverter wirings of the inverter device 80 are drawn into the signal terminal block 440. The multiple inverter wirings include inverter lines that form the signal line 425 together with the signal wiring 426 and form the signal line 435 together with the signal wiring 436. The inverter wirings are electrically connected to the signal wirings 426 and 436 via the terminal portions in the signal terminal block 440. The inverter wirings connected to the signal wirings 426 and 436 are electrically connected to the control device 54 in the inverter device 80, for example.

<Configuration Group De>

Figure 77:
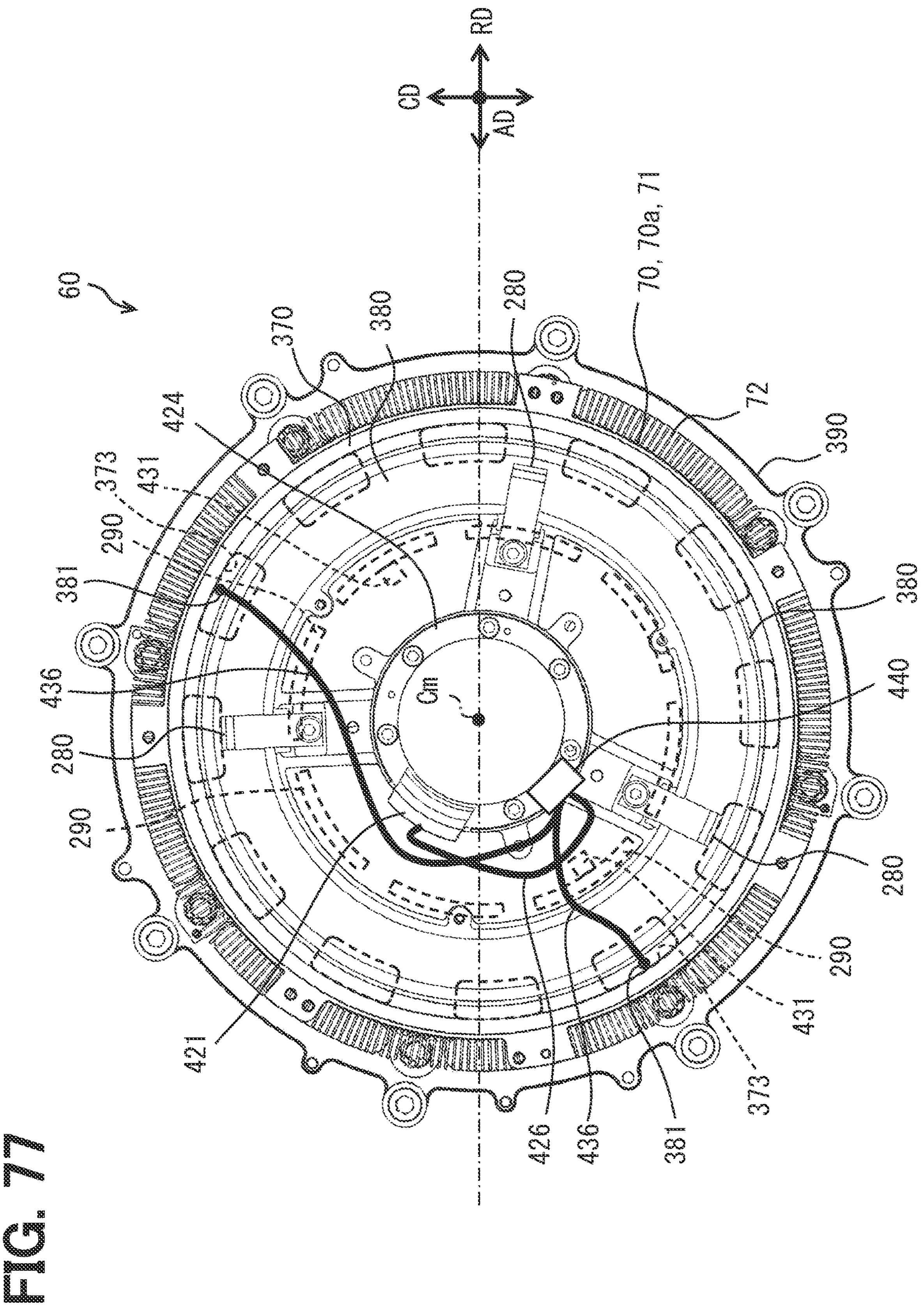
FIG. 77 is a top view of a motor device in a configuration group De.

In FIG. 77, the dustproof cover 380 covers all the frame opening portions 373. The dustproof cover 380 is in a state of spanning the multiple frame opening portions 373 in the circumferential direction CD. The dustproof cover 380 closes the frame opening portion 373 from the inverter device 80 side in the axial direction AD. The dustproof cover 380 restricts a foreign matter from passing through the frame opening portion 373 in the axial direction AD.

The dustproof cover 380 is in a state of covering the electric power lead-out wire 212 and the busbar unit 260 from the inverter device 80 side. The dustproof cover 380 has an electrical insulation property and reduce a decrease in insulation reliability between the electric power lead-out wire 212 and the electric power busbar 261 and the inverter device 80. The dustproof cover 380 is in a state of entering between the busbar unit 260 and the busbar terminal 263 in the axial direction AD.

The signal wiring 436 extending from the temperature sensor 431 penetrates the dustproof cover 380 and is led out toward the inverter device 80. The dustproof cover 380 has wiring holes 381. Each of the wiring holes 381 penetrates the dustproof cover 380 in the axial direction AD. The signal wiring 436 passes through the wiring hole 381 to penetrate the dustproof cover 380. The wiring hole 381 has a size and a shape that are closed by the signal wiring 436. In a state in which the signal wiring 436 passes through the wiring hole 381, it is difficult for the foreign matter to pass through the wiring hole 381. The wiring hole 381 is formed in the dustproof cover 380 at a position closer to an outer peripheral edge than to an inner peripheral edge. Multiple wiring holes 381 are formed in the dustproof cover 380. One signal wiring 436 passes through one wiring hole 381.

The rear frame 370 and the resolver cover 424 correspond to the housing partition portions, and the dustproof cover 380 corresponds to a partition cover. The frame opening portion 373 corresponds to a partition opening portion, and the electric power lead-out wire 212 corresponds to the coil lead-out wire. The signal wiring 436 may pass between the dustproof cover 380 and the rear frame 370 and led out toward the inverter device 80.

<Configuration Group Df>

Figure 78:
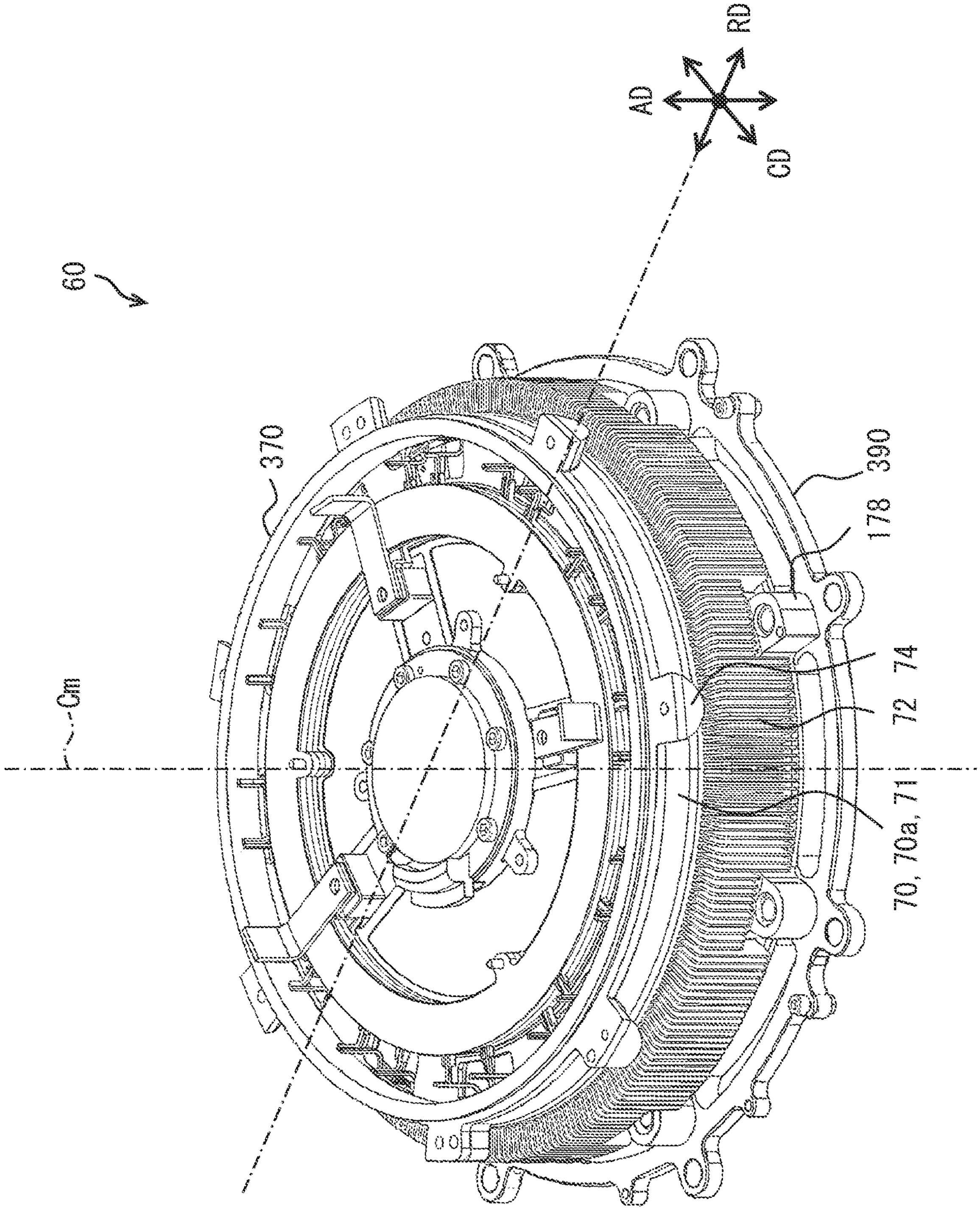
FIG. 78 is a perspective view of a motor device in a configuration group Df.
Figure 79:
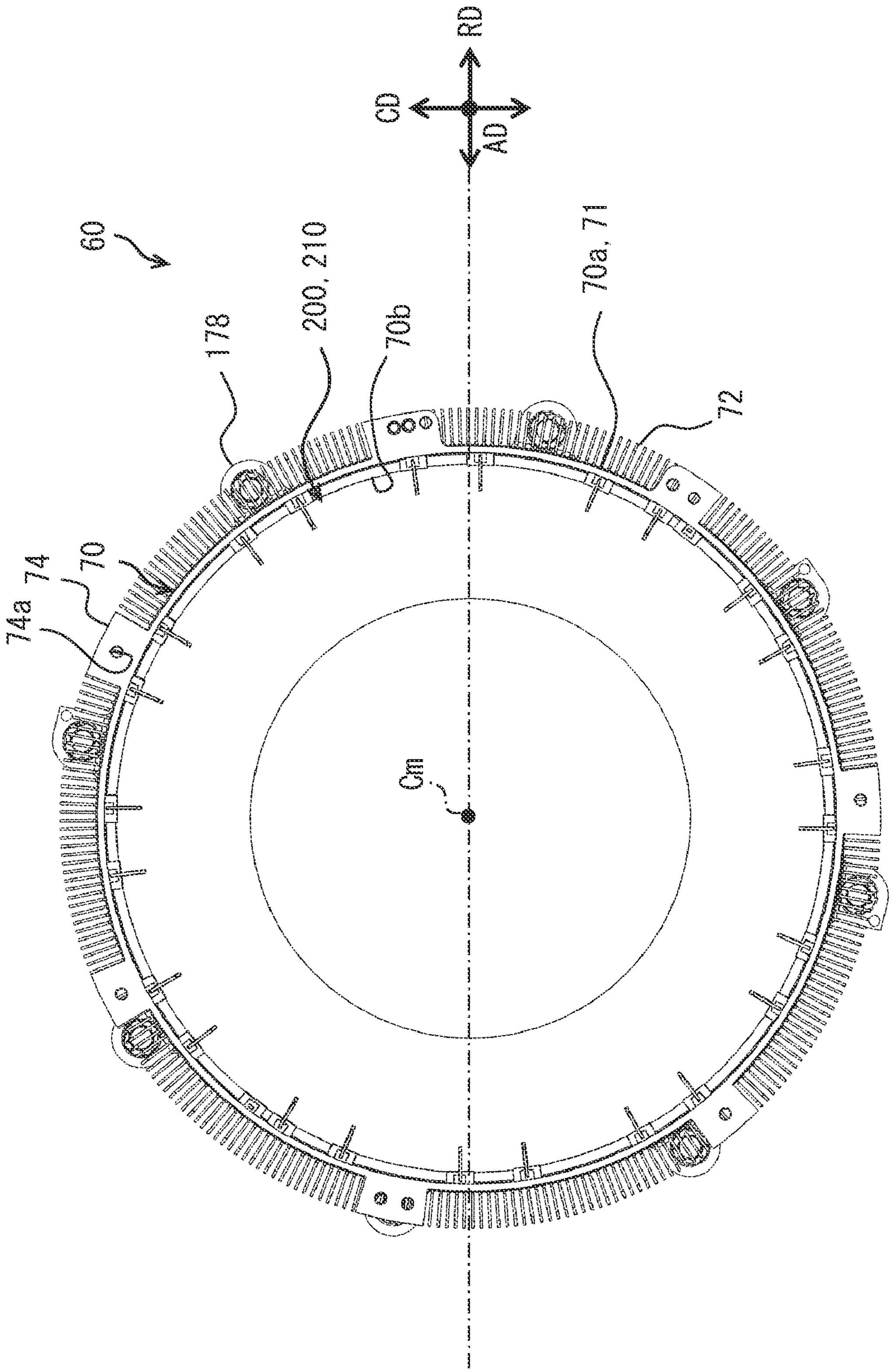
FIG. 79 is a top view of a motor housing and a stator.

As shown in FIGS. 78 and 79, the motor housing 70 includes the connection flanges 74. The connection flange 74 extends from the housing main body 71 toward the radially outer side and corresponds to an electric machine flange. Multiple connection flanges 74 are arranged in the circumferential direction CD.

The connection flange 74 has a flange hole **74*a*. The flange hole 74*a* extends in the axial direction AD. The flange hole 74*a* penetrates the connection flange 74 in the axial direction AD. The flange hole 74*a* is a hole for fixing the motor housing 70 to the inverter housing 90, and corresponds to an electric machine fixing hole. The flange hole 74*a* is formed only in the connection flange 74 of the housing main body 71 and the connection flange 74. The connection flange 74 is connected to the connection flange 94 of the inverter housing 90 by screwing the housing fixing tool 52 into the flange hole 74*a*. The inverter housing 90 is a fixing target to which the motor housing 70 is fixed, and corresponds to a housing fixing target. The connection flange 74** may be referred to as a lug portion.

As described above, in the motor housing 70, the flange hole 74*a* is formed only in the connection flange 74 of the housing main body 71 and the connection flange 74. Therefore, rigidity of the housing main body 71 is not lowered by the flange hole 74*a*. In the motor housing 70, a flange portion in which the connection flange 74 is provided on the housing main body 71 and a non-flange portion in which the connection flange 74 is not provided on the housing main body 71 are alternately arranged in the circumferential direction CD. Even though the flange hole 74*a* is formed in the connection flange 74, a thickness dimension of the flange portion in the radial direction RD is larger than a thickness dimension of the non-flange portion. Rigidity of the flange portion is higher than rigidity of the non-flange portion by an amount corresponding to the thickness dimension of the connection flange 74.

For example, a configuration different from that of the present embodiment is assumed in which a hole for fixing the housing fixing tool 52 is provided in the housing main body 71. In the configuration, the housing main body 71 is thinned by an amount corresponding to forming of the hole for the housing fixing tool 52. Therefore, there is a concern that the rigidity of the housing main body 71 is lowered by the hole for the housing fixing tool 52.

Figure 80:
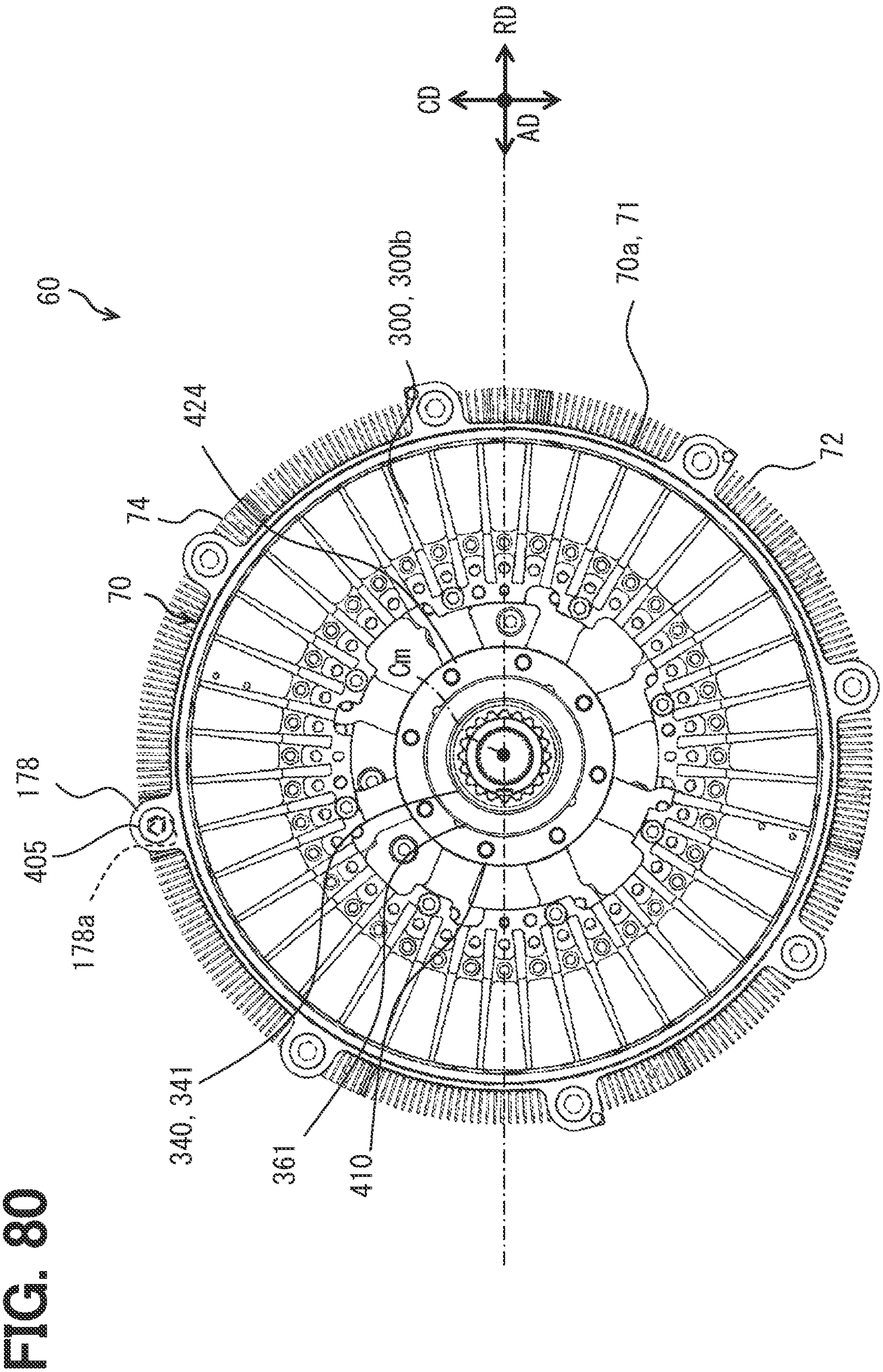
FIG. 80 is a top view of the motor housing viewed from a second rotor side.

As shown in FIGS. 78 and 80, the motor housing 70 includes fixing flanges 178. Each of the fixing flanges 178 is provided on the outer peripheral surface 70*a* of the motor housing 70. The fixing flange 178 protrudes from the housing main body 71 toward the radially outer side and corresponds to the electric machine flange. Multiple fixing flanges 178 are arranged in the circumferential direction CD.

The fixing flange 178 has a flange hole 178*a*. The flange hole 178*a* extends in the axial direction AD. The flange hole 178*a* penetrates the fixing flange 178 in the axial direction AD. The flange hole 178*a* is a hole for fixing the motor housing 70 to the drive frame 390, and corresponds to an electric machine fixing hole. The flange hole 178*a* is formed only in the fixing flange 178 of the housing main body 71 and the fixing flange 178. The fixing flange 178 is fixed to the drive frame 390 by screwing the frame fixing tool 405 into the flange hole 178*a*. The drive frame 390 is a fixing target to which the motor housing 70 is fixed, and corresponds to the housing fixing target. The fixing flange 178 may be referred to as the lug portion. In FIG. 80, an illustration of the drive frame 390 is omitted.

As described above, in the motor housing 70, the flange hole 178*a* is formed only in the fixing flange 178 of the housing main body 71 and the fixing flange 178. Therefore, the rigidity of the housing main body 71 is not lowered by the flange hole 178*a*. In the motor housing 70, a flange portion in which the fixing flange 178 is provided on the housing main body 71 and a non-flange portion in which the fixing flange 178 is not provided on the housing main body 71 are alternately arranged in the circumferential direction CD. Even though the flange hole 178*a* is formed in the fixing flange 178, a thickness dimension of the flange portion in the radial direction RD is larger than a thickness dimension of the non-flange portion. Rigidity of the flange portion is higher than rigidity of the non-flange portion by an amount corresponding to the thickness dimension of the fixing flange 178.

For example, a configuration different from that of the present embodiment is assumed in which a hole for fixing the frame fixing tool 405 is provided in the housing main body 71. In the configuration, the housing main body 71 is thinned by an amount corresponding to forming of the hole for the frame fixing tool 405. Therefore, there is a concern that the rigidity of the housing main body 71 is lowered by the hole for the frame fixing tool 405.

<Configuration Group Dg>

Figure 81:
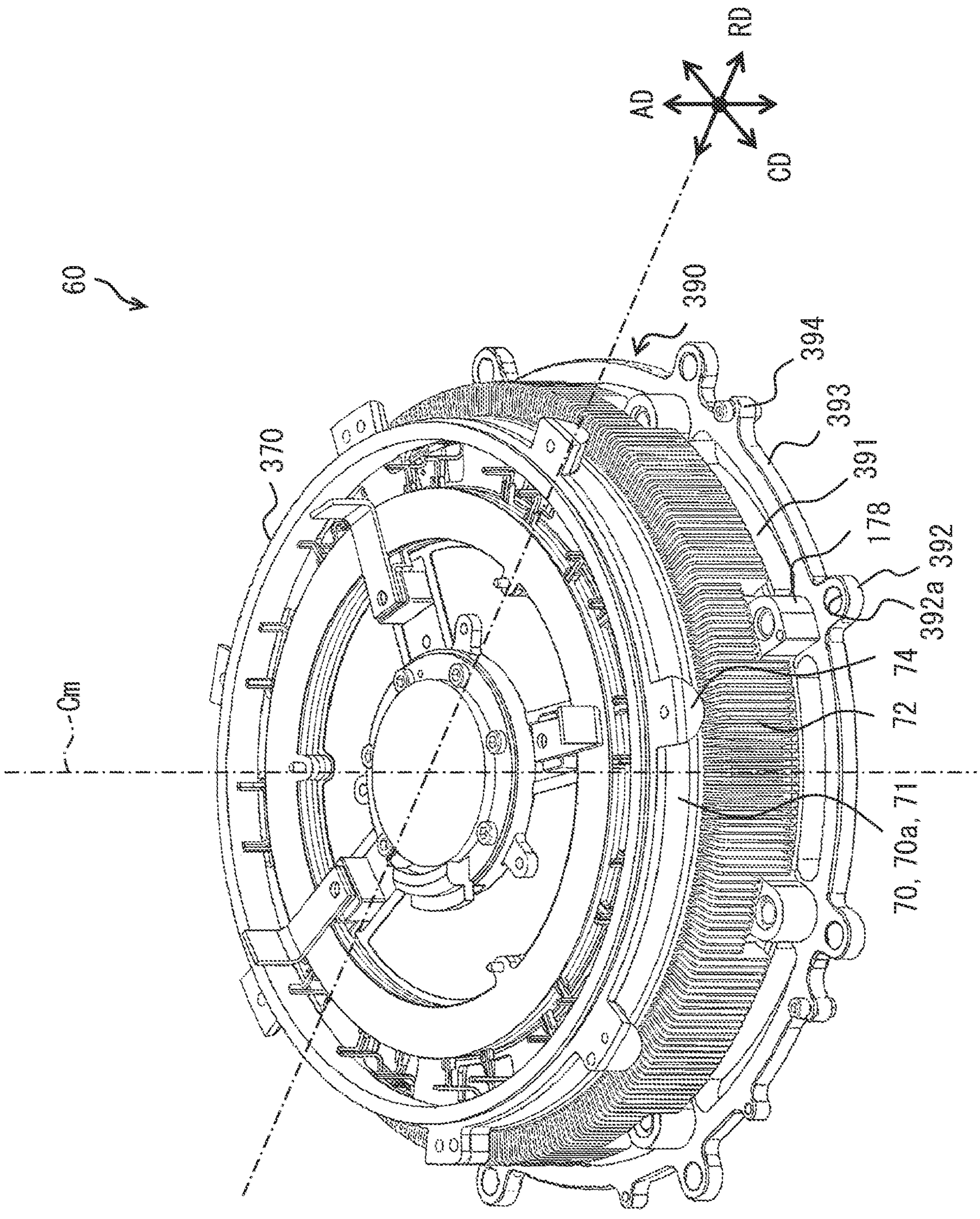
FIG. 81 is a perspective view of a motor device in a configuration group Dg.
Figure 82:
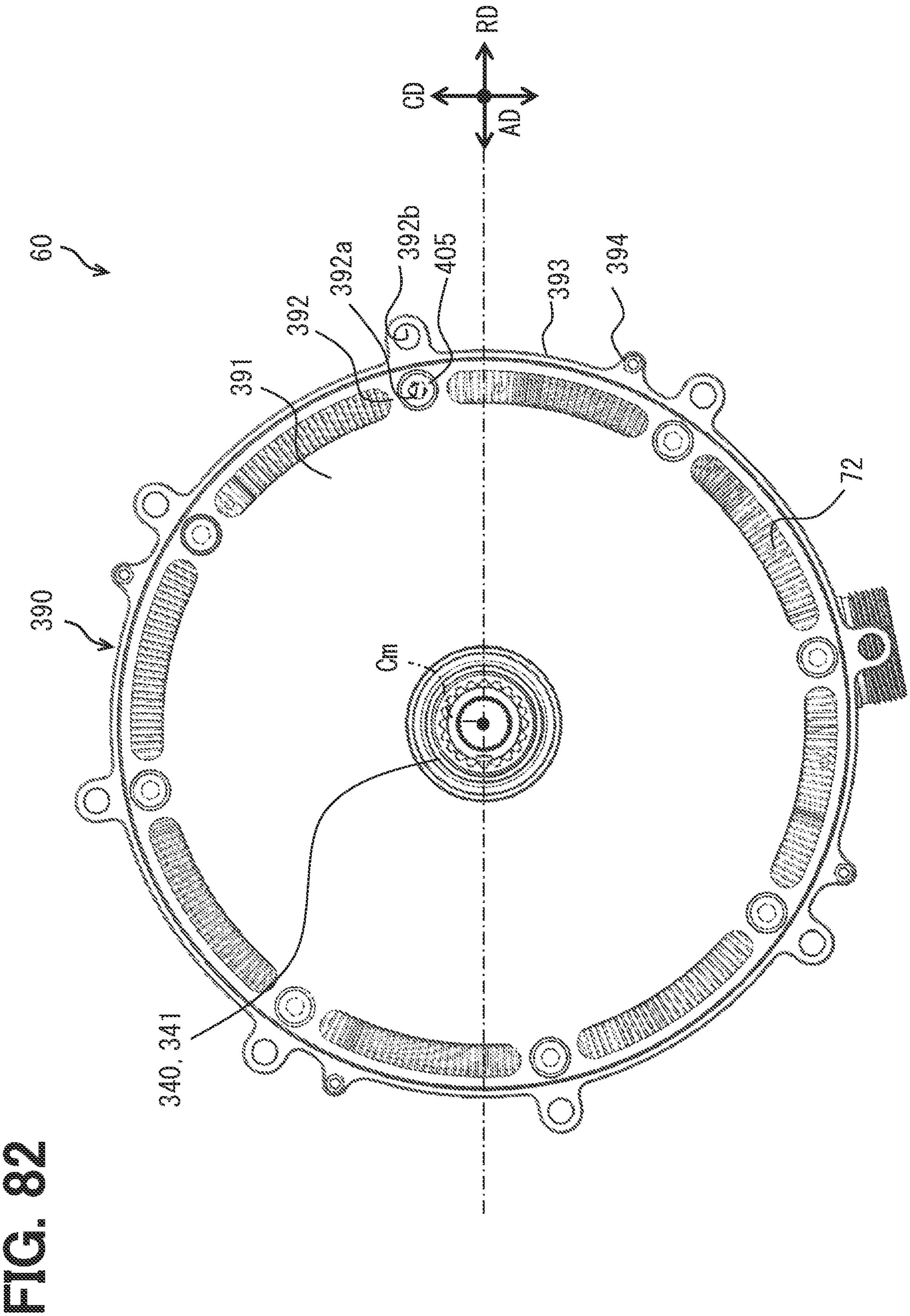
FIG. 82 is a top view of the motor device viewed from a drive frame side.
Figure 83:
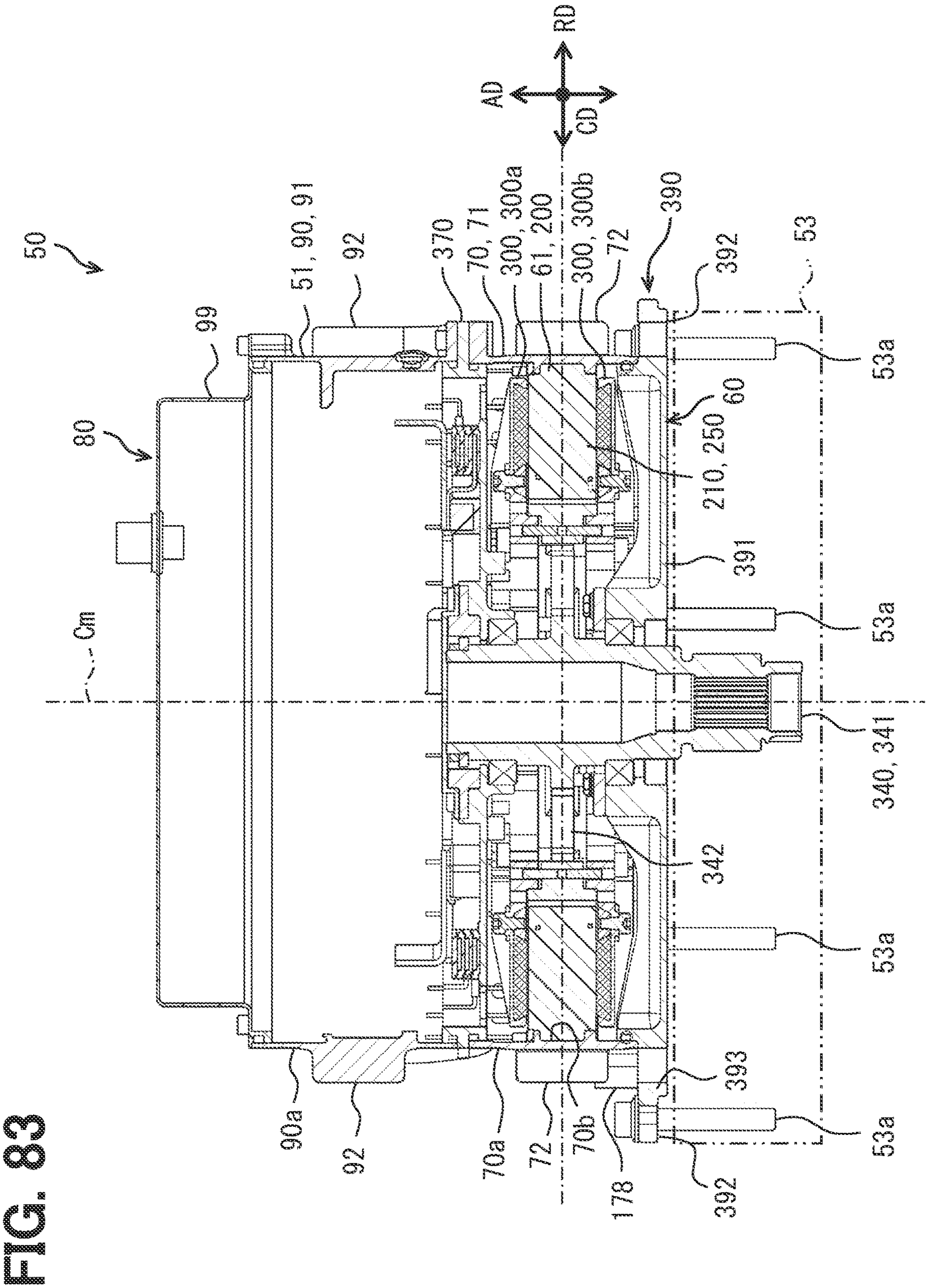
FIG. 83 is a vertical cross-sectional view of a motor device unit.

As shown in FIGS. 81, 82, and 83, the drive frame 390 covers the motor 61 from the side opposite to the inverter device 80 in the axial direction AD. The drive frame 390 is in a state of closing the opening portion of the motor housing 70 from a second rotor 300*b* side. The motor housing 70 corresponds to the electric machine housing, and the drive frame 390 corresponds to an electric machine cover portion.

The drive frame 390 includes a frame main body 391 and fixing flanges 392. The frame main body 391 is formed in a plate shape as a whole and extends in the direction orthogonal to the axial direction AD. The frame main body 391 is in a state of closing the opening portion of the motor housing 70. An outer peripheral edge of the frame main body 391 extends along the outer peripheral surface 70*a* of the motor housing 70 in the circumferential direction CD.

Each of the fixing flanges 392 extends from the frame main body 391 toward the radially outer side. Multiple fixing flanges 392 are arranged in the circumferential direction CD. For example, eight fixing flanges 392 are arranged in the circumferential direction CD. The fixing flange 392 is located at a position aligned with the fixing flange 178 of the motor housing 70 in the axial direction AD.

The fixing flange 392 includes a first fixing hole 392*a* and a second fixing hole 392*b*. Each of the first fixing hole 392*a* and the second fixing hole 392*b* extends in the axial direction AD. Each of the first fixing hole 392*a* and the second fixing hole 392*b* penetrates the fixing flange 392 in the axial direction AD. The first fixing hole 392*a* and the second fixing hole 392*b* are provided only in the fixing flange 392 of the frame main body 391 and the fixing flange 392. The first fixing hole 392*a* and the second fixing hole 392*b* are arranged in the fixing flange 392 in the radial direction RD. The first fixing hole 392*a* is provided radially inward with respect to the second fixing hole 392*b*. The first fixing hole 392*a* is located at a position separated from the second fixing hole 392*b* toward the radially inner side.

The first fixing hole 392*a* is a hole for fixing the drive frame 390 to the motor housing 70. The fixing flange 392 is fixed to the fixing flange 178 of the motor housing 70 by screwing the frame fixing tool 405 into the first fixing hole 392*a*. The fixing flange 392 may be referred to as the lug portion.

The second fixing hole 392*b* is a hole for fixing the drive frame 390 to the speed reducer 53. The fixing flange 392 is fixed to the speed reducer 53 by screwing the speed reducer fixing tool 53*a* into the second fixing hole 392*b*. The speed reducer 53 is a fixing target to which the drive frame 390 is fixed, and corresponds to a cover fixing target.

As described above, in the drive frame 390, the first fixing hole 392*a* and the second fixing hole 392*b* are formed only in the fixing flange 392 of the frame main body 391 and the fixing flange 392. Therefore, rigidity of the frame main body 391 is not lowered by the first fixing hole 392*a* and the second fixing hole 392*b*.

For example, a configuration different from that of the present embodiment is assumed in which holes for fixing the frame fixing tool 405 and the speed reducer fixing tool 53*a* are formed in the frame main body 391. In the configuration, there is a concern that the rigidity of the frame main body 391 is reduced by an amount corresponding to forming of the holes for the frame fixing tool 405 and the speed reducer fixing tool 53*a*.

The drive frame 390 includes outer peripheral frame portions 393 and outer peripheral flanges 394. Each of the outer peripheral frame portions 393 spans two fixing flanges 392 adjacent to each other in the circumferential direction CD, and connects the fixing flanges 392. The outer peripheral frame portion 393 extends along the outer peripheral edge of the frame main body 391 in the circumferential direction CD. Multiple outer peripheral frame portions 393 are arranged in the circumferential direction CD. The outer peripheral frame portion 393 is located at a position separated from the frame main body 391 toward the radially outer side. The outer peripheral frame portion 393 is located at a position separated from a tip portion of the fixing flange 392 toward the radially inner side. The outer peripheral frame portion 393 extends in the circumferential direction CD from a portion of the fixing flange 392 between the first fixing hole 392*a* and the second fixing hole 392*b*.

In the drive frame 390, the fixing flange 392 is in a state of being reinforced by the outer peripheral frame portion 393. Therefore, even if the rigidity of the fixing flange 392 is lowered due to formation of the two holes including the first fixing hole 392*a* and the second fixing hole 392*b*, the rigidity of the fixing flange 392 is compensated by the outer peripheral frame portion 393.

The outer peripheral flange 394 extends from the outer peripheral frame portion 393 toward the radially outer side. The outer peripheral flange 394 is located at a position separated from the fixing flange 392 in the circumferential direction CD. Multiple outer peripheral flanges 394 are arranged in the circumferential direction CD. The outer peripheral flange 394 is fixed to the unit duct 100 (see FIG. 2). A hole for fixing the unit duct 100 is formed in the outer peripheral flange 394. The outer peripheral flange 394 is fixed to the unit duct 100 by screwing a fixing tool such as a bolt into the hole.

<Configuration Group O>

As a cooling method for the motor device unit 50, an air cooling method is used. In the present embodiment, the motor device unit 50 is cooled by a gas such as external air existing outside the motor device unit 50. For example, the motor device 60 is cooled by a gas present outside the motor housing 70. In the motor device 60, heat generated by the motor 61 is released from the motor fins 72 to external air.

Figure 84:
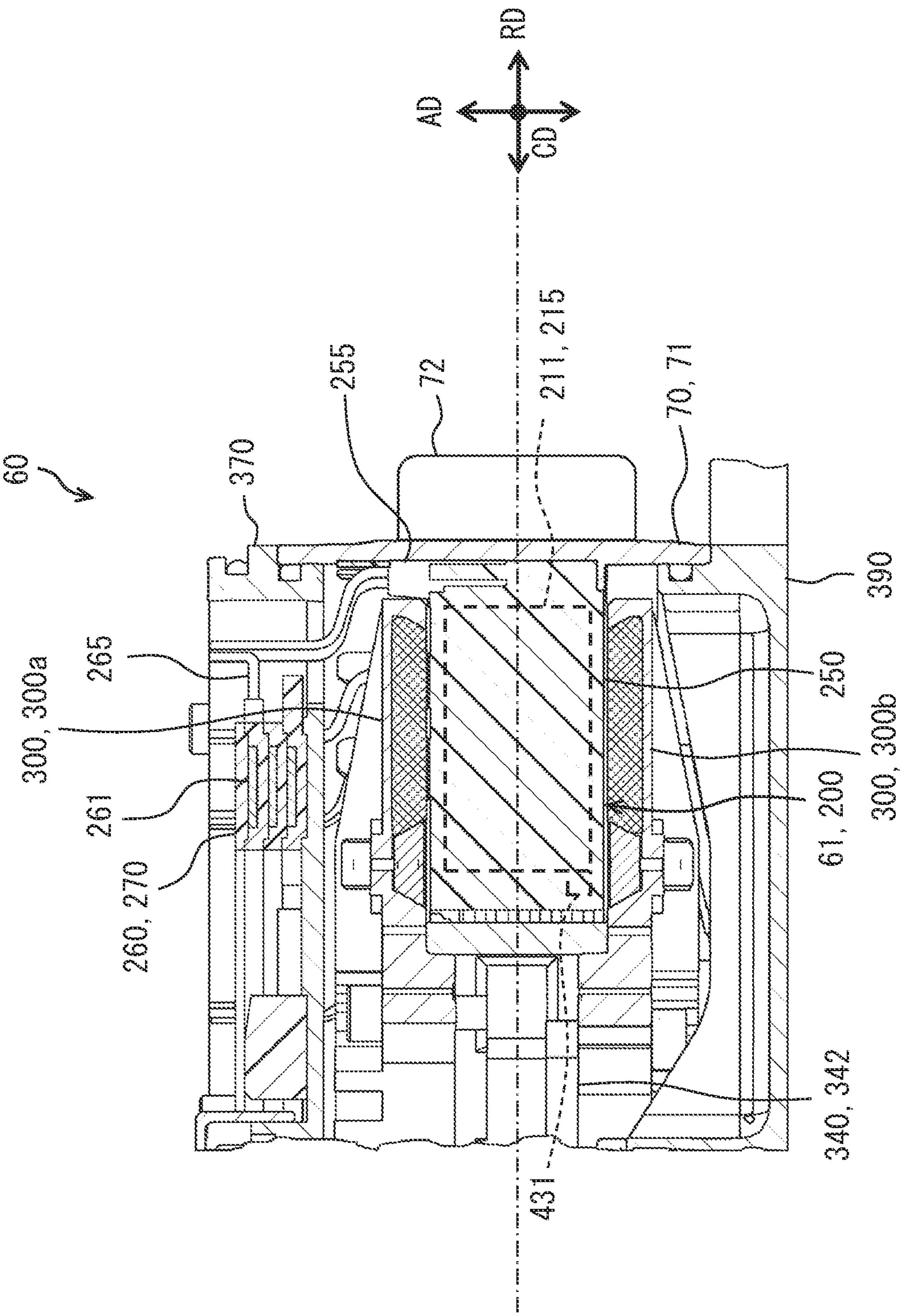
FIG. 84 is a vertical cross-sectional view of a periphery of a temperature sensor in a motor device in a configuration group O.
Figure 85:
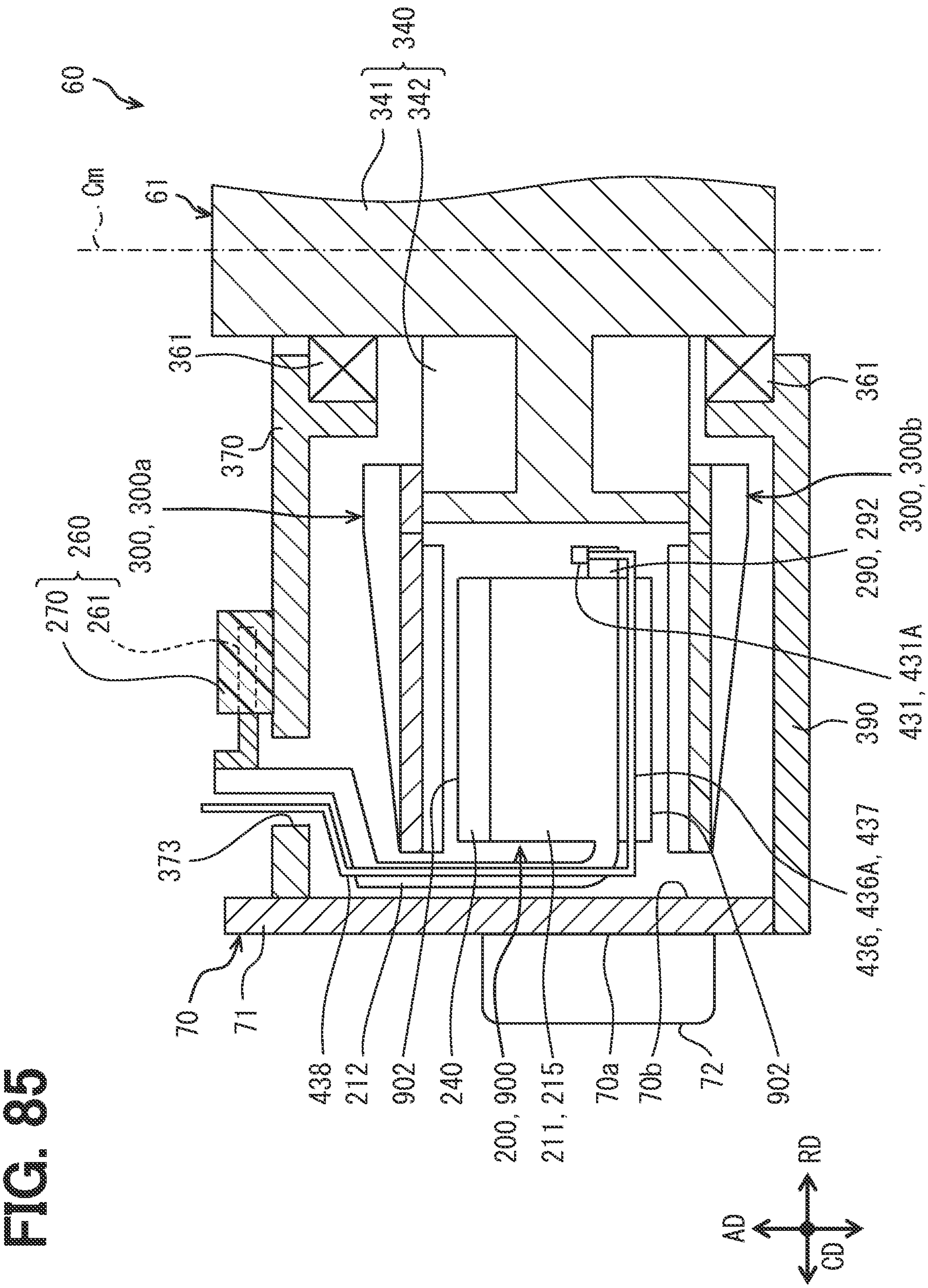
FIG. 85 is a schematic vertical cross-sectional view of the periphery of the temperature sensor in the motor device.
Figure 86:
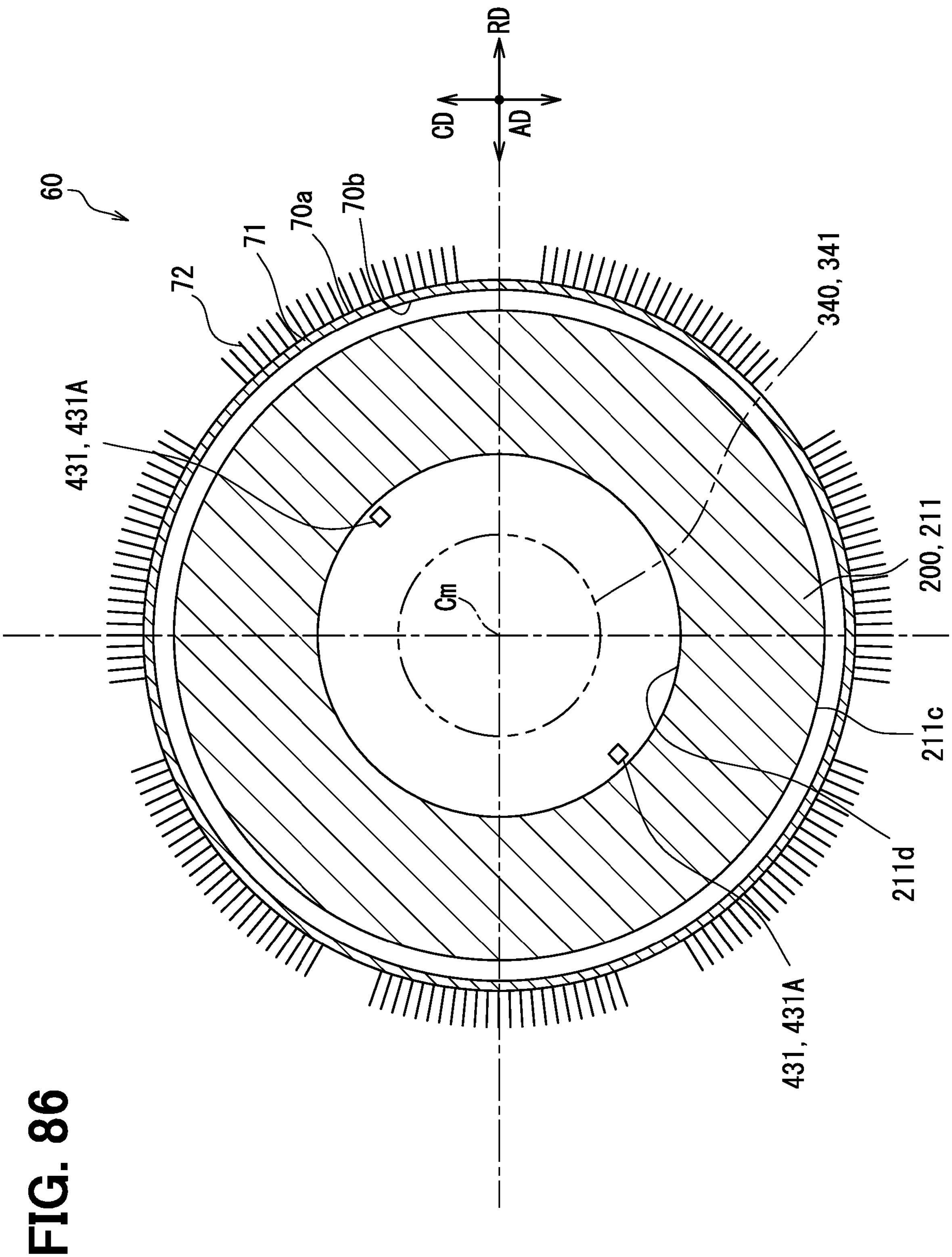
FIG. 86 is a schematic top view showing a stator coil and the temperature sensor of the motor device.

As shown in FIGS. 84 to 86, the motor fin 72 is provided on a radially outer side of a stator coil 211. The motor fin 72 is provided on a motor outer peripheral surface 70*a*, and thus located at a position away from the stator coil 211 toward a radially outer side. The motor fin 72 releases heat of the stator coil 211 and the like to the outside of the motor housing 70. For example, the heat of the stator coil 211 is released to the outside from the motor fin 72 via the coil protection portion 250 and the housing main body 71. The motor fin 72 is not provided on a radially inner side of the stator coil 211.

In the motor device 60, heat radiated from the stator coil 211 toward the radially outer side is more than heat radiated from the stator coil 211 toward the radially inner side. The motor fin 72 accelerates the heat radiation of the stator coil 211 toward the radially outer side such that the heat radiated from the stator coil 211 toward the radially outer side is more than the heat radiated from the stator coil 211 toward the radially inner side. The motor fin 72 corresponds to a heat radiation accelerating portion and an outer peripheral accelerating portion.

The motor fin 72 extends further toward both sides in the radial direction RD than the stator coil 211 extends. The motor fin 72 is in a state of spanning the first rotor 300*a* and the second rotor 300*b* in the radial direction RD. In the radial direction RD, all of the stator coils 211 faces the motor fins 72. In the radial direction RD, a part of the stator coils 211 may not face the motor fins 72. That is, at least a part of the stator coils 211 may face the motor fins 72.

In FIG. 85, illustration of the coil protection portion 250 and the like is omitted. In FIG. 86, illustrations of the coil protection portion 250 and the neutral point busbar 290 are omitted. In the motor housing 70, the outer peripheral surface 70*a* is referred to as the motor outer peripheral surface 70*a*, and the inner peripheral surface 70*b* is referred to as a motor inner peripheral surface 70*b*. The coil 211 may be referred to as the stator coil 211.

As shown in FIGS. 84 to 87, the temperature sensor 431 is provided on a radially inner side of the stator coil 211. The temperature sensor 431 is located on a side opposite to the motor fin 72 in the radial direction RD. The temperature sensor 431 can detect an internal temperature of the motor housing 70. The temperature sensor 431 is provided at a position in contact or close to the stator coil 211. Multiple temperature sensors 431 are arranged in the circumferential direction CD on a radially inner side of the stator coil 211. The temperature sensor 431 detects a coil temperature as the internal temperature of the motor housing 70. The coil temperature is a temperature of the stator coil 211. The temperature sensor 431 corresponds to a temperature detection unit.

The temperature sensor 431 is provided, for example, on the neutral point busbar 290. The neutral point busbar 290 is electrically connected to the stator coil 211. The neutral point busbar 290 is provided between the stator coil 211 and the shaft main body 341 in the radial direction RD. The neutral point busbar 290 is formed by the same material as the coil wire 220. As described above, the neutral point busbar 290 is a member having a plate-shaped conductor covered with an insulator. The conductor of the neutral point busbar 290 is formed by the same material as the wire 223 of the coil wire 220. The neutral point busbar 290 corresponds to an energization busbar.

In the stator 200, the stator coils 211 of multiple phases are arranged in an annular shape in the circumferential direction CD. The stator coils 211 of multiple phases may be simply referred to as stator coils 211. In the stator coils 211 of multiple phases, multiple coil portions 215 are arranged in an annular shape in the circumferential direction CD. The neutral point busbar 290 extends along a coil inner peripheral surface 211*d* in the circumferential direction. The neutral point busbar 290 spans multiple coil portions 215 in the circumferential direction CD.

The stator coil 211 has a coil outer peripheral surface 211*c* and the coil inner peripheral surface 211*d*. The coil outer peripheral surface 211*c* is an outer peripheral surface of the stator coil 211. The coil inner peripheral surface 211*d* is an inner peripheral surface of the stator coil 211. The coil outer peripheral surface 211*c* and the coil inner peripheral surface 211*d* extend in an annular shape in the circumferential direction CD as a whole. In the stator 200, the multiple coil portions 215 are arranged in the circumferential direction CD, and thus the coil outer peripheral surface 211*c* and the coil inner peripheral surface 211*d* intermittently extend in the circumferential direction CD.

The temperature sensor 431 provided on the neutral point busbar 290 may be referred to as a busbar sensor 431A. The busbar sensor 431A is fixed to the neutral point busbar 290 by an adhesive or the like. For example, the busbar sensor 431A is fixed to the sensor support portion 292. The busbar sensor 431A is located at a position separated from the stator coil 211 toward a radially inner side. Multiple busbar sensors 431A are arranged in the circumferential direction CD on a radially inner side of the stator coils 211. Each of the busbar sensors 431A detects a temperature of the neutral point busbar 290 at a position close to the stator coil 211. The busbar sensor 431A detects the temperature of the neutral point busbar 290 as the coil temperature. The busbar sensor 431A is in contact with the neutral point busbar 290. The busbar sensor 431A corresponds to the temperature detection unit, a busbar detection unit, and an inner peripheral detection unit.

The busbar sensor 431A is embedded in the coil protection portion 250. The busbar sensor 431A is also fixed to the neutral point busbar 290 by the coil protection portion 250 in addition to the adhesive or the like. The busbar sensor 431A is not exposed to the outside of the coil protection portion 250. The busbar sensor 431A corresponds to an embedded detection unit. The coil protection portion 250 protects the temperature sensor 431 in addition to the stator coil 211. At least a part of the temperature sensor 431 may be embedded in the coil protection portion 250. That is, a part of the temperature sensor 431 may be exposed from the coil protection portion 250.

The neutral point busbar 290 is embedded in the coil protection portion 250 together with the busbar sensor 431A. In the neutral point busbar 290, both the busbar main body 291 and the sensor support portion 292 are embedded in the coil protection portion 250. As long as the busbar sensor 431A is embedded in the coil protection portion 250, at least a part of the busbar sensor 431A may not be embedded in the coil protection portion 250.

Figure 87:
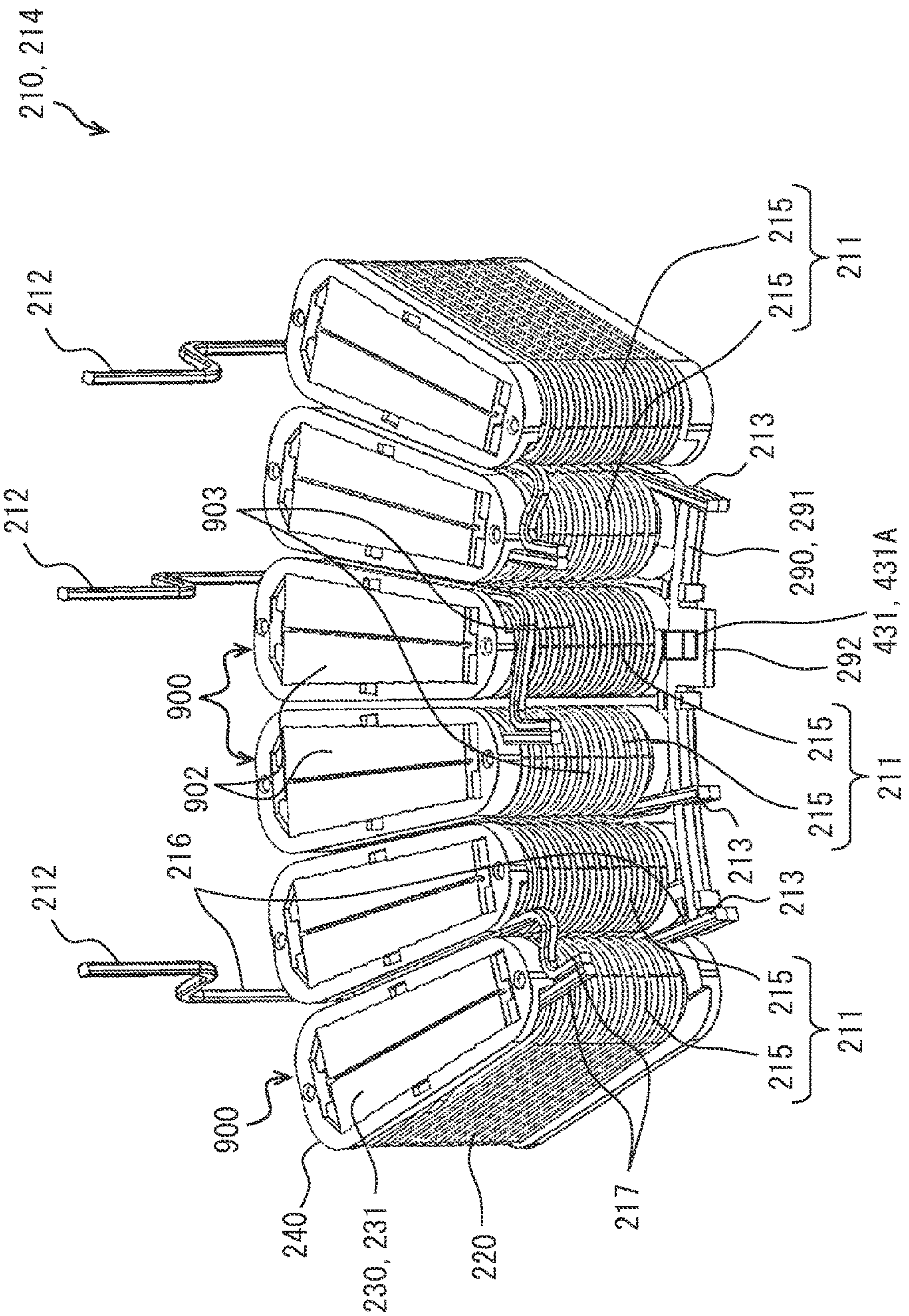
FIG. 87 is a perspective view of a neutral point unit.

As shown in FIGS. 85 and 87, the stator 200 includes coil bodies 900. Each of the coil bodies 900 is provided in the coil unit 210. The coil body 900 includes the coil portion 215 and the core unit 230. Multiple coil bodies 900 are arranged along the motor inner peripheral surface 70*b* in the circumferential direction CD. The coil bodies 900 extend in a columnar shape in the axial direction AD as a whole. The coil body 900 includes the wound coil wire 220 as the coil portion 215. The multiple coil bodies 900 are arranged in the circumferential direction CD such that the stator coils 211 are formed by the respective coil wires 220.

The coil body 900 has coil body end surfaces 902 and a coil body outer peripheral surface 903. The coil body end surfaces 902 and the coil body outer peripheral surface 903 are provided on the coil body 900. The coil body end surfaces 902 are end surfaces of the coil body 900 and are arranged in pair in the axial direction AD. The coil body end surface 902 extends in a direction orthogonal to the axial direction AD. The coil body end surface 902 includes an end surface of the core 231 and an end surface of the bobbin 240.

The coil body outer peripheral surface 903 is an outer peripheral surface of the coil body 900 and extends in a winding direction of the coil portion 215. The coil body outer peripheral surface 903 is provided between the pair of coil body end surfaces 902. The coil body outer peripheral surface 903 extends in the axial direction AD to span the pair of coil body end surfaces 902. The coil body outer peripheral surface 903 includes an outer peripheral surface of the coil portion 215 and an outer peripheral surface of the bobbin 240.

The temperature sensor 431 is provided at a position aligned with the coil body 900 in the radial direction RD. The temperature sensor 431 is located at a position at which the temperature sensor 431 does not protrude from the coil body 900 in the axial direction AD. The temperature sensor 431 is provided between the pair of coil body end surfaces 902 in the axial direction AD. For example, the coil portion 215 and at least a part of the temperature sensor 431 are aligned in the radial direction RD.

The neutral point busbar 290 is provided at a position aligned with the stator coil 211 in the radial direction RD. The neutral point busbar 290 is located at a position at which the neutral point busbar 290 does not protrude from the coil body 900 in the axial direction AD. The neutral point busbar 290 is provided between the pair of coil body end surfaces 902 in the axial direction AD. For example, the coil portion 215 and at least a part of the neutral point busbar 290 are aligned in the radial direction RD.

Figure 88:
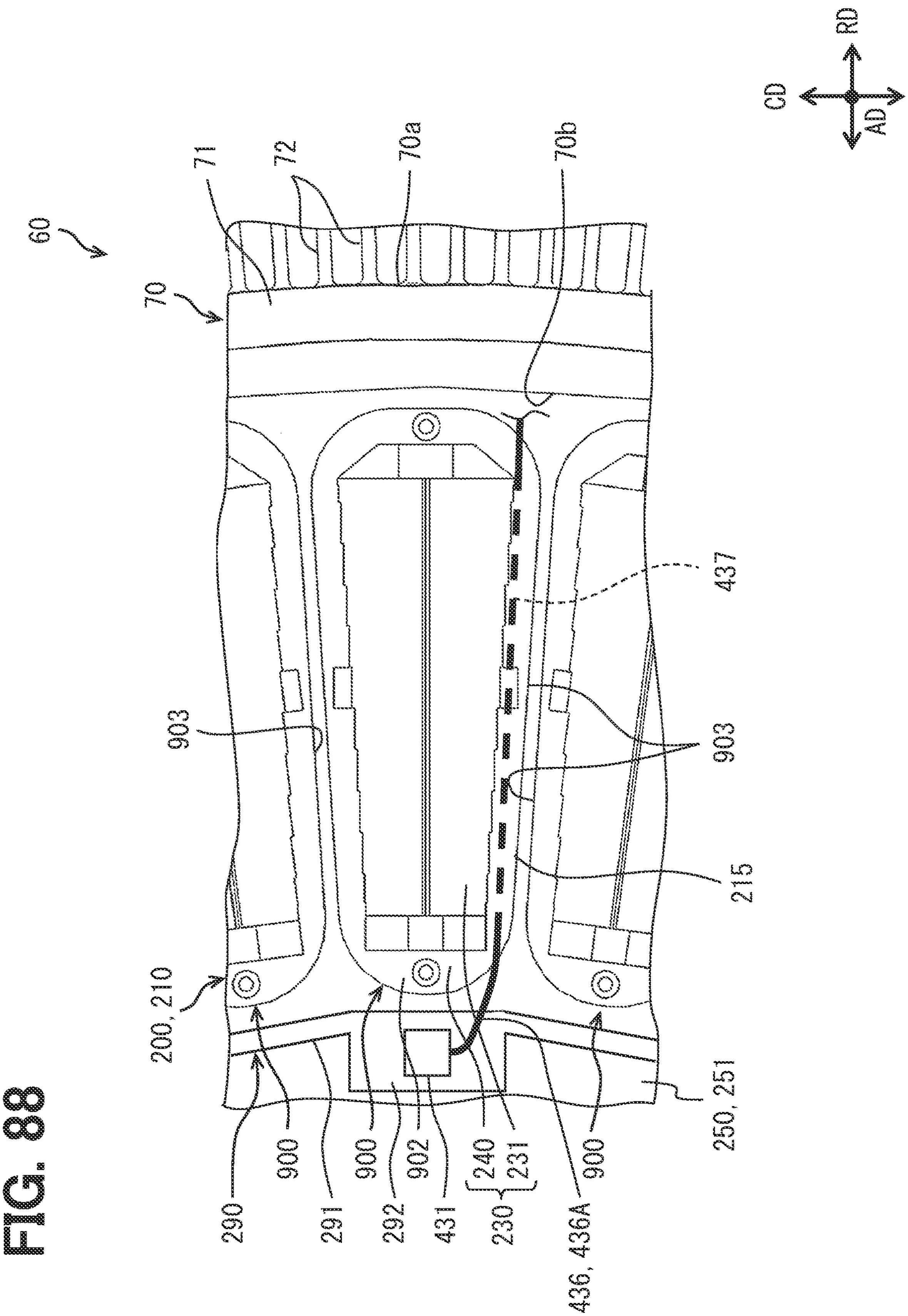
FIG. 88 is a top view of the periphery of the temperature sensor in the motor device.

As shown in FIGS. 85 and 88, a temperature signal wiring 436 is communicably connected to the temperature sensor 431. The signal wiring 436 may be referred to as the temperature signal wiring 436. A detection signal of the temperature sensor 431 can be output through the temperature signal wiring 436. The temperature sensor 431 and the control device 54 can communicate with each other via the temperature signal wiring 436 and the signal terminal block 440.

The temperature signal wiring 436 is communicably connected to the busbar sensor 431A. The temperature signal wiring 436 extends toward a radially outer side of the stator coil 211 from the busbar sensor 431A to traverse the stator coil 211 in the radial direction RD. The temperature signal wiring 436 traverses the stator coil 211 in the radial direction RD passing between two coil bodies 900 adjacent to each other in the circumferential direction CD. The temperature signal wiring 436 is extended from a radially outer side of the stator coil 211 in the axial direction AD, thus led out from the rear frame opening portion 373 toward the signal terminal block 440. The temperature signal wiring 436 corresponds to a temperature communication line.

The temperature signal wiring 436 includes a transversal line portion 437 and a lead-out line portion 438. The lead-out line portion 438 is a portion of the temperature signal wiring 436 which is led out from the radially outer side of the stator coil 211 toward the signal terminal block.

Figure 89:
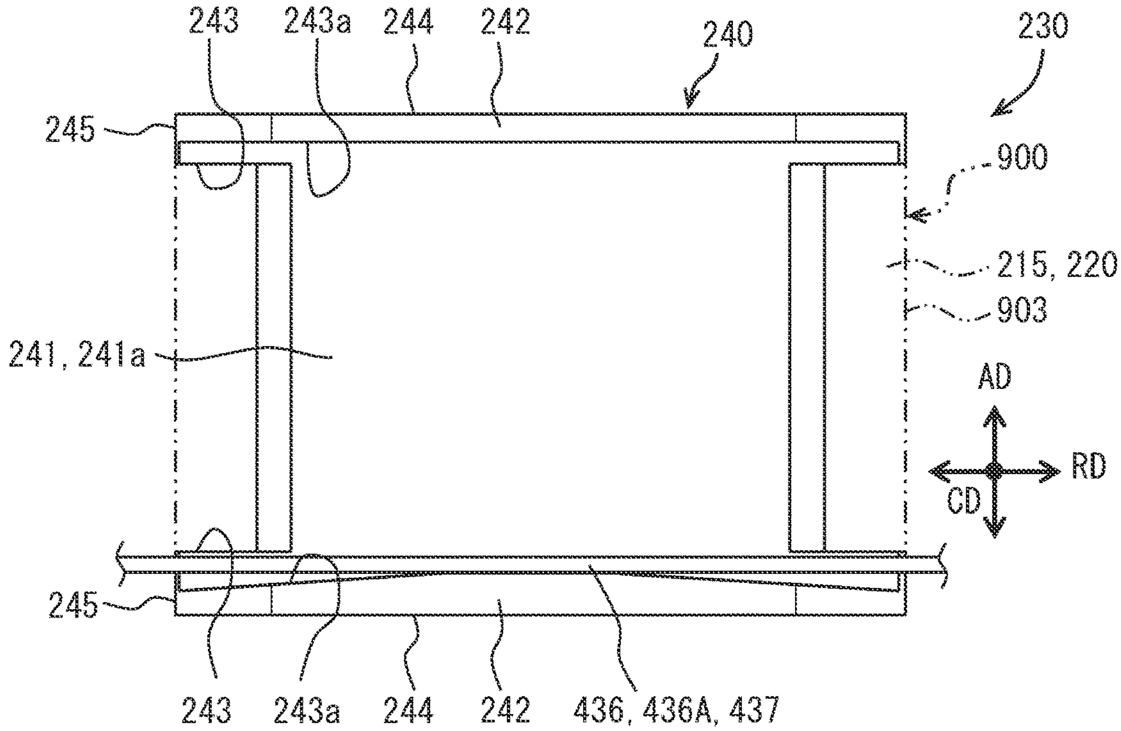
FIG. 89 is a side view of a core unit and shows a position of a temperature signal wiring.
Figure 90:
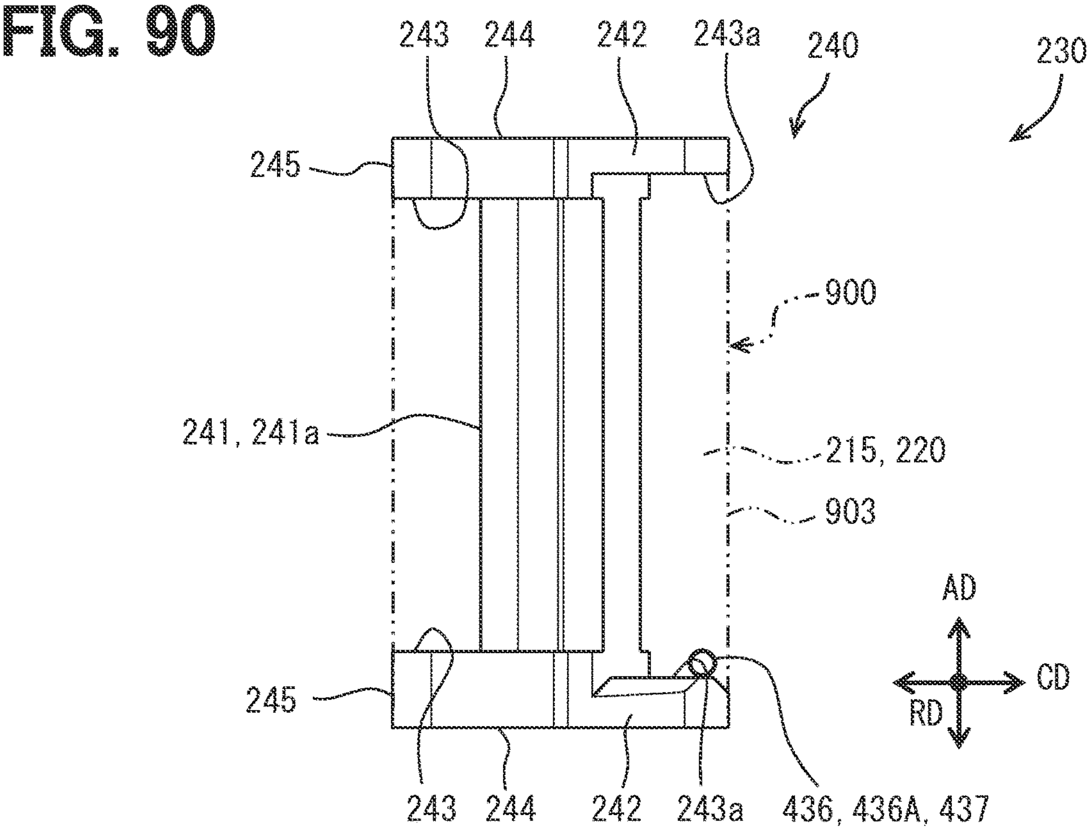
FIG. 90 is a front view of the core unit and shows the position of the temperature signal wiring.

As shown in FIGS. 88 to 90, the transversal line portion 437 is a portion of the temperature signal wiring 436 which extends to traverse the stator coil 211 in the radial direction RD. The transversal line portion 437 extends in the radial direction RD passing through between two coil bodies 900 adjacent to each other in the circumferential direction CD. The transversal line portion 437 is fixed to one of the two coil bodies 900 by an adhesive or the like. For example, the transversal line portion 437 is fixed to the coil wire 220 provided in the coil body 900. The transversal line portion 437 is fixed to a portion of the coil wire 220 that forms the coil portion 215.

The temperature signal wiring 436 is also fixed to the coil body 900 and the coil unit 210 by the coil protection portion 250 in addition to the adhesive or the like. An end portion of the temperature signal wiring 436 on a side facing the temperature sensor 431 is embedded in the coil protection portion 250 together with the temperature sensor 431. An end portion of the temperature signal wiring 436 on a side opposite to the temperature sensor 431 is led out from the coil protection portion 250. In the temperature signal wiring 436, at least the transversal line portion 437 is embedded in the coil protection portion 250.

The temperature signal wiring 436 extends in the radial direction RD passing through the inside of one of the two coil bodies 900 adjacent to each other in the circumferential direction CD. The temperature signal wiring 436 passing through the inside of the coil body 900 may be referred to as a passing signal line 436A. In the passing signal line 436A, the transversal line portion 437 extends in the radial direction RD passing through one coil body 900. The transversal line portion 437 is provided at a position closer to one of the two coil bodies 900. The transversal line portion 437 is located at a position away from the other coil body 900 in the circumferential direction CD.

The passing signal line 436A extends in the radial direction RD passing through a position at which the passing signal line 436A enters between the pair of bobbin flanges 242 in one coil body 900. The passing signal line 436A corresponds to the temperature communication line and an entry line. In the passing signal line 436A, the transversal line portion 437 is provided at a position at which the transversal line portion 437 enters between the pair of bobbin flanges 242 in one coil body 900. The transversal line portion 437 extends in the radial direction RD on an inner side of the coil body outer peripheral surface 903, for example, in a manner of not protruding from the coil body outer peripheral surface 903 in the circumferential direction CD. The transversal line portion 437 may protrude from the coil body outer peripheral surface 903 in the circumferential direction CD. That is, at least a part of the transversal line portion 437 may enter between the pair of bobbin flanges 242.

The passing signal line 436A passes through the inside of the flange recess portion 243*a* to extend toward the radially inner side from the busbar sensor 431A. As shown in FIGS. 89 and 90, in the passing signal line 436A, the transversal line portion 437 passes through a position at which the transversal line portion 437 enters the flange recess portion 243*a* of one in the pair of bobbin flanges 242. The transversal line portion 437 extends in the radial direction RD passing through the inside of the flange recess portion 243*a* in a manner of not protruding from the flange recess portion 243*a* in both the circumferential direction CD and the axial direction AD. The transversal line portion 437 is fixed to the coil wire 220 passing through the inside of the flange recess portion 243*a* by an adhesive or the like. For example, the transversal line portion 437 is fixed to a portion of the coil wire 220 that is connected to the first extending wire 216. The portion of the coil wire 220 that is connected to the first extending wire 216 is also a portion connected to the neutral lead-out wire 213. At least a part of the transversal line portion 437 may enter the inside of the flange recess portion 243*a*. The transversal line portion 437 may be fixed to a portion of the coil wire 220 that is connected to the second extending wire 217.

Next, a method of manufacturing the stator 200, on which the temperature sensor 431 is attached, in the method of manufacturing the motor device 60 will be described. The operator prepares, in a preparation process, the coil unit 210, the motor housing 70, and the temperature sensor 431 on which the temperature signal wiring 436 is attached. After the preparation process, the operator performs a temporary fixing process. In the temporary fixing process, the operator temporarily fixes the temperature sensor 431 and the temperature signal wiring 436 to the coil unit 210 with an adhesive or the like. For example, the operator temporarily fixes the busbar sensor 431A to the neutral point busbar 290 and temporarily fixes the temperature signal wiring 436 to the coil wire 220.

After the temporary fixing process, the operator performs a molding process. In the molding process, the operator attaches the motor housing 70 to a mold for molding, together with the coil unit 210, the temperature sensor 431, and the temperature signal wiring 436. The operator molds the coil protection portion 250 by injection molding. Since the temporary fixing process is performed before the molding process, the temperature sensor 431 and the temperature signal wiring 436 are less likely to deviate from the coil unit 210 when the molten resin is injected. Therefore, the temperature sensor 431 and the temperature signal wiring 436 are prevented from being exposed from the coil protection portion 250 to come into contact with the rotor 300 and the shaft 340.

<Configuration Group A>

According to the present embodiment described above, the neutral point busbar 290 is provided at a position separated from the busbar protection portion 270 that has an electrical insulation property and that protects the electric power busbar 261. In the configuration, the neutral point busbar 290 and the electric power busbar 261 are certainly not in contact with each other, and the neutral point busbar 290 and the busbar protection portion 270 are also not in contact with each other. Therefore, a decrease in the insulation reliability of an electrical insulation state between the neutral point busbar 290 and the electric power busbar 261 can be reduced due to separation between the neutral point busbar 290 and the busbar protection portion 270. Therefore, since the neutral point busbar 290 and the busbar protection portion 270 are separated from each other, the electrical insulation reliability of the motor device 60 can be enhanced.

According to the present embodiment, the electric power busbar 261 is provided in one of the stator-side space S1 and the inverter-side space S2 arranged in the axial direction AD, and the neutral point busbar 290 is provided in the other space. Specifically, the electric power busbar 261 is provided in the inverter-side space S2, and the neutral point busbar 290 is provided in the stator-side space S1. Moreover, the stator-side space S1 and the inverter-side space S2 are partitioned by the rear frame 370. In the configuration, the rear frame 370 restricts contact between the neutral point busbar 290 and the electric power busbar 261. In this way, the rear frame 370 can reduce the decrease in the insulation reliability of the electrical insulation state between the neutral point busbar 290 and the electric power busbar 261. Therefore, the electrical insulation reliability of the motor device 60 can be enhanced by the rear frame 370.

According to the present embodiment, the neutral point busbar 290 and the busbar protection portion 270 are provided at positions separated from each other in the axial direction AD. In the configuration, a separation distance between the neutral point busbar 290 and the busbar protection portion 270 can be increased as much as possible. Therefore, the insulation reliability between the neutral point busbar 290 and the electric power busbar 261 is enhanced, and insufficiency in the separation distance between the neutral point busbar 290 and the busbar protection portion 270 can be prevented.

According to the present embodiment, the motor device 60 is a rotary electric machine corresponding to both the axial gap-type and the double rotor-type. That is, the first rotor 300*a* and the second rotor 300*b* are arranged along the motor axis Cm with the stator 200 interposed therebetween. In the configuration, the axial gap type allows the motor device 60 to be decreased in size, and the double rotor type allows motor output to be increased. Further, in the configuration, the Halbach array is used for the array of the magnets 310 in each of the first rotor 300*a* and the second rotor 300*b*. Therefore, in the motor device 60, a back yoke can be easily omitted. The coil 211 is formed by winding the coil wire 220 having the multiple wires 223. Therefore, copper loss of the coil wire 220 generated in the coil 211 can be reduced.

According to the present embodiment, two coil portions 215 adjacent to each other in the circumferential direction CD are different in the number of turns. In the configuration, in the two coil portions 215, the coil wires 220 can be easily led out in opposite directions in the radial direction RD. Therefore, in the coil 211, it is easy to lead out one of the electric power lead-out wire 212 and the neutral lead-out wire 213 toward the radially outer side and lead out the other toward the radially inner side. Therefore, it is possible to enhance the insulation reliability of the electrical insulation state between the electric power lead-out wire 212 and the neutral lead-out wire 213.

According to the present embodiment, a connection portion between the electric power busbar 261 and the relay terminal 280 is supported by the terminal base 285. In the configuration, even if the electric power busbar 261 vibrates relative to the relay terminal 280, a stress generated due to the vibration is easily reduced by the terminal base 285. Therefore, vibration resistance of the relay terminal 280 and the electric power busbar 261 that form the output line 143 can be enhanced. Therefore, even if the motor device 60 vibrates relative to the inverter device 80, it is possible to reduce the occurrence of an abnormality in the output line 143 formed by the relay terminal 280 and the electric power busbar 261.

For example, in a configuration which is different from that of the present embodiment and in which the electric power busbar 261 is directly connected to the inverter device 80 side with no relay terminal 280 interposed therebetween, the electric power busbar 261 is in a state of spanning the inverter device 80 and the motor device 60. Therefore, when vibration of the motor device 60 relative to the inverter device 80 occurs, there is a concern that the stress concentrates on the electric power busbar 261 and an abnormality occurs in the electric power busbar 261. That is, there is a concern that an abnormality occurs in the output line 143 formed by the electric power busbar 261.

According to the present embodiment, one relay terminal 280 is disposed in each of the multiple divided regions RE. In the configuration, it is possible to secure a sufficiently large separation distance between two relay terminals 280 adjacent to each other in the circumferential direction CD. Therefore, even if heat is generated at the relay terminal 280 due to a current flowing through the relay terminal 280, the heat is easily released from the relay terminal 280. Therefore, occurrence of an abnormality in the motor device 60 due to the heat generated on the relay terminal 280 can be reduced.

According to the present embodiment, the rear frame 370 includes the busbar support portion 371 and the bearing support portion 372. In the configuration, two devices such as the electric power busbar 261 and the first bearing 360 can be supported by one member such as the rear frame 370. Therefore, the number of components constituting the motor device 60 can be reduced.

For example, a configuration different from that of the present embodiment is assumed in which the electric power busbar 261 and the first bearing 360 are respectively supported by independent dedicated members. In the configuration, it is necessary to respectively use the dedicated members for the electric power busbar 261 and the first bearing 360, and it is also necessary to fix the dedicated members on the motor housing 70 or the like. Therefore, in the configuration, there is a concern that the number of components constituting the motor device 60 increases.

According to the present embodiment, the resolver 421 is provided on the side opposite to the neutral point busbar 290 with the rear frame 370 interposed therebetween in the axial direction AD. In the configuration, a separation distance between the resolver 421 and the neutral point busbar 290 can be sufficiently secured. Therefore, even if the electromagnetic wave is generated by the current or the like flowing through the neutral point busbar 290, the resolver 421 is less likely to be influenced by the electromagnetic wave. For example, the noise is less likely to be generated in the detection signal of the resolver 421 as the neutral point busbar 290 is energized.

<Configuration Group B>

According to the present embodiment, in the rotor 300, the pair of axially inward magnets **312*a* and 312*b* adjacent to each other in the circumferential direction CD are oriented to be inclined with respect to the motor axis Cm in a manner of facing the stator 200 in the axial direction AD. The pair of peripheral magnets 311*a* and 311*b* adjacent to each other with the pair of axially inward magnets 312*a* and 312*b* interposed therebetween in the circumferential direction CD are oriented to face each other in the circumferential direction CD. In the configuration, magnetic flux generated by the pair of peripheral magnets 311*a* and 311 *b* and the pair of axially inward magnets 312*a* and 312*b* is concentrated on the stator 200, and thus a magnetic field on the stator 200 tends to be strengthened. Therefore, the energy efficiency of the motor device 60** can be improved.

According to the present embodiment, the pair of axially inward magnets **312*a* and 312*b* are oriented to be inclined with respect to the motor axis Cm in a manner of facing the stator 200 in the axial direction AD and facing each other in the circumferential direction CD. In the configuration, the magnetic flux generated by the pair of peripheral magnets 311*a* and 311*b* and the pair of axially inward magnets 312*a* and 312*b* is easily concentrated toward the inner boundary BI in the circumferential direction CD. By concentrating the magnetic flux in this way, the magnetic field on the stator 200** side can be strengthened.

According to the present embodiment, in the rotor 300, the pair of axially outward magnets **313*a* and 313*b* adjacent to each other in the circumferential direction CD are provided on opposite sides with the first peripheral magnet 311*a* or the second peripheral magnet 311*b* interposed therebetween. The pair of axially outward magnets 313*a* and 313*b* are oriented to be inclined with respect to the motor axis Cm in a manner of facing the side opposite to the stator 200 in the axial direction AD and facing opposite sides in the circumferential direction CD. In the configuration, the magnetic flux on the side opposite to the stator 200 in the axial direction AD is diffused, and thus the magnetic field on the stator 200 tends to be strengthened. Therefore, the energy efficiency of the motor device 60** can be further improved.

According to the present embodiment, the first rotor **300*a* and the second rotor 300*b* are point-symmetrically provided such that the pair of axially inward magnets 312*a* and 312*b* provided in one rotor and the pair of axially outward magnets 313*a* and 313*b* provided in the other rotor are aligned in the axial direction AD. In the configuration, the magnetic flux passing through the stator 200 in the axial direction AD is likely to concentrate on the inner boundary BI and the outer boundary BO in the circumferential direction CD. Therefore, the magnetic field on the stator 200** side can be strengthened.

According to the present embodiment, the fixing block 330 fixes the magnet 310 to the magnet holder 320 such that the block tapered surface 330*a* is overlapped with the inner peripheral tapered surface 316*d* and the magnet 310 is sandwiched between the block tapered surface 330*a* and the magnet holder 320. In the configuration, the magnet 310 can be firmly fixed to the magnet holder 320 by the fixing block 330 by using the fact that the block tapered surface 330*a* and the inner peripheral tapered surface 316*d* are inclined with respect to the motor axis Cm.

According to the present embodiment, the multiple magnet units 316 arranged in the circumferential direction CD in the rotor 300 include the inclined magnet units 317 and the parallel magnet units 318. In the configuration, in the process of manufacturing the rotor 300, the operator can insert, as the last one magnet unit 316 to be arranged in the magnet holder 320, the parallel magnet unit 318 between two inclined magnet units 317 adjacent to each other in the circumferential direction CD. Therefore, all the magnet units 316 can be appropriately fixed to the magnet holder 320.

According to the present embodiment, the pressing force F3 is applied to the rotor 300 on the side opposite to the magnet 310 via the rim tip portion 344*a* serving as a fulcrum in the radial direction RD such that the bending stress F2 is generated in the rotor 300 against the attraction force F1 on the magnet 310. In the configuration, deformation of the rotor 300 in which the peripheral portion of the magnet 310 approaches the stator 200 and the rotor 300 is warped can be reduced by the holder fixing tool 350. Therefore, a problem such as a decrease in the efficiency of the motor 61 due to deformation of the rotor 300 can be prevented.

According to the present embodiment, the portion of the rotor 300 to which the holder fixing tool 350 is fixed and the portion of the shaft flange 342 to which the holder fixing tool 350 is fixed are separated in the axial direction AD. Therefore, even if the pressing force F3 is insufficient with respect to the attraction force F1, the shortage of the pressing force F3 can be eliminated by increasing the pressing force F3 by the holder fixing tool 350.

According to the present embodiment, the holder fixing hole 325 of the first rotor 300*a* into which the first holder fixing tool 350*a* is inserted and the holder fixing hole 325 of the second rotor 300*b* into which the second holder fixing tool 350*b* is inserted are located at positions separated from each other in the circumferential direction CD. In the configuration, it is unnecessary to insert both the first holder fixing tool 350*a* and the second holder fixing tool 350*b* into one hole of the shaft flange 342 from opposite sides in the axial direction AD. Therefore, it is unnecessary for the shaft flange 342 to be thick enough to allow both the first holder fixing tool 350*a* and the second holder fixing tool 350*b* to be inserted into one hole. Therefore, the shaft flange 342 can be made thinner and reduced in weight.

<Configuration Group C>

According to the present embodiment, in the motor housing 70, the coil protection portion 250 is provided in a state of being overlapped with the inner peripheral surface 70*b*. In the configuration, the heat of the coil 211 is easily transferred to the motor housing 70 via the coil protection portion 250. Moreover, in the motor housing 70, the motor fins 72 are provided on the outer peripheral surface 70*a*. Therefore, the heat transferred from the coil protection portion 250 to the motor housing 70 is easily released to the outside by the motor fins 72. Therefore, a heat radiation effect of the motor device 60 can be enhanced.

According to the present embodiment, the coil protection portion 250 is in a state of entering between the multiple stator holding portions 171 from the radially inner side. In the configuration, a contact area between the coil protection portion 250 and the inner peripheral surface 70*b* can be increased by the stator holding portion 171. Therefore, the heat is easily transferred from the coil protection portion 250 to the stator holding portion 171, and as a result, the heat radiation effect of the motor housing 70 can be enhanced.

According to the present embodiment, the coil portion 215 and the axial holding portion 174 face each other in the radial direction RD. In the configuration, a separation distance between the coil portion 215 and the motor housing 70 in the radial direction RD can be reduced by the axial holding portion 174. That is, it is possible to reduce a thickness dimension of the coil protection portion 250 existing on the axial holding portions 174 in the radial direction RD. Therefore, the heat transferred from the coil portion 215 to the motor housing 70 is less likely to remain in the coil protection portion 250. Therefore, a decrease in the heat radiation effect of the motor housing 70 caused by the coil protection portion 250 can be reduced.

According to the present embodiment, the coil protection portion 250 is at least overlapped with the housing rough surface 177. In the configuration, since the coil protection portion 250 easily comes into close contact with the housing rough surface 177, the heat is easily transferred from the coil protection portion 250 to the motor housing 70. In the configuration, since the contact area between the coil protection portion 250 and the housing rough surface 177 tends to be large, the heat is easily transferred from the coil protection portion 250 to the motor housing 70. Therefore, the heat radiation effect of the motor housing 70 can be enhanced by the housing rough surface 177.

According to the present embodiment, the gap between the electric power lead-out wire 212 and the coil protection portion 250 is filled with the grommet 255 that protects the electric power lead-out wire 212. In the configuration, the deformation of the electric power lead-out wire 212 in which the electric power lead-out wire 212 is folded at the boundary portion between the embedded portion 255*a* and the exposed portion 255*b* can be reduced by the grommet 255. When the coil protection portion 250 is resin molded at the time of manufacturing the motor device 60, leakage of the molten resin from a periphery of the electric power lead-out wire 212 can be reduced by the grommet 255.

According to the present embodiment, since the bobbin 240 has the electrical insulation property, the electrical insulation state of the coil 211 can be optimized by the bobbin 240. Therefore, occurrence of partial discharge in the coil 211 can be reduced. Further, since the heat of the core 231 is released to the coil protection portion 250 via the bobbin 240, a heat radiation effect of the core unit 230 can be enhanced.

According to the present embodiment, the coil protection portion 250 is at least overlapped with the bobbin rough surface 247. In the configuration, since the coil protection portion 250 easily comes into close contact with the bobbin rough surface 247, the heat is easily transferred from the bobbin 240 to the coil protection portion 250. In the configuration, since the contact area between the coil protection portion 250 and the bobbin rough surface 247 tends to be large, the heat is easily transferred from the bobbin 240 to the coil protection portion 250. Therefore, the heat radiation effect of the motor device 60 can be enhanced by the bobbin rough surface 247.

According to the present embodiment, in the core 231, the core width gradually decreases toward the radially inner side. In the configuration, for example, as compared with the configuration in which the core width continuously decreases, a surface area of the core 231 is likely to increase, and the core 231 is likely to be in close contact with the bobbin 240. Therefore, the heat of the core 231 is easily transferred to the bobbin 240. Moreover, when the multiple core forming plate members 236 are stacked to manufacture the core 231, the types of the core forming plate members 236 can be reduced according to the number of stages in which the core width reduces. Therefore, an increase in cost for manufacturing the core forming plate members 236 can be reduced.

According to the present embodiment, the flange inner plate surface 243 of the bobbin 240 is provided with the flange recess portion 243*a* which is recessed for lead-out of the electric power lead-out wire 212 from the coil 211. In the configuration, a dead space is less likely to be generated between the flange inner plate surface 243 and the coil 211 on the side opposite to the flange recess portion 243*a* with the bobbin trunk portion 241 interposed therebetween in the circumferential direction CD. Therefore, the space factor of the coil 211 can be increased in the bobbin 240.

<Configuration Group D>

According to the present embodiment, the inverter 81, and the rotor 300 and stator 200 which are aligned in the axial direction AD are accommodated in the unit housing 51. In the configuration, the motor device 60 is made thinner, and a size of the motor device unit 50 can be decreased. Moreover, the motor fins 72 and the inverter fins 92 are provided on the outer peripheral surface of the unit housing 51. Therefore, a heat radiation effect of the motor device unit 50 can be enhanced by the motor fins 72 and the inverter fins 92. Therefore, both the decrease in the size and the enhancement in the heat radiation effect of the motor device unit 50 can be achieved.

According to the present embodiment, the coil protection portion 250 is overlapped with the inner peripheral surface of the unit housing 51. In the configuration, the heat of the coil 211 is easily transferred to the unit housing 51 via the coil protection portion 250. Moreover, the motor fins 72 and the inverter fins 92 are provided on the outer peripheral surface of the unit housing 51. Therefore, the heat transferred from the coil protection portion 250 to the unit housing 51 is easily released to the outside by the motor fins 72 and the inverter fins 92. Therefore, the heat radiation effect of the motor device unit 50 can be enhanced.

According to the present embodiment, the motor housing 70 is made thinner by aligning the stator 200 and the rotor 300 in the axial direction AD, and in the unit housing 51, the motor housing 70 and the inverter housing 90 are aligned in the axial direction AD. Therefore, an increase in the size of the motor device unit 50 in the axial direction AD can be reduced by making the motor housing 70 thinner.

According to the present embodiment, the flange vent hole 346 provided in the shaft flange 342 penetrates the rim 344 in the radial direction RD and enables ventilation in the radial direction RD. In the configuration, the heat of the stator 200 is easily released through the flange vent holes 346 in the radial direction RD. Therefore, the heat radiation effect of the motor device 60 can be enhanced by the flange vent hole 346.

According to the present embodiment, the holder adjustment hole 326 for adjusting the balance of the rotor 300 penetrates the rotor 300 in the axial direction AD and enables ventilation in the axial direction AD. In the configuration, the heat of the stator 200 is easily released through the holder adjustment hole 326 in the axial direction AD. Therefore, the heat radiation effect of the motor device 60 can be enhanced by using the holder adjustment hole 326 for adjusting the balance of the rotor 300.

According to the present embodiment, the signal wiring 426 extending from the resolver 421 and the signal wiring 436 extending from the temperature sensor 431 are collected in the signal terminal block 440. In the configuration, the inverter wiring of the inverter device 80 is drawn into the signal terminal block 440, and thereby the inverter wiring can be electrically connected to both the resolver 421 and the temperature sensor 431. Therefore, when the operator connects the signal wiring of the motor device 60 and the signal wiring of the inverter device 80 at the time of manufacturing the motor device 60, a workload can be reduced.

According to the present embodiment, the dustproof cover 380 covers the frame opening portion 373. Therefore, the configuration in which the electric power lead-out wire 212 is led out from the frame opening portion 373 is implemented, and the dustproof cover 380 can prevent the foreign matter from passing through the frame opening portion 373.

According to the present embodiment, in the motor housing 70, the flange hole 74*a* is formed in the connection flange 74 protruding from the housing main body 71. Therefore, a decrease in the rigidity of the housing main body 71 due to the flange hole 74*a* can be reduced. The flange hole 178*a* is formed in the fixing flange 178 protruding from the housing main body 71. Therefore, a decrease in the rigidity of the housing main body 71 due to the flange hole 178*a* can be reduced.

According to the present embodiment, in the drive frame 390, the first fixing hole 392*a* and the second fixing hole 392*b* are aligned in the radial direction RD. In the configuration, a stress applied from the motor housing 70 to the first fixing hole 392*a* and a stress applied from the speed reducer 53 to the second fixing hole 392*b* tend to cancel each other. Therefore, occurrence of an abnormality such as deformation on the drive frame 390 due to the stress from the motor housing 70 and the stress from the speed reducer 53 can be reduced.

<Configuration Group O>

According to the present embodiment, the motor fin 72 serving as the heat radiation accelerating portion is provided on the radially outer side of the stator coil 211. Therefore, an effect of cooling the motor device 60 from the radially outer side of the stator coil 211 can be applied by the motor fin 72. Moreover, the busbar sensor 431A, which is the temperature sensor 431, is provided on the side opposite to the motor fin 72 with the stator coil 211 interposed therebetween. In the configuration, due to the cooling effect of the motor fin 72, a detected temperature of the busbar sensor 431A is less likely to be lower than an actual coil temperature. That is, a difference between the detected temperature of the busbar sensor 431A and the actual coil temperature is less likely to be generated. Therefore, in the motor device 60, the detection accuracy for the coil temperature can be improved while enhancing the cooling effect.

For example, a comparison configuration which is different from that of the present embodiment and in which the temperature sensor 431 is provided on an outer peripheral side of the stator coil 211 together with the motor fin 72 is assumed. In the comparison configuration, the heat of the stator coil 211 is transferred to the motor fin 72 passing through a heat radiation path extending toward the radially outer side, and is released to the outside from the motor fin 72.

In the comparison configuration, the temperature sensor 431 exists in the heat radiation path on the radially outer side of the stator coil 211. Therefore, the temperature sensor 431 is easily cooled as the heat is released from the motor fin 72. That is, in the motor device 60, a temperature measuring portion whose temperature is to be measured by the temperature sensor 431 is easily cooled. When the temperature measuring portion is cooled, temperature deviation between a maximum temperature portion having a highest temperature and the temperature measuring portion in the motor device 60 tends to be large. In this way, when an influence of heat transfer, that is based on the motor fin 72, on the temperature sensor 431 is large, there is a concern that the temperature measurement accuracy of the temperature sensor 431 is deteriorated. When the stator coil 211 is a heat generating source in the motor device 60, a portion on the side opposite to the motor fin 72 with the stator coil 211 interposed therebetween tends to be the maximum temperature portion.

With respect to the comparison configuration, in the present embodiment, the busbar sensor 431A is provided on the side opposite to the heat radiation path with the stator coil 211 interposed therebetween. In the configuration, it can be avoided that the busbar sensor 431A is cooled as the heat is released from the motor fin 72. Therefore, the temperature deviation between the maximum temperature portion and the temperature measuring portion is less likely to increase. That is, the temperature deviation between the maximum temperature portion and the temperature measuring portion tends to be small, and the influence of the heat transfer, that is based on the motor fin 72, on the busbar sensor 431A is reduced. Therefore, the temperature measurement accuracy of the busbar sensor 431A can be improved.

In the present embodiment, the neutral point busbar 290 is electrically connected to the stator coil 211. In the configuration, heat generated in the stator coil 211 is easily transferred to the neutral point busbar 290. Therefore, a temperature difference between the neutral point busbar 290 and the stator coil 211 tends to be small. Then, according to the present embodiment, the busbar sensor 431A, which is the temperature sensor 431, is provided at the neutral point busbar 290. Therefore, the busbar sensor 431A can detect a temperature of the stator coil 211 via the neutral point busbar 290. Therefore, a decrease in the detection accuracy of the busbar sensor 431A due to the cooling effect of the motor fin 72 can be reduced, and a difference between the detected temperature of the busbar sensor 431A and the actual coil temperature can be reduced.

Further, a fixed target of the temperature sensor 431 is the neutral point busbar 290, and thus the temperature sensor 431 is likely to be firmly fixed on the neutral point busbar 290. The neutral point busbar 290 has a higher degree of freedom in shape and position than the coil portion 215. For example, even when the sensor support portion 292 for fixing the temperature sensor 431 is provided on the neutral point busbar 290, a magnetic field generated by the motor 61 is less likely to be weakened. Therefore, a configuration in which the temperature sensor 431 is firmly fixed on the neutral point busbar 290 by fixing the temperature sensor 431 to the sensor support portion 292 is easily implemented.

In the present embodiment, the stator coil 211 is protected by the coil protection portion 250 having a thermal conduction property. In the configuration, the heat generated in the stator coil 211 tends to be directly transferred to the coil protection portion 250. Therefore, a temperature difference between the coil protection portion 250 and the stator coil 211 tends to be small. Therefore, according to the present embodiment, the busbar sensor 431A is embedded in the coil protection portion 250. Therefore, the temperature sensor 431 can detect the temperature of the stator coil 211 via the coil protection portion 250. Therefore, the decrease in the detection accuracy of the temperature sensor 431 due to the cooling effect of the motor fin 72 can be reduced, and further, a difference between the detected temperature of the temperature sensor 431 and the actual coil temperature can be reduced by the coil protection portion 250.

Further, the temperature sensor 431 is fixed to the stator coil 211 via the coil protection portion 250. In the configuration, the coil protection portion 250 can limit a fact that the temperature sensor 431 is more likely to vibrate than the stator coil 211. That is, vibration of the temperature sensor 431 relative to the stator coil 211 can be reduced by the coil protection portion 250. Therefore, the strength reliability of the temperature sensor 431 against vibration can be improved.

According to the present embodiment, the temperature signal wiring 436 is provided to extend in the radial direction RD passing through two coil bodies 900 adjacent to each other in the circumferential direction CD. In the configuration, the temperature signal wiring 436 does not need to pass through a position deviated from the coil body 900 in the axial direction AD. That is, the temperature signal wiring 436 does not need to pass through the gaps G1 and G2 (see FIG. 12) between the stator coil 211 and the rotor 300. For this reason, occurrence of inconvenience due to the temperature signal wiring 436 passing through the gaps G1 and G2 can be reduced.

For example, as an example of the inconvenience, an abnormality may occur in the rotation of the rotors **300*a* and 300*b* due to the temperature signal wiring 436 coming into contact with the rotors 300*a* and 300*b*. When the gaps G1 and G2 are expanded in the axial direction AD in order to avoid contact of the temperature signal wiring 436 with the rotors 300*a* and 300*b*, the output of the motor 61 may be decreased. Meanwhile, in the present embodiment, since the temperature signal wiring 436 does not need to pass through the gaps G1 and G2, the temperature signal wiring 436 is less likely to come into contact with the rotors 300*a* and 300*b*. Accordingly, the occurrence of the abnormality on the rotation of the rotors 300*a* and 300*b* and the deterioration of the performance of the motor 61 as the gaps G1 and G2** are expanded can be reduced.

According to the present embodiment, the temperature signal wiring 436 is fixed to one of the two coil bodies 900 adjacent to each other in the circumferential direction CD. In the configuration, unintentional movement of the temperature signal wiring 436 relative to the coil body 900 can be prevented by a fixing portion between the temperature signal wiring 436 and the coil body 900. Therefore, when the coil protection portion 250 is molded in the process of manufacturing the motor device 60, the temperature signal wiring 436 can be prevented from unintentionally entering the gaps G1 and G2.

According to the present embodiment, the temperature signal wiring 436 extends in the radial direction RD passing through a position at which the temperature signal wiring 436 enters between the pair of bobbin flanges 242 of one of the two coil bodies 900. In the configuration, it is easy to fix the temperature signal wiring 436 to one of the two coil bodies 900. Moreover, even if the temperature signal wiring 436 moves in the axial direction AD relative to the coil body 900, the temperature signal wiring 436 can be restricted by the bobbin flange 242 from entering the gaps G1 and G2.

According to the present embodiment, while the motor fin 72 is provided on the radially outer side of the stator coil 211, the busbar sensor 431A is provided on the radially inner side of the stator coil 211. Therefore, a configuration in which the difference between the detected temperature of the busbar sensor 431A and the actual coil temperature is less likely to be generated while cooling the stator coil 211 from the radially outer side can be implemented.

Second Embodiment

In a second embodiment, the motor device 60 includes only one rotor 300. That is, the motor device 60 is a single-rotor-type rotary electric machine. For example, one rotor 300 is provided between the stator 200 and the inverter device 80 in the axial direction AD. The rotor 300 may be provided on the side opposite to the inverter device 80 with the stator 200 interposed therebetween in the axial direction AD.

The motor device 60 may include multiple stators 200. For example, the motor device 60 may include two stators 200. The motor device 60 is a double stator-type rotary electric machine. The motor device 60 and the inverter device 80 may be provided to be separated from each other. For example, the motor housing 70 and the inverter housing 90 may be provided independently of each other. Further, the unit duct 100 may not be provided for the motor device unit 50.

Third Embodiment

In the first embodiment described above, the temperature sensor 431 is provided on the neutral point busbar 290 serving as the energization busbar. Meanwhile, in a third embodiment, the temperature sensor 431 is provided on a coil. Configurations, operations, and effects not particularly described in the third embodiment are the same as those in the first embodiment described above. In the third embodiment, differences from the first embodiment described above will be mainly described.

Figure 91:
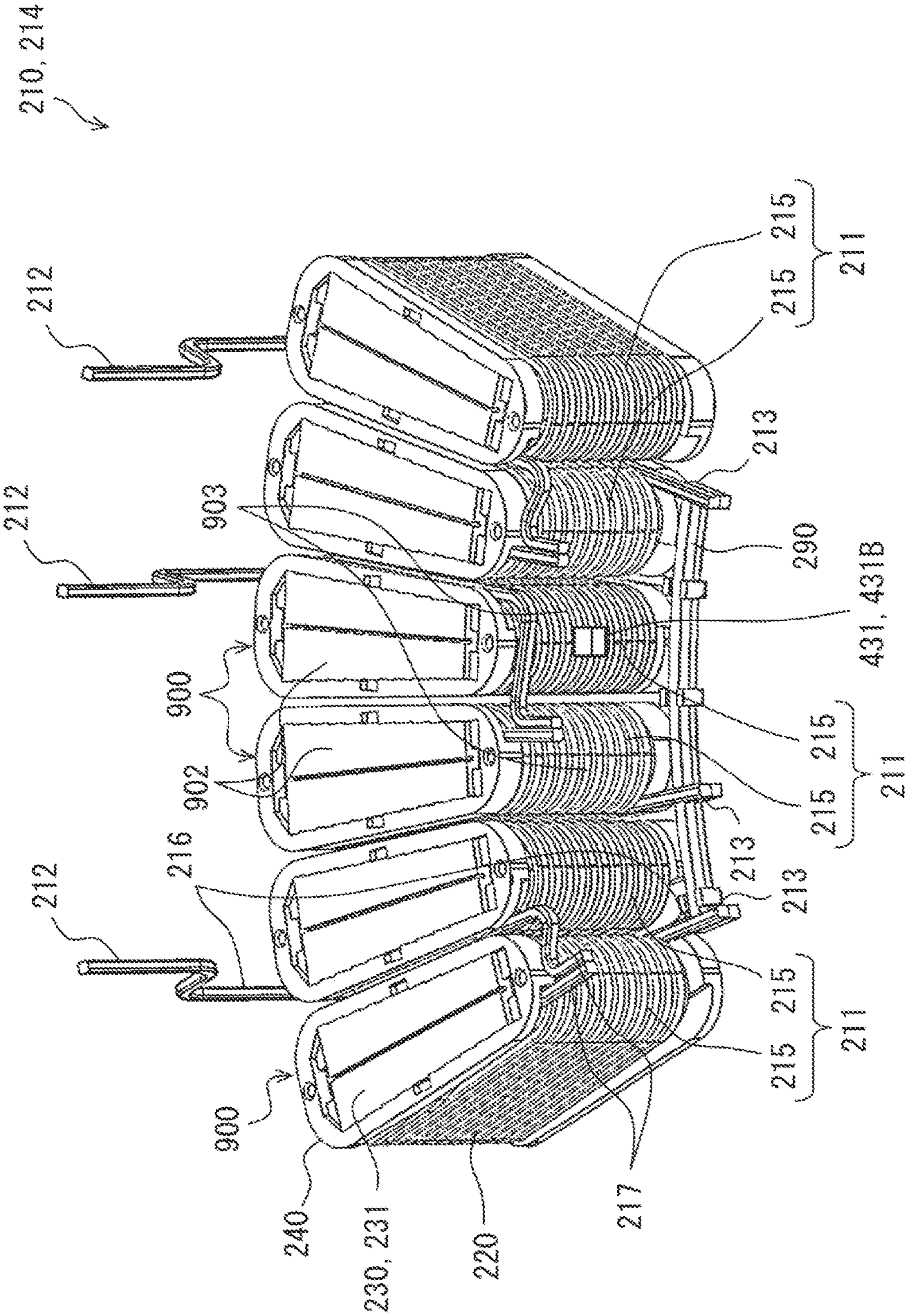
FIG. 91 is a perspective view of a neutral point unit in the configuration group O and a third embodiment.

As shown in FIG. 91, the temperature sensor 431 is provided on the stator coil 211. That is, the temperature sensor 431 is provided on the coil portion 215. The temperature sensor 431 provided on the coil portion 215 may be referred to as a coil sensor 431B. The coil sensor 431B is fixed to the coil portion 215 by an adhesive or the like. The coil sensor 431B is fixed to the coil wire 220 that forms the coil portion 215. The coil sensor 431B is in a state of being directly fixed to the stator coil 211. Multiple coil sensors 431B are arranged in the circumferential direction CD. The multiple coil sensors 431B are fixed to different coil portions 215. The coil sensor 431B detects a temperature of the coil portion 215 as a coil temperature. The coil sensor 431B is in contact with the coil portion 215. The coil sensor 431B corresponds to the temperature detection unit and a coil detection unit.

The coil sensor 431B is provided on an inner peripheral side of the stator coil 211. For example, the coil sensor 431B is fixed to the coil inner peripheral surface 211*d*. The coil sensor 431B is embedded in the coil protection portion 250. The coil sensor 431B is also fixed to the stator coil 211 by the coil protection portion 250 in addition to the adhesive or the like. Similarly to the busbar sensor 431A according to the first embodiment described above, the coil sensor 431B corresponds to the inner peripheral detection unit and the embedded detection unit.

The coil sensor 431B is provided at a position at which the coil sensor 431B does not protrude from the coil body 900 in the axial direction AD. The coil sensor 431B is fixed to the coil body outer peripheral surface 903. The coil sensor 431B is provided between the pair of coil body end surfaces 902 in the axial direction AD. The coil sensor 431B is provided between the pair of bobbin flanges 242 in the axial direction AD. For example, the coil sensor 431B is provided at a position away from both of the pair of bobbin flanges 242 in the axial direction AD.

The temperature signal wiring 436 is communicably connected to the coil sensor 431B. The temperature signal wiring 436 connected to the coil sensor 431B is the passing signal line 436A as in the first embodiment described above. However, the passing signal line 436A according to the present embodiment does not pass through the inside of the flange recess portion 243*a*.

Figure 92:
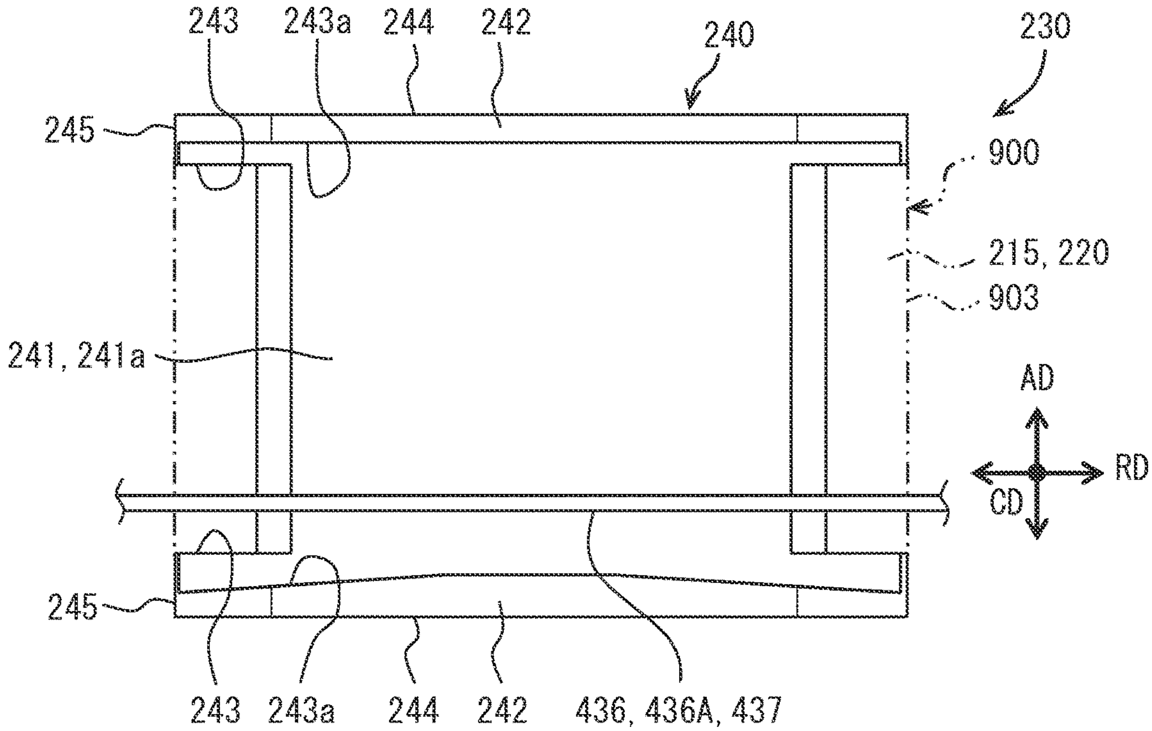
FIG. 92 is a side view of a core unit and shows a position of a temperature signal wiring.
Figure 93:
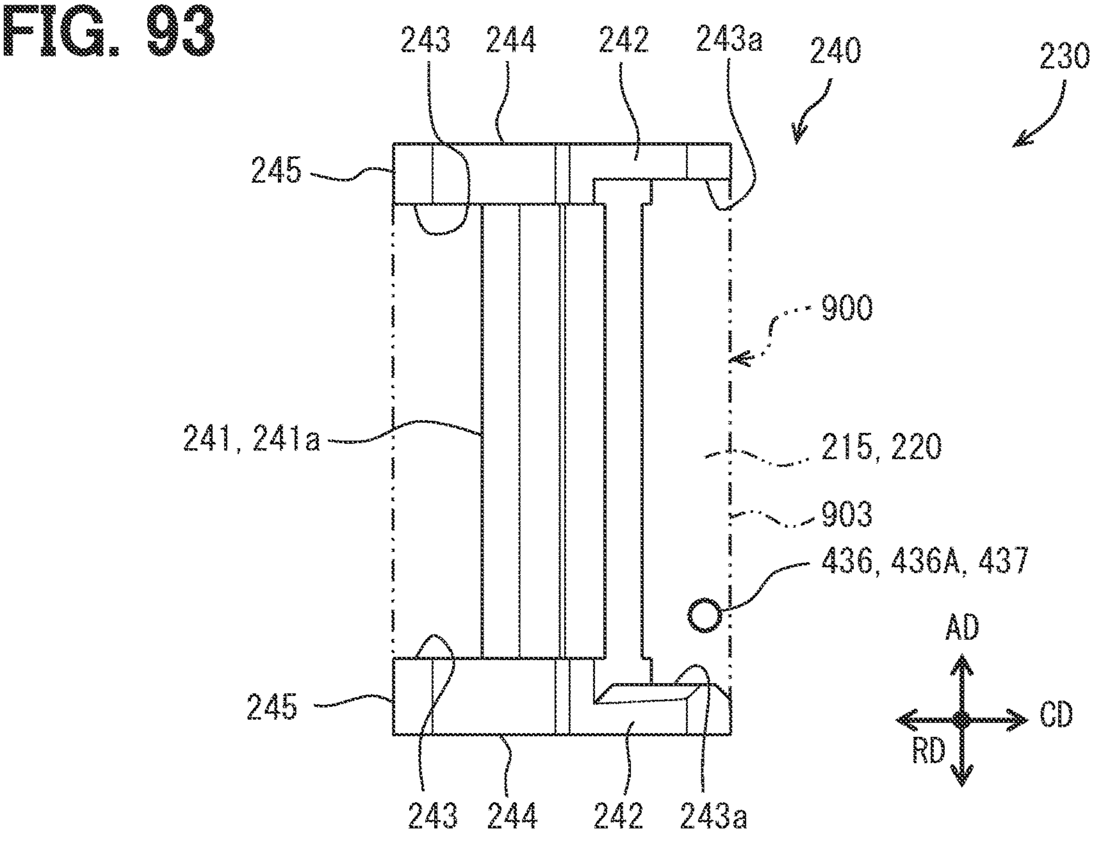
FIG. 93 is a front view of the core unit and shows the position of the temperature signal wiring.

As shown in FIGS. 92 and 93, the passing signal line 436A extends in the radial direction RD between the pair of bobbin flanges 242 passing through a position away from each of the bobbin flanges 242 in the axial direction AD. In the coil portion 215, multiple coil wires 220 each of which is wound to extend in a direction orthogonal to the axial direction AD are in a state of being arranged in the axial direction AD. The passing signal line 436A is in a state of entering between two coil wires 220 adjacent to each other in the axial direction AD in the coil portion 215. The passing signal line 436A is also fixed to the coil portion 215 by the coil protection portion 250 in addition to the adhesive or the like.

According to the present embodiment, the coil sensor 431B, which is the temperature sensor 431, is provided on the stator coil 211. Therefore, the coil sensor 431B can directly detect the temperature of the stator coil 211. Therefore, a decrease in the detection accuracy of the coil sensor 431B due to the cooling effect of the motor fin 72 can be reduced, a difference between the detected temperature of the coil sensor 431B and the actual coil temperature can be reduced.

Fourth Embodiment

In the third embodiment described above, the temperature sensor 431 is provided on the stator coil 211 serving as the coil. Meanwhile, in a fourth embodiment, the temperature sensor 431 is provided on a coil lead-out wire. Configurations, operations, and effects not particularly described in the fourth embodiment are the same as those in the first embodiment described above. In the fourth embodiment, differences from the first embodiment described above will be mainly described.

Figure 94:
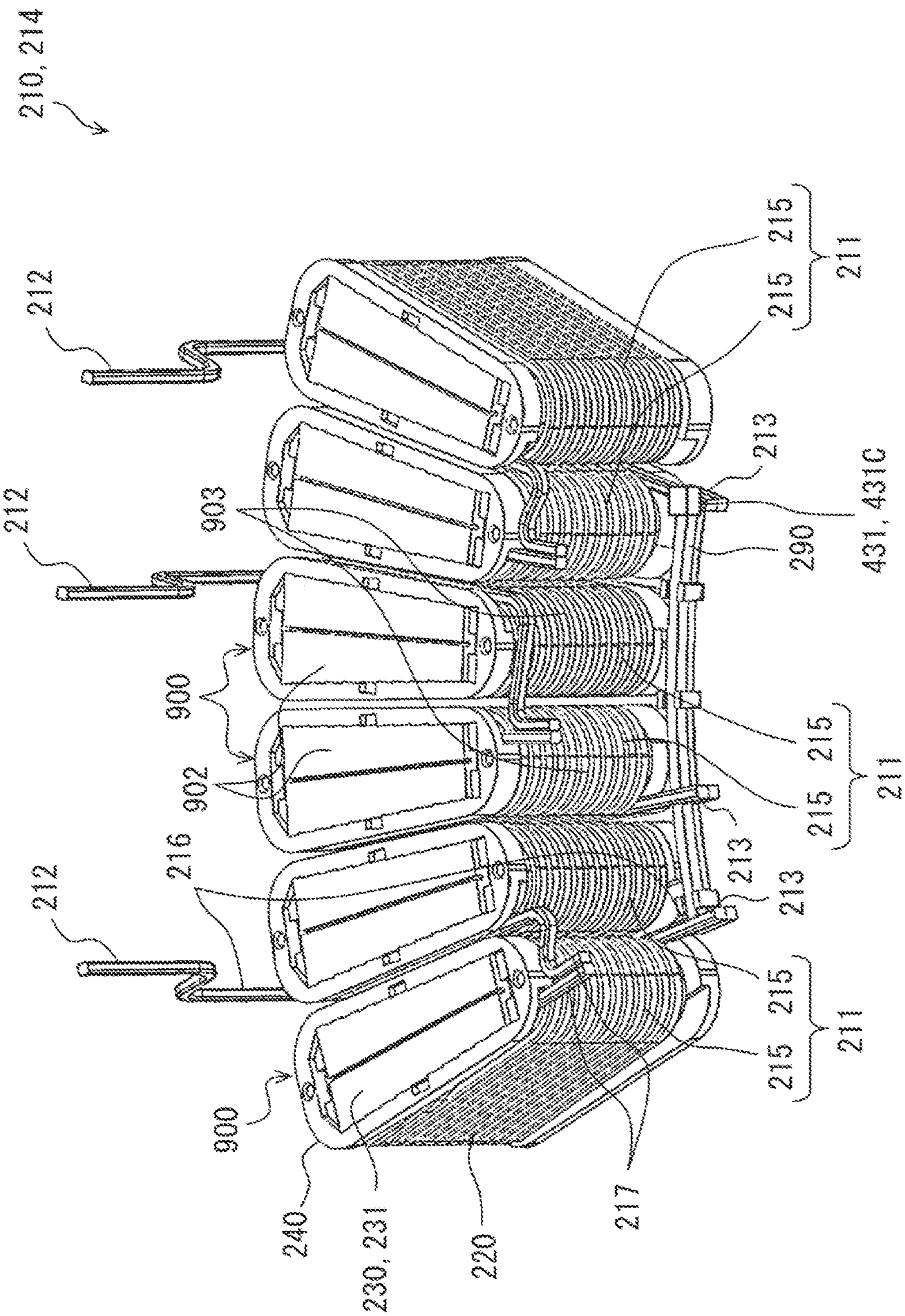
FIG. 94 is a perspective view of a neutral point unit according to a fourth embodiment.

As shown in FIG. 94, the neutral lead-out wire 213 is led out from the stator coil 211 by being led out from the coil portion 215. The neutral lead-out wire 213 is led out from the coil portion 215 toward a radially inner side. In the stator 200, one coil portion 215 and the neutral lead-out wire 213 led out from the coil portion 215 are formed by the common coil wire 220. The neutral lead-out wire 213 corresponds to the coil lead-out wire.

The temperature sensor 431 is provided on the neutral lead-out wire 213. The temperature sensor 431 provided on the neutral lead-out wire 213 may be referred to as a lead-out sensor 431C. The lead-out sensor 431C is fixed to the neutral lead-out wire 213 by an adhesive or the like. The lead-out sensor 431C is provided on the neutral lead-out wire 213, and thus is provided on the first extending wire 216 that forms the neutral lead-out wire 213. Multiple lead-out sensors 431C are arranged in the circumferential direction CD. The multiple lead-out sensors 431C are fixed to different neutral lead-out wires 213. The lead-out sensor 431C detects a temperature of the neutral lead-out wire 213 as the coil temperature. The lead-out sensor 431C is in contact with the neutral lead-out wire 213. The lead-out sensor 431C corresponds to the temperature detection unit and a lead-out detection unit. The lead-out sensor 431C may be fixed to multiple neutral lead-out wires 213.

The lead-out sensor 431C is provided on an inner peripheral side of the stator coil 211. The lead-out sensor 431C is embedded in the coil protection portion 250. The lead-out sensor 431C is also fixed to the neutral lead-out wire 213 by the coil protection portion 250 in addition to the adhesive or the like. Similarly to the busbar sensor 431A according to the first embodiment described above, the lead-out sensor 431C corresponds to the inner peripheral detection unit and the embedded detection unit.

The lead-out sensor 431C is provided at a position at which the lead-out sensor 431C does not protrude from the coil body 900 in the axial direction AD. The lead-out sensor 431C is provided between the pair of coil body end surfaces 902 in the axial direction AD. The lead-out sensor 431C is provided between the pair of bobbin flanges 242 in the axial direction AD.

According to the present embodiment, the neutral lead-out wire 213 is led out from the stator coil 211. In the configuration, heat generated in the stator coil 211 tends to be directly transferred to the neutral lead-out wire 213. Therefore, a temperature difference between the neutral lead-out wire 213 and the stator coil 211 tends to be small. Thus, according to the present embodiment, the lead-out sensor 431C, which is the temperature sensor 431, is provided on the neutral lead-out wire 213. Therefore, the lead-out sensor 431C can detect the temperature of the stator coil 211 via the neutral lead-out wire 213. Therefore, a decrease in the detection accuracy of the lead-out sensor 431C due to the cooling effect of the motor fin 72 can be reduced, a difference between the detected temperature of the lead-out sensor 431C and the actual coil temperature can be reduced.

Fifth Embodiment

In the first embodiment described above, as the passing signal line 436A, the temperature signal wiring 436 extends in the radial direction RD passing through the position at which the temperature signal wiring 436 enters between the pair of bobbin flanges 242 in one coil body 900. Meanwhile, in a fifth embodiment, the temperature signal wiring 436 extends in the radial direction RD passing through a gap between two coil bodies 900 adjacent to each other in the circumferential direction CD. Configurations, operations, and effects not particularly described in the fifth embodiment are the same as those in the first embodiment described above. In the fifth embodiment, differences from the first embodiment described above will be mainly described.

Figure 95:
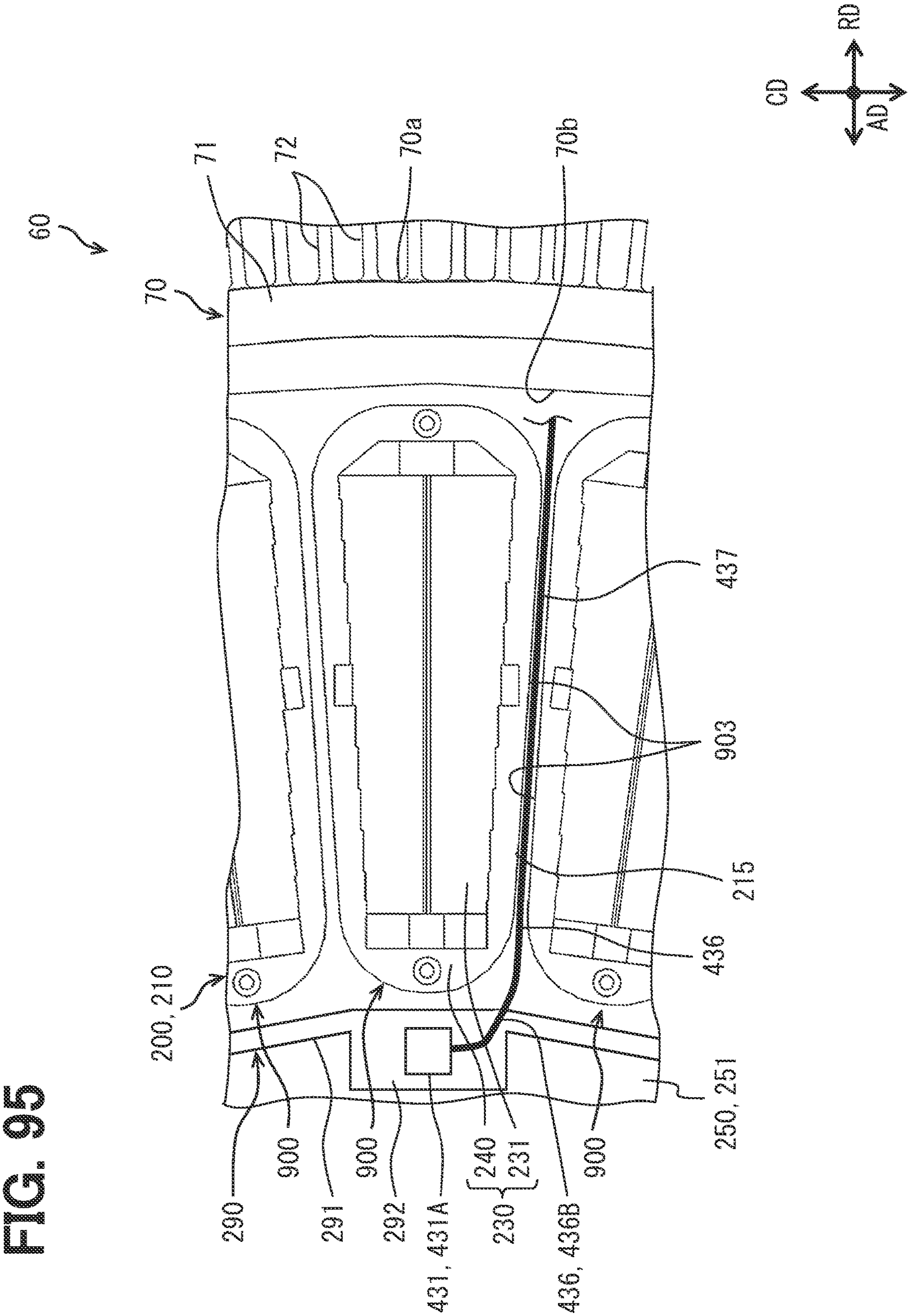
FIG. 95 is a schematic vertical cross-sectional view of a periphery of a temperature sensor in a motor device according to a fifth embodiment.

As shown in FIG. 95, a gap exists between the two coil bodies 900 adjacent to each other in the circumferential direction CD. The gap between the two coil bodies 900 is a gap between the coil body outer peripheral surfaces 903 of the respective coil bodies 900. The temperature signal wiring 436 extends toward the radially outer side from the temperature sensor 431 passing through the gap between the two coil bodies 900. The temperature signal wiring 436 passing through the two coil bodies 900 may be referred to as a gap signal line 436B. The gap signal line 436B extends in the radial direction RD passing through, for example, between the respective coil portions 215 of the two coil bodies 900. The gap signal line 436B extends in the radial direction RD in a manner of not entering between the pair of bobbin flanges 242 in one coil body 900. In the gap signal line 436B, the transversal line portion 437 does not enter between the pair of bobbin flanges 242. The gap signal line 436B corresponds to the temperature communication line.

Figure 96:
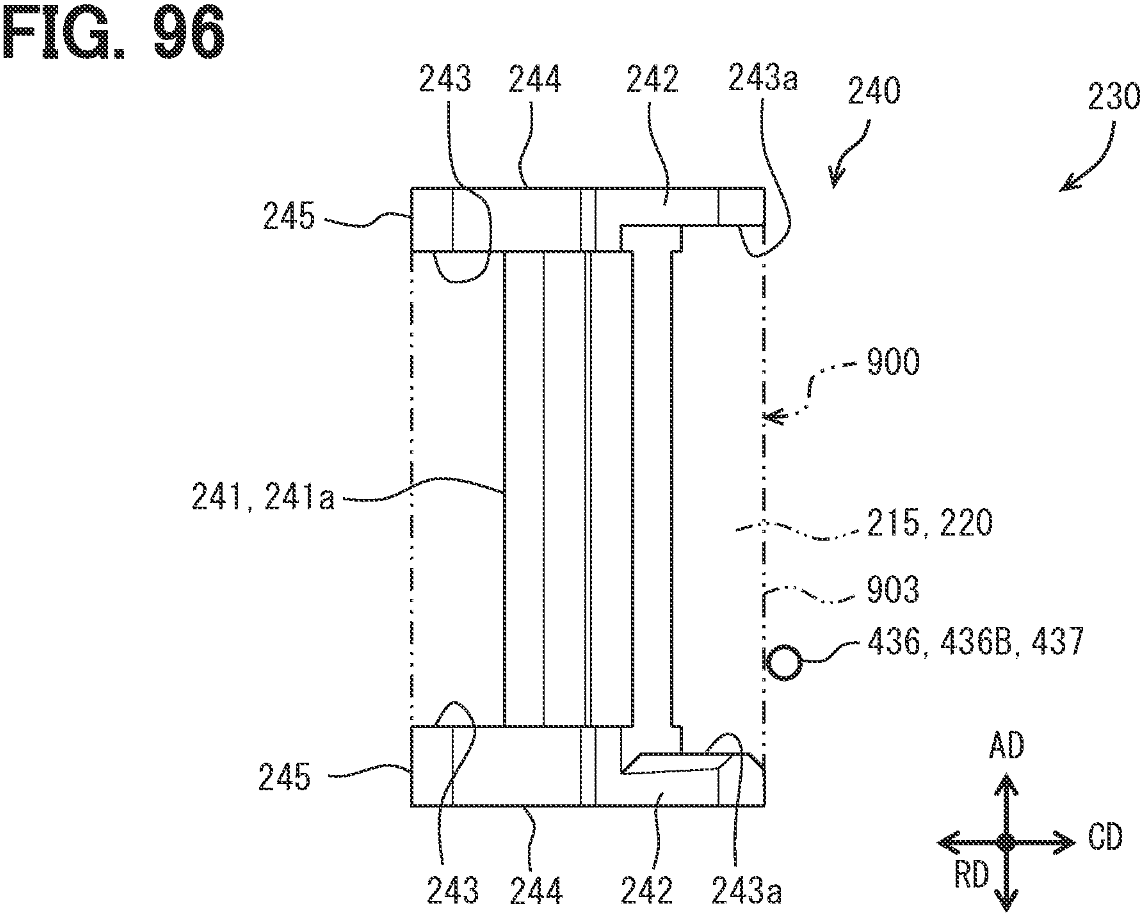
FIG. 96 is a front view of a core unit and shows a position of a temperature signal wiring.

As shown in FIG. 96, the gap signal line 436B is provided between the pair of coil body end surfaces 902 in the axial direction AD. The gap signal line 436B does not protrude from the pair of coil body end surfaces 902 in the axial direction AD. The gap signal line 436B is fixed to at least one of the coil portion 215 and the bobbin flange 242 by an adhesive or the like. The gap signal line 436B is also fixed to at least one of the coil portion 215 and the bobbin flange 242 by the coil protection portion 250 in addition to the adhesive or the like.

Sixth Embodiment

In the first embodiment described above, the temperature sensor 431 is provided on the radially inner side of the stator coil 211. Meanwhile, in a sixth embodiment, the temperature sensor 431 is provided on a radially outer side of the stator coil 211. Configurations, operations, and effects not particularly described in the sixth embodiment are the same as those in the first embodiment described above. In the sixth embodiment, differences from the first embodiment described above will be mainly described.

Figure 97:
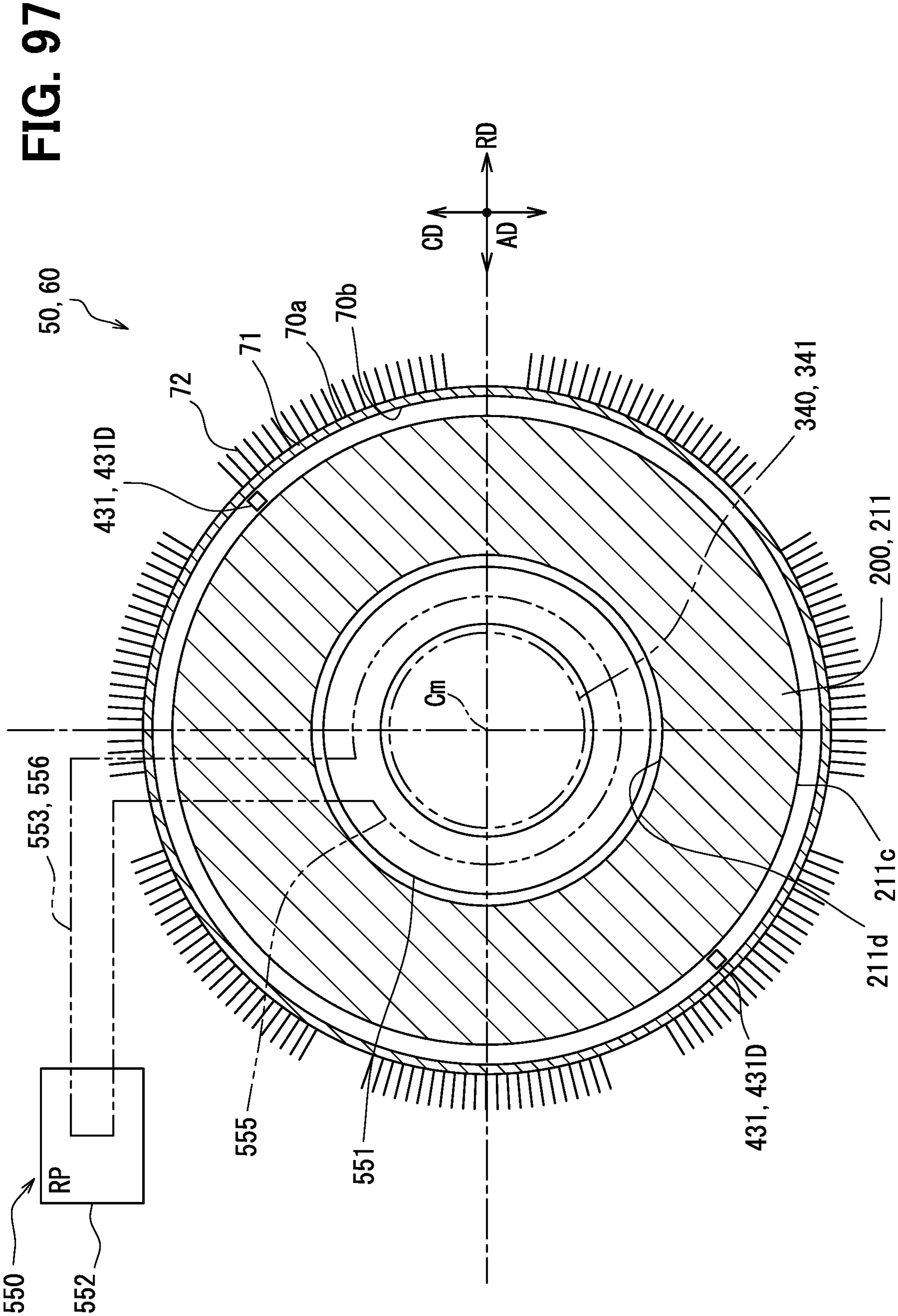
FIG. 97 is a schematic top view showing a stator coil and a temperature sensor of a motor device according to a sixth embodiment.

As shown in FIG. 97, a cooling device 550 is provided for the motor device 60. The cooling device 550 is provided in, for example, the motor device unit 50. The cooling device 550 is a cooling system that cools the motor device unit 50 using a refrigerant. As the refrigerant, for example, a fluid such as a coolant is used. A cooling method using the refrigerant may be referred to as a liquid cooling method. In the present embodiment, both the air cooling method and the liquid cooling method are used as the cooling method of the motor device unit 50.

The cooling device 550 includes an inner peripheral heat absorption portion 551, a refrigerant pump 552, and a refrigerant flow channel 553. In the cooling device 550, the refrigerant flows through the refrigerant flow channel 553. The refrigerant flow channel 553 is, for example, a circulation flow channel through which the refrigerant is circulated. The refrigerant pump 552 pumps the refrigerant in the refrigerant flow channel 553 such that the refrigerant flows through the refrigerant flow channel 553. The refrigerant pump 552 is a circulation pump for circulating the refrigerant in the refrigerant flow channel 553. The refrigerant pump 552 is connected to, for example, the shaft 340, and causes the refrigerant to flow through the refrigerant flow channel 553 as the motor 61 is driven, for example. The refrigerant pump 552 may be driven independently of the motor 61.

The refrigerant flow channel 553 includes a heat absorption channel 555 and a heat radiation channel 556. The heat absorption channel 555 is a portion in the refrigerant flow channel 553 at which the refrigerant absorbs heat from a cooling target. The cooling target is at least a part of the motor device 60, and is, for example, the stator coil 211. The heat radiation channel 556 is a portion in the refrigerant flow channel 553 at which the refrigerant releases the heat to the outside. The heat radiation channel 556 is provided outside the motor device 60, for example, and can release the heat of the refrigerant to external air or the like.

The inner peripheral heat absorption portion 551 forms the heat absorption channel 555. The inner peripheral heat absorption portion 551 is provided on a radially inner side of the stator coil 211. The inner peripheral heat absorption portion 551 extends along the coil inner peripheral surface 211*d* in the circumferential direction CD. The inner peripheral heat absorption portion 551 extends in an annular shape in the circumferential direction CD. The inner peripheral heat absorption portion 551 is located at a position separated from the stator coil 211 toward a radially inner side. The inner peripheral heat absorption portion 551 is provided between the shaft main body 341 and the coil protection portion 250 in the radial direction RD.

In the inner peripheral heat absorption portion 551, the heat absorption channel 555 extends along the coil inner peripheral surface 211*d*. For example, in the inner peripheral heat absorption portion 551, the heat absorption channel 555 extends in an annular shape in the circumferential direction CD. In the inner peripheral heat absorption portion 551, the refrigerant flows along the coil inner peripheral surface 211*d* in the circumferential direction CD. The inner peripheral heat absorption portion 551 absorbs heat from the stator coil 211. In the inner peripheral heat absorption portion 551, the refrigerant flowing through the heat absorption channel 555 absorbs heat released from the coil inner peripheral surface 211*d* or the like. That is, the inner peripheral heat absorption portion 551 cools the stator coil 211 from an inner peripheral side of the stator coil 211.

A heat radiation effect of the stator coil 211 based on the inner peripheral heat absorption portion 551 is higher than a heat radiation effect of the stator coil 211 based on the motor fin 72. In the stator coil 211, heat radiated toward the radially inner side is more than heat radiated toward the radially outer side. In the stator coil 211, an amount of heat per unit time released to the radially inner side by the inner peripheral heat absorption portion 551 is larger than an amount of heat per unit time released to the radially outer side by the motor fin 72. In the stator coil 211, an amount of heat per unit area released from the coil inner peripheral surface 211*d* is larger than an amount of heat per unit area released from the coil outer peripheral surface 211*c*. The inner peripheral heat absorption portion 551 accelerates the heat radiation from the stator coil 211 toward the radially inner side such that the heat radiated from the stator coil 211 toward the radially inner side is more than the heat radiated from the stator coil 211 toward the radially outer side. The inner peripheral heat absorption portion 551 corresponds to the heat radiation accelerating portion and an inner peripheral accelerating portion.

In a configuration in which the heat radiation portion such as the motor fin 72 is provided on only the radially outer side or the radially inner side of the stator coil 211 as in the first embodiment, the heat radiation portion corresponds to the heat radiation accelerating portion. In a configuration in which the heat radiation portion is provided on both the radially outer side and radially inner side of the stator coil 211 as in the present embodiment, one of the heat radiation portion on the radially outer side and the heat radiation portion on the radially inner side which has larger heat radiation corresponds to the heat radiation accelerating portion. In a configuration in which the heat radiation portion on the radially outer side is the heat radiation accelerating portion, the heat radiation portion corresponds to the outer peripheral accelerating portion. In a configuration in which the heat radiation portion on the radially inner side is the heat radiation accelerating portion, the heat radiation portion corresponds to the inner peripheral accelerating portion. The present embodiment is an example in which the heat radiation portion on the radially inner side corresponds to the inner peripheral accelerating portion.

The temperature sensor 431 is provided on a radially outer side of the stator coil 211. The temperature sensor 431 provided on the radially outer side of the stator coil 211 may be referred to as an outer peripheral sensor 431D. The outer peripheral sensor 431D is provided between the stator coil 211 and the housing main body 71 in the radial direction RD. The outer peripheral sensor 431D is fixed to the stator coil 211 by an adhesive or the like. The outer peripheral sensor 431D is in contact with the stator coil 211. The outer peripheral sensor 431D is fixed to, for example, the coil outer peripheral surface 211*c*. The outer peripheral sensor 431D is embedded in the coil protection portion 250. The outer peripheral sensor 431D is also fixed to the stator coil 211 by the coil protection portion 250 in addition to the adhesive or the like. The outer peripheral sensor 431D corresponds to the temperature detection unit, the embedded detection unit, and an outer peripheral detection unit.

The temperature signal wiring 436 not shown extends from the outer peripheral sensor 431D along the motor inner peripheral surface 70*b* in the axial direction AD and is led out from the rear frame opening portion 373. In the present embodiment, the temperature signal wiring 436 does not traverse the stator coil 211 in the radial direction RD. That is, the temperature signal wiring 436 includes the lead-out line portion 438, and does not include the transversal line portion 437.

According to the present embodiment, the inner peripheral heat absorption portion 551 serving as the heat radiation propulsion unit is provided on the radially inner side of the stator coil 211. Therefore, an effect of cooling the motor device 60 from the radially inner side of the stator coil 211 can be applied by the inner peripheral heat absorption portion 551. Moreover, the outer peripheral sensor 431D, which is the temperature sensor 431, is provided on a side opposite to the inner peripheral heat absorption portion 551 with the stator coil 211 interposed therebetween. In the configuration, due to the cooling effect of the inner peripheral heat absorption portion 551, a detected temperature of the outer peripheral sensor 431D is less likely to be lower than an actual coil temperature. That is, a difference between the detected temperature of the outer peripheral sensor 431D and the actual coil temperature is less likely to be generated. Therefore, as in the first embodiment described, in the motor device 60, the detection accuracy for the coil temperature can be improved while enhancing the cooling effect.

For example, a comparison configuration which is different from that of the present embodiment and in which the temperature sensor 431 is provided on the inner peripheral side of the stator coil 211 together with the inner peripheral heat absorption portion 551 is assumed. In the comparison configuration, the heat of the stator coil 211 passes through the heat radiation path extending toward the radially inner side to be absorbed by the inner peripheral heat absorption portion 551, and is released to the outside via the refrigerant flowing through the inner peripheral heat absorption portion 551.

In the comparison configuration, the temperature sensor 431 exists on the heat radiation path on the radially inner side of the stator coil 211. Therefore, the temperature sensor 431 is likely to be cooled as the heat is released from stator coil 211 toward the inner peripheral heat absorption portion 551. In this way, when an influence of heat transfer, that is based on the inner peripheral heat absorption portion 551, on the temperature sensor 431 is large, there is a concern that the temperature measurement accuracy of the temperature sensor 431 is deteriorated.

With respect to the comparison configuration, in the present embodiment, the outer peripheral sensor 431D is provided on the side opposite to the heat radiation path with the stator coil 211 interposed therebetween. In the configuration, it can be avoided that the outer peripheral sensor 431D is cooled as the heat is released from the stator coil 211 toward the inner peripheral heat absorption portion 551. Therefore, the influence of the heat transfer, that is based on the inner peripheral heat absorption portion 551, on the outer peripheral sensor 431D is reduced. Therefore, the temperature measurement accuracy of the outer peripheral sensor 431D can be improved.

According to the present embodiment, the inner peripheral heat absorption portion 551 is provided on the radially inner side of the stator coil 211, and the outer peripheral sensor 431D is provided on the radially outer side of the stator coil 211. Therefore, a configuration in which the difference between the detected temperature of the outer peripheral sensor 431D and the actual coil temperature is less likely to be generated while cooling the stator coil 211 from the radially inner side by the inner 110/139 peripheral heat absorption portion 551 can be implemented.

Seventh Embodiment

In the first embodiment described above, as a liquid-cooling heat radiation accelerating portion, the inner peripheral heat absorption portion 551 is provided on the radially inner side of the stator coil 211. Meanwhile, in a seventh embodiment, the liquid-cooling heat radiation accelerating portion is not provided on the radially outer side of the stator coil 211 and provided on a radially outer side of the stator coil 211. Configurations, operations, and effects not particularly described in the seventh embodiment are the same as those in the first embodiment described above. In the seventh embodiment, differences from the first embodiment described above will be mainly described.

Figure 98:
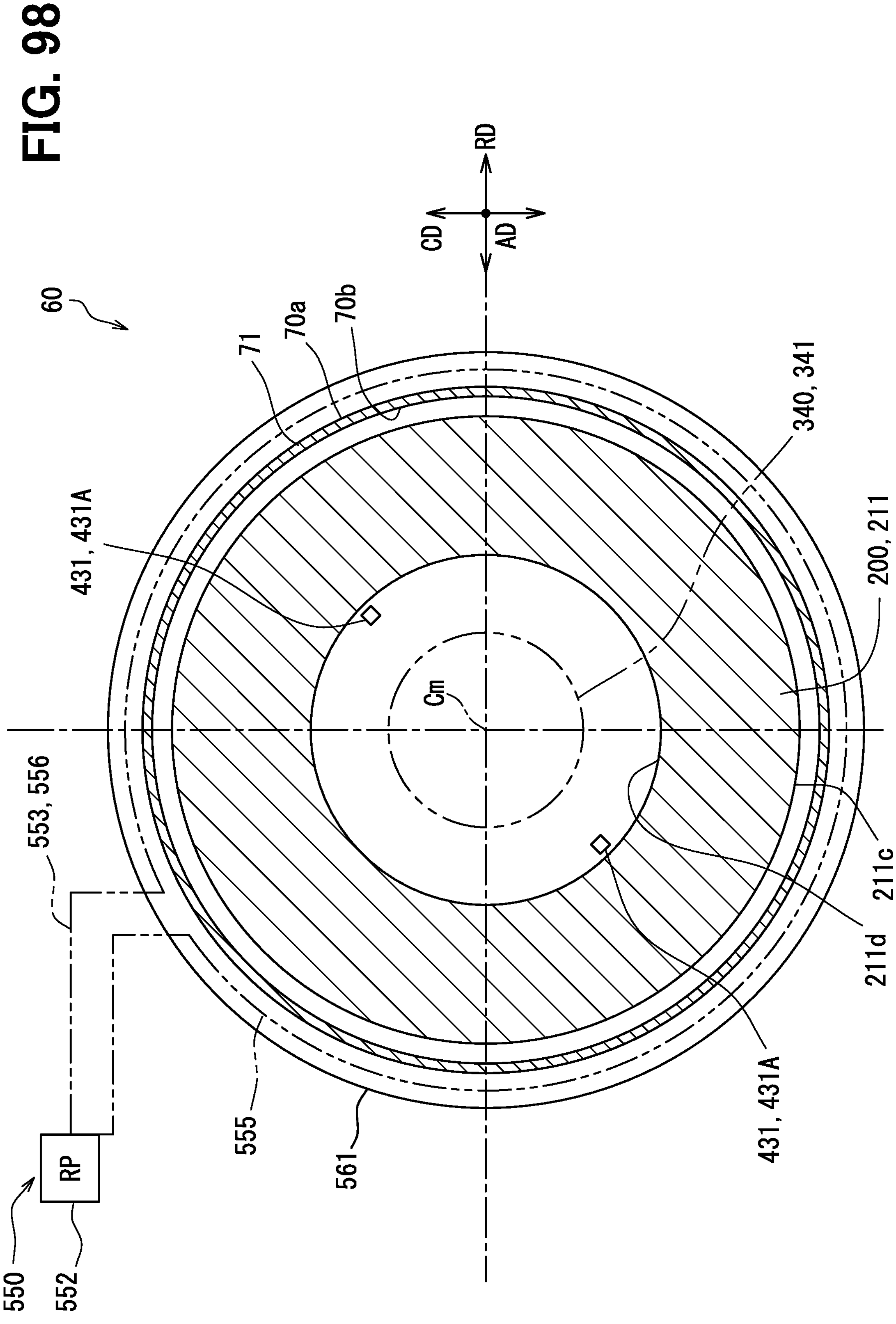
FIG. 98 is a schematic top view showing a stator coil and a temperature sensor of a motor device according to a seventh embodiment.

As shown in FIG. 98, as in the sixth embodiment described above, the cooling device 550 is provided for the motor device 60. The cooling device 550 has a configuration similar to that of the sixth embodiment described above. However, in the present embodiment, unlike the sixth embodiment described above, the cooling device 550 includes an outer peripheral heat absorption portion 561 instead of the inner peripheral heat absorption portion 551.

The outer peripheral heat absorption portion 561 forms the heat absorption channel 555. The outer peripheral heat absorption portion 561 is provided on the radially outer side of the stator coil 211. The outer peripheral heat absorption portion 561 extends along the coil outer peripheral surface 211$c$ in the circumferential direction CD. The outer peripheral heat absorption portion 561 extends in an annular shape in the circumferential direction CD. The outer peripheral heat absorption portion 561 is located at a position separated toward a radially outer side from the stator coil 211. For example, the outer peripheral heat absorption portion 561 is provided on an outer peripheral side of the housing main body 71. The outer peripheral heat absorption portion 561 is provided to be overlapped with the motor outer peripheral surface 70$a$. In the motor housing 70, the outer peripheral heat absorption portion 561 is provided on the motor outer peripheral surface 70$a$ instead of the motor fins 72.

In the outer peripheral heat absorption portion 561, the heat absorption channel 555 extends along the coil outer peripheral surface 211$c$. For example, in the outer peripheral heat absorption portion 561, the heat absorption channel 555 extends in an annular shape in the circumferential direction CD. In the outer peripheral heat absorption portion 561, the refrigerant flows along the coil outer peripheral surface 211$c$ in the circumferential direction CD. In the outer peripheral heat absorption portion 561, the refrigerant flowing through the heat absorption channel 555 absorbs heat released from the coil outer peripheral surface 211$c$ or the like. That is, the outer peripheral heat absorption portion 561 cools the stator coil 211 from the outer peripheral side of the stator coil 211.

In the present embodiment, as in the first embodiment described above, the heat radiated from the stator coil 211 toward the radially inner side is more than the heat radiated from the stator coil 211 toward the radially outer side. The outer peripheral heat absorption portion 561 accelerates the heat radiation of the stator coil 211 toward the radially outer side such that the heat radiated from the stator coil 211 toward the radially inner side is more than the heat radiated from the stator coil 211 toward the radially outer side. The outer peripheral heat absorption portion 561 corresponds to the heat radiation accelerating portion and the outer peripheral accelerating portion.

As in the first embodiment described above, the temperature sensor 431 is provided on the radially inner side of the stator coil 211. That is, the temperature sensor 431 is provided on a side opposite to the outer peripheral heat absorption portion 561 with the stator coil 211 interposed therebetween. Therefore, according to the present embodiment, due to the cooling effect of the outer peripheral heat absorption portion 561, a detected temperature of the temperature sensor 431 is less likely to be lower than an actual coil temperature. Therefore, in the motor device 60, the detection accuracy of the temperature sensor 431 for the coil temperature can be improved while enhancing the cooling effect.

The outer peripheral heat absorption portion 561 may be provided on an inner peripheral side of the housing main body 71 as long as the outer peripheral heat absorption portion 561 is provided on the radially outer side of the stator coil 211. For example, the outer peripheral heat absorption portion 561 may be provided between the stator coil 211 and the housing main body 71 in the radial direction RD. Both the motor fins 72 and the outer peripheral heat absorption portion 561 may be provided on the motor housing 70.

Eighth Embodiment

In the sixth embodiment described above, the inner peripheral heat absorption portion 551 is provided on the radially inner side of the stator coil 211 as the liquid-cooling heat radiation accelerating portion. Meanwhile, in an eighth embodiment, an air-cooling heat radiation accelerating portion is provided on a radially inner side of the stator coil 211. Configurations, operations, and effects not particularly described in the eighth embodiment are the same as those in the first embodiment described above. In the eighth embodiment, differences from the first embodiment described above will be mainly described.

Figure 99:
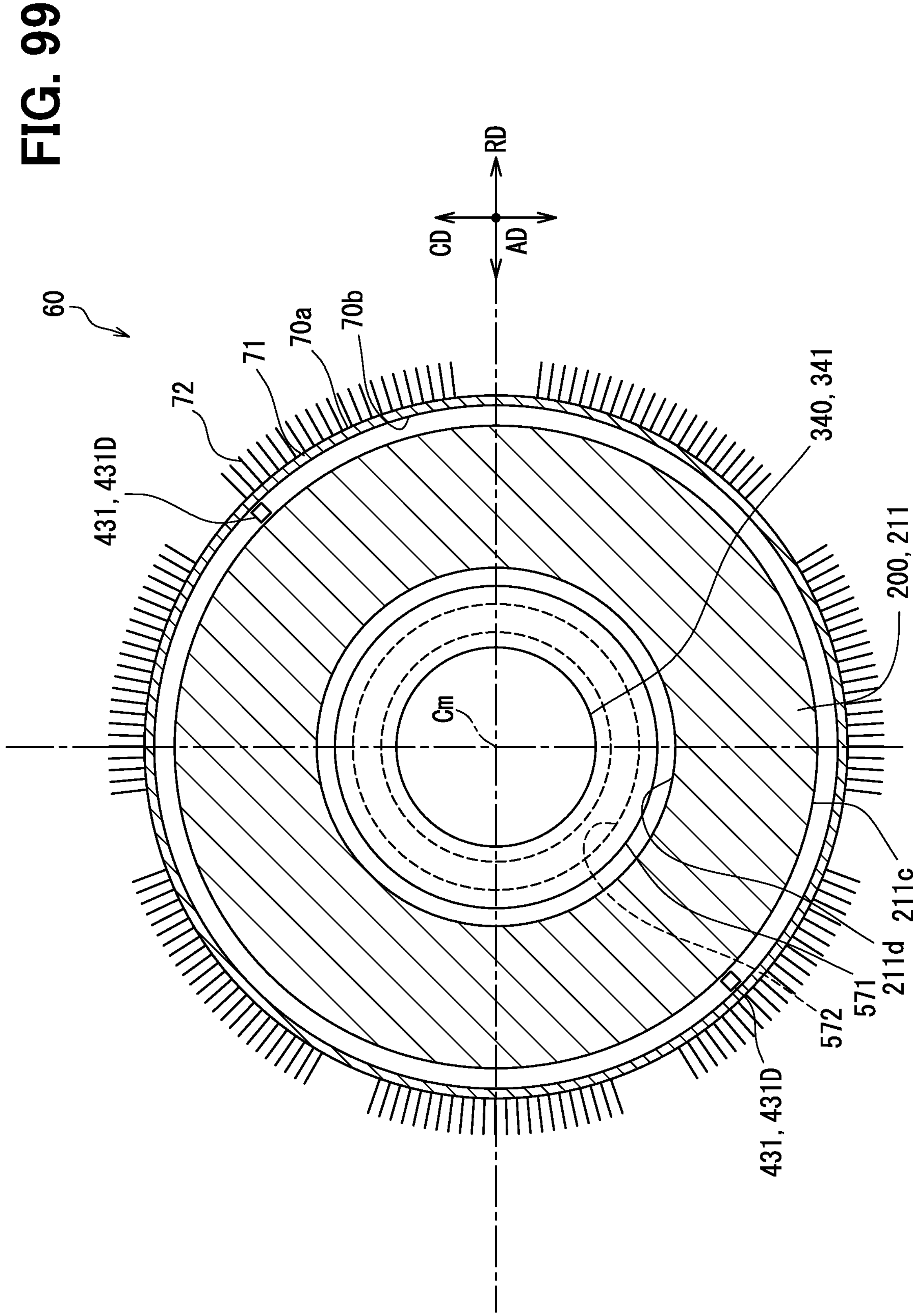
FIG. 99 is a schematic top view showing a stator coil and a temperature sensor of a motor device according to an eighth embodiment.

As shown in FIG. 99, the motor device 60 includes an inner peripheral cooling portion 571. The inner peripheral cooling portion 571 is provided on a radially inner side of the stator coil 211. The inner peripheral cooling portion 571 extends along the coil inner peripheral surface 211$d$ in the circumferential direction CD. The inner peripheral cooling portion 571 extends in an annular shape in the circumferential direction CD. The inner peripheral cooling portion 571 is located at a portion separated from the stator coil 211 toward the radially inner side.

The inner peripheral cooling portion 571 has an inner peripheral cooling passage 572. The inner peripheral cooling passage 572 is an internal space of an inner peripheral heat radiation channel. The inner peripheral cooling portion 571 is an air passage forming portion that forms the inner peripheral cooling passage 572. The inner peripheral cooling portion 571 includes the shaft main body 341, the coil protection portion 250, and the like. In the inner peripheral cooling portion 571, the inner peripheral cooling passage 572 is formed by an outer peripheral surface of the shaft main body 341 and an inner peripheral surface of the coil protection portion 250. In FIG. 99, illustration of the coil protection portion 250 is omitted.

In the inner peripheral cooling portion 571, the inner peripheral cooling passage 572 extends along the coil inner peripheral surface 211*d*. For example, in the inner peripheral cooling portion 571, the inner peripheral cooling passage 572 extends in an annular shape in the circumferential direction CD. In the inner peripheral cooling portion 571, a gas such as external air flows through the inner peripheral cooling passage 572 as cooling air. The cooling air flows along the coil inner peripheral surface 211*d* in the circumferential direction CD and the axial direction AD. Heat of the stator coil 211 is released to the inner peripheral cooling portion 571. In the inner peripheral cooling portion 571, the heat of the stator coil 211 is released to the cooling air flowing through the inner peripheral cooling passage 572. The cooling air flowing through the inner peripheral cooling passage 572 cools the stator coil 211. The inner peripheral cooling portion 571 cools the stator coil 211 from an inner peripheral side of the stator coil 211 by the cooling air.

A heat radiation effect of the stator coil 211 based on the inner peripheral cooling portion 571 is higher than a heat radiation effect of the stator coil 211 based on the motor fins 72. In the stator coil 211, as in the sixth embodiment described above, the heat radiated toward the radially inner side is more than the heat radiated toward the radially outer side. The inner peripheral cooling portion 571 accelerates the heat radiation of the stator coil 211 toward the radially inner side such that the heat radiated from the stator coil 211 toward the radially inner side is more than the heat radiated from the stator coil 211 toward the radially outer side. The inner peripheral cooling portion 571 corresponds to the heat radiation accelerating portion and the inner peripheral accelerating portion. The present embodiment is an example in which in a configuration in which the heat radiation portions are provided on both the radially outer side and the radially inner side of the stator coil 211, the heat radiation portion on the radially inner side serves as the heat radiation accelerating portion. The inner peripheral cooling portion 571 is an air-cooling heat radiation accelerating portion.

As in the sixth embodiment described above, the temperature sensor 431 is provided on the radially outer side of the stator coil 211. That is, the outer peripheral sensor 431D is provided on the radially outer side of the stator coil 211.

According to the present embodiment, the inner peripheral cooling portion 571 serving as the heat radiation propulsion unit is provided on the radially inner side of the stator coil 211. Therefore, an effect of cooling the motor device 60 from the radially inner side of the stator coil 211 can be applied by the inner peripheral cooling portion 571. Moreover, the outer peripheral sensor 431D is provided on a side opposite to the inner peripheral cooling portion 571 with the stator coil 211 interposed therebetween. In the configuration, due to the cooling effect of the inner peripheral cooling portion 571, a detected temperature of the outer peripheral sensor 431D is prevented from being lower than an actual coil temperature. In addition, a configuration in which a difference between the detected temperature of the outer peripheral sensor 431D and the actual coil temperature is less likely to be generated while cooling the stator coil 211 from the radially inner side by the inner peripheral cooling portion 571 can be implemented.

Ninth Embodiment

In the eighth embodiment described above, in a configuration in which the heat radiation portions are provided on both the radially outer side and the radially inner side of the stator coil 211, the heat radiation portion on the radially inner side serves as the heat radiation accelerating portion. Meanwhile, in a ninth embodiment, in a configuration in which heat radiation portions are provided on both the radially outer side and the radially inner side of the stator coil 211, the heat radiation portion on the radially outer side serves as the heat radiation accelerating portion. Configurations, operations, and effects not particularly described in the ninth embodiment are the same as those in the eighth embodiment described above. In the ninth embodiment, differences from the eighth embodiment described above will be mainly described.

Figure 100:
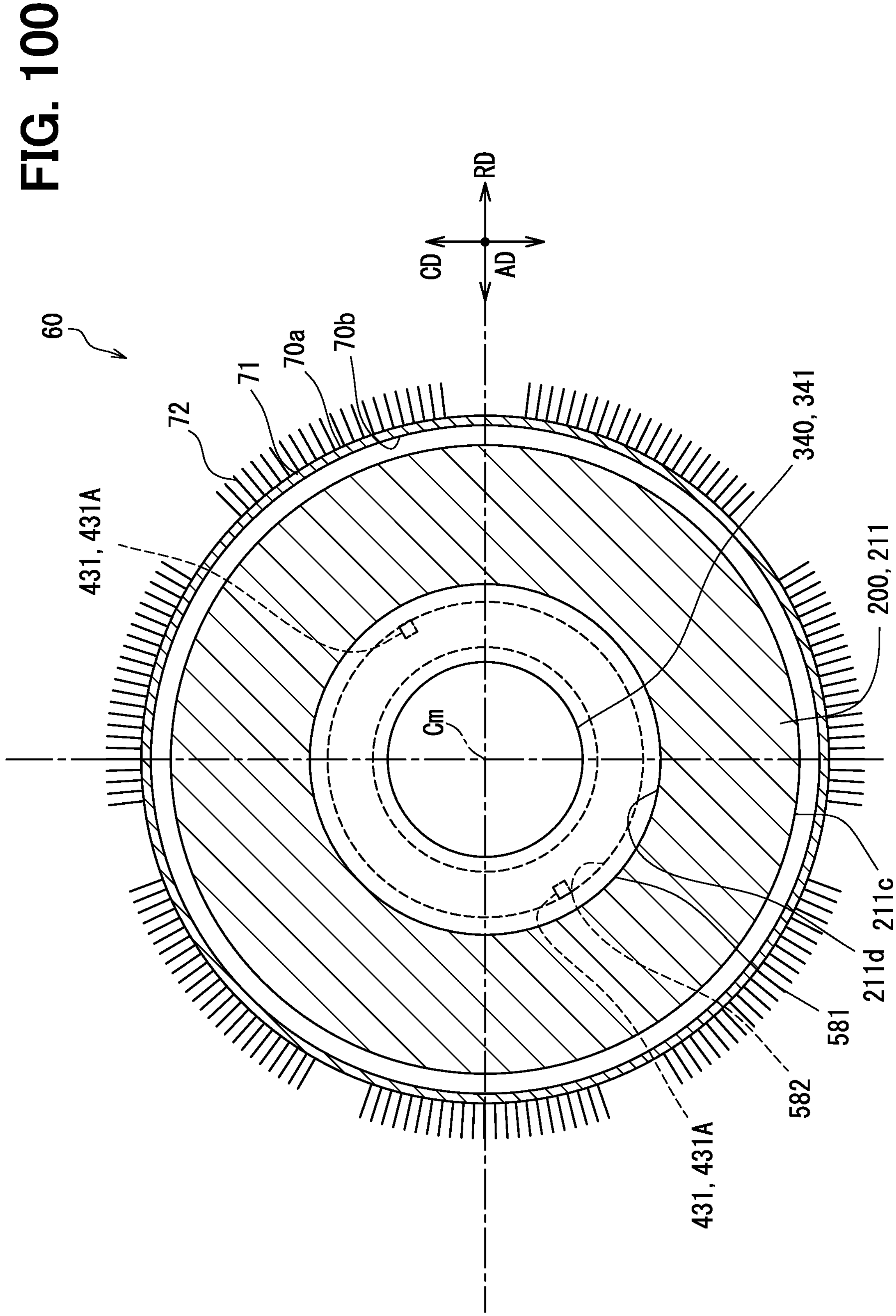
FIG. 100 is a schematic top view showing a stator coil and a temperature sensor of a motor device according to a ninth embodiment.

As shown in FIG. 100, the motor device 60 includes an inner peripheral cooling portion 581 and an inner peripheral cooling passage 582. The inner peripheral cooling portion 581 and the inner peripheral cooling passage 582 have configurations basically similar to those of the inner peripheral cooling portion 571 and the inner peripheral cooling passage 572 according to the eighth embodiment described above. In the present embodiment, unlike the eighth embodiment described above, the motor device 60 does not include the coil protection portion 250. That is, the stator coil 211 is not protected by the coil protection portion 250. Therefore, the inner peripheral cooling portion 581 includes the stator coil 211 instead of the coil protection portion 250. In the inner peripheral cooling portion 581, the inner peripheral cooling passage 582 is formed by the coil inner peripheral surface 211*d* or the like.

In the present embodiment, unlike the eighth embodiment described above, a heat radiation effect of the stator coil 211 based on the motor fin 72 is higher than a heat radiation effect of the stator coil 211 based on the inner peripheral cooling portion 581. Therefore, in the stator coil 211, heat radiated toward the radially outer side is more than heat radiated toward the radially inner side. As in the first embodiment described above, the motor fin 72 accelerates the heat radiation of the stator coil 211 toward the radially outer side such that the heat radiated from the stator coil 211 toward the radially outer side is more than the heat radiated from the stator coil 211 toward the radially outer side. In the present embodiment, even when the motor device 60 includes the inner peripheral cooling portion 581, the motor fin 72 corresponds to the heat radiation accelerating portion and the outer peripheral accelerating portion.

Regarding the temperature sensor 431, as in the first embodiment described above, the busbar sensor 431A is provided on the neutral point busbar 290. In the present embodiment, the busbar sensor 431A is provided on the inner peripheral cooling portion 581. For example, the busbar sensor 431A is accommodated in the inner peripheral cooling passage 582.

Other Embodiments

The disclosure in the present description is not limited to the illustrated embodiments. The disclosure encompasses the illustrated embodiments and modifications thereof by those skilled in the art. For example, the disclosure is not limited to the combination of components and elements described in the embodiments, and various modifications and implementations can be performed. The disclosure may be implemented in various combinations. The disclosure may have an additional portion that can be added to the embodiments. The disclosure encompasses the omission of components and elements of the embodiments. The disclosure encompasses the replacement or combination of components, elements between one embodiment and another embodiment. The disclosed technical scope is not limited to those described in the embodiments. The disclosed technical scope is indicated by the description of the claims, and should be construed to include all changes within the meaning and range equivalent to the description of the claims.

<Configuration Group A>

In each of the embodiments described above, the busbar unit 260 and the neutral point busbar 290 may be separated from each other in at least one of the axial direction AD, the radial direction RD, and the circumferential direction CD. The electric power busbar 261 may not be protected by the busbar protection portion 270. In the configuration, when the neutral point busbar 290 is provided in the stator-side space S1 and the electric power busbar 261 is provided in the inverter-side space S2, the insulation reliability between the electric power busbar 261 and the neutral point busbar 290 is also less likely to be decreased. One of the electric power busbar 261 and the neutral point busbar 290 may be provided in the stator-side space S1, and the other may be provided in the inverter-side space S2.

<Configuration Group B>

In each of the embodiments described above, the pair of axially inward magnets 312*a* and 312*b* may be oriented to face opposite sides in the circumferential direction CD as long as the pair of axially inward magnets 312*a* and 312*b* are oriented to be inclined with respect to the motor axis Cm. The pair of axially outward magnets 313*a* and 313*b* may be oriented to face each other in the circumferential direction CD as long as the pair of axially outward magnets 313*a* and 313*b* are oriented to be inclined with respect to the motor axis Cm. The pair of axially inward magnets 312*a* and 312*b* and the pair of axially outward magnets 313*a* and 313*b* may be inclined with respect to the motor axis Cm in the radial direction RD.

<Configuration Group C>

In each of the embodiments described above, in the motor housing 70, the coil portion 215 may be disposed regardless of the position of the stator holding portion 171. For example, the coil portion 215 may be provided at a position deviated from the axial holding portion 174 in the circumferential direction CD. In the motor housing 70, as long as the coil protection portion 250 is in contact with the inner peripheral surface 70*b*, the stator holding portion 171 may not be provided on the inner peripheral surface 70*b*.

<Configuration Group D>

In each of the embodiments described above, the motor device 60 and the inverter device 80 may share the housing. For example, the motor 61 and the inverter 81 may be accommodated in one housing. In the unit housing 51, at least one of the motor fin 72 and the inverter fin 92 may be provided. In the unit housing 51, the coil protection portion 250 may be provided at a position separated from the inner peripheral surface 70*b*.

<Configuration Group O>

In each of the embodiments described above, the busbar detection unit such as the busbar sensor 431A may be provided on the energization busbar such as the neutral point busbar 290. In the motor device 60, the electric power busbar 261 also corresponds to the energization busbar electrically connected to the stator coil 211. Therefore, in a configuration in which the electric power busbar 261 is provided at a position close to the stator coil 211, the busbar detection unit may be provided on the electric power busbar 261. For example, in the first embodiment described above, the busbar detection unit may be fixed to the electric power busbar 261 or the busbar main body 262.

In each of the embodiments described above, the coil detection unit such as the coil sensor 431B may be provided on a coil such as the stator coil 211. That is, the coil detection unit may be provided on the coil portion 215. For example, in the third embodiment described above, the coil detection unit may be fixed to the coil portion 215 on the radially outer side of the stator coil 211. The coil detection unit may be provided at a position between two coil portions 215 adjacent to each other in the radial direction RD.

In each of the embodiments described above, the lead-out detection unit such as the lead-out sensor 431C may be provided on the coil lead-out wire such as the neutral lead-out wire 213. In the motor device 60, the electric power lead-out wire 212, the first extending wire 216, and the second extending wire 217 also correspond to the coil lead-out wire led out from the stator coil 211. For example, in the fourth embodiment described above, the lead-out detection unit may be fixed to the first extending wire 216 or the second extending wire 217.

In each of the embodiments described above, the inner peripheral detection unit such as the busbar sensor 431A may be provided on a radially inner side of the stator coil 211. For example, in the first embodiment described above, the inner peripheral detection unit may be fixed to somewhere in the coil unit 210 on the radially inner side of the stator coil 211. The inner peripheral detection unit may be fixed to the inner peripheral surface of the coil protection portion 250, the rear frame 370, and the drive frame 390. Further, the inner peripheral detection unit may be fixed to the bobbin 240.

In each of the embodiments described above, the outer peripheral detection unit such as the outer peripheral sensor 431D may be provided on a radially outer side of the stator coil 211. For example, in the sixth embodiment described above, the outer peripheral detection unit may be fixed to somewhere in the coil unit 210 on the radially outer side of the stator coil 211. For example, the outer peripheral detection unit may be fixed to the coil body 900 or the electric power lead-out wire 212. The outer peripheral detection unit may be fixed to the outer peripheral surface of the coil protection portion 250, the motor inner peripheral surface 70*b*, the rear frame 370, and the drive frame 390. Further, the outer peripheral detection unit may be fixed to the bobbin 240. In addition, in a configuration in which the neutral point busbar 290 is provided on a radially inner side of the stator coil 211, the outer peripheral detection unit may be provided on the neutral point busbar 290.

In each of the embodiments described above, the temperature detection unit such as the temperature sensor 431 may be provided at any position in the axial direction AD with respect to the stator coil 211. For example, in the first embodiment described above, the busbar sensor 431A may be provided on a side of the rear frame 370 facing the stator coil 211 in the axial direction AD. In the configuration, the neutral point busbar 290 may also be provided on the side of the rear frame 370 facing the stator coil 211 in the axial direction AD.

In each of the embodiments described above, the temperature detection unit such as the temperature sensor 431 may be provided at a position deviated from the stator coil 211 in the radial direction RD. For example, a part of the temperature detection unit may protrude from the stator coil 211 in the radial direction RD.

In each of the embodiments described above, the heat radiation portion on the radially outer side such as the motor fin 72 may not be provided on the motor outer peripheral surface 70*a*. That is, in the configuration in which the heat radiation accelerating portion is provided on the radially outer side of the stator coil 211 as the outer peripheral accelerating portion, the outer peripheral accelerating portion may be provided on a radially inner side of the motor outer peripheral surface 70*a*. For example, in the seventh embodiment described above, the outer peripheral heat absorption portion 561 may be incorporated in the housing main body 71. In the configuration, the outer peripheral heat absorption portion 561 is provided between the motor outer peripheral surface 70*a* and the motor inner peripheral surface 70*b*. The outer peripheral heat absorption portion 561 may be provided inside the motor housing 70 between the stator coil 211 and the motor inner peripheral surface 70*b*.

In each of the embodiments described above, the heat radiation portion on the radially inner side such as the inner peripheral heat absorption portion 551 may be provided on the shaft 340. That is, in a configuration in which the heat radiation accelerating portion is provided on the radially inner side of the stator coil 211 as the inner peripheral accelerating portion, the inner peripheral accelerating portion may be provided on the shaft 340. For example, in the sixth embodiment described above, the heat absorption channel 555 may be provided inside the shaft 340. In the configuration, a portion of the shaft 340 forming the heat absorption channel 555 is the inner peripheral heat absorption portion 551. In the shaft 340, the shaft main body 341, the shaft flange 342, and the like may be the inner peripheral heat absorption portion 551.

<Configuration Group A>

In a motor such as an axial gap motor, there is a concern that insulation reliability of an electrical insulation state between an electric power busbar and a neutral point busbar is decreased. In view of this concern, a rotary electric machine capable of enhancing the electrical insulation reliability is provided.

According to a feature A1, a neutral point busbar (290) is provided at a position separated from a busbar protection portion (270) that has an electrical insulation property and that protects an electric power busbar (261). In the configuration, the neutral point busbar (290) and the electric power busbar (261) are certainly not in contact with each other, and the neutral point busbar (290) and the busbar protection portion (270) are also not in contact with each other. Therefore, a decrease in the insulation reliability of an electrical insulation state between the neutral point busbar (290) and the electric power busbar (261) can be reduced due to separation between the neutral point busbar (290) and the busbar protection portion (270). Therefore, since the neutral point busbar (290) and the busbar protection portion (270) are separated from each other, the electrical insulation reliability of the rotary electric machine (60) can be enhanced.

According to a feature A10, an electric power busbar (261) is provided in one of a first space (S1) and a second space (S2) which are arranged in the axial direction (AD), and a neutral point busbar (290) is provided in the other space. Moreover, the first space (S1) and the second space (S2) are partitioned by a space partition portion (370). In the configuration, the space partition portion (370) restricts contact between the neutral point busbar (290) and the electric power busbar (261). In this way, the space partition portion (370) can reduce the decrease in the insulation reliability of the electrical insulation state between the neutral point busbar (290) and the electric power busbar (261). Therefore, the electrical insulation reliability of the rotary electric machine (60) can be enhanced by the space partition portion (370).

[Feature A1]

A rotary electric machine (60) to be driven by supply of electric power includes:

- a stator (200) including coils (211) of multiple phases;
- a rotor (300, 300*a*, 300*b*) configured to rotate about a rotation axis (Cm) and aligned with the stator in an axial direction (AD) in which the rotation axis extends;
- an electric power busbar (261) electrically connected to the coils and configured to supply the electric power to the coils;
- a busbar protection portion (270) having an electrical insulation property and configured to protect the electric power busbar; and
- a neutral point busbar (290) provided at a position separated from the busbar protection portion and electrically connected to a neutral point (65) in each of the coils of multiple phases.

[Feature A2]

The rotary electric machine according to feature A1, further includes:

- a space partition portion (370) extending in a direction orthogonal to the rotation axis and partitioning a first space (S1) in which the stator is accommodated and a second space (S2) in which the stator is not accommodated such that the first space and the second space are arranged along the rotation axis, and
- the electric power busbar is provided in one of the first space and the second space, and the neutral point busbar is provided in the other space.

[Feature A3]

In the rotary electric machine according to feature A1 or A2, the neutral point busbar and the busbar protection portion are provided at positions separated from each other in the axial direction.

[Feature A4]

In the rotary electric machine according to any one of features A1 to A3,

- a first rotor (300*a*) and a second rotor (300*b*) aligned with the first rotor with the stator interposed therebetween in the axial direction are provided as the rotor, and
- the coil is formed by winding a coil wire (220) including multiple wires (223).

[Feature A5]

In the rotary electric machine according to any one of features A1 to A4,

- the coil is formed by multiple coil portions (215) around each of which a coil wire (220) is wound and which are arranged in a circumferential direction (CD) of the rotation axis, and
- two of the coil portions adjacent to each other in the circumferential direction are different in the number of turns.

[Feature A6]

The rotary electric machine according to any one of features A1 to A5, further includes:

a relay busbar (280) electrically connected to an electric power conversion unit (81) configured to convert the electric power and to supply the converted electric power to the electric power busbar; and a terminal block (285) configured to support a connection portion between the electric power busbar and the relay busbar.

[Feature A7]

In the rotary electric machine according to feature A6, when an area around the rotation axis is divided into multiple divided regions (RE) at equal intervals in a circumferential direction of the rotation axis, the relay busbar is provided to each of the multiple divided regions.

[Feature A8]

The rotary electric machine according to any one of features A1 to A7, further includes:

a bearing (360) configured to rotatably support the rotor; and a support frame (370) including a bearing support portion (372) configured to support the bearing and a busbar support portion (371) configured to support the busbar protection portion.

[Feature A9]

The rotary electric machine according to any one of features A1 to A8, further includes:

an orthogonal frame (370) extending in a direction orthogonal to the rotation axis; and a rotation detection unit (421) provided on a side opposite to the neutral point busbar with the orthogonal frame interposed therebetween in the axial direction and configured to detect a rotation angle of the rotor.

[Feature A10]

A rotary electric machine (60) to be driven by supply of electric power includes:

a stator (200) including coils (211) of multiple phases;

a rotor (300, 300*a*, 300*b*) aligned with the stator in an axial direction (AD) in which a rotation axis (Cm) extends and configured to rotate about the rotation axis with respect to the stator;

an electric power busbar (261) electrically connected to the coils and configured to supply the electric power to the coils;

a neutral point busbar (290) electrically connected to a neutral point (65) in each of the multi-phase coils; and a space partition portion (370) extending in a direction orthogonal to the rotation axis and partitioning a first space (S1) in which the stator is accommodated and a second space (S2) in which the stator is not accommodated such that the first space and the second space are arranged in the axial direction, and the electric power busbar is provided in one of the first space and the second space, and the neutral point busbar is provided in the other space.

<Configuration Group B>

In a motor such as an axial gap motor, there is a concern that the energy efficiency is decreased. In view of this concern, a rotary electric machine capable of improving the energy efficiency is provided.

According to a feature B1, magnetic flux generated by a pair of peripheral magnets (311*a*, 311*b*) and a pair of axially inward magnets (312*a*, 312*b*) is concentrated on the stator (200), and thus a magnetic field on the stator (200) tends to be strengthened. Therefore, the energy efficiency of a rotary electric machine (60) can be improved.

[Feature B1]

A rotary electric machine (60) to be driven by supply of electric power includes:

a stator (200) including coils (211) of multiple phases; and a rotor (300, 300*a*, 300*b*) configured to rotate about a rotation axis (Cm) and aligned with the stator in an axial direction (AD) in which the rotation axis extends;

the rotor includes multiple magnets (310, 311*a*, 311*b*, 312*a*, 312*b*, 313*a*, 313*b*) arranged in a circumferential direction (CD) of the rotation axis, and the multiple magnets include a pair of axially inward magnets (312*a*, 312*b*) adjacent to each other in the circumferential direction and oriented to be inclined with respect to the rotation axis in a manner of facing the stator in the axial direction, and a pair of peripheral magnets (311*a*, 311 *b*) adjacent to each other in the circumferential direction with the pair of axially inward magnets interposed therebetween and oriented to face each other in the circumferential direction.

[Feature B2]

In the rotary electric machine according to feature B1, the pair of axially inward magnets are oriented to be inclined with respect to the rotation axis in the circumferential direction in a manner of facing the stator in the axial direction and facing each other in the circumferential direction.

[Feature B3]

In the rotary electric machine according to feature B2, the multiple magnets further include a pair of axially outward magnets (313*a*, 313*b*) provided on opposite sides of the pair of axially inward magnets with the peripheral magnets interposed therebetween in the circumferential direction and adjacent to each other in the circumferential direction, and the pair of axially outward magnets are oriented to be inclined with respect to the rotation axis in the circumferential direction in a manner of facing a side opposite to the stator in the axial direction and facing opposite sides in the circumferential direction.

[Feature B4]

In the rotary electric machine according to feature B3, a pair of rotors are arranged in the axial direction with the rotor interposed therebetween, and one of the rotors is provided point-symmetrically with respect to the other of the rotors such that the pair of axially inward magnets of the one rotor (300*a*) and the pair of axially outward magnets of the other rotor (300*b*) are aligned in the axial direction.

[Feature B5]

In the rotary electric machine according to any one of features B1 to B4, each of the magnets has a magnet inclined surface (316*d*) inclined with respect to the rotation axis, and the rotor includes a magnet holder (320) overlapped with the magnet from one side in the axial direction, and a fixing support portion (330) having a support inclined surface (330*a*) inclined with respect to the rotation axis and configured to fix the magnet to the magnet holder such that the support inclined surface is overlapped with the magnet inclined surface and the magnet is sandwiched between the support inclined surface and the magnet holder.

[Feature B6]

In the rotary electric machine according to any one of features B1 to B5, the rotor includes multiple magnet units (316, 317, 318) each of which has a pair of unit side surfaces (316*c*) arranged in the circumferential direction, each of which includes at least one magnet, and which are arranged in the circumferential direction, the multiple magnet units include an inclined magnet unit (317) having a pair of unit side surfaces which are relatively inclined to be away from each other toward an outside in a radial direction (RD) of a rotation axis, and a parallel magnet unit (318) having a pair of unit side surfaces which are parallel to each other.

[Feature B7]

The rotary electric machine according to any one of features B1 to B6, further includes:

a shaft (340) including a shaft flange (342) which is aligned with the rotor in the axial direction and which is fixed to the rotor, and configured to rotate about the rotation axis together with the rotor; and a pressing member (350) configured to apply a pressing force (F3) to the rotor on a side opposite to the magnets with the shaft flange as a fulcrum (344*a*) of the rotor in a radial direction (RD) of the rotation axis such that a bending stress (F2) is generated on the rotor in a direction in which the magnet is away from the coils against an attraction force (F1) between the magnets and the coils.

[Feature B8]

In the rotary electric machine according to feature B7, the pressing member is a fixing tool (350) configured to fix the rotor to the shaft flange, and a portion (325) of the rotor to which the pressing member is fixed and a portion (345) of the shaft flange to which the pressing member is fixed are separated from each other in the axial direction.

[Feature B9]

In the rotary electric machine according to any one of features B1 to B8, a first rotor (300*a*) serving as the rotor is provided, a second rotor (300*b*) serving as the rotor and aligned with the first rotor with the stator interposed therebetween in the axial direction is provided, a shaft flange (342) is provided between the first rotor and the second rotor in the axial direction and rotates together with the first rotor and the second rotor about the rotation axis, a first rotor hole (325*a*) is formed in the first rotor and extends in the axial direction, a second rotor hole (325*b*) is formed in the second rotor at a position separated from the first rotor hole in the circumferential direction and extends in the axial direction, a first shaft hole (345*a*) is formed in the shaft flange at a position aligned with the first rotor hole in the axial direction and extends in the axial direction, a second shaft hole (345*b*) is formed in the shaft flange at a position aligned with the second rotor hole in the axial direction and extends in the axial direction, a first fixing tool (350*a*) for fixing the first rotor to the shaft flange is inserted into the first rotor hole and the first shaft hole, and a second fixing tool (350*b*) for fixing the second rotor to the shaft flange is inserted into the second rotor hole and the second shaft hole.

<Configuration Group C>

In a motor such as an axial gap motor, there is a concern that a heat radiation effect is insufficient. In view of this concern, a rotary electric machine capable of enhancing the heat radiation effect is provided.

According to a feature C1, a coil protection portion (250) is provided in a state of being overlapped with an inner peripheral surface (70*b*) of an electric machine housing (70). In the configuration, heat of a coil (211) is easily transferred to the electric machine housing (70) via the coil protection portion (250). Moreover, radiation fins (72) are provided on an outer peripheral surface (70*a*) of the electric machine housing (70), and thus the heat transferred from the coil protection portion (250) to the electric machine housing (70) is easily released to the outside by the radiation fins (72). Therefore, the heat radiation effect of a rotary electric machine (60) can be enhanced.

[Feature C1]

A rotary electric machine (60) to be driven by supply of electric power includes:

a stator (200) including coils (211) of multiple phases;

a rotor (300, 300*a*, 300*b*) configured to rotate about a rotation axis (Cm) and aligned with the stator in an axial direction (AD) in which the rotation axis extends;

an electric machine housing (70) accommodating the stator and the rotor; and radiation fins (72) provided on an outer peripheral surface (70*a*) of the electric machine housing and configured to release heat, and the stator includes a coil protection portion (250) provided in a state of being overlapped with an inner peripheral surface (70*b*) of the electric machine housing, having a thermal conduction property, and configured to protect the coils.

[Feature C2]

In the rotary electric machine according to the feature C1, the electric machine housing includes multiple projection portions (171, 172, 173, 174) provided on the inner peripheral surface, and the coil protection portion is in a state of entering between the projection portions from an inner side in a radial direction (RD) of the rotation axis.

[Feature C3]

In the rotary electric machine according to the feature C2, the multiple projection portions include multiple axial projection portions (174) each of which extends in the axial direction and which are arranged in a circumferential direction (CD) of the rotation axis, each of the coils is formed by multiple coil portions (215) around each of which a coil wire (220) is wound and which are arranged in the circumferential direction, and the coil portion is provided at a position facing the axial projection portion in the radial direction (RD) of the rotation axis.

[Feature C4]

In the rotary electric machine according to any one of features C1 to C3, the inner peripheral surface includes a housing base surface (176) and a housing rough surface (177) rougher than the housing base surface, and the coil protection portion is at least overlapped with the housing rough surface.

[Feature C5]

The rotary electric machine according to any one of features C1 to C4 further includes a lead-out wire protection portion (255) that protects a coil lead-out wire (212) led out from a corresponding one of the coils through the coil protection portion and that fills a gap between the coil lead-out wire and the coil protection portion.

[Feature C6]

In the rotary electric machine according to any one of features C1 to C5, the stator includes a bobbin (240) which is protected by the coil protection portion together with a corresponding one of the coils, through which heat is released to the coil protection portion, which has an electrical insulation property, and around which the coil is wound.

[Feature C7]

In the rotary electric machine according to feature C6, the bobbin has a bobbin base surface (246) and a bobbin rough surface (247) rougher than the bobbin base surface, and the coil protection portion is at least overlapped with the bobbin rough surface.

[Feature C8]

In the rotary electric machine according to feature C6 or C7, the stator includes a core (231) provided inside the bobbin and having a width in a circumferential direction (CD) of the rotation axis decreasing stepwise toward an inner side in a radial direction (RD) of the rotation axis.

[Feature C9]

In the rotary electric machine according to any one of features C6 to C8, the bobbin includes a bobbin trunk portion (241) around which the coil is wound, and a bobbin flange (242) having a flange surface (243) facing the coil and extending toward an outside from an outer peripheral surface (241*a*) of the bobbin trunk portion, and a flange recess portion (243*a*) recessed to allow the coil lead-out wire (212), which is lead out from the coil, to pass therethrough is formed in the flange surface.

<Configuration Group D>

In a motor such as an axial gap motor, there is a concern that a heat radiation effect of the motor is insufficient. Regarding the motor, it is conceivable to provide the motor integrally with an inverter to configure a unit. In the unit, it is also conceivable that the heat radiation effect of the unit is likely to be insufficient due to heat from the inverter and the like. In view of this concern, a rotary electric machine unit capable of implementing both a decrease in a size and an enhancement in the heat radiation effect is provided.

According to a feature D1, an electric power conversion unit (81), and a rotor (300, 300*a*, 300*b*) and a stator (200) which are aligned in the axial direction (AD) are accommodated in a unit housing (51). In the configuration, the rotary electric machine (60) is made thinner, and a size of a rotary electric machine unit (50) can be decreased. Moreover, since radiation fins (72, 92) are provided on an outer peripheral surface (70*a*, 90*a*) of the unit housing (51), a heat radiation effect of the rotary electric machine unit (50) can be enhanced by the radiation fins (72, 92). Therefore, a decrease in a size and an enhancement in the heat radiation effect of the rotary electric machine unit (50) can be implemented.

[Feature D1]

A rotary electric machine unit (50) to be driven by supply of electric power includes:

a rotary electric machine (60) including a rotor (300, 300*a*, 300*b*) configured to rotate about a rotation axis (Cm) and a stator (200) aligned with the rotor in an axial direction (AD) in which the rotation axis extends;

an electric power conversion device (80) including an electric power conversion unit (81) configured to convert electric power to be supplied to the rotary electric machine;

a unit housing (51) forming both an outer peripheral surface (70*a*) of the rotary electric machine and an outer peripheral surface (90*a*) of the electric power conversion device and accommodating the rotor, the stator, and the electric power conversion unit; and radiation fins (72, 92) provided on the outer peripheral surface (70*a*, 90*a*) of the unit housing and configured to release heat.

[Feature D2]

In the rotary electric machine unit according to feature D1, the stator includes a coil (211) configured to allow a current to flow therethrough, and a coil protection portion (250) provided in a state of being overlapped with an inner peripheral surface (70*b*) of the unit housing, having a thermal conduction property, and configured to protect the coil.

[Feature D3]

In the rotary electric machine unit according to feature D1 or D2, the rotary electric machine includes an electric machine housing (70) included in the unit housing, forming the outer peripheral surface of the rotary electric machine, and accommodating the rotor and the stator, the electric power conversion device includes a device housing (90) included in the unit housing, forming the outer peripheral surface of the electric power conversion device, and accommodating the electric power conversion unit, and in the unit housing, the electric machine housing and a device housing are aligned in the axial direction.

[Feature D4]

The rotary electric machine unit according to any one of features D1 to D3, further includes:

a shaft (340) including a shaft flange (342) which is aligned with the rotor in the axial direction and which is fixed to the rotor, and configured to rotate about the rotation axis together with the rotor, and the shaft flange includes an annular portion (344) provided on an inner side of the stator in a radial direction (RD) of the rotation axis and extending in an annular shape along the stator in a circumferential direction (CD) of the rotation axis, and a flange vent hole (345) penetrating the annular portion in the radial direction and configured to allow ventilation in the radial direction.

[Feature D5]

The rotary electric machine unit according to any one of the features D1 to D4, further includes:

a balance adjustment hole (326) which is formed in the rotor and which adjusts a balance of the rotor, and the balance adjustment hole penetrates the rotor in the axial direction and is formed on an inner side of the stator in the radial direction (RD) of the rotation axis to enable ventilation in the axial direction.

[Feature D6]

The rotary electric machine unit according to any one of features D1 to D5, further includes:

a housing partition portion (370, 424) partitioning an inside of the unit housing into a rotary electric machine side and an electric power conversion unit side in the axial direction;

multiple state detection units (421, 431) configured to detect a state of the rotary electric machine; and a wiring collecting portion (440) provided on an electric power conversion unit side of the housing partition portion and configured to collect detection wirings (426, 436) electrically connected to the multiple state detection units, respectively.

[Feature D7]

The rotary electric machine unit according to feature D6, further includes:

a housing partition portion (370, 424) partitioning the inside of the unit housing into the rotary electric machine side and the electric power conversion unit side in the axial direction;

a partition opening portion (373) allowing a coil lead-out wire (212) led out from a coil (211) of the stator to be inserted therethrough and opening the housing partition portion in the axial direction; and a partition cover portion (380) covering the partition opening portion.

[Feature D8]

In the rotary electric machine unit according to any one of features D1 to D7, the unit housing includes an electric machine housing (70) forming the outer peripheral surface of the rotary electric machine and accommodating the rotor and the stator, and the electric machine housing includes a housing main body (71) forming the outer peripheral surface of the rotary electric machine, an electric machine flange (74, 178) protruding from the housing main body toward an outer side in a radial direction (RD) of the rotation axis, and an electric machine fixing hole (74*a*, 178*a*) formed in the electric machine flange and through which the electric machine housing is fixed to a predetermined housing fixing target (90, 390).

[Feature D9]

In the rotary electric machine unit according to any one of features D1 to D8, the unit housing includes an electric machine housing (70) forming the outer peripheral surface of the rotary electric machine and accommodating the rotor and the stator, and an electric machine cover portion (390) fixed to the electric machine housing and covering the rotor and the stator from one side in the axial direction, and the electric machine cover portion includes a first fixing hole (392*a*) for fixing the electric machine cover portion to the electric machine housing, and a second fixing hole (392*b*) aligned with the first fixing hole in the radial direction (RD) of the rotation axis and for fixing the electric machine cover portion to a predetermined cover fixing target (53).

(Disclosure of Technical Concept)

The present specification discloses multiple technical concepts described in multiple clauses as follows. Some of the clauses may be described in a multiple dependency form (a multiple dependency form) in which a succeeding clause refers selectively to preceding clauses. Further, some of the clauses may be described in a multiple dependent form referring to another multiple dependent form (a multiple dependent form referring to another multiple dependent form). The clause in the multiple dependent form referring to another multiple dependent form defines multiple technical concepts.

Technical Concept 1. A rotary electric machine (60) to be driven by supply of electric power, the rotary electric machine (60) comprising:

a stator (200) including a coil (211);

a rotor (300, 300*a*, 300*b*) configured to rotate about a rotation axis (Cm) and aligned with the stator in an axial direction (AD) in which the rotation axis extends;

an electric machine housing (70) accommodating the stator and the rotor;

a heat radiation accelerating portion (72, 551, 561, 571, 581) provided on one of an inner side and an outer side of the coil in a radial direction (RD) of the rotation axis and configured to accelerate heat radiation of the coil toward one side, such that heat radiated from the coil toward the one side is more than heat radiated toward the other side; and a temperature detection unit (431, 431A, 431B, 431C, 431D) accommodated in the electric machine housing, provided on an opposite side of the coil from the heat radiation accelerating portion in the radial direction, and configured to detect an internal temperature of the electric machine housing.

Technical Concept 2. The rotary electric machine according to technical concept 1, further comprising:

an energization busbar (290) provided on one of the inner side and the outer side of the coil in the radial direction and electrically connected to the coil, wherein the temperature detection unit includes a busbar detection unit (431A) provided to the energization busbar.

Technical Concept 3. The rotary electric machine according to technical concept 1 or 2, wherein the temperature detection unit includes a coil detection unit (431B) provided to the coil.

Technical Concept 4. The rotary electric machine according to any one of technical concepts 1 to 3, further comprising:

a coil lead-out wire (213) led out from the coil, wherein the temperature detection unit includes a lead-out detection unit (431C) provided to the coil lead-out wire.

Technical Concept 5. The rotary electric machine according to any one of technical concepts 1 to 4, further comprising:

a coil protection portion (250) having a thermal conduction property and configured to protect the coil, wherein the temperature detection unit includes an embedded detection unit (431A, 431B, 431C, 431D) embedded in the coil protection portion.

Technical Concept 6. The rotary electric machine according to any one of technical concepts 1 to 5, further comprising:

a plurality of coil bodies (900) each including a wound coil wire (220) and arranged in a circumferential direction (CD) of the rotation axis, such that the coil wire forms the coil; and a temperature communication line (436, 436A, 436B) provided to extend in the radial direction, passing between two of the coil bodies, which are adjacent to each other in the circumferential direction, and communicably connected to the temperature detection unit.

Technical Concept 7. The rotary electric machine according to technical concept 6, wherein the temperature communication line is fixed to at least one of the two coil bodies, which are adjacent to each other in the circumferential direction.

Technical Concept 8. The rotary electric machine according to technical concept 6 or 7, wherein the coil body includes a bobbin (240) configured to support the coil wire, the bobbin includes a pair of bobbin flanges (242) each extending in a direction orthogonal to the axial direction and arranged in the axial direction, and a bobbin trunk portion (241) connecting the pair of bobbin flanges and configured to support the wound coil wire between the pair of bobbin flanges, and the temperature communication line is an entry wire (436A), which extends in the radial direction, and passing through a position, at which the temperature communication line enters between the pair of bobbin flanges, in one of the two coil bodies, which are adjacent to each other in the circumferential direction.

Technical Concept 9. The rotary electric machine according to any one of technical concepts 1 to 8, wherein the heat radiation accelerating portion includes an outer peripheral accelerating portion (72, 561, 581) provided on the outer side of the coil in the radial direction, and the temperature detection unit includes an inner peripheral detection unit (431A, 431B, 431C) provided on the inner side of the coil in the radial direction. Technical Concept 10. The rotary electric machine according to any one of technical concepts 1 to 8, wherein the heat radiation accelerating portion includes an inner peripheral accelerating portion (551, 571) provided on the inner side of the coil in the radial direction, and the temperature detection unit includes an outer peripheral detection unit (431D) provided on the outer side of the coil in the radial direction.

What is claimed is:

1. A rotary electric machine to be driven by supply of electric power, the rotary electric machine comprising:

a stator including a coil;

a rotor configured to rotate about a rotation axis and aligned with the stator in an axial direction in which the rotation axis extends;

an electric machine housing accommodating the stator and the rotor;

a heat radiation accelerating portion provided on one of an inner side and an outer side of the coil in a radial direction of the rotation axis and configured to accelerate heat radiation of the coil toward one side, such that heat radiated from the coil toward the one side is more than heat radiated toward the other side; and a temperature detection unit accommodated in the electric machine housing, provided on an opposite side of the coil from the heat radiation accelerating portion in the radial direction, and configured to detect an internal temperature of the electric machine housing, wherein the heat radiation accelerating portion is an opposed accelerating portion provided at a position opposed to an outer peripheral surface of the coil on a radially outside of the coil, and the temperature detection unit is an opposed detection unit provided at a position opposed to an inner peripheral surface of the coil on a radially inner side of the coil.

2. The rotary electric machine according to claim 1, further comprising:

an energization busbar provided on one of the inner side and the outer side of the coil in the radial direction and electrically connected to the coil, wherein the temperature detection unit includes a busbar detection unit provided to the energization busbar.

3. The rotary electric machine according to claim 1, wherein the temperature detection unit includes a coil detection unit provided to the coil.

4. The rotary electric machine according to claim 1, further comprising:

a coil lead-out wire led out from the coil, wherein the temperature detection unit includes a lead-out detection unit provided to the coil lead-out wire.

5. The rotary electric machine according to claim 1, further comprising:

a coil protection portion having a thermal conduction property and configured to protect the coil, wherein the temperature detection unit includes an embedded detection unit embedded in the coil protection portion.

6. The rotary electric machine according to claim 1, further comprising:

a plurality of coil bodies each including a wound coil wire and arranged in a circumferential direction of the rotation axis, such that the coil wire forms the coil; and a temperature communication line provided to extend in the radial direction, passing between two of the coil bodies, which are adjacent to each other in the circumferential direction, and communicably connected to the temperature detection unit.

7. The rotary electric machine according to claim 6, wherein the temperature communication line is fixed to at least one of the two coil bodies, which are adjacent to each other in the circumferential direction.

8. A rotary electric machine to be driven by supply of electric power, the rotary electric machine comprising:

a stator including a coil;

a rotor configured to rotate about a rotation axis and aligned with the stator in an axial direction in which the rotation axis extends;

an electric machine housing accommodating the stator and the rotor;

a heat radiation accelerating portion provided on one of an inner side and an outer side of the coil in a radial direction of the rotation axis and configured to accelerate heat radiation of the coil toward one side, such that heat radiated from the coil toward the one side is more than heat radiated toward the other side;

a temperature detection unit accommodated in the electric machine housing, provided on an opposite side of the coil from the heat radiation accelerating portion in the radial direction, and configured to detect an internal temperature of the electric machine housing;

a plurality of coil bodies each including a wound coil wire and arranged in a circumferential direction of the rotation axis, such that the coil wire forms the coil; and a temperature communication line provided to extend in the radial direction, passing between two of the coil bodies, which are adjacent to each other in the circumferential direction, and communicably connected to the temperature detection unit, wherein the coil body includes a bobbin configured to support the coil wire, the bobbin includes a pair of bobbin flanges each extending in a direction orthogonal to the axial direction and arranged in the axial direction, and a bobbin trunk portion connecting the pair of bobbin flanges and configured to support the wound coil wire between the pair of bobbin flanges, and the temperature communication line is an entry wire, which extends in the radial direction, and passing through a position, at which the temperature communication line enters between the pair of bobbin flanges, in one of the two coil bodies, which are adjacent to each other in the circumferential direction.

9. The rotary electric machine according to claim 1, wherein the heat radiation accelerating portion includes an outer peripheral accelerating portion provided on the outer side of the coil in the radial direction, and the temperature detection unit includes an inner peripheral detection unit provided on the inner side of the coil in the radial direction.

10. The rotary electric machine according to claim 1, wherein the heat radiation accelerating portion includes an inner peripheral accelerating portion provided on the inner side of the coil in the radial direction, and the temperature detection unit includes an outer peripheral detection unit provided on the outer side of the coil in the radial direction.

* * * * *